United States Patent
Tabata

(10) Patent No.: US 6,672,415 B1
(45) Date of Patent: Jan. 6, 2004

(54) MOVING OBJECT WITH FUEL CELLS INCORPORATED THEREIN AND METHOD OF CONTROLLING THE SAME

(75) Inventor: Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/576,444

(22) Filed: May 22, 2000

(30) Foreign Application Priority Data

| May 26, 1999 | (JP) | ......................... 11-145914 |
| Jun. 14, 1999 | (JP) | ......................... 11-166257 |
| Jun. 25, 1999 | (JP) | ......................... 11-179128 |
| Oct. 22, 1999 | (JP) | ......................... 11-300792 |
| Nov. 8, 1999 | (JP) | ......................... 11-316422 |
| Dec. 2, 1999 | (JP) | ......................... 11-343371 |
| Feb. 1, 2000 | (JP) | ......................... 2000-023582 |
| Apr. 12, 2000 | (JP) | ......................... 2000-110709 |

(51) Int. Cl.⁷ .................................................. B60K 6/00
(52) U.S. Cl. ........................ 180/65.2; 180/65.3; 701/22
(58) Field of Search ............................... 180/65.2, 65.3, 180/65.4; 123/3; 320/101

(56) References Cited

U.S. PATENT DOCUMENTS

| 3,850,695 | A | * | 11/1974 | Keller et al. ............... 136/86 B |
| 4,629,664 | A | * | 12/1986 | Tsukui et al. ................. 429/23 |
| 4,797,186 | A | * | 1/1989 | Levy et al. .................. 204/129 |
| 5,170,124 | A | * | 12/1992 | Blair et al. .................. 324/434 |
| 5,212,431 | A | * | 5/1993 | Origuchi et al. ............ 180/65.4 |
| 5,318,142 | A |   | 6/1994 | Bates et al. |
| 5,487,002 | A |   | 1/1996 | Diller et al. |
| 5,759,712 | A | * | 6/1998 | Hockaday ..................... 429/30 |
| 5,898,282 | A | * | 4/1999 | Drozdz et al. .............. 180/65.4 |
| 5,929,595 | A | * | 7/1999 | Lyons et al. ................. 320/104 |
| 6,003,626 | A |   | 12/1999 | Ibaraki et al. |
| 6,098,733 | A |   | 8/2000 | Ibaraki et al. |
| 6,119,799 | A | * | 9/2000 | Morisawa et al. ........... 180/275 |
| 6,132,902 | A | * | 10/2000 | Miyasaka ................... 180/65.3 |
| 6,209,494 | B1 | * | 4/2001 | Manikowski et al. .......... 123/3 |
| 6,294,277 | B1 | * | 9/2001 | Ueno et al. .................... 429/22 |
| 6,326,097 | B1 | * | 12/2001 | Hockaday ..................... 429/34 |
| 6,346,340 | B1 |   | 2/2002 | Abersfelder et al. |

FOREIGN PATENT DOCUMENTS

| EP | 0751045 A | 1/1997 |
| GB | 1447835 A | 9/1976 |
| JP | 50-31516 | 3/1975 |
| JP | 1-211860 | 8/1989 |
| JP | 3-148330 | 6/1991 |
| JP | 3-195305 | 8/1991 |
| JP | 5-112145 | 5/1993 |
| JP | 6-137735 | 5/1994 |
| JP | 11-147424 | 6/1999 |

* cited by examiner

*Primary Examiner*—Brian Johnson
*Assistant Examiner*—Christopher Bottorff
(74) *Attorney, Agent, or Firm*—Oblon, Spivak, McClelland, Maier & Neustadt, P.C.

(57) ABSTRACT

In a hybrid vehicle with fuel cells and an engine mounted thereon as energy output sources, a technique is employed that adequately changes a working energy output source according to a driving state of the hybrid vehicle. The hybrid vehicle has the engine and a motor, both enabling power to be output to an axle. The hybrid vehicle also has fuel cells as a main electric power supply for driving the motor. The technique changes the working energy output source between the fuel cells and the engine, in order to reduce the output of the fuel cells with consumption of a fuel for the fuel cells. With a decrease in remaining quantity of the fuel, the technique narrows a specific driving range, in which the motor is used as the power source. The technique also causes the engine to drive the motor as a generator and charges a battery not with electric power of the fuel cells but with electric power generated by the motor. This arrangement effectively prevents the fuel for the fuel cells from being excessively consumed in one driving mode. The fuel cells can thus be used preferentially in a specific driving state of the hybrid vehicle where the fuel cells have a high efficiency.

16 Claims, 83 Drawing Sheets

Fig. 4

|  | C0 | C1 | C2 | B0 | B1 | B2 | B3 | B4 | F0 | F1 | F2 |
|---|---|---|---|---|---|---|---|---|---|---|---|
| P | ○ |  |  |  |  |  |  |  |  |  |  |
| R |  |  | ○ | ○ |  |  |  |  | ○ |  |  |
| N | ○ |  |  |  |  |  |  |  |  |  |  |
| 1st | ○ | ○ |  |  |  |  |  | ◎ | ○ |  | ○ |
| 2nd | ◎ | ○ |  |  |  |  | ○ |  | ○ |  |  |
| 3rd | ○ | ○ |  |  | ◎ | ○ |  |  | ○ |  |  |
| 4th |  | ○ | ○ |  |  | △ |  |  | ○ | ○ |  |
| 5th |  | ○ | ○ | ○ |  | △ |  |  | ○ |  |  |

○ : Coupling
◎ : Coupling in the case of power-source braking
△ : Coupling but not involved in power transmission

| Driving state | | | Motor 80 | Motor 20 |
|---|---|---|---|---|
| N, P | SOC<L02 | | ◎ | ○ |
| | SOC≧L02 | | ◎ | — |
| Other gearshift positions | EV drive | | ◎ | — |
| | Engine drive | During change of speed | ◎ | — |
| | | High AT oil temperature | ◎ | — |
| | | Other conditions SOC<LOSS | ◎ | ○ |
| | | Other conditions SOC≧LOSS | ◎ | — |
| | Non-driving conditions | SOC<L02 | ○ | △ |
| | | SOC≧L02 | — | △ |

◎ : Used as main generator
○ : Used as sub-generator
△ : Regenerative operation

Fig. 23

|  |  | Clutch 171 | Clutch 172 | Brake 173 | Gear ratio |
|---|---|---|---|---|---|
| Engine | D 2nd | ○ | ○ | × | 1 |
| | D 2nd (low speed) | △ | ○ | × | 1 |
| | R high speed | ○ | × | ○ | $-1/(\rho 2)$ |
| | R low speed | △ | × | ○ | $-1/(\rho 2)$ |
| | N | × | × | ○ | |
| Motor | D 1st | × | × | ○ | $1/(\rho 1)$ |
| | D 2nd (assist) | ○ | ○ | × | 1 |
| | D 2nd (regeneration) | × | ○ | × | 1 |
| | R low speed | × | × | ○ | $-1/(\rho 1)$ |

○ : Coupled
△ : Slip
× : Released

MOVING OBJECT WITH FUEL CELLS INCORPORATED THEREIN AND METHOD OF CONTROLLING THE SAME

BACKGROUND OF THE INVENTION

1. Field of the Invention

The present invention relates to a moving object with at least two energy output sources including fuel cells incorporated therein, a driving apparatus for the moving object, and a method of controlling the moving object.

2. Description of the Related Art

Hybrid vehicles with an engine and a motor mounted thereon have been proposed recently. In one form of the hybrid vehicle called a parallel hybrid vehicle, the power of both the motor and the engine is output to a drive shaft. The parallel hybrid vehicle has the engine and a battery as energy output sources to produce mechanical and electrical power to rotate the drive shaft. The parallel hybrid vehicle may run only with the power from the engine or from the battery. Proper conditional use of these two energy output sources enables the engine to operate in an efficient operating range. The motor may also act as a generator to convert the mechanical power of the driving shaft into electric power while causing a braking force to the driving shaft. The regenerative braking by the motor recovers the kinetic energy of the vehicle to charge the battery. Because of these functions, the parallel hybrid vehicle has excellent fuel consumption and environmental properties.

Another form of the hybrid vehicle is called a series hybrid vehicle. The series hybrid vehicle runs with power from a motor connected with the drive shaft. The engine is disposed separately from the drive shaft and drives a generator to generate electric power. The motor is driven by either the electric power generated by the generator or the electric power supplied from a battery. The series hybrid vehicle also has the two energy output sources of the engine and the battery. Proper combinational use of these two energy output sources ensures the excellent fuel consumption and environmental properties.

Some vehicles with fuel cells mounted thereon as one of energy output sources have been proposed as one type of the parallel hybrid vehicle (for example, a vehicle disclosed in JAPANESE PATENT LAID-OPEN GAZETTE No. 3-148330). The fuel cells oxidize hydrogen, or fuel, to generate electric power. The exhaust from the fuel cells is water vapor and does not contain any harmful components. The fuel cells accordingly have extremely excellent environmental properties. Some types of fuel cells utilize a hydrogen rich gas generated by reforming of a fuel, such as methanol. Hybrid vehicles having these fuel cells and a gasoline engine are provided with a plurality of fuel reservoirs, in which methanol and gasoline are separately stored.

The fuel cell technology is being under rapid development these days. There is accordingly no sufficient discussion on the optimum combination of the output characteristics of the fuel cells with those of another energy output sources such as a heat engine. The fuel cells generate electrical energy like secondary batteries, but they are irreversible energy output sources. The secondary battery is rechargeable even in the course of a drive of the hybrid vehicle. The fuel cells, on the other hand, do not recover their power generation ability without an external supply of fuel. Another disadvantage of the fuel cells is a poor response.

Hybrid vehicles with the fuel cells have been proposed to combine the advantages of the conventionally used engine with these of the fuel cells. In the proposed hybrid vehicles with the fuel cells, however, the effective use of the fuel cells has not been fully considered by taking into account the above characteristics.

In the proposed hybrid vehicles with the fuel cells mounted thereon, the fuel cells are used only in a limited manner and not fully utilized. The favorable fuel consumption and the other advantages of the hybrid vehicle have not been fully utilized. Sufficient warming up is generally required in the process of power generation by the fuel cells. The fuel cells accordingly have a poor response to a requirement of power generation. There has been no sufficient discussion on the method of compensating for the poor response and outputting the required electric power.

In the proposed hybrid vehicles with the fuel cells mounted thereon, there has been substantially no discussion on the selective use of energy output sources at a drive in a specific condition that is different from a normal drive. There has also been substantially no discussion on the technique of utilizing the characteristics of the fuel cells as an electric power supply of high efficiency and excellent environmental properties, so as to improve the facility of the hybrid vehicle.

In the vehicle with a plurality of energy output sources requiring different types of fuels, such as fuel cells and a gasoline engine, it is required to supply the corresponding fuels to the respective fuel reservoirs or tanks without any confusion. No simple structure, however, has been proposed to prevent confusion between the plurality of fuels supplied.

The conventional vehicles have another problem relating to vibration damping of the engine as discussed below. The engine generally has a pulsation or variation in its output torque. In a vehicle with a motor in addition to the engine as a mechanism to output a torque to the drive shaft, the motor can compensate for a variation in the torque output from the engine to the drive shaft. There has been no sufficient discussion on the effective use of the fuel cells as the electric power supply of the motor in the torque control.

When the engine torque is greater than a required torque, the motor carries out regenerative operation to give a load, thereby attaining the required torque output. When the engine torque is less than the required torque, on the other hand, the motor carries out power operation to attain the required torque output. The torque control is generally accompanied by extraction and supply of electric power from and into the motor. The conventional technique implements such control with the secondary battery. The fuel cells are the power generator unit that carries out only power generation, and can not replace the secondary battery.

The torque control technique with the secondary battery, however, has a problem that the extraction and supply of electric power from and into the motor are difficult to balance, and thereby the electric power of the secondary battery is often consumed excessively. This is ascribed to a conversion loss between the mechanical power and the electric power due to the charge and discharge efficiencies of the secondary battery.

One proposed technique for compensating the conversion loss includes the use of another electric power supply. The fuel cells may be used as such an electric power supply for compensation. While the motor carries out power operation for the vibration damping, this proposed technique restricts the discharge of the secondary battery by the amount of the electric power previously regenerated and causes the fuel cells to compensate for an insufficiency of electric power. The electric power supplied from the secondary battery, however, has a low efficiency due to the losses in the charging and discharging process. The primary use of such electric power results in lowering the energy efficiency in the vibration damping. The use of the fuel cells for the purpose of compensation does not effectively draw the advantages of the fuel cells having the high efficiency of power generation.

The issues discussed above arise not only in the hybrid vehicles but in any moving objects having a plurality of energy output sources including fuel cells.

SUMMARY OF THE INVENTION

One object of the present invention is thus to provide a moving object with fuel cells mounted thereon, which effectively uses the fuel cells as an energy output source and has excellent fuel consumption and environmental properties.

Another object of the present invention is to provide a simple structure that effectively prevents confusion between a plurality of fuels supplied.

Still another object of the present invention is to provide a technique that efficiently controls a variation in torque output from a heat engine with a torque of a motor.

At least part of the above and other related objects is actualized by a first moving object having at least two energy output sources including a fuel cell. The first moving object includes: a detector that measures at least either one of an output sustaining ability and a variation thereof with regard to at least one of the at least two energy output sources; and an output controller that controls an output state of energy from each of the at least two energy output sources, based on a result of the measurement by the detector, so as to ensure output of a required total energy.

The first moving object of the present invention has at least two energy output sources including fuel cells. The energy output source outputs energy in a variety of forms including mechanical energy and electrical energy. The fuel cells are the energy output source that outputs electrical energy. It is not necessary that the at least two energy output sources output different forms of energy. The at least two energy output sources may, however, output the same form of energy as in the case of the fuel cells and a secondary battery.

The first moving object of the present invention controls the output state of each of the plural energy output sources according to its output sustaining ability. For example, the fuel cells can be controlled to have the output according to at least either one of the output sustaining ability and the variation thereof. The output sustaining ability here means a total quantity of energy that can be output continuously from each energy output source. The output sustaining ability of the fuel cells is defined, for example, as the ability of the fuel cells for continuously performing the power generation and corresponds to a physical quantity obtained as a time integral of the electric power that can be output from the fuel cells. Even if the energy output source can output the required electric power, in the case where the required level of electric power is kept only for a short time period, it is determined that the energy output source has a low output sustaining ability.

The continuous output of high energy from the fuel cells having the low output sustaining ability may cause the fuel cells to fall into a power generation-unable state. The fuel cells in this state can no longer be used as the energy output source. In this case, the moving object should be driven with the energy output source or sources other than the fuel cells. The moving object with a plurality of energy output sources mounted thereon attains a drive of high efficiency by properly using these energy output sources. If the fuel cells can not be used as one of the energy output sources, there is an undesirable restriction in use of the energy output sources. This lowers the driving efficiency. Controlling the output of the fuel cells according to the output sustaining ability enables the fuel cells to be kept in the power generation-capable state over a long time period. The variation in output sustaining ability is regarded as a parameter indirectly representing the future output sustaining ability. The control may thus be carried out according to the variation in output sustaining ability, in order to keep the fuel cells in the power generation-capable state over a long time period. The control may alternatively be performed according to both the output sustaining ability and its variation. The first moving object of the present invention controls the output of the fuel cells in this manner and thus ensures the proper use of the respective energy output sources during a long drive. This desirably improves the driving efficiency and the environmental properties. In other words, the first moving object of the present invention adequately reduces the consumption of the FC fuel, in order to allow the fuel cells to be used in the specific conditions that effectively utilize the power generation ability of the fuel cells, thereby improving the driving efficiency and the environmental properties. The above description regards the control of the output of the fuel cells. The principle of the present invention, however, enables the proper use of the energy output sources according to the observed output sustaining ability of any other energy output source.

In the moving object, the operation of each constituent is generally controlled by taking into account the energy per unit time. The term 'energy' used in the specification hereof means the energy per unit time, unless otherwise specified. In this specification, the term 'energy' is synonymous, in principle, with the terms 'power' and 'electric power'.

The term 'moving object' used in the specification hereof includes a diversity of moving objects that move with the power, for example, vehicles, ships and vessels, aircraft, airships, and other flying objects. The purpose of the moving object is not restricted to the transportation of people or things nor to the boarding.

In accordance with one preferable application of the first moving object, the detector measures at least either one of the output sustaining ability of the fuel cell and the variation thereof, based on a remaining quantity of a fuel for the fuel cell.

This application enables the output sustaining ability and the variation thereof to be securely measured by the simplest procedure. The fuel cells are an irreversible energy output source that can not perform power generation without an external supply of a fuel once the fuel for the fuel cells (hereinafter referred to as the FC fuel) has been used up. Measurement of the output sustaining ability using the remaining quantity of the FC fuel as the parameter enables the irreversibility of the fuel cells to be evaluated in the most appropriate manner. This ensures the proper control by taking into account the characteristics of the fuel cells. In the case where the variation of the output sustaining ability is observed, it is not necessary to measure the absolute value of the remaining quantity of the FC fuel, but only a variation in remaining quantity of the FC fuel may be measured. Similarly, in the case where a heat engine is used as one of the energy output sources, the output sustaining ability of the heat engine may be measured, based on the remaining quantity of a fuel supplied to the heat engine.

In accordance with another preferable application of the first moving object, the detector measures at least either one of the output sustaining ability of the fuel cell and the variation thereof, based on a loading state of the fuel cell. The loading state is defined, for example, by the electric power output from the fuel cells or the output of the motor driven by the fuel cells as the parameter. The output sustaining ability of the fuel cells varies with a variation in loading applied to the fuel cells. The continuous monitor of the loading state allows measurement of the output sustaining ability or its variation. Similarly, in the case where a heat engine is used as one of the energy output sources, the output sustaining ability of the heat engine may be measured, based on the loading state of the heat engine.

The output sustaining ability and its variation may be defined by a variety of other parameters. For example, the temperature of the fuel cells may be used for the measurement. When the temperature of the fuel cells is abnormally high, it is required to interrupt the power generation, in order to lower the temperature. The abnormally high temperature can thus be regarded as the case of the lowered output sustaining ability. When the temperature of the fuel cells does not sufficiently rise to the allowable level for power generation, this is also regarded as the case of the lowered output sustaining ability. In the case where the temperature of the fuel cells is used as the parameter, it may be determined that the output sustaining ability is improved according to a temperature variation subsequent to the determination of the lowered output sustaining ability. In another example, the output sustaining ability may be evaluated, based on the determination of whether the fuel cells function properly or malfunction.

In the first moving object of the present invention, the at least two energy output sources may include the fuel cell and a heat engine.

The fuel cells are the output source of electrical energy, whereas the heat engine is the output source of mechanical energy. The use of the two different energy output sources that respectively output different forms of energy ensures the mutual supplement in the areas of low driving efficiency, thereby attaining a drive of high efficiency as a whole. The available energy output sources are, however, not restricted to these two examples.

In accordance with one preferable embodiment of the moving object that has the fuel cells and the heat engine as the energy output sources, the detector measures at least either one of the output sustaining ability of the heat engine and the variation thereof. The output controller selects the fuel cell to be used in place of the heat engine as a working energy output source even in a specific driving range where the heat engine is to be used as the working energy output source, when the observed output sustaining ability of the heat engine is lower than a predetermined level.

In the case of the lowered output sustaining ability of the heat engine, the change of the working energy output source from the heat engine to the fuel cells effectively restricts the use of the heat engine and desirably prevents a further decrease in output sustaining ability. This enables the heat engine to be kept in a workable state, and ensures the proper use of the fuel cells and the heat engine in other driving conditions. The predetermined level used as the criterion for the control is arbitrarily set and may vary according to the driving state of the moving object. The control may be performed at a time point when the observed output sustaining ability is actually lower than the predetermined level or at a time point when the output sustaining ability is expected to be lower than the predetermined level.

As discussed above, the principle of the present invention is applicable to the diversity of moving objects having the various energy output sources. The control of the fuel cells may be implemented by a variety of techniques. The following describes some applications of the control procedure.

In accordance with one preferable application of the present invention, the first moving object further includes: a drive shaft that outputs power; and a mechanical energy output mechanism that converts energy output from each of the at least two energy output sources into mechanical energy and outputs the converted mechanical energy to the drive shaft. The required total energy is expressed as a quantity of mechanical energy output from the drive shaft per unit time.

This application carries out the control based on the mechanical energy output to the drive shaft. In the case of the energy output source outputting the electrical energy, such as the fuel cells, a motor may correspond to the mechanical energy output mechanism. In the case of the energy output source outputting the mechanical energy, such as the heat engine, a mechanism for transmitting the output energy to the drive shaft may correspond to the mechanical energy output mechanism. In this case, the output shaft of the heat engine may be linked directly with the drive shaft. In the first moving object of the above application, the output of the fuel cells is regulated according to at least either one of the output sustaining ability and its variation. This technique enables the power to be output from the drive shaft while properly using the respective energy output sources. This output power is mainly used to move the moving object. This structure accordingly ensures a highly efficient movement of the moving object.

In accordance with one preferable application of the moving object that controls the power output from the drive shaft, the output controller narrows a preset driving range of the moving object, in which a predetermined energy output source selected out of the at least two energy output sources is mainly used to output the required total energy, with a decrease in output sustaining ability of the selected energy output source.

For example, in the case where the predetermined energy output source is the fuel cells, the output controller narrows the preset driving range of the moving object, in which the fuel cells are mainly used to output the required total energy, with a decrease in output sustaining ability of the fuel cells.

In the first moving object of this application, the preset driving range, in which the fuel cells are mainly used, is narrowed with a decrease in output sustaining ability of the fuel cells. This reduces the frequency of consumption of the FC fuel. The driving range here is defined, for example, by the driving force required for the movement and the moving velocity as the parameters. The narrowed driving range of the moving object reduces the consumption of the FC fuel. The preset driving range of the moving object may be narrowed in a stepwise manner or continuously with a decrease in output sustaining ability of the fuel cells. The similar control procedure may be applied for any energy output source other than the fuel cells.

In accordance with another preferable application of the moving object that controls the power output from the drive shaft, the output controller reduces a torque, which is to be output by utilizing a predetermined energy output source selected out of the at least two energy output sources, with a decrease in output sustaining ability of the selected energy output source. For example, in the case where the predetermined energy output source is the fuel cells, the output torque by utilizing the fuel cells is reduced with a decrease in output sustaining ability of the fuel cells. This arrangement effectively reduces the loading of the selected energy output source, for example, the fuel cells. This prevents a further decrease in output sustaining ability of the fuel cells and thereby desirably reduces the consumption of the FC fuel.

In accordance with a concrete embodiment of the moving object that controls the power output from the drive shaft, the at least two energy output sources include a heat engine, the fuel cell, and a secondary battery. The mechanical energy output mechanism includes at least a motor that is rotatable with electric power output from the fuel cell and the secondary battery. The output controller varies at least either one of a driving area of the motor and an output torque of the motor in a specific driving range of the moving object, based on an output sustaining ability of the fuel cell.

The first moving object of this arrangement varies at least either one of the driving area of the motor and the output torque of the motor, so as to reduce the consumption of the FC fuel based on the functions discussed previously. The moving object has the secondary battery as the electric power supply for driving the motor. This enables the insufficiency of electric power due to the decreased loading of the fuel cells to be compensated with the electric power output from the secondary battery, thus ensuring the proper use of the respective energy output sources with a high degree of freedom. This technique desirably reduces the loading of the fuel cells without damaging the ride of the moving object or the response.

In accordance with another preferable application of the present invention, the first moving object further includes: an accumulator that is charged with electric power and is discharged to release electric power; and an electrical energy output mechanism that converts energy output from each of the at least two energy output sources into electrical energy, which is supplied to charge the accumulator. The required total energy is expressed as a quantity of electrical energy required to increase a charge level of the accumulator to a predetermined degree.

This application carries out the control based on the electrical energy supplied to charge the accumulator. The electric power accumulated in the accumulator, such as a secondary battery or a capacitor, may be used to drive the moving object via a motor or to drive a diversity of auxiliary machines. In the case of the energy output source outputting the electrical energy, such as the fuel cells, a conductor, through which the output electric power is transmitted, may correspond to the electrical energy output mechanism. In the case of the energy output source outputting the mechanical energy, such as the heat engine, a generator driven with the mechanical energy may correspond to the electrical energy output mechanism. The technique of the above application controls the output of the fuel cells according to the output sustaining ability, thereby enabling the charging control of the accumulator with the proper use of the respective energy output sources.

In accordance with one preferable embodiment of the moving object that carries out the charging control of the accumulator, the output controller lowers the predetermined degree, which is set as a target charge level of the accumulator, with a decrease in output sustaining ability of a specific energy output source that mainly outputs electric power to charge the accumulator.

Lowering the predetermined degree, which is the target level of the electric power to be accumulated in the accumulator, naturally decreases the total electric power to be output from the energy output sources to the accumulator. This accordingly decreases the electric power to be output from the fuel cells. The first moving object of this arrangement lowers the target level of the electric power to be accumulated in the accumulator according to the output sustaining ability, thereby reducing the consumption of the FC fuel.

In accordance with another preferable embodiment of the moving object that carries out the charging control of the accumulator, the output controller reduces a ratio of an output of a specific energy output source, which mainly outputs electric power to charge the accumulator, to the total energy with a decrease in output sustaining ability of the specific energy output source.

This arrangement properly uses the energy output sources while keeping the target level of the electric power to be accumulated in the accumulator. With a decrease in output sustaining ability, the first moving object of this arrangement reduces the output of the fuel cells and compensates the insufficiency with the energy output from another energy output source, so as to charge the accumulator. The technique of this embodiment thus effectively reduces the consumption of the FC fuel.

In the case of lowering the output of the fuel cells, it is preferable that the output controller heightens the predetermined degree, which is set as a target charge level of the accumulator, with a decrease in output sustaining ability of a specific energy output source that mainly outputs electric power to charge the accumulator.

In the case where the output sustaining ability is lowered, it is preferable to reduce the output of the fuel cells in any state in addition to the charging state of the accumulator. From this point of view, it is favorable that the electric power accumulated in the accumulator is kept at a sufficiently high level. In the case of the lowered output sustaining ability, this arrangement reduces the output of the fuel cells and enables a large quantity of electric power to be accumulated in the accumulator using the output from another energy output source. This technique effectively reduces the consumption of the FC fuel under a variety of conditions requiring electric power.

A combination of the above two control techniques may be applied to the moving object that carries out the charging control. In the case of the lowered output sustaining ability, the combined arrangement lowers the predetermined degree set in the accumulator while reducing the ratio of the output of the fuel cells to the total energy. In any of the applications discussed above, the predetermined degree and the ratio of the output may be lowered with a decrease in output sustaining ability in a stepwise manner or continuously.

The first moving object of the present invention may carry out the control discussed above, based on the output sustaining ability. In the case where the detector measures a variation in output sustaining ability with regard to at least one of the at least two energy output sources, however, the output controller may vary an output of the at least one energy output source, with regard to which the variation in output sustaining ability is measured, at a speed corresponding to the observed variation. For example, in the case where the output sustaining ability abruptly decreases, the output of the fuel cells should abruptly be reduced with the abrupt decrease. This arrangement effectively prevents excessive consumption of the FC fuel. This control technique regulates the consumption of the FC fuel according to the variation in output sustaining ability in the course of a drive of the moving object. The output variation speed of the fuel cells may be varied continuously or in a stepwise manner according to the variation in output sustaining ability.

In accordance with one preferable embodiment of the moving object, the output controller changes a working energy output source according to a driving state of the moving object, so as to output the total energy. The output controller forbids a change of the working energy output source to a specific energy output source that is determined to have an output sustaining ability of not greater than a preset level. In a moving object with fuel cells and a heat engine mounted thereon, for example, when the remaining quantity of the fuel for the heat engine decreases to or below a predetermined level, the fuel cells should continuously be used as the working energy output source even in the specific driving state that generally recommends a change of the working energy output source from the fuel cells to the heat engine.

In accordance with another preferable embodiment of the moving object, the output controller changes a working energy output source according to a driving state of the moving object, so as to output the total energy. The output controller performs a change of the working energy output source from a specific energy output source, which is determined to have an output sustaining ability of not greater than a preset level, to another energy output source even if the driving state of the moving object recommends a selection of the specific energy output source as the working energy output source. In the moving object with the fuel cells and the heat engine mounted thereon, for example, when the remaining quantity of the fuel for the heat engine decreases to or below a predetermined level, the working energy output source should be changed from the heat engine to the fuel cells.

These arrangements effectively restrict the use of the specific energy output source having the lowered output sustaining ability. The continuous use of the specific energy output source in the state of low output sustaining ability results in lowering the driving efficiency and may further cause an abrupt change of the total output energy when the specific energy output source falls into an output-unable state. This may significantly damage the drive feeling of the moving object. These arrangements of the present invention favorably prevent the drive feeling from being abruptly changed.

In the latter arrangement that changes the working energy output source from the specific energy output source having the lowered output sustaining ability to another energy output source, it is preferable that each of the at least two energy output sources has a mechanism that outputs rotational power to a drive shaft of the moving object. The output controller performs the change of the working energy output source from the specific energy output source to the another energy output source in a specific driving state of the moving object, where a difference between torques said specific energy output sources can output is within a preset range.

This arrangement effectively restricts a variation in torque at the time of the change within the preset range and thereby reduces the potential shock. The preset range may arbitrarily be determined in an allowable area according to the type of the moving object.

In accordance with another preferable application of the present invention, the first moving object further includes a driving state input unit that inputs a predetermined parameter representing a driving state of the moving object. The output controller varies a reference value, which is used to control the output state of energy from each of the at least two energy output sources based on the result of the measurement, with a variation of the predetermined parameter.

This arrangement ensures the flexible use of the energy output sources according to the driving conditions and thereby actualizes a highly efficient drive suitable for the drive feeling. There are a variety of parameters usable as direct indexes of the driving conditions; for example, the moving velocity of the moving object and the accelerator travel indicating a required power. In the structure having a system that gives information on the course of the moving object, various pieces of information obtained from this system may also be used as the parameters.

Another embodiment of the present invention is a driving apparatus having a main part identical with that of the moving object discussed above.

The present invention is accordingly directed to a driving apparatus having at least two energy output sources including a fuel cell. The driving apparatus includes: an estimation unit that estimates at least either one of a remaining power and a variation thereof with regard to at least one of the at least two energy output sources; and an output distribution controller that regulates a distribution of total energy to be output from the at least two energy output sources among the at least two energy output sources, based on a result of the estimation by the estimation unit.

Because of the same functions as those discussed above with regard to the moving object, the driving apparatus of the present invention ensures a drive of high efficiency and excellent environmental properties.

The remaining power here corresponds to a physical quantity obtained as a time integral of the electric power output from each energy output source. The remaining power can be estimated with a variety of parameters.

For example, the estimation unit may estimate at least either one of the remaining power and the variation thereof with regard to the fuel cell, based on either one of a remaining quantity of a fuel for the fuel cell and a remaining quantity of a raw material used to produce the fuel for the fuel cell.

In accordance with one preferable embodiment of the driving apparatus, the output distribution controller regulates the distribution while allowing at least one energy output source other than the fuel cell to have a negative output energy.

Setting a negative value to the output energy means that the energy output source prepares for an input of energy. For example, in the case where a chargeable and dischargeable accumulator is used as one of the energy output sources, the state of negative output energy corresponds to charging state of the accumulator. Setting the negative value to the output energy enables the energy state of the energy output source in the driving apparatus preparing for an input of energy to be recovered with the energy output from the other energy output sources including the fuel cells.

Like the first moving object of the present invention discussed above, there are a variety of possible arrangements applicable for the driving apparatus.

In accordance with one preferable application of the driving apparatus, the output distribution controller changes a working energy output source according to a driving state of the driving apparatus, so as to output the total energy. The output distribution controller forbids a change of the working energy output source to a specific energy output source that is determined to have a remaining power of not greater than a preset level.

In accordance with another preferable application of the driving apparatus, the output distribution controller changes a working energy output source according to a driving state of the driving apparatus, so as to output the total energy. The output distribution controller performs a change of the working energy output source from a specific energy output source, which is determined to have a remaining power of not greater than a preset level, to another energy output source even if the driving state of the moving object recommends a selection of the specific energy output source as the working energy output source.

In this case, it is further preferable that the output distribution controller performs a change of the working energy output source from the specific energy output source to the another energy output source in a specific driving state of the driving apparatus, where a total torque output from both the specific energy output source and the another energy output source to the drive shaft of the driving apparatus is within a preset range.

In accordance with another preferable application of the present invention, the driving apparatus further includes a driving state input unit that inputs a predetermined parameter representing a driving state of the driving apparatus. The output distribution controller varies a reference value, which is used to regulate the distribution of the total energy to be output from the at least two energy output sources among the at least two energy output sources based on the result of the estimation by the estimation unit, with a variation of the predetermined parameter.

Because of the same functions as those discussed above with regard to the moving object, these arrangements ensure the efficient use of the respective energy output sources suitable for the drive feeling.

The present invention is also directed to a method of controlling a drive of a moving object that has at least two energy output sources including a fuel cell. The method includes the steps of: (a) measuring at least either one of an output sustaining ability and a variation thereof with regard to at least one of the at least two energy output sources; (b) setting a total energy to be output from the at least two energy output sources; and (c) regulating energy to be output from each of the at least two energy output sources based on a result of the measurement in the step (a) and controlling the each energy output source, so as to output the total energy set in the step (b).

Part of the objects mentioned above is also actualized by a second moving object having a motor and a heat engine as power sources. The second moving object includes: a fuel cell and a secondary battery as electric power supplies of the motor; a regulation unit that regulates supplies of electric power fed from the fuel cell and the secondary battery to the motor; and a control unit that controls operations of the electric power supplies and the power sources according to a driving state of the moving object.

The second moving object of the present invention includes fuel cells and a secondary battery as the electric power supplies. As described previously, the fuel cells are the highly efficient energy source having the excellent environmental properties. The fuel cells generate power through the oxidation reaction of a fuel and thereby have a disadvantage that the sufficient power generation can not be performed once the fuel has been used up. Another disadvantage of the fuel cells is a time lag before the reaction proceeds to start power generation. The secondary battery is, on the other hand, a reversible energy source that can recover the level of electric power by charging even after the total consumption of electric power. The advantage of the secondary battery is a quick supply of electric power without any delay.

The second moving object of the present invention has the two electric power supplies having different characteristics. The control unit works to properly use these two electric power supplies, thereby attaining a favorable drive of the moving object that effectively utilizes the advantages of the respective electric power supplies. In the moving object with only the fuel cells mounted thereon as the electric power supply, the motor can no longer be used as the power source after the fuel for the fuel cells has been used up. The second moving object of the present invention, on the other hand, has the two different electric power supplies mounted thereon. The proper use of these two electric power supplies solves the above restriction and enables the motor to be driven more flexibly. This ensures a favorable drive of the moving object that effectively utilizes the advantages of the two different power sources, that is, the motor and the heat engine. Since the moving object has the secondary battery, the kinetic energy of the moving object through the regenerative braking can be recovered in the form of electric power. These functions enable the second moving object of the present invention to attain a drive of excellent fuel consumption and environmental properties. The heat engine here includes a diversity of engines that output power by taking advantage of heat, such as internal combustion engines and external combustion engines. The term 'power' used in the specification hereof is not restricted to the power that is directly used to drive the moving object. The 'power' here includes the power output from the heat engine for the purpose of power generation.

In the second moving object of the present invention, a variety of settings may be applicable for the selective use of the electric power supplies and the power sources according to the driving state of the moving object.

For example, the second moving object may further include a remaining charge measurement unit that measures a remaining charge of the secondary battery. In this structure, the control unit drives the motor with the secondary battery as a working electric power supply in the case where the observed remaining charge is not less than a predetermined level, while the moving object is in a specific driving state that has been set in advance to select the motor as a working power source.

In the second moving object of this arrangement, when the observed remaining charge of the secondary battery is not less than a predetermined level, the motor is driven with the secondary battery as the working electric power supply. As described previously, the secondary battery recovers the level of electric power by charging. In order to recover the kinetic energy of the moving object through the regenerative braking, it is desirable that the charge level of the secondary battery has some margin to a full charge level. The preferential use of the secondary battery having a sufficient remaining charge effectively draws the advantages of the secondary battery discussed above.

In the second moving object, when the observed remaining charge of the secondary battery is less than the predetermined level, the heat engine may be used as the working power source.

It is also preferable that the control unit drives the motor with the fuel cell as the working electric power supply in the case where the observed remaining charge is less than the predetermined level.

This control procedure enables the motor to be driven as the working power source, even when the secondary battery has an insufficient remaining charge. This arrangement ensures the flexible use of the motor in a wider driving area.

The motor is the power source having the better environmental properties than the heat engine. The fuel cells are the electric power supply having the excellent environmental properties. The second moving object of the above application uses the fuel cells when the secondary battery has a relatively low remaining charge. This arrangement desirably saves the fuel for the fuel cells and attains a favorable drive having excellent environmental properties. This control procedure is substantially equivalent to the control that gives a preference to the secondary battery over the fuel cells as the working electric power supply.

The predetermined level as the criterion for the selective use of the electric power supplies is adequately set in a specific range that enables the moving object to be smoothly and efficiently driven, based on the power generation ability of the fuel cells, the load of the fuel for the fuel cells, and the remaining charge of the secondary battery.

In one exemplified structure, the control unit causes an insufficiency of electric power to be compensated with electric power output from the secondary battery in a transient period before the fuel cell ensures a sufficient supply of electric power required to drive the motor, while the fuel cell is selected as a working electric power supply. In this case, the predetermined level is a certain remaining quantity set based on a quantity of electric power that enables the compensation.

The fuel cells generally have a time lag between the activation of the fuel cells and the actual supply of a desired electric power. The above control procedure enables the secondary battery to compensate for an insufficiency of electric power in the transient period before the fuel cells generate a desired electric power. The setting of the predetermined level switches the working electric power supply from the secondary battery to the fuel cells, while the secondary battery still has a remaining quantity of electric power to attain the compensation. This arrangement ensures the compensation of electric power and smoothly switches the working electric power supply without any extreme variation in electric power.

In the second moving object of the present invention, a variety of settings may be applied for the proper selection of the power sources.

In accordance with one preferable application, the second moving object further includes a high torque condition decision unit that determines whether or not the moving object is in a specific driving state that satisfies a preset condition for requiring a high torque. The control unit drives both the heat engine and the motor as working power sources when it is determined that the moving object is in the specific driving state that satisfies the preset condition for requiring a high torque.

This arrangement enables the combined use of the two power sources, so as to output an extremely high torque.

A variety of settings are also applicable for the preset condition.

In one exemplified structure, the moving object further includes an accelerator travel measurement unit that measures an accelerator travel. In this structure, the preset condition is that a variation in accelerator travel is not less than a predetermined value.

In this structure, when the driver abruptly steps on an accelerator pedal for abrupt acceleration, it is determined that a high torque is required.

In another exemplified structure, the moving object further includes a required torque input unit that inputs a required torque. In this structure, the preset condition is that the required torque is not less than a predetermined value.

The required torque may be input directly or set based on the accelerator travel and the vehicle speed. In this structure, when the step-on amount of the accelerator pedal has a large absolute value, for example, in the case of a drive on an upward slope, it is determined that a high torque is required.

In still another exemplified structure, the moving object further includes a drive mode switch that allows a driver of the moving object to select a specific drive mode for requiring a high torque, and the high torque condition decision unit carries out the determination, based on an operating condition of the drive mode switch.

This arrangement enables output of a high torque according to an operation of the driver, thereby improving the facility of the moving object.

The drive mode switch may be a special switch exclusively used for the selection of the drive mode or alternatively a combination switch having other functions as well as the selection of the drive mode. In one typical structure, the power of the heat engine and the motor is output via an automatic transmission. The automatic transmission varies a change gear ratio according to a predetermined map, based on the vehicle speed or another parameter. In the moving object of this structure, the switch used for selecting a change speed mode of the automatic transmission may also be used as the switch for selecting the drive mode. For example, when a specific change speed mode, which uses a speed having a greater change gear ratio than the expected change gear ratio from the vehicle speed, is selected through an operation of the switch, it may be determined that a high torque is required. In another example, when the automatic change speed mode is cancelled and a manual change speed mode is set, it may be determined that a high torque is required.

A variety of settings are applicable for the proper selection of the electric power supplies to drive the motor when a high torque is required.

In accordance with one preferable application, the second moving object further includes a remaining charge measurement unit that measures a remaining charge of the secondary battery, wherein the control unit drives the motor with the secondary battery as a working electric power supply in the case where the observed remaining charge is not less than a predetermined level.

In this application, it is further preferable that the control unit drives the motor with the fuel cell as the working electric power supply in the case where the observed remaining charge is less than the predetermined level.

Namely it is desirable to use the secondary battery preferentially over the fuel cells. As discussed above, this arrangement ensures a selective use of the two electric power supplies by taking the respective advantages of the fuel cells and the secondary battery. An adequate value may be set to the predetermined level according to the remaining charge of the secondary battery or another parameter as described previously.

In accordance with one preferable application of the present invention, the second moving object further includes: a second motor that is driven with the fuel cell and the secondary battery as the electric power supplies; a regulation unit that regulates supplies of electric power respectively fed from the fuel cell and the secondary battery to the second motor; and auxiliary machinery that is linked with the heat engine and the second motor, wherein the control unit drives the second motor while the heat engine is at a stop.

The auxiliary machinery here includes a variety of devices and apparatuses that do not directly participate in output of the power for a drive but are required to be driven during a drive of the moving object, for example, an air conditioner and a power steering. The auxiliary machinery is generally required to be driven irrespective of the type of the working power source currently used for a drive. The second moving object of the above structure has the second motor in addition to the heat engine as the power source that can drive the auxiliary machinery. While the heat engine is at a stop, the auxiliary machinery is driven with the second motor. This arrangement enables the moving object to be smoothly driven.

A variety of settings are applicable for the proper selection of the electric power supplies of the second motor to drive the auxiliary machinery.

In accordance with one preferable application, the second moving object further includes a remaining charge measurement unit that measures a remaining charge of the secondary battery, wherein the control unit drives the second motor with the secondary battery as a working electric power supply in the case where the observed remaining charge is not less than a predetermined level.

In this application, it is further preferable that the control unit drives the second motor with the fuel cell as the working electric power supply in the case where the observed remaining charge is less than the predetermined level.

Namely it is desirable to use the secondary battery preferentially over the fuel cells. As discussed above, this arrangement ensures a selective use of the two electric power supplies by taking the respective advantages of the fuel cells and the secondary battery. An adequate value may be set to the predetermined level according to the remaining charge of the secondary battery or another parameter as described previously.

In the second moving object of the present invention, the power of the motor and the heat engine may be output to a common drive shaft, or may alternatively be output to different drive shafts. In the case where the moving object is a vehicle, the linkage of the motor and the heat engine with different drive shafts actualizes a four-wheel drive vehicle. In this case, the motor may further be connected to the drive shaft, with which the heat engine is linked.

In the structure of four-wheel drive, a variety of settings are applicable for the proper selection of the electric power supplies to drive the motor.

In accordance with one preferable application, the second moving object further includes a remaining charge measurement unit that measures a remaining charge of the secondary battery, wherein the control unit drives the motor with the secondary battery as a working electric power supply in the case where the observed remaining charge is not less than a predetermined level.

It is further preferable that the control unit drives the motor with the fuel cell as the working electric power supply in the case where the observed remaining charge is less than the predetermined level.

Namely it is desirable to use the secondary battery preferentially over the fuel cells. As discussed above, this arrangement ensures a selective use of the two electric power supplies by taking the respective advantages of the fuel cells and the secondary battery. An adequate value may be set to the predetermined level according to the remaining charge of the secondary battery or another parameter as described previously.

The variety of control procedures described above ensure the proper use of the fuel cells and the secondary battery. For example, the fuel cells are driven when the secondary battery has a relatively low remaining charge. The fuel cells generally have a time lag between the activation of the fuel cells and the actual output of a desired electric power. It is accordingly preferable that the second moving object of the present invention has a compensation unit that compensates for the time lag.

For the purpose of compensation, the secondary battery may be used to supplement the electric power before the fuel cells are ready for output of a sufficient electric power as discussed previously.

In accordance with another possible application for the purpose of compensation, the control unit activates the fuel cell, so as to cause the fuel cell to output a preset electric power, even when it is not required to supply electric power from the fuel cell to the motor.

This control operation may, however, lead to waste of the fuel for the fuel cells.

It is accordingly preferable that the second moving object further includes a power estimation decision unit that determines whether or not the moving object is in a specific driving state that satisfies a preset condition, in which there is a little possibility of requirement of an increase in total power to be output from the power sources. The control unit reduces the preset electric power when it is determined that the moving object is in the specific driving state that satisfies the preset condition.

The time lag of the fuel cells has significant effects when it is required to drive the motor with the electric power output from the fuel cells. When the moving object is in a specific driving state that does not require output of the power, for example, when the moving object is at a stop or being braked, it is not highly required to quickly drive the motor. Namely there is a relatively little possibility of issuing a requirement of power generation to the fuel cells. When it is determined that there is a little possibility of issuing a requirement of power generation to the fuel cells, the second moving object of this application reduces the electric power output from the fuel cells. This effectively prevents the fuel for the fuel cells from being wasted. One embodiment of the reducing the electric power fully stops the operation of the fuel cells.

A variety of settings are applicable for the preset condition, in which there is a little possibility of issuing a requirement of power generation.

In accordance with one preferable embodiment, the second moving object further includes: a transmission that changes speed of power output from a working power source according to the driving state of the moving object and outputs the converted power to a drive shaft; and an operation unit that specifies a working condition of the transmission. In this embodiment, the preset condition is that the working condition of the transmission is set to a non-driving state by the operation unit.

A neutral mode in which no power transmission is carried out or a specific mode that is used when the moving object is at a stop corresponds to the non-driving state of the transmission.

In accordance with another preferable embodiment, the second moving object further includes a braking decision unit that determines whether or not the moving object is in the course of braking. In this embodiment, the preset condition is that the moving object is being braked.

The determination for the braking may be performed, based on a variation in vehicle speed, a step-on condition of the brake pedal, or a set of the accelerator pedal to the full-close state.

In accordance with still another preferable embodiment, the second moving object further includes an information receiving unit that receives information regarding whether or not a pathway, on which the moving object runs, is in a jam. In this embodiment, the preset condition is that the pathway is in a jam.

A variety of other settings may also be applied for the preset condition.

As described previously, one preferable application of the present invention is a moving object that properly uses two different electric power supplies, that is, fuel cells and a secondary battery, and two different power sources, that is, a motor and a heat engine. The principle of the present invention is, however, not restricted to this application. The principle of the present invention may also be applied to a moving object that adequately controls the power source with using only the fuel cells as the electric power source.

The present invention is accordingly directed to a third moving object having a motor and a heat engine as power sources to output power to a drive shaft. The third moving object includes: a transmission that varies a change gear ratio in the process of transmitting power output from at least the heat engine to the drive shaft; a fuel cell that feeds a supply of electric power to the motor; and a control unit that controls operations of the fuel cell, the power sources, and the transmission according to a driving state of the moving object.

The third moving object of the present invention has two power sources and one electric power supply, and includes a transmission that varies a change gear ratio in the process of transmitting power output from the power source. The third moving object properly uses the motor and the heat engine, while controlling the transmission. This actualizes a favorable control operation that takes the respective advantages of the motor and the heat engine. Among the variety of applications discussed above with regard to the second moving object of the present invention, the arrangements involved in the proper use of the power sources and the control of the driving state of the fuel cells are also applicable to the third moving object. The following describes some preferable arrangements applied for the control operation.

In accordance with one preferable application, the third moving object further includes a high torque condition decision unit that determines whether or not the moving object is in a specific driving state that satisfies a preset condition for requiring a high torque. In this application, the control unit drives both the heat engine and the motor as working power sources when it is determined that the moving object is in the specific driving state that satisfies the preset condition for requiring a high torque.

In accordance with another preferable application, the third moving object further includes a drive mode switch that allows a driver of the moving object to select a specific drive mode for requiring a high torque. In this application, the control unit drives both the heat engine and the motor as working power sources when the drive mode switch is in a predetermined state.

In accordance with still another preferable application, the control unit activates the fuel cell, so as to cause the fuel cell to output a preset electric power, even when it is not required to supply electric power from the fuel cell to the motor.

In the above application, it is preferable that the third moving object further includes a power estimation decision unit that determines whether or not the moving object is in a specific driving state that satisfies a preset condition, in which there is a little possibility of requirement of an increase in total power to be output from the power sources. The control unit reduces the preset electric power when it is determined that the moving object is in the specific driving state that satisfies the preset condition.

A variety of settings are applicable for the preset condition.

For example, when the third moving object further includes
    an operation unit that specifies a working condition of the transmission, the preset condition is that the working condition of the transmission is set to a non-driving state by the operation unit.

In another example, when the third moving object further includes a braking decision unit that determines whether or not the moving object is in the course of braking, the preset condition is that the moving object is being braked.

In still another example, when the third moving object further includes an information receiving unit that receives information regarding whether or not a pathway, on which the moving object runs, is in a jam, the preset condition is that the pathway is in a jam.

Like the second moving object of the present invention discussed above, these applications ensure the proper use of the power sources and the adequate control of the driving state of the fuel cells.

In the moving object having the two electric power supplies, that is, the fuel cells and the secondary battery, and the two power sources, that is, the motor and the heat engine, the heat engine may be utilized as the power source to generate electric power as discussed below.

The present invention is accordingly directed to a fourth moving object that further includes a generator that is used as another electric power supply of the motor and converts power output from the heat engine to electric power, in addition to the basic constituents of the second moving object. In the fourth moving object, the control unit has: a driving state decision unit that determines whether or not the moving object is in a specific driving state that requires the fuel cell to start power generation; and an electric power compensation unit that causes the electric power supplies other than the fuel cell to compensate for the fuel cell and output a required electric power in a period before the fuel cell is ready for power generation, when it is determined that the driving state of the moving object requires the fuel cell to start power generation. The electric power compensation unit includes: an electric power estimation unit that estimates an amount of electric power to be compensated in the period before the fuel cell is ready for power generation; a remaining charge measurement unit that measures a remaining charge of the secondary battery; a secondary battery capacity determination unit that determines whether or not the secondary battery has a sufficient capacity of enabling output of the estimated amount of electric power, based on the observed remaining charge; and a heat engine control unit that drives the heat engine and causes the generator to carry out power generation when it is determined that the secondary battery does not have the sufficient capacity of enabling output of the estimated amount of electric power.

As described previously, the fuel cells often have a time lag between the issuance of a requirement of power generation and the actual supply of sufficient electric power. The arrangement of the fourth moving object properly uses the secondary battery and the generator linked with the heat engine, so as to enable the required electric power to be output in a stable manner. In this case, the electric power of the secondary battery is used preferentially over the generator. Namely the control procedure drives the heat engine only when the secondary battery does not have sufficient electric power. The fourth moving object of this arrangement accordingly has the improved fuel consumption and environmental properties.

In the fourth moving object that utilizes the power of the heat engine for generation of electric power, a variety of structures may be applicable for the combined use of the power of the heat engine for both a drive and power generation. It is, however, preferable that the heat engine outputs power only to drive the generator. In this application, the heat engine is regarded as an auxiliary power source used before the fuel cells are ready for power generation. This effectively reduces the required capacity of the heat engine, thereby reducing the size of the whole power system and improving the fuel consumption and the environmental properties.

The delayed response of the fuel cells for the actual power generation may be compensated with the secondary battery and the generator.

In accordance with one preferable application, the fourth moving object further includes: a temperature measurement unit that measures temperature of the fuel cell; and a cold-time control unit that causes the electric power compensation unit to function effectively at a cold time, when the observed temperature of the fuel cell is not higher than a predetermined value.

The delayed response of the fuel cells is especially significant at the cold time. This arrangement thus desirably cancels the effects due to the delayed response. In this case, it is preferable that the control procedure issues a requirement of power generation to the fuel cells, while the secondary battery has a sufficient level of electric power that can compensate for the delayed response of the fuel cells at an ordinary time except the cold time. This arrangement causes only the secondary battery to be used to compensate for the delayed response at the ordinary time, whereas causing both the secondary battery and the generator to be used to compensate for the delayed response at the cold time. If the control procedure issues a requirement of power generation to the fuel cells only when the secondary battery has a charge level that can compensate for the delayed response at any time including the cold time, the secondary battery should have an extremely high level of remaining charge, which is used as the criterion to determine the issuance of the requirement of power generation. This does not allow the effective use of the secondary battery. The control procedure applied in this arrangement, on the other hand, uses both the secondary battery and the generator at the cold time when an especially long time is required before the fuel cells are ready for power generation. This favorably lowers the required level of remaining charge used as the criterion of the issuance and thereby allows the effective use of the secondary battery.

In the case where the delayed response of the fuel cells is compensated with the electric power converted from the power of the heat engine, the heat engine should be driven to an extent that at least compensates for an insufficiency of electric power output from the secondary battery. It is, however, preferable that the heat engine is driven in a specific driving state, which gives a preference to a driving efficiency, from the viewpoints of the improved fuel consumption and environmental properties. Setting the driving state with the preference to the driving efficiency may result in outputting a greater amount of power that exceeds a required amount to compensate for the insufficient electric power of the secondary battery. In this case, the excess electric power is accumulated in the secondary battery. When the charging of the secondary battery causes the remaining charge of the secondary battery to rise to a level that can compensate for the delayed response of the fuel cells, the preferable control procedure stops operation of the heat engine at that time.

The present invention is further directed to a hybrid system having a plurality of energy output sources, which include at least a fuel cell and a heat engine, and an energy transmission unit that causes energy of the energy output sources to be output to outside in a usable form. The hybrid system further includes: a required energy setting unit that sets a total required energy to be output; a target driving state setting unit that sets respective target driving states of the fuel cell, the heat engine, and the energy transmission unit, while the fuel cell is preferentially used to output the total required energy; a decision unit that determines whether or not a preset condition regarding a working state of the hybrid system is fulfilled; a state change unit that, when it is determined that the preset condition is fulfilled, changes the target driving state of at least one of the fuel cell, the heat engine, and the energy transmission unit to a predetermined state according to the preset condition; and a drive control unit that controls the plurality of energy output sources including at least the fuel cell and the heat engine as well as the energy transmission unit to meet the respective target driving states.

The hybrid system of the present invention has the fuel cells and the heat engine as the energy output sources. The energy output source outputs energy in a variety of forms including mechanical energy and electrical energy. The fuel cells correspond to the energy output source that outputs electrical energy, whereas the heat engine corresponds to the energy output source that outputs mechanical energy. The energy transmission unit included in the hybrid system should be adaptable to the form of energy output from each energy output source and the form of energy supplied to the outside. A conductive line and a receptacle are examples of the means that transmits and outputs electrical energy. A transmission mechanism, such as a gear, and a drive shaft are examples of the means that transmits and outputs mechanical energy. The energy transmission unit also includes a device that converts the form of energy output from each energy output source. In the case where only the mechanical energy is to be supplied to the outside, the energy transmission unit includes a motor that converts electrical energy output from the energy output source into mechanical energy. In the case where only the electrical energy is to be supplied to the outside, on the other hand, the energy transmission unit includes a generator that generates electricity with the mechanical energy output from the energy output source.

The hybrid system of the present invention gives the preference to the fuel cells in the ordinary working state. The expression of 'giving the preference to the fuel cells' here means that the fuel cells are used preferentially over the heat engine when the working energy output source used to output the required total energy is selectable between the fuel cells and the heat engine. For example, when the use of either one of the fuel cells and the heat engine is sufficient for the energy output, the fuel cells should be used preferentially. In this case, the heat engine is used when the fuel cells can not output a sufficient quantity of energy. The expression of 'giving the preference to the fuel cells' also means that the fuel cells have a higher ratio of energy output than that of the other energy output source. The fuel cells generate electric power at a high efficiency and have excellent environmental properties without any harmful emission. The hybrid system of the present invention uses the fuel cells preferentially over the heat engine, so as to improve the working efficiency and the environmental properties. The term 'working' is not restricted to the state of a movement of the hybrid system, for example, a drive or a flight, but also includes the state of outputting some energy in a usable form from the hybrid system that is even at a stop.

As described above, in the hybrid system of the present invention, the fuel cells are basically used in a preferential manner. When the preset condition is fulfilled, however, the state change unit changes the driving state of at least one of the respective constituents, that is, the energy output sources and the energy transmission unit. The changed driving state is determined according to the preset condition. The preset condition regards the working state of the hybrid system. For example, when a specific drive mode is selected or when a constituent of the hybrid system is in a specific driving state, it is determined that the preset condition is fulfilled. The preferential use of the fuel cells basically attains an operation of the hybrid system having the excellent working efficiency and favorable environmental properties. In part of various working conditions, however, such selective use of the energy output sources may be unsuitable. For example, in some cases, the operation of the fuel cells is not desirable even if the working efficiency and the environmental properties are sacrificed. In other cases, the use of the fuel cells does not sufficiently improve the driving efficiency. The hybrid system of the present invention changes the driving state of each constituent under the preset condition, so as to attain the most suitable operation of the constituent.

The following describes the significance of the control carried out in the hybrid system of the present invention. The secondary battery can recover the energy level by charging even during a run of the hybrid system. The fuel cells are, on the other hand, the energy output source of irreversible characteristics and can not recover the energy level unless the FC fuel (the fuel for the fuel cells) is externally supplied once the FC fuel has been used up. Because of such characteristics of the fuel cells, there is accordingly no guarantee that the preferential use of the fuel cells improves the working efficiency and the environmental properties of the hybrid system. The quick consumption of the FC fuel causes the energy output source of a relatively low efficiency, such as the heat engine, to be forcibly used for the subsequent operation. This may lower the mean driving efficiency.

The inventors of the present invention have studied a variety of working conditions of the hybrid system with the plurality of energy output sources including the fuel cells and the heat engine, as well as the frequencies of the respective working conditions. There are a number of optional states in the use of the energy output sources, for example, 'the state of preferentially using the fuel cells', 'the state of minimizing the use of the fuel cells in order to save the FC fuel', and 'the state of equally using the fuel cells and the heat engine'. Based on the results of the study, the inventors have found that the state of preferentially using the fuel cells well contributes to the improvement in driving efficiency and environmental properties and completed the invention. The inventors have also found that under a specific condition, a change of the target driving state of each constituent to a predetermined state corresponding to the specific condition enables the adequate operation of the hybrid system. The control carried out in the hybrid system of the present invention attains a desired operation by taking into account the characteristics of the fuel cells and the frequency of use of the fuel cells in the hybrid system.

In the hybrid system, the operation of each constituent is generally controlled by taking into account the energy per unit time. The term 'energy' used in the description hereof means the energy per unit time, unless otherwise specified. In the description hereof, the term 'energy' is synonymous, in principle, with the terms 'power' and 'electric power'.

In the hybrid system of the present invention, a variety of settings are applicable for the preset condition and the change of the target driving state of each constituent corresponding to the preset condition.

In accordance with one preferable embodiment, the hybrid system further includes a drive mode switch that is operated by a driver to specify a desired drive mode. In this embodiment, the preset condition, whose fulfillment is determined by the decision unit, is an operating state of the drive mode switch.

This arrangement enables the driver to arbitrarily set the driving state of each constituent, such as the fuel cells or the heat engine, by a simple operation of the drive mode switch. This improves the facility of the hybrid system.

In one embodiment of the hybrid system that enables specification of the desired drive mode through operation of the drive mode switch, the energy is electrical energy, and the preset condition is that a predetermined drive mode, which allows output of electrical energy to outside, is specified through an operation of the drive mode switch. The change carried out by the state change unit represents prohibition of a drive of the heat engine.

The hybrid system of this arrangement enables electrical energy to be supplied to the outside. The hybrid system of this arrangement includes a generator that converts the mechanical energy of the heat engine into electrical energy and a receptacle that causes the electrical energy output from the heat engine and the fuel cells to be supplied to the outside, as the energy transmission unit. The receptacle enables the use of various electric appliances in the field, for example, at a destination of the hybrid system. This improves the facility of the hybrid system.

The hybrid system of the present invention preferentially uses the fuel cells in the ordinary drive mode and drives the heat engine when the output of the fuel cells does not meet the required level. In the hybrid system of the above structure, the drive of the heat engine is forbidden in the predetermined drive mode that allows a supply of electric power, for example, through the receptacle. In many cases, the use of the electric power in the field is a requirement of low priority. The continuous allowance of the operation of the heat engine under such conditions causes the heat engine to be activated at the time of supply of electric power. This undesirably damages the driving efficiency and the environmental properties of the hybrid system. The heat engine generally has a large working noise and may impair the quietness in the field. The hybrid system of the above arrangement forbids the operation of the heat engine in the predetermined drive mode that allows the external use of electrical energy, so as to avoid these potential problems.

In the application that forbids operation of the heat engine, it is preferable that the hybrid system further includes a starter switch that is operated by the driver to direct a start of the heat engine. The preset condition is that the start of the heat engine is directed through an operation of the starter switch, while the predetermined drive mode is specified, and the change carried out by the state change unit represents the start of the heat engine.

When it is highly required to supply electric power in the field, this arrangement enables the driver to intentionally start the heat engine through operation of the starter switch, so as to ensure a further supply of electric power. This improves the facility of the hybrid system. The description above regards only the operations of the fuel cells and the heat engine, but this does not mean to exclude the hybrid system having other energy output sources.

In another embodiment of the hybrid system that enables specification of the desired drive mode through operation of the drive mode switch, the energy is mechanical energy, and the preset condition is that a predetermined drive mode, in which either one of the fuel cell and the heat engine is selected and used as a working energy output source, is specified through an operation of the drive mode switch. The change carried out by the state change unit represents execution of a drive of the working energy output source and prohibition of a drive of the other energy output source, which is other than the working energy output source.

The hybrid system of this arrangement enables mechanical energy to be supplied to the outside. The hybrid system of this arrangement includes a motor that converts the electrical energy of the fuel cells into mechanical energy and a drive shaft that causes the mechanical energy output from the heat engine and the fuel cells to be supplied to the outside, as the energy transmission unit. Application of the output power for a drive enables the hybrid system to be driven with either one of the fuel cells and the heat engine.

The hybrid system of the present invention preferentially uses the fuel cells in the ordinary drive mode and drives the heat engine when the output of the fuel cells does not meet the required level. The hybrid system of the above structure enables the driver to arbitrarily select a desired power source. For example, when it is required to use the electric power output from the fuel cells in the field, the driver selects the drive mode that uses the heat engine. Such selection desirably reduces the consumption of the FC fuel before the hybrid system arrives at the field. This ensures the effective use of the fuel cells in the field. In another example, the energy output sources are selectively used according to the requirement with regard to the response of the hybrid system. The fuel cells generally have a poor output response. Selection of the drive mode using the heat engine enables a drive of the hybrid system with a good response. In still another example, the energy output sources are selectively used according to the requirement of noise reduction. The heat engine generally has a large working noise. When noise reduction is highly required, for example, during a drive at midnight, selection of the drive mode using the fuel cells ensures a drive in stillness. The arrangement of enabling the driver to arbitrarily select the desired power source improves the facility of the hybrid system.

In the application that forbids operation of the other energy output source, the hybrid system further includes a starter switch that is operated by the driver to direct a start of the other energy output source. The preset condition is that the start of the other energy output source is directed through an operation of the starter switch, while the predetermined drive mode is specified, and the change carried out by the state change unit represents the start of the other energy output source.

This arrangement enables the other energy output source to be activated according to the requirements. The operation of the energy output sources according to the requirement of power output desirably improves the facility of the hybrid system. The description above regards only the operations of the fuel cells and the heat engine, but this does not mean to exclude the hybrid system including other energy output sources.

In still another embodiment of the hybrid system that enables specification of the desired drive mode through operation of the drive mode switch, the energy is mechanical energy, and the preset condition is that a predetermined drive mode, in which only the fuel cell is selected and used as a working energy output source, is specified through an operation of the drive mode switch. The change carried out by the state change unit represents execution of a drive of the fuel cell and prohibition of warm-up of the heat engine.

The structure of enabling the driver to select the working energy output source through the operation of the drive mode switch has the advantages discussed previously. In this embodiment, when the predetermined drive mode, in which only the fuel cells are used as the working energy output source, is selected, the control procedure forbids not only a drive but even warm-up or preparation for a drive of the heat engine. The prohibition of even the warm-up of the heat engine further improves the fuel consumption and the environmental properties of the hybrid system.

The prohibition of the warm-up of the heat engine naturally leads to a little response delay when the energy output from the heat engine is required. The driver, however, intentionally selects the drive mode, in which only the fuel cells are used as the working energy output source, so that the response delay does not have significant effects on the good drive feeling of the driver. The drive mode is generally set to prevent a significant variation in drive feeling. The arrangement of this embodiment, on the other hand, enables the driver to intentionally select the desired drive mode with the comprehension of the characteristics thereof. The drive mode is set free from the restriction of substantially constant drive feeling but by placing the importance specifically on the improvement in fuel consumption and environmental properties.

Such control operation is on the premise that the fuel cells are in a workable state. Even when the predetermined drive mode, in which only the fuel cells are used as the working energy output source, is selected, if the fuel cells are not in the workable state, the drive of the heat engine should be allowed automatically or manually.

In accordance with another preferable embodiment that varies the settings for the preset condition and the change of the target driving state of each constituent corresponding to the preset condition, the hybrid system further includes a detector that detects a power generation capacity of the fuel cell. In this embodiment, the preset condition is that the power generation capacity is lowered to or below a predetermined level, and the change carried out by the state change unit represents a reduction of output of the fuel cell.

In this embodiment, the power generation capacity may be observed with a variety of parameters.

For example, the detector detects the power generation capacity, based on a remaining quantity of a fuel for the fuel cell.

In another example, the detector detects the power generation capacity, based on temperature of the fuel cell.

In the case where the power generation capacity is detected according to the remaining quantity of the FC fuel, a decrease in remaining quantity of the FC fuel leads to a decrease in power generation capacity. In the case of the decrease in remaining quantity of the FC fuel, the hybrid system of the above arrangement reduces the output of the fuel cells, thereby preventing the FC fuel from being excessively consumed. As mentioned previously, the fuel cells are the irreversible energy output source and are not usable once the FC fuel has been used up. The hybrid system of the above arrangement reduces the consumption of the FC fuel and thereby enables the fuel cells to be kept in the workable state over a long time period. The fuel cells can thus be driven in a driving state of higher effectiveness.

In the case where the power generation capacity is detected according to the temperature of the fuel cells, the power generation capacity decreases when the temperature of the fuel cells rises to an abnormally high level or when the fuel cells are not sufficiently warmed up to a certain temperature level to be ready for power generation. The requirement of the high power output from the fuel cells under such conditions may significantly shorten the life of the fuel cells or cause other damages on the fuel cells. The arrangement of the above embodiment reduces the output of the fuel cells, thereby avoiding such potential damages.

In the hybrid system that reduces the output of the fuel cell according to the observed power generation capacity, the change carried out by the state change unit may represent an increase in output of the heat engine.

This application compensates for the effects due to the lowered output of the fuel cells and enables the output of the required total energy.

In accordance with another application of the hybrid system that reduces the output of the fuel cell according to the observed power generation capacity, the energy is rotational energy of a rotating shaft, and the energy transmission unit has a speed change gear unit that switches a change gear ratio between at least two different stages. The speed change gear unit changes the speed of the rotational energy output from each of the energy output sources at a preset change gear ratio and outputs the converted rotational energy. In this application, the change carried out by the state change unit represents an increase in change gear ratio set in the speed change gear unit.

In the case of the rotational energy, the lowered output of the fuel cells may cause a significant decrease in output torque. This arrangement sets the greater change gear ratio, so as to control the decrease in output torque.

In accordance with still another preferable embodiment that varies the settings for the preset condition and the change of the target driving state of each constituent corresponding to the preset condition, the hybrid system further includes a temperature measurement unit that measures temperature of the heat engine. In this embodiment, the preset condition is that the observed temperature of the heat engine is not higher than a predetermined level, and the change carried out by the state change unit represents execution of warm-up of the heat engine.

The sufficient warm-up is desired for the improved driving efficiency and the better exhaust emission control of the heat engine. In the hybrid system of the present invention, while the fuel cells are used as the working energy output source, the temperature of the heat engine might be lowered. The hybrid system of this embodiment warms up the heat engine against the temperature decrease thereof. This improves the driving efficiency and the exhaust emission control properties of the heat engine when the power output from the heat engine is required. An additional condition may be set for the execution of the warm-up of the heat engine. This modified control procedure warms the heat engine up only when it is determined that there is a good possibility of requirement of the power output from the heat engine. This effectively saves the fuel required for the warm-up operation and further improves the driving efficiency of the heat engine.

In accordance with another preferable embodiment that varies the settings for the preset condition and the change of the target driving state of each constituent corresponding to the preset condition, the hybrid system further includes: a temperature measurement unit that measures temperature of the heat engine; and a heat supply unit that feeds at least part of thermal energy generated by the fuel cell to the heat engine. In this embodiment, the preset condition is that the observed temperature of the heat engine is not higher than a predetermined level, and the change carried out by the state change unit represents an increase in output of the fuel cell.

The heat supply unit may have any arbitrary structure. For example, a common cooling mechanism of the fuel cells and the heat engine may be utilized as the heat supply unit.

The hybrid system of this embodiment implements the warm-up of the heat engine by utilizing the heat generated by the fuel cells. This arrangement does not independently warm the heat engine up and thereby saves the fuel required for the warm-up operation. In this arrangement, the heat engine may also be warmed up only when it is determined that there is a good possibility of requirement of the power output from the heat engine. This modified control procedure further improves the driving efficiency of the heat engine.

The present invention is further directed to another hybrid system having a plurality of energy output sources, which include at least a fuel cell and a heat engine, and an energy transmission unit that causes energy of the energy output sources to be output to outside in a usable form. The hybrid system further includes: an energy output source selection switch that is operated by a driver of the hybrid system to select at least one of the energy output sources as a working energy output source; a target driving state setting unit that sets respective target driving states of the fuel cell, the heat engine, and the energy transmission unit according to the selection with the energy output source selection switch; and a drive control unit that controls the plurality of energy output sources including the fuel cell and the heat engine as well as the energy transmission unit to the respective target driving states.

In this hybrid system, the target driving state setting unit may set the target driving state of the heat engine to a specific condition that forbids not only a drive but warm-up of the heat engine, when only the fuel cell is selected as the working energy output source through operation of the energy output source selection switch.

The operation of the energy output source selection switch enables the driver to freely select the working energy output source. For example, when the hybrid system has the fuel cells and the heat engine as the available energy output sources, there are three optional modes: that is, the mode of using only the fuel cells, the mode of using only the heat engine, and the mode of using the both. The hybrid system of the above arrangement enables the driver to freely select a desired mode among these three optional modes. The selective use of the working energy output source improves the facility of the hybrid system. The favorable control procedure forbids not only a drive but even warm-up of the heat engine when only the fuel cells are selected as the working energy output source. This further improves the fuel consumption and the environmental properties of the hybrid system as discussed previously.

The hybrid systems of the various applications discussed above are not restricted to have only the fuel cells and the heat engine.

In accordance with another preferable structure, the hybrid system further includes an accumulator as a reversible energy output source. In this case, the target driving state setting unit sets the respective target driving states by taking into account electrical energy input into and output from the accumulator.

The accumulator is a reversible energy output source that recovers its energy level by charging in the course of a drive of the hybrid system. A secondary battery and a capacitor are typical examples of the accumulator. This hybrid system has the highly efficient but irreversible fuel cells and the reversible accumulator as the available energy output sources that output electrical energy. The combination of the energy output sources having different characteristics desirably improves the working efficiency, the environmental properties, and the facility of the hybrid system by taking the advantages of the respective energy output sources. In the hybrid system of the above application, the accumulator may be used preferentially over the fuel cells or alternatively the fuel cells may be used preferentially over the accumulator. The priority may be set according to the respective rated outputs of the fuel cells and the accumulator and the capacity of the accumulator.

The principle of the present invention is applicable to a diversity of immobilized systems, such as plants and industrial machines, as well as to moving objects. The term 'moving object' used in the description hereof includes a diversity of moving objects that move with the power, for example, vehicles, ships and vessels, aircraft, airships, and other flying objects. The purpose of the moving object is not restricted to the transportation of people or things nor to the boarding.

The present invention is further directed to still another hybrid system having a plurality of energy output sources, which include at least a fuel cell and a heat engine, and an energy transmission unit that causes energy of the energy output sources to be output to outside in a usable form. The hybrid system further includes a control unit that controls operations of the fuel cell and the heat engine, in order to cause the fuel cell to be used and output energy preferentially, while both the fuel cell and the heat engine are ready for energy output.

This hybrid system preferentially uses the fuel cells over the heat engine, thus significantly improving the working efficiency and the environmental properties like the hybrid systems of various applications described previously. The variety of arrangements discussed above with regard to the other hybrid systems may also be applied for this hybrid system.

The technique of the present invention may be actualized by a hybrid moving object.

The present invention is thus directed to a first hybrid moving object having a plurality of energy output sources, which include at least a fuel cell and a heat engine, and an energy transmission unit that causes energy of the energy output sources to be output to outside in a usable form. The first hybrid moving object further includes: a deterioration detector that detects deterioration of at least either one of the fuel cell and the heat engine; and a deterioration-time control unit that, when deterioration is detected with regard to one of the fuel cell and the heat engine, controls the other of the fuel cell and the heat engine to compensate for an effect on energy output due to the deterioration.

The present invention is also directed to a second hybrid moving object having a plurality of power output sources, which include at least a fuel cell and a heat engine, and a transmission mechanism that transmits power output from the power output sources to a drive shaft via a transmission. The second hybrid moving object further includes: a deterioration detector that detects deterioration of the fuel cell; and a transmission control unit that, when deterioration of the fuel cell is detected, controls the transmission to compensate for an effect on energy output due to the deterioration.

In the event that either one of the fuel cells and the heat engine deteriorates, the first hybrid moving object regulates the output of the other energy output source that does not deteriorate, and thereby compensates for the adverse effects of the deterioration. The deterioration here represents the failure of proper output due to malfunction, shortage of the fuel, or change with the elapse of time. In the first hybrid moving object, the detection of deterioration may be carried out for both or either one of the fuel cells and the heat engine. In the event that the fuel cells deteriorate, the second hybrid moving object controls the transmission and thereby compensates for the adverse effects of the deterioration. The variety of arrangements discussed above with regard to the hybrid systems may also be applied for these hybrid moving objects. The principle of the present invention may also be actualized by a method of controlling the hybrid system.

The present invention is also directed to a fifth moving object having a heat engine as a power source that outputs power to a drive shaft, and a motor that applies a torque to a specific site in order to compensate for a variation in torque output from the heat engine to the drive shaft. The fifth moving object further includes: an accumulator that is charged with electric power and a power generator unit, which are included in an electric power system that transmits electric power to and from the motor; a target torque setting unit that sets a torque to compensate for a variation in torque of the heat engine as a target torque of the motor; and a control unit that selectively uses the accumulator and the power generator unit according to a sign of the target torque, so as to enable the motor to be driven with the target torque.

The fifth moving object of the present invention improves the energy efficiency under the control of restricting the torque variation. The variation in torque output from the heat engine is controlled by regulating the torque of the motor. In the case where the actual torque, which is actually output from the heat engine, is greater than a required torque, the motor applies a negative torque, so as to compensate for the torque variation. In the case where the actual torque is smaller than the required torque, on the contrary, the motor applies a positive torque, so as to compensate for the torque variation. In the fifth moving object, the control technique selectively uses the working electric power system according to the sign of the target torque of the motor. In the case of a negative target torque, the electric power regenerated by the motor is accumulated in the accumulator. In the case of a positive target torque, on the other hand, the electric power is supplied from the power generator unit to enable power operation of the motor. There is no supply of electric power from the accumulator to the motor in the case of the positive target torque. During the power operation of the motor, the electric power is supplied from the power generator unit. This improves the energy efficiency during the power operation of the motor. The supply of electric power from the accumulator is mainly based on the excess power previously output from the heat engine. In this case, there are both the charge loss in the process of charging the accumulator with the excess power and the discharge loss in the process of discharging the accumulator. The supply of electric power from the power generator unit, on the other hand, is not via the charge and discharge processes into and from the accumulator, thereby attaining the high energy efficiency.

The effectiveness of this technique of the fifth moving object is affected by the charge-discharge characteristics of the accumulator. In some cases, the charge and discharge efficiencies of the accumulator show non-linear characteristics according to the amounts of input and output electric power and the charge level. The accumulator that is charged with electric power and is discharged to release electric power through chemical reactions, such as the secondary battery, may have the varying efficiency with a variation in charge-discharge cycle. The torque variation of the heat engine arises at relatively high frequencies. Compensation of the torque variation with the electric power output from the accumulator may cause frequent discharges at the especially low efficiencies. The technique of the fifth moving object, on the other hand, compensates the torque variation with the power generator unit of high efficiency. This arrangement effectively prevents the accumulator from being discharged in the driving state of low discharge efficiency. This enables the electric power output from the accumulator to be used in the driving state of high discharge efficiency and thereby improves the total driving efficiency of the moving object as well as the driving efficiency in the course of controlling the torque variation.

Typical examples of the accumulator include a secondary battery and a capacitor. Typical examples of the power generator unit include fuel cells and a generator. The fuel cells have an advantage of good driving efficiency. The generator may be driven by means of a heat engine. In this case, the preferable control procedure regulates the loading applied from the generator to the heat engine to a fixed value, irrespective of the amount of electric power required for the motor.

The fifth moving object discussed above selectively uses the accumulator and the power generator unit according to the sign of the target torque of the motor that compensates for the torque variation.

The present invention is also directed to a sixth moving object having a heat engine as a power source that outputs power to a drive shaft and a control mechanism that checks a variation in torque output from the heat engine to the drive shaft. The control mechanism includes: a first motor and a second motor that apply a torque to the drive shaft; and an accumulator that is charged with electric power and a power generator unit, which are included in an electric power system that transmits electric power to and from the first and second motors. The control mechanism further includes: a target torque setting unit that respectively sets target torques of the first motor and the second motor, as long as a condition of maintaining a torque to be output to the drive shaft, a condition of compensating for the variation in torque, a condition of making the torque of the first motor not greater than zero, and a condition of making the torque of the second motor not less than zero are fulfilled; and a control unit that regulates electric power transmitted between the first motor and the accumulator and electric power transmitted between the second motor and the power generator unit, so as to enable the first motor and the second motor to be driven with the respective target torques.

The technique of the sixth moving object selectively uses the accumulator and the power generator unit as the working electric power system, as well as the first motor and the second motor according to the magnitude of the torque to be applied to compensate for the torque variation. The arrangement of the sixth moving object also enables the control of the torque variation with a high efficiency, like the arrangement of the fifth moving object.

In accordance with one preferable embodiment that controls the torque variation, the fifth moving object further includes a charge state detector that observes a charge level of the accumulator. The control unit selectively uses the accumulator and the power generator unit according to the observed charge level of the accumulator, so as to drive the motor.

For example, the control unit may carry out the control that properly uses the accumulator and the power generator unit according to the sign of the target torque, only when the observed charge level of the accumulator is not higher than a predetermined level.

This desirably prevents the accumulator from being excessively charged.

Each of the moving objects of the present invention discussed above has a plurality of fuel reservoir units, in which a plurality of fuels are separately stored. The present invention also includes a configuration of a fuel supply mechanism that adequately supplies the plurality of fuels to the respective fuel reservoir units.

The present invention is thus directed to a first fuel supply mechanism, which includes: a fuel supply unit that supplies a plurality of different fuels; a plurality of fuel reservoir units that respectively store the plurality of different fuels therein; and a fuel inlet unit that is connected with the fuel supply unit and leads the supplies of different fuels fed from the fuel supply unit to the plurality of fuel reservoir units. The fuel inlet unit has a plurality of openings that are provided corresponding to the plurality of fuel reservoir units and respectively connect with the corresponding fuel reservoir units. The plurality of openings are formed to have different shapes.

In the first fuel supply mechanism of the present invention, the plurality of openings have different shapes corresponding to the plurality of different fuels. This effectively prevents the user from being mixed up by the plurality of different fuels at the time of fuel supply. Especially preferable is that the respective openings of the fuel inlet unit have the shapes allowing one-to-one connection with the fuel supply unit. This structure more securely prevents the confusion between different fuels.

In accordance with one preferable embodiment of the first fuel supply mechanism, the fuel inlet unit has the plurality of openings that are located close to each other in a predetermined area on an outer wall surface of the moving object. The fuel inlet unit has a single cover member that covers over the plurality of openings.

This arrangement enables all fuel supply operations to be performed in the predetermined area, thereby simplifying the work required for the fuel supply. The single cover member to cover over the plurality of openings desirably reduces the required number of parts involved in the opening and closing mechanism of the cover member and simplifies the structure of the fuel inlet unit.

For the purpose of labor saving at the time of fuel supply, it is desirable that the cover member of the fuel inlet unit is opened by a single action. This is especially preferable when the fuel inlet unit has a plurality of cover members corresponding to the plurality of different fuels.

The plurality of different fuels respectively stored in the plurality of fuel reservoir units may be supplied to all the energy output sources. Alternatively there may be one or plural fuels that are supplied only to part of the energy output sources.

The present invention is also directed to a second fuel supply mechanism, which includes: a plurality of fuel reservoir units that respectively store a plurality of different fuels therein; a plurality of flow paths that are provided corresponding to the plurality of fuel reservoir units and respectively lead external supplies of the plurality of different fuels to the corresponding fuel reservoir units; and a detector that is disposed in at least one flow path among the plurality of flow paths and obtains information regarding a type of fuel passing through the flow path.

In the second fuel supply mechanism, the detector identifies the type of the fuel supplied through the flow path. It is preferable that the second fuel supply mechanism further includes an alarm unit that informs a user of an inappropriate supply of fuel. The alarm unit may provide an alarm display, an alarm sound, or an alarm of any other suitable form.

In accordance with one preferable application, the second fuel supply mechanism further includes: a plurality of energy output sources, each of which receives a supply of one of the plurality of different fuels stored in the plurality of fuel reservoir units and generates energy; and a fuel identification unit that determines whether or not the fuel passing through the flow path is identical with the fuel that is to be stored in the fuel reservoir unit corresponding to the flow path, based on the information obtained by the detector. The second fuel supply mechanism further includes a prohibition unit that forbids generation of energy by the energy output source that receives the supply of fuel from the fuel reservoir unit corresponding to the flow path, when the fuel identification unit determines that the fuel passing through the flow path is different from the fuel that is to be stored in the fuel reservoir unit corresponding to the flow path.

In the event that the wrong fuel is mistakenly fed to the fuel reservoir unit, this arrangement effectively prevents the energy output source from being driven with the fuel. One possible modification drives the energy output source corresponding to another fuel reservoir unit, in which the right fuel is stored, instead of the energy output source subjected to the prohibition. This ensures the required energy even when the wrong fuel is mistakenly supplied.

The fuel supply unit that supplies at least two fuels among the plurality of different fuels has a configuration corresponding to the arrangement of the first fuel supply mechanism.

The fuel supply unit has a joint member that is connected to the moving object and enables the at least two fuels to be supplied to the moving object. The joint member includes a plurality of ejection outlets that are provided independently corresponding to the at least two fuels supplied from the fuel supply unit to the moving object. The plurality of ejection outlets are formed to have different shapes and cause the corresponding fuels to be ejected therefrom.

In the fuel supply unit of this configuration, the plurality of ejection outlets, from which the corresponding fuels are ejected, have different shapes. This effectively prevents the user from being mixed up by the at least two fuels at the time of fuel supply. Especially preferable is that each of the ejection outlets has a shape allowing one-to-one connection with the opening of the fuel inlet unit. This structure more securely prevents the confusion between different fuels. From this point of view, it is preferable that each of the ejection outlets corresponding to a certain fuel has a shape forbidding connection with any openings of the fuel inlet unit except the right opening corresponding to the certain fuel.

These and other objects, features, aspects, and advantages of the present invention will become more apparent from the following detailed description of the preferred embodiments with the accompanying drawings.

BRIEF DESCRIPTION OF THE DRAWINGS

FIG. 4 shows the relationship between the state of connection of the respective clutches, brakes, and one-way clutches and the position of the change-speed gear;

FIG. 23 shows the state of coupling in a sub-transmission in the structure of the third embodiment;

DESCRIPTION OF THE PREFERRED EMBODIMENTS

Some modes of carrying out the present invention are described below in the following sequence as preferred embodiments, in which the technique of the present invention is applied to hybrid vehicles:

A. Structure of System
B. General Operations
C. EV Drive Control Process
D. Auxiliary Machinery Drive Control Process
E. Charging Control Process
F. Second Embodiment
G. Third Embodiment
H. Fourth Embodiment
   H1. First Modification
   H2. Second Modification
I. Fifth Embodiment
   I1. Structure of System
   I2. EV Drive Control Process
   I3. Auxiliary Machinery Drive Control Process
   I4. Power Assist Control Process
   I5. Vehicle Stop- or Speed Reduction-Time Control Process
   I6. First Modification
   I7. Second Modification
J. Sixth Embodiment
K. Seventh Embodiment
   K1. Structure of System
   K2. EV Drive Control Process
   K3. Fuel Cell Activation Control Process
L. Eighth Embodiment
   L1. Structure of System
   L2. EV Drive Control Process
   L3. External Electric Power Supply Activation Control Process
   L4. First Modification
   L5. Second Modification
   L6. Third Modification
M. Ninth Embodiment
   M1. Modification
N. Tenth Embodiment
O. Eleventh Embodiment
   O1. Damping Control Process
   O2. Modification
P. Twelfth Embodiment
   P1. Structure of System
   P2. Modification
Q. Other Modifications

A. Structure of System

Figure 1:
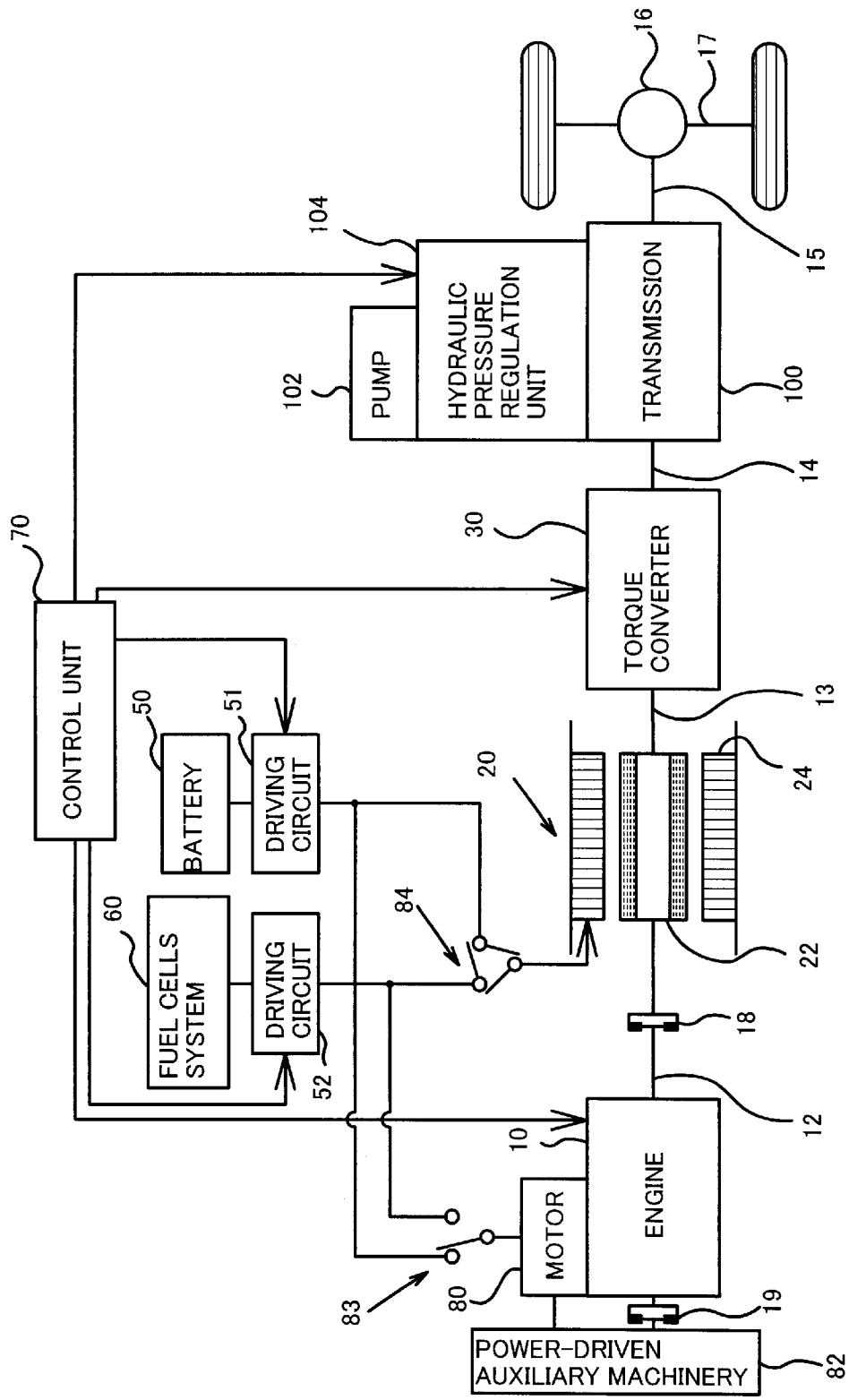
FIG. 1 schematically illustrates the structure of a hybrid vehicle in a first embodiment according to the present invention.

FIG. 1 schematically illustrates the structure of a hybrid vehicle in a first embodiment according to the present invention. The hybrid vehicle of the first embodiment has an engine 10 and a motor 20 as power sources thereof. The hybrid vehicle of the embodiment has a power system, in which the engine 10, an input clutch 18, the motor 20, a torque converter 30, and a transmission 100 are connected in series in this sequence from the upstream side to the downstream side. A crankshaft 12 of the engine 10 is connected to the motor 20 via the input clutch 18. The on-off operations of the input clutch 18 allow and forbid transmission of power from the engine 10. A rotating shaft 13 of the motor 20 is connected to the torque converter 30. An output shaft 14 of the torque converter 30 is linked with the transmission 100. An output shaft 15 of the transmission 100 or a drive shaft is connected to an axle 17 via a differential gear 16. The respective elements of the power system are described below in detail.

The engine 10 is a general gasoline engine, but has a mechanism of adjusting open and close timings of an intake valve, which is used to ingest a mixture of gasoline and the air into a cylinder, and an exhaust valve, which is used to release combustion exhausts from the cylinder, relative to vertical movements of a piston. This mechanism is hereinafter referred to as the VVT mechanism, which is known to the art and is thus not specifically described here. The mechanism of the engine 10 adjusts the open and close timings of these valves, in order to close these valves with some delays relative to the vertical movements of the piston. This arrangement effectively decreases the pumping loss and thereby reduces the torque to be output from the motor 20 in the course of motoring the engine 10. In the process of outputting the power through combustion of gasoline, the VVT mechanism controls on and off the respective valves at the optimum timings attaining the highest possible combustion efficiency according to the resolving speed of the engine 10.

The motor 20 is a three-phase synchronous motor, and includes a rotor 22 with a plurality of permanent magnets attached to an outer circumferential face thereof and a stator 24 with three-phase coils wound thereon to form a rotating magnetic field. The motor 20 is driven and rotated by means of an interaction between the magnetic field produced by the permanent magnets attached to the rotor 22 and the magnetic field produced by the three-phase coils of the motor 24. In the case where the rotor 22 is rotated by an external force, the interaction between these magnetic fields causes an electromotive force to be generated between both ends of the three-phase coils. A non-sine-wave magnetic motor that enables output of relatively large torques is applied for the motor 20 in this embodiment, although a sine-wave magnetic motor, in which the magnetic flux density between the rotor 22 and the stator 24 has a sine distribution in a circumferential direction, may alternatively be applicable.

A battery 50 and a fuel cells system 60 are provided as the electric power supplies of the motor 20. Between these two electric power supplies, the fuel cells system 60 is used as a main electric power supply. The battery 50 is used as an auxiliary electric power supply to supplement the electric power to the motor 20 in the case of malfunction of the fuel cells system 60 or in a transient driving state of the fuel cells system 60, when the fuel cells system 60 can not output sufficient electric power. The electric power of the battery 50 is mainly supplied to a control unit 70, which controls operations of the hybrid vehicle, and power-driven apparatuses including lighting systems.

A changeover switch 84 for switching the state of connection is located between the motor 20 and the respective electric power supplies 50 and 60. The changeover switch 84 arbitrarily changes the state of connection among the battery 50, the fuel cells system 60, and the motor 20. The stator 24 is electrically connected to the battery 50 via the changeover switch 84 and a driving circuit 51. The stator 24 is also electrically connected to the fuel cells system 60 via the changeover switch 84 and a driving circuit 52. Each of the driving circuits 51 and 52 is constructed as a transistor inverter that includes plural pairs of transistors, one as a source and the other as a sink, provided respectively for the three phases of the motor 20. Both the driving circuits 51 and 52 are electrically connected to the control unit 70. The control unit 70 carries out the PWM control of the on- and off-time of the respective transistors included in each of the driving circuits 51 and 52. As a result of the PWM control, quasi three-phase alternating currents run through the three-phase coils of the stator 24 with the battery 50 and the fuel cells system 60 as the electric power supplies, so as to produce a rotating magnetic field. The action of the rotating magnetic field enables the motor 20 to function either as a motor or a generator.

Figure 2:
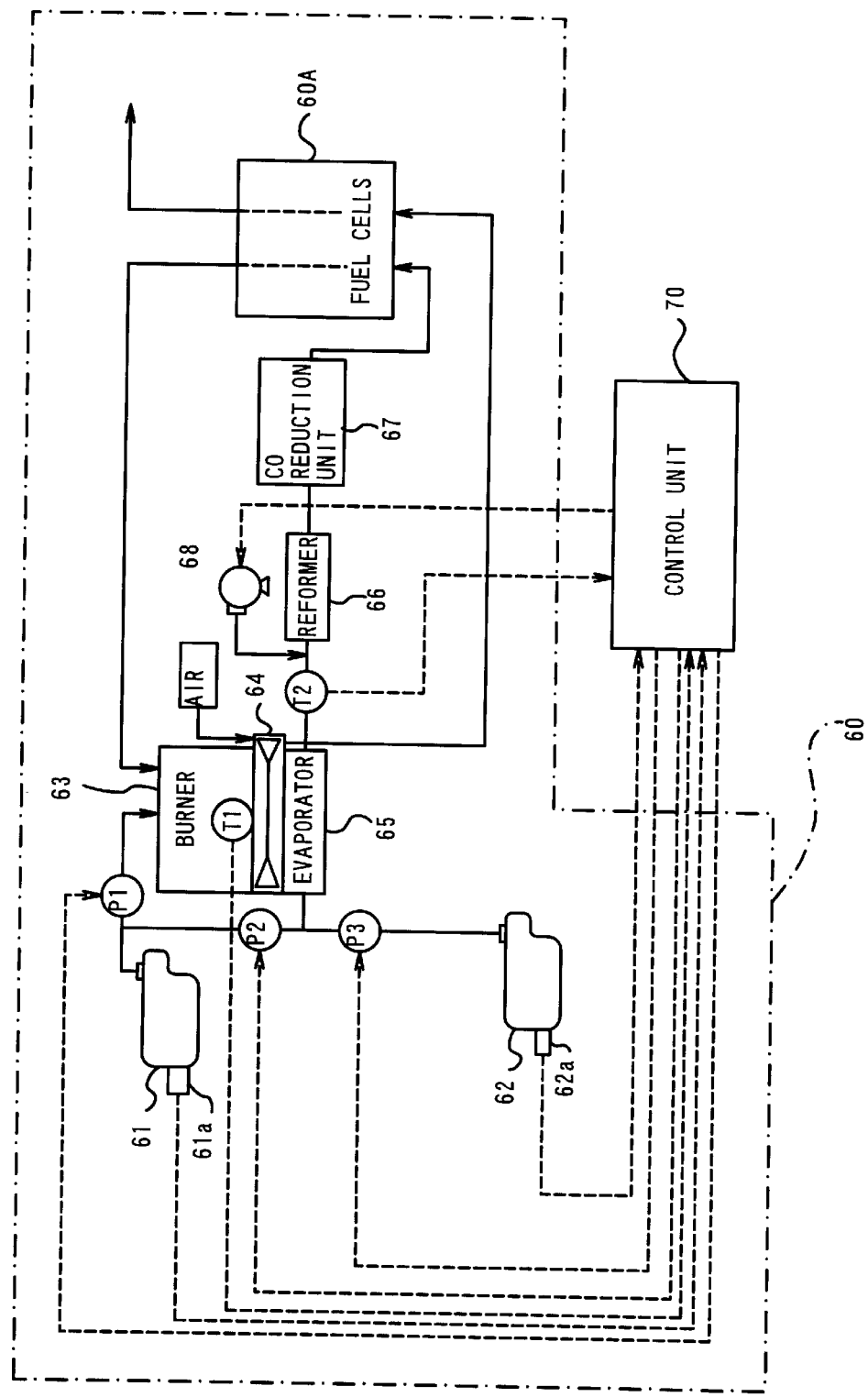
FIG. 2 schematically illustrates the structure of a fuel cells system incorporated in the hybrid vehicle of the first embodiment.

FIG. 2 schematically illustrates the structure of the fuel cells system 60. The fuel cells system 60 includes, as main constituents, a methanol reservoir 61 in which methanol is kept, a water reservoir 62 in which water is kept, a burner 63 that produces a combustion gas, a compressor 64 that compresses the air, an evaporator 65 assembled with the burner 63 and the compressor 64, a reformer 66 that produces a gaseous fuel through reforming reactions, a CO reduction unit 67 that reduces the concentration of carbon monoxide (CO) included in the gaseous fuel, and a fuel cells stack 60A that generates an electromotive force through electrochemical reactions. The operations of these constituents are controlled by the control unit 70.

The fuel cells stack 60A includes a plurality of polymer electrolyte fuel cells that are laid one upon another. Each fuel cell includes an electrolyte membrane, a cathode, an anode, and a pair of separators. The electrolyte membrane is a proton-conductive ion exchange membrane composed of a polymer material, for example, fluororesin. The cathode and the anode are composed of carbon cloth of woven carbon fibers. The separators are composed of a gas-impermeable conductive material, for example, gas-impermeable dense carbon prepared by compressing carbon. Flow paths of gaseous fuel and oxidant gas are formed between the cathode and the anode.

The respective constituents of the fuel cells system 60 have the following connections. The methanol reservoir 61 is connected to the evaporator 65 via piping. A pump P2 disposed in the middle of the piping functions to regulate the flow of methanol and feed a regulated supply of methanol as a crude fuel to the evaporator 65. The water reservoir 62 is also connected to the evaporator 65 via piping. A pump P3 disposed in the middle of the piping functions to regulate the flow of water and feed a regulated supply of water to the evaporator 65. The piping of methanol and the piping of water join together at a position downstream the pumps P2 and P3 to one conduit, which is connected to the evaporator 65.

The evaporator 65 vaporizes the supplies of methanol and water. The evaporator 65 is combined with the burner 63 and the compressor 64. The evaporator 65 boils and vaporizes the supplies of methanol and water with the combustion gas supplied from the burner 63. Methanol is also used as the fuel of the burner 63. The methanol reservoir 61 is accordingly connected to the burner 63 via piping, in addition to the evaporator 65. A pump P1 disposed in the middle of the piping functions to feed a supply of methanol to the burner 63. The burner 63 also receives a supply of fuel gas exhaust that has not been consumed by the electrochemical reactions in the fuel cells stack 60A but remains. The burner 63 combusts the fuel gas exhaust preferentially over methanol. The combustion temperature of the burner 63 is regulated, based on an output of a temperature sensor T1, to be kept in a range of approximately 800° C. to 1000° C. The combustion gas of the burner 63 rotates a turbine to drive the compressor 64, while being fed to the evaporator 65. The compressor 64 compresses the air ingested from the outside of the fuel cells system 60 and supplies the compressed air to the cathodes in the fuel cells stack 60A.

The evaporator 65 is further connected with the reformer 66 via a conduit. The crude fuel gas, that is, the mixture of methanol and water vapor, obtained by the evaporator 65 is supplied to the reformer 66. The reformer 66 reforms the supply of the crude fuel gas mainly consisting of methanol and water, so as to produce a hydrogen-rich gaseous fuel. A temperature sensor T2 is disposed in the middle of the supply conduit connecting the evaporator 65 with the reformer 66. The quantity of methanol supplied to the burner 63 is regulated to keep the observed temperature of the temperature sensor T2 at a predetermined level, for example, approximately 250° C. Oxygen is involved in the reforming reactions proceeding in the reformer 66. The reformer 66 has a blower 68 to ingest the air from the outside and supply oxygen required for the reforming reactions.

The reformer 66 is further connected to the CO reduction unit 67 via piping. The hydrogen-rich gaseous fuel obtained by the reformer 66 is fed into the CO reduction unit 67. The gaseous fuel obtained through the reforming reactions in the reformer 66 generally contains a certain quantity of carbon monoxide (CO). The CO reduction unit 67 reduces the concentration of carbon monoxide included in the gaseous fuel. In the polymer electrolyte fuel cells, carbon monoxide included in the gaseous fuel interferes with the reaction proceeding at the anode to lower the performance of the fuel cells. The CO reduction unit 67 oxidizes carbon monoxide included in the gaseous fuel to carbon dioxide, so as to reduce the concentration of carbon monoxide.

The CO reduction unit 67 is connected to the anodes in the fuel cells stack 60A via piping. The gaseous fuel having the reduced concentration of carbon monoxide is subjected to the cell reaction proceeding at the anodes in the fuel cells stack 60A. As described previously, the compressed air is fed to the cathodes in the fuel cells stack 60A via piping. The air functions as an oxidant gas and is subjected to the cell reaction proceeding at the cathodes in the fuel cells stack 60A.

The fuel cells system 60 having the above configuration generates the electric power through the chemical reaction of methanol with water. In the structure of the embodiment, the driving conditions of the fuel cells stack 60A are controlled according to the remaining quantities of methanol and water in the methanol reservoir 61 and the water reservoir 62. In order to attain such control, volume sensors 61a and 62a are attached to the methanol reservoir 61 and the water reservoir 62, respectively. The fuel cells system 60 incorporated in the hybrid vehicle of the embodiment utilizes methanol and water to generate the electric power. The fuel cells system 60 is, however, not restricted to this structure but may have any suitable structure according to the requirements.

In the description hereinafter, the fuel cells system 60 may symbolically be referred to as the fuel cell 60. Methanol and water used for power generation in the fuel cell 60 are generically referred to as the FC fuel. The volume of methanol may be identical with or different from the volume of water. In the description below, the term 'quantity of the FC fuel' means the volume of the determinant that restricts the power generation in the fuel cell 60, that is, the volume of either methanol or water that falls into short supply prior to the other in the case of continuous power generation.

Referring back to FIG. 1, the torque converter 30 is a known fluid-based power transmission mechanism. The input shaft of the torque converter 30, that is, the output shaft 13 of the motor 20, is not mechanically linked with the output shaft 14 of the torque converter 30. The input shaft 13 and the output shaft 14 are rotatable via a certain slip. Each of the input and output shafts 13 and 14 has a turbine with a plurality of blades mounted on an end thereof. The turbine on the input shaft 13 of the torque converter 30 and the turbine on the output shaft 14 of the torque converter 30 are incorporated in the torque converter 30 in such a manner as to face each other. The torque converter 30 has a sealed structure and includes transmission oil sealed therein. The transmission oil acts on the respective turbines, so as to enable the power to be transmitted from one rotating shaft to the other rotating shaft. Since these rotating shafts are rotatable via a certain slip, the power input from one rotating shaft is converted to a different combination of revolving speed and torque and transmitted to the other rotating shaft. The torque converter 30 has a lock-up clutch that links the two rotating shafts with each other under predetermined conditions, in order to prevent the slip between the two rotating shafts. The on-off conditions of the lock-up clutch are controlled by the control unit 70.

Figure 3:
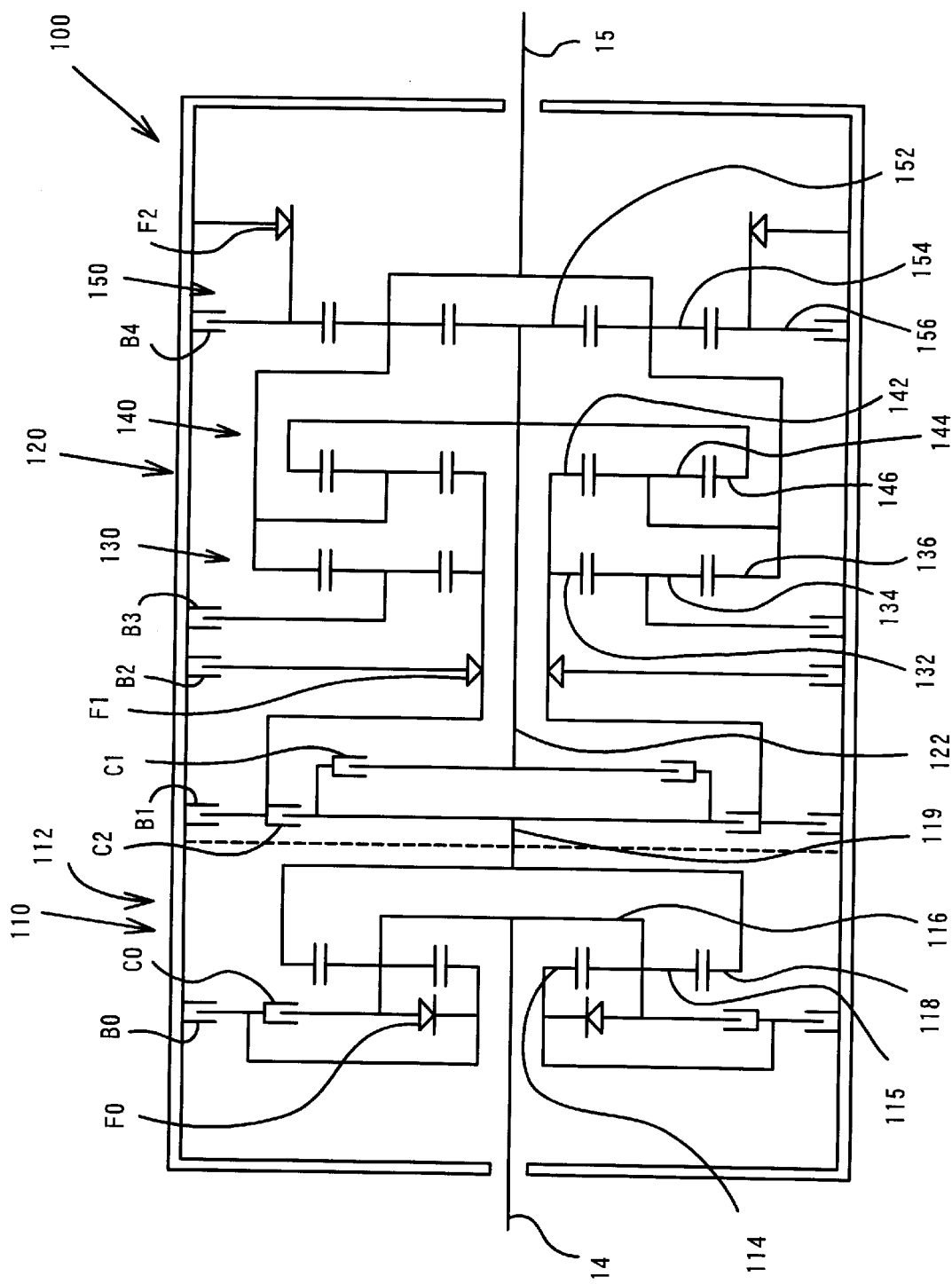
FIG. 3 shows the internal structure of a transmission incorporated in the hybrid vehicle of the first embodiment.

The transmission 100 has a plurality of gear units, clutches, one-way clutches, and brakes incorporated therein, and changes the gear ratio, so as to enable the power input from the output shaft 14 of the torque converter 30 to be converted to a different combination of torque and revolving speed and transmitted to the output shaft 15 of the transmission 100. FIG. 3 shows the internal structure of the transmission 100. The transmission 100 of this embodiment mainly includes a sub-change gear unit 110 (a portion on the left side of the dotted line in FIG. 3) and a main change gear unit 120 (a portion on the right side of the dotted line). The illustrated structure enables five forward speeds and one reverse speed.

The detailed structure of the transmission 100 is described sequentially from the rotating shaft 14. As illustrated in FIG. 3, the sub-change gear unit 110 constructed as an overdrive unit converts the power input from the rotating shaft 14 at a predetermined gear ratio and transmits the converted power to a rotating shaft 119. The sub-change gear unit 110 includes a first planetary gear unit 112 of a single pinion type, a clutch C0, a one-way clutch F0, and a brake B0. The first planetary gear unit 112 includes three different gears, that is, a sun gear 114 revolving on the center, a planetary pinion gear 115 revolving both round the sun gear 114 and on its axis, and a ring gear 118 revolving round the planetary pinion gear 115. The planetary pinion gear 115 is supported on a rotating part called a planetary carrier 116.

In the planetary gear unit, when the rotating conditions of two gears selected among the three gears are determined, the rotating conditions of the residual gear are automatically determined. The rotating conditions of the respective gears in the planetary gear unit are expressed by Equations (1) known in the field of mechanics and given below:

$$Ns=(1+\rho)/\rho \times Nc - Nr/\rho$$

$$Nc=\rho/(1+\rho) \times Ns + Nr/(1+\rho)$$

$$Nr=(1+\rho)Nc - \rho Ns$$

$$Ts=Tc \times \rho/(1+\rho) = \rho Tr$$

$$Tr=Tc/(1+\rho) \tag{1}$$

where ρ denotes the number of teeth in the sun gear to the number of teeth in the ring gear, Ns represents the revolving speed of the sun gear, Ts represents the torque of the sun gear, Nc represents the revolving speed of the planetary carrier, Tc represents the torque of the planetary carrier, Nr represents the revolving speed of the ring gear, and Tr represents the torque of the ring gear.

In the sub-change gear unit 110, the rotating shaft or the output shaft 14 of the torque converter 30, which corresponds to the input shaft of the transmission 100, is linked with the planetary carrier 116. The one-way clutch F0 and the clutch C0 are disposed in parallel between the planetary carrier 116 and the sun gear 114. The one-way clutch F0 is arranged to be coupled when the sun gear 114 has normal rotations relative to the planetary carrier 116, that is, when the sun gear 114 rotates in the same direction as that of the input shaft 14 of the transmission 100. The sun gear 114 is connected to the multiple disc brake B0 that can stop the rotation of the sun gear 114. The ring gear 118 corresponding to the output of the sub-change gear unit 110 is linked with the rotating shaft 119, which corresponds to the input shaft of the main change gear unit 120.

In the sub-change gear unit 110 of the above configuration, the planetary carrier 116 rotates integrally with the sun gear 114 in the case of coupling of either the clutch C0 or the one-way clutch F0. According to Equations (1) given above, when the sun gear 114 and the planetary carrier 116 have an identical revolving speed, the ring gear 118 also rotates at the identical revolving speed. In this state, the revolving speed of the rotating shaft 119 is identical with the revolving speed of the input shaft 14. In the case of coupling the brake B0 to stop the rotation of the sun gear 114, on the other hand, according to Equations (1), substitution of the value '0' into the revolving speed Ns of the sun gear 114 makes the revolving speed Nr of the ring gear 118 higher than the revolving speed Nc of the planetary carrier 116. Namely the rotation of the input shaft 14 is accelerated and then transmitted to the rotating shaft 119. The sub-change gear unit 110 selectively performs the function of directly transmitting the power input from the input shaft 14 to the rotating shaft 119 or the function of accelerating the input power and then transmitting the accelerated power to the rotating shaft 119.

The main change gear unit 120 includes three planetary gear units 130, 140, and 150, two clutches C1 and C2, two one-way clutches F1 and F2, and four brakes B1 through B4. Like the first planetary gear unit 112 included in the sub-change gear unit 110, each of the planetary gear units 130, 140, and 150 includes a sun gear, a planetary carrier, a planetary pinion gear, and a ring gear. The three planetary gear units 130, 140, and 150 are linked as discussed below.

A sun gear 132 of the second planetary gear unit 130 is integrally linked with a sun gear 142 of the third planetary gear unit 140. These sun gears 132 and 142 may be connected with the rotating shaft 119, that is, the input shaft of the main change gear unit 120, via the clutch C2. The rotating shaft 119 linked with these sun gears 132 and 142 is connected with the brake B1 that stops the rotation of the rotating shaft 119. The one-way clutch F1 is arranged to be coupled in the case of reverse rotation of this rotating shaft 119. The brake B2 is provided to stop the rotation of the one-way clutch F1.

A planetary carrier 134 of the second planetary gear unit 130 is connected with the brake B3 that stops the rotation of the planetary carrier 134. A ring gear 136 of the second planetary gear unit 130 is integrally linked with a planetary carrier 144 of the third planetary gear unit 140 and a planetary carrier 154 of the fourth planetary gear unit 150. The ring gear 136 and the planetary carriers 144 and 154 are further connected with the output shaft 15 of the transmission 100.

A ring gear 146 of the third planetary gear unit 140 is linked with a sun gear 152 of the fourth planetary gear unit 150 and with a rotating shaft 122. The rotating shaft 122 may be linked with the input shaft 119 of the main change gear unit 120 via the clutch C1. A ring gear 156 of the fourth planetary gear unit 150 is connected with the brake B4 that stops the rotation of the ring gear 156 and with the one-way clutch F2 that is arranged to be coupled in the case of reverse rotation of the ring gear 156.

The clutches C0 through C2 and the brakes B0 through B4 included in the transmission 100 are coupled and released by means of the hydraulic pressure. As shown in FIG. 1, the transmission 100 receives a supply of working oil fed from a power-driven hydraulic pump 102 to enable functions of these clutches and brakes. The transmission 100 has a hydraulic pressure regulation unit 104 that regulates the hydraulic pressure. The hydraulic pressure regulation unit 104 includes hydraulic oil conduits to enable the functions of the transmission 100 and solenoid valves to regulate the hydraulic pressure, though not specifically illustrated. In the hybrid vehicle of the embodiment, the control unit 70 outputs control signals to these solenoid valves and other related elements in the hydraulic pressure regulation unit 104, so as to control the operations of the respective clutches and brakes.

The transmission 100 of the embodiment can set one speed selected among five forward speeds and one reverse speed to the position of the change-speed gear through the combination of coupling and release of the clutches C0 through C2 and the brakes B0 through B4. The transmission 100 also has a Neutral position and a Parking position. FIG. 4 shows the relationship between the state of connection of the respective clutches, brakes, and one-way clutches and the position of the change-speed gear. In the table of FIG. 4, the circle represents a normal state of coupling, the double circle represents coupling under the application of power-source braking, and the triangle represents a specific state of coupling that does not participate in the transmission of power. The power-source braking here represents the braking by means of the engine 10 and the motor 20. The coupling of the one-way clutches F0 through F2 is not based on the control signal of the control unit 70 but is based on the directions of rotations of the respective gears.

As shown in FIG. 4, in the case of either a Parking (P) position or a Neutral (N) position, the clutch C0 and the one-way clutch F0 are coupled. Since both the clutches C2 and C1 are released, the power is not transmitted from the input shaft 119 of the main change gear unit 120 to the downstream elements.

In the case of the first speed ($1^{st}$), the clutches C0 and C1 and the on-way clutches F0 and F2 are coupled. Under the application of engine brake, the brake B4 is further coupled. This is equivalent to the state where the input shaft 14 of the transmission 100 is directly linked with the sun gear 152 of the fourth planetary gear unit 150. The power is accordingly transmitted to the output shaft 15 of the transmission 100 at a certain gear ratio corresponding to the gear ratio of the fourth planetary gear unit 150. The ring gear 156 is restricted not to rotate reversely by the function of the one-way clutch F2. The revolving speed of the ring gear 156 is thus practically equal to zero.

In the case of the second speed ($2^{nd}$), the clutch C1, the brake B3, and the one-way clutch F0 are coupled. Under the application of engine brake, the clutch C0 is further coupled. This is equivalent to the state where the input shaft 14 of the transmission 100 is directly linked with the sun gear 152 of the fourth planetary gear unit 150 and with the ring gear 146 of the third planetary gear unit 140. In this state, the planetary carrier 134 of the second planetary gear unit 130 is fixed. The sun gear 132 of the second planetary gear unit 130 and the sun gear 142 of the third planetary gear unit 140 have an identical revolving speed. The ring gear 136 and the planetary carrier 144 also have an identical revolving speed. Under such conditions, according to Equations (1) discussed previously, the rotating conditions of the second and third planetary gear units 130 and 140 are determined unequivocally. The revolving speed Nout of the output shaft 15 at the second speed ($2^{nd}$) is higher than the revolving speed at the first speed ($1^{st}$), whereas the torque Tout of the output shaft 15 at the second speed ($2^{nd}$) is smaller than the torque at the first speed ($1^{st}$).

In the case of the third speed ($3^{rd}$), the clutches C0 and C1, the brake B2, and the one-way clutches F0 and F1 are coupled. Under the application of engine brake, the brake B1 is further coupled. This is equivalent to the state where the input shaft 14 of the transmission 100 is directly linked with the sun gear 152 of the fourth planetary gear unit 150 and with the ring gear146 of the third planetary gear unit 140. The sun gears 132 and 142 of the second and third planetary gear units 130 and 140 are restricted not to rotate reversely by the functions of the brake B2 and the one-way clutch F1. The revolving speeds of these sun gears 132 and 142 are thus practically equal to zero. Like in the case of the second speed ($2^{nd}$), under such conditions, according to Equations (1) discussed previously, the rotating conditions of the second and third planetary gear units 130 and 140 are determined unequivocally, and the revolving speed of the output shaft 15 is determined unequivocally. The revolving speed Nout of the output shaft 15 at the third speed ($3^{rd}$) is higher than the revolving speed at the second speed ($2^{nd}$), whereas the torque Tout of the output shaft 15 at the third speed ($3^{rd}$) is smaller than the torque at the second speed ($2^{nd}$).

In the case of the fourth speed ($4^{th}$), the clutches C0 through C2 and the one-way clutch F0 are coupled. The brake B2 is simultaneously coupled but does not participate in transmission of the power. In this state, the clutches C1 and C2 are simultaneously coupled, so that the input shaft 14 of the transmission 100 is directly linked with the sun gear 132 of the second planetary gear unit 130, with the sun gear 142 and the ring gear 146 of the third planetary gear unit 140, and with the sun gear 152 of the fourth planetary gear unit 150. The third planetary gear unit 140 thus integrally rotates with the input shaft 14 at an identical revolving speed. The output shaft 15 of the transmission 100 thereby integrally rotates with the input shaft 14 of the transmission 100 at an identical revolving speed. The revolving speed Nout of the output shaft 15 at the fourth speed ($4^{th}$) is higher than the revolving speed at the third speed ($3^{rd}$), whereas the torque Tout of the output shaft 15 at the fourth speed ($4^{th}$) is smaller than the torque at the third speed ($3^{rd}$).

In the case of the fifth speed ($5^{th}$), the clutches C1 and C2 and the brake B0 are coupled. The brake B2 is simultaneously coupled but does not participate in transmission of the power. In this state, the clutch C0 is released, so that the revolving speed is increased by the sub-change gear unit 110. The revolving speed of the input shaft 14 of the transmission 100 is increased and transmitted to the input shaft 119 of the main change gear unit 120. The clutches C1 and C2 are simultaneously coupled, so that the input shaft 119 and the output shaft 15 of the main change gear unit 120 rotate at an identical revolving speed, like in the case of the fourth speed ($4^{th}$). According to Equations (1) discussed previously, the relation between the revolving speed and the torque of the input shaft 14 and the output shaft 119 of the sub-change gear unit 110 is obtained, so as to determine the revolving speed and the torque of the output shaft 15. The revolving speed Nout of the output shaft 15 at the fifth speed ($5^{th}$) is higher than the revolving speed at the fourth speed ($4^{th}$), whereas the torque Tout of the output shaft 15 at the fifth speed ($5^{th}$) is smaller than the torque at the fourth speed ($4^{th}$).

In the case of reverse speed (R), the clutch C2 and the brakes B0 and B4 are coupled. In this state, the revolving speed of the input shaft 14 is increased by the sub-change gear unit 110 and linked directly with the sun gear 132 of the second planetary gear unit 130 and the sun gear 142 of the third planetary gear unit 140. As described previously, the ring gear 136 and the planetary carriers 144 and 154 have an identical revolving speed. The ring gear 146 and the sun gear 152 also have an identical revolving speed. The revolving speed of the ring gear 156 of the fourth planetary gear unit 150 becomes equal to zero by the function of the brake B4. Under such conditions, according to Equations (1) discussed previously, the rotating conditions of the respective planetary gear units 130, 140, and 150 are determined unequivocally. At this moment, the output shaft 15 rotates in the negative direction to allow a reverse movement.

As described above, the transmission 100 of the embodiment sets one selected out of the five forward speeds and one reverse speed to the position of the change-speed gear. The power input from the input shaft 14 is converted to a different combination of revolving speed and torque and output to the output shaft 15. The output power is defined by the increasing revolving speed and the decreasing torque in the sequence of the first speed ($1^{st}$) to the fifth speed ($5^{th}$). This is also true when a negative torque, that is, a braking force, is applied to the input shaft 14. In the case where a fixed braking force is applied to the input shaft 14 by means of the engine 10 and the motor 20, the braking force applied to the output shaft 15 decreases in the sequence of the first speed ($1^{st}$) to the fifth speed ($5^{th}$). The transmission 100 may have a variety of known structures other than the structure adopted in this embodiment. The transmission 100 may have a greater number of or a less number of forward speeds than five.

Figure 5:
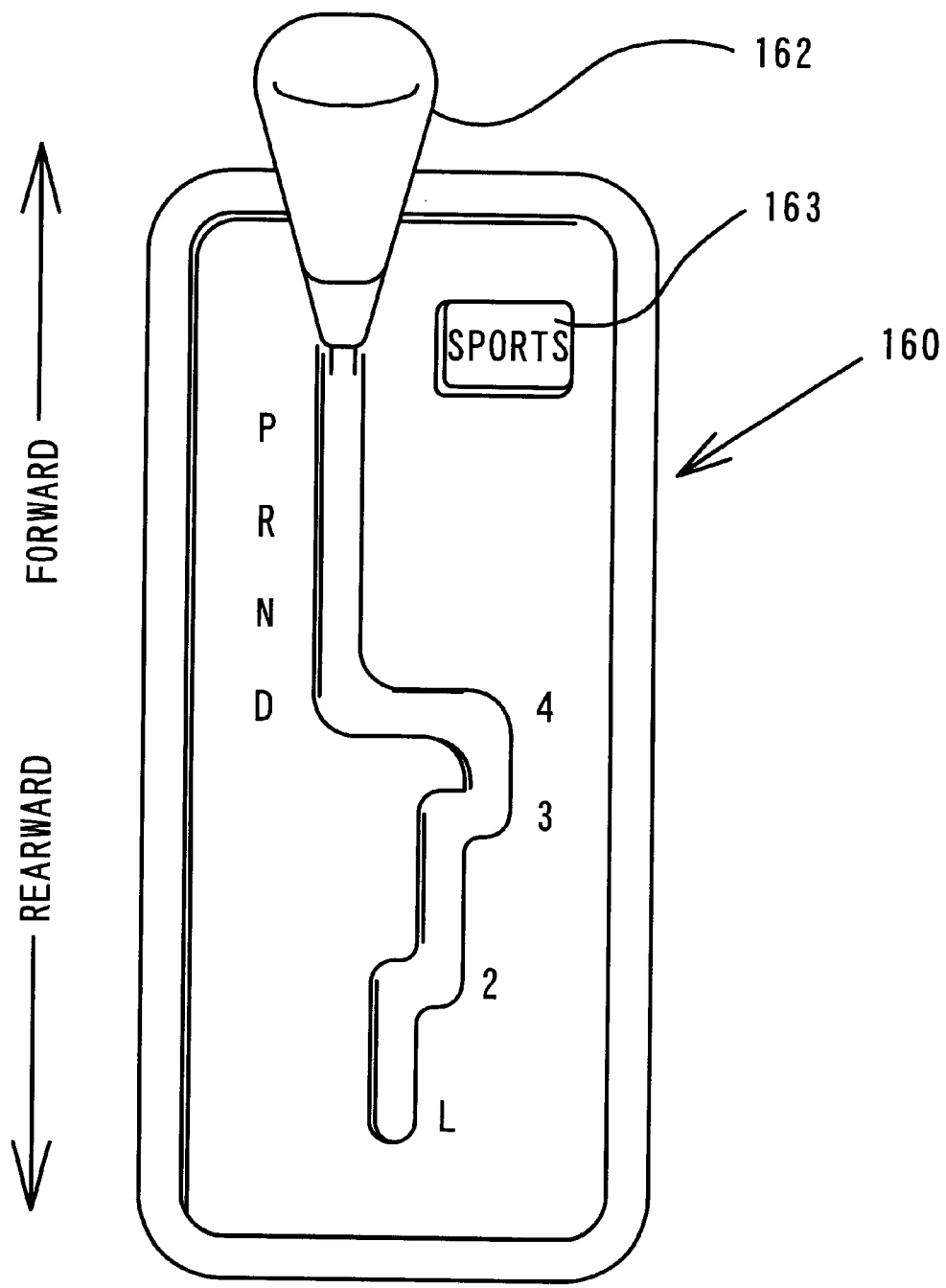
FIG. 5 shows an operation unit for selecting the gearshift position in the hybrid vehicle of the first embodiment.

The control unit 70 switches over the position of the change-speed gear in the transmission 100 according to the vehicle speed and other conditions. The driver manually operates a gearshift lever in the vehicle, so as to select a desired gearshift position and vary the available range of the change-speed gear. FIG. 5 shows an operation unit 160 for selecting the gearshift position in the hybrid vehicle of this embodiment. The operation unit 160 is located along a longitudinal axis of the vehicle on the floor next to the driver's seat.

As shown in FIG. 5, the operation unit 160 has a gearshift lever 162. The driver slides the gearshift lever 162 along the longitudinal axis of the vehicle, so as to select one among available gearshift positions. The available gearshift positions include a parking (P) position, a reverse (R) position, a neutral (N) position, a drive (D) position, a fourth position (4), a third position (3), a second position (2), and a low position (L), which are arranged in this order from the forward of the vehicle.

The parking (P), the reverse (R), and the neutral (N) positions correspond to the connection states shown in the table of FIG. 4. At the drive (D) position, the selected mode enables a drive using the first speed ($1^{st}$) to the fifth speed ($5^{th}$). At the fourth position (4), the selected mode enables a drive using the first speed ($1^{st}$) to the fourth speed ($4^{th}$). In a similar manner, the selected mode at the third position (3), the second position (2), and the low position (L) enables a drive using the first speed ($1^{st}$) to the third speed ($3^{rd}$), using the first speed ($1^{st}$) to the second speed ($2^{nd}$), and using only the first speed ($1^{st}$), respectively.

The operation unit 160 also has a sports mode switch 163, which is pressed on by the driver on the occasions of frequent acceleration and deceleration. The position of the change-speed gear in the transmission 100 is generally set, based on maps, in which the possible speeds are mapped to combinations of the vehicle speed and the accelerator travel. When the sports mode switch 163 is in ON position, the maps are modified to set the lower speeds to the change-speed gear.

The operation unit 160 used for selecting the gearshift position and setting the target deceleration is not restricted to the structure of the embodiment shown in FIG. 5, but may have any suitable structure according to the requirements. A manual transmission mode, which enables the driver to set the change-speed gear manually, may be provided in place of or together with the sports mode switch 163. In the structure having the manual transmission mode, the position of the change-speed gear may be set with the gearshift lever 162 or with a separate operation unit. An example of the separate operation unit has a speed up switch and a speed down switch mounted on a steering wheel in the vehicle.

In the hybrid vehicle of the embodiment, the power output from the power sources like the engine 10 is also used to drive auxiliary machinery. In the structure of the hybrid vehicle shown in FIG. 1, power-driven auxiliary machinery 82 is connected to the engine 10. The power-driven auxiliary machinery 82 is a generic term representing any auxiliary machines driven with the power of the engine 10, for example, a compressor of an air conditioner and a pump for power steering. The power-driven auxiliary machinery 82 is linked via a belt with a pulley, which is attached to the crankshaft 12 of the engine 10 via an auxiliary machinery clutch 19, and is driven by the rotational power of the crankshaft 12.

An auxiliary machinery driving motor 80 is connected to the power-driven auxiliary machinery 82. The auxiliary machinery driving motor 80 is also connected with the fuel cell 60 and the battery 50 via a changeover switch 83. The auxiliary machinery driving motor 80 has a similar structure to that of the motor 20, and is driven with the power of the engine 10 to generate electric power. The battery 50 is chargeable with the electric power generated by the auxiliary machinery driving motor 80. The auxiliary machinery driving motor 80 receives supplies of electric power from the battery 50 and the fuel cell 60 to carry out power operation. In the hybrid vehicle of this embodiment, the operation of the engine 10 is stopped under predetermined conditions as discussed later. The power operation of the auxiliary machinery driving motor 80 enables the power-driven auxiliary machinery 82 to be driven even in the state of the engine 10 at a stop. While the engine 10 is at a stop, the power-driven auxiliary machinery 82 may alternatively be driven with the power of the motor 20 in the state of the input clutch 18 in ON position. When the auxiliary machinery driving motor 80 works to drive the power-driven auxiliary machinery 82, the auxiliary machinery clutch 19 between the engine 10 and the power-driven auxiliary machinery 82 is released to reduce the loading of the auxiliary machinery driving motor 80.

In the hybrid vehicle of the embodiment, the main energy output sources are engine 10 and the fuel cell 60. The electric power of the battery 50 is not mainly used to drive the hybrid vehicle and is thus not regarded as the main energy output source. The fuel cell 60 outputs electrical energy and also causes the motor 20 to carry out power operation and thereby output mechanical energy to the drive shaft 15. The engine 10 outputs mechanical energy to the drive shaft 15 and also causes either the motor 20 or the auxiliary machinery driving motor 80 to work as the generator and thereby output electrical energy. The hybrid vehicle of the embodiment runs by properly using these two energy output sources as described later. Which of the energy output sources is to be used depends upon the conditions of the FC fuel. The hybrid vehicle of the embodiment has a display unit that informs the driver of the currently working energy output source, in order to ensure a smooth drive without making the driver feel uneasy.

Figure 6:
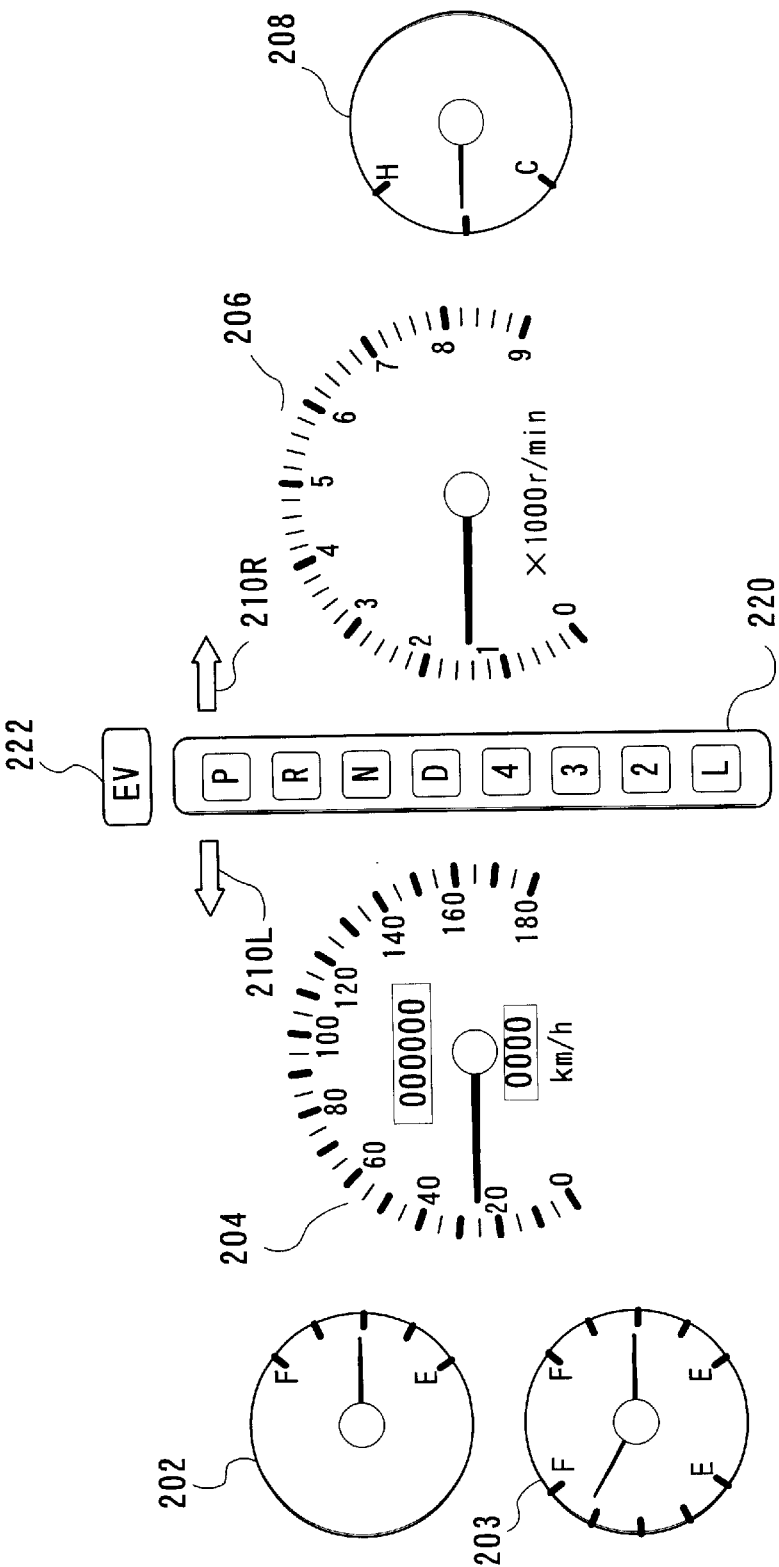
FIG. 6 shows an instrument panel in the hybrid vehicle of the first embodiment.

FIG. 6 shows an instrument panel in the hybrid vehicle of this embodiment. The instrument panel is placed in front of the driver like the standard vehicle. A fuel gauge 202 of gasoline, a fuel gauge 203 for the fuel cell 60, and a speedometer 204 are disposed on the left side of the instrument panel seen from the driver. An engine temperature gauge 208 and a tachometer 206 are disposed on the right side of the instrument panel. The fuel gauge 202 for the fuel cell 60 has left and right pointers respectively representing the remaining quantities of methanol and water used for reforming. A gearshift position indicator 220 is arranged on the center of the instrument panel to display the gearshift position. Direction indicators 210L and 210R are set on the left and right sides of the gearshift position indicator 220. An EV drive indicator 222 is provided above the gearshift position indicator 220. The EV drive indicator 222 lights up during the power operation of the motor 20.

Figure 7:
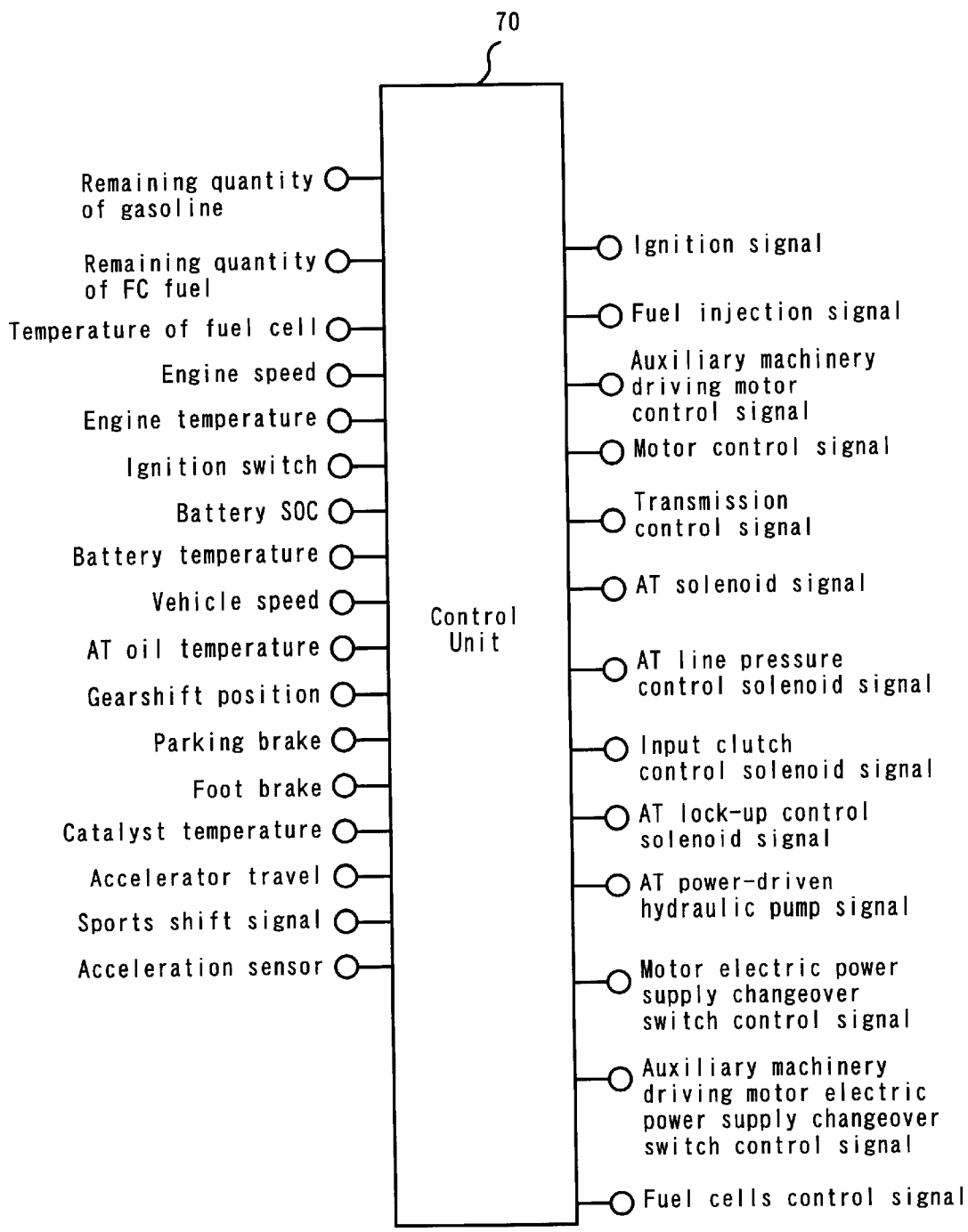
FIG. 7 shows connections of input and output signals into and from a control unit incorporated in the hybrid vehicle of the first embodiment.

In the hybrid vehicle of the embodiment, the control unit 70 controls the operations of the engine 10, the motor 20, the torque converter 30, the transmission 100, and the auxiliary machinery driving motor 80 (see FIG. 1). The control unit 70 is constructed as a one-chip microprocessor including a CPU, a RAM, and a ROM. The CPU carries out various control operations discussed below according to programs recorded in the ROM. A variety of input and output signals are connected to the control unit 70, in order to implement the control operations. FIG. 7 shows connections of input and output signals into and from the control unit 70. The left side of FIG. 7 shows the signals input into the control unit 70, whereas the right side shows the signals output from the control unit 70.

The signals input into the control unit 70 are received from various switches and sensors. The input signals represent, for example, the remaining quantity FCL of the FC fuel, the temperature of the fuel cell 60, the speed of the engine 10, the water temperature in the engine 10, the on-off state of an ignition switch, the remaining charge SOC of the battery 50, the temperature of the battery 50, the vehicle speed, the oil temperature of the torque converter 30, the gearshift position, the on-off state of a parking brake, the amount of actuation of a brake pedal, the temperature of a catalyst for converting the exhausts of the engine 10, the travel of the accelerator, the on-off state of the sports mode switch 163, and the acceleration of the vehicle. There are lots of other signals input into the control unit 70, though not specifically illustrated here.

The signals output from the control unit 70 are used to control the engine 10, the motor 20, the torque converter 30, the transmission 100, and the other constituents. The output signals include, for example, an ignition signal to regulate the ignition timing of the engine 10, a fuel injection signal to control the fuel injection, an auxiliary machinery driving motor control signal to control the operations of the auxiliary machinery driving motor 80, a motor control signal to control the operations of the motor 20, a transmission control signal to set the position of the change-speed gear in the transmission 100, an AT solenoid signal and an AT line pressure control solenoid signal to regulate the hydraulic pressure in the transmission 100, an input clutch control solenoid signal to control the input clutch 18 on and off to allow and forbid transmission of power from the engine 10 to the motor 20, an AT lock-up control solenoid signal to lock the torque converter 30 up, an AT power-driven hydraulic pump signal to regulate the power-driven hydraulic pump 102, a control signal of the changeover switch 84 to change over the electric power supply of the motor 20, a control signal of the changeover switch 83 to change over the electric power supply of the auxiliary machinery driving motor 80, and a control signal of the fuel cells system 60. The control unit 70 outputs lots of other signals, though not specifically illustrated here.

B. General Operations

The following describes the general operations of the hybrid vehicle of the embodiment. As described previously with FIG. 1, the hybrid vehicle of the embodiment includes the engine 10 and the motor 20 as the power sources thereof. The control unit 70 uses at least either one of the power sources, based on the driving conditions of the vehicle, that is, the vehicle speed and the torque. Which of the power sources is to be used has previously been set in the form of a map in the ROM of the control unit 70.

Figure 8:
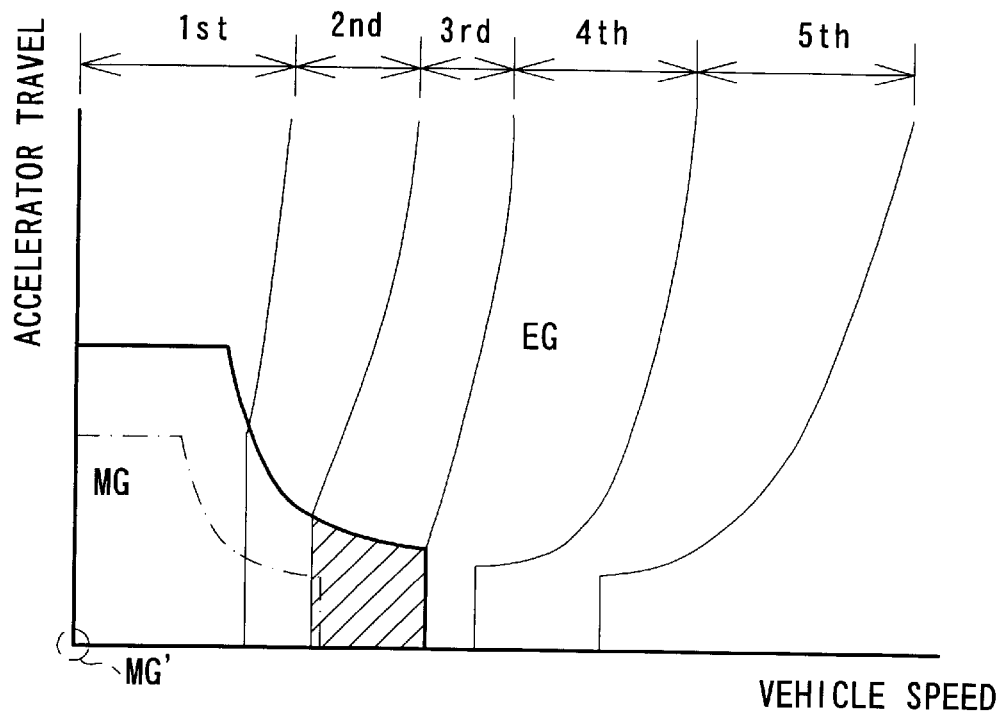
FIG. 8 is a map showing the working power source and the available speeds mapped to the respective driving conditions of the vehicle.

FIG. 8 is a map showing the working power source to be used according to the driving conditions of the vehicle. In an area MG, the hybrid vehicle runs with the motor 20 as the working power source. In a residual area EG other than the area MG, the hybrid vehicle runs with the engine 10 as the working power source. The drive in the former area is hereinafter referred to as the EV drive, and the drive in the latter area is referred to as the engine drive. The hybrid vehicle constructed as shown in FIG. 1 may run with both the engine 10 and the motor 20 as the working power sources, but there is not such a drive area in this embodiment. The area of the EV drive is set to have a high driving efficiency by taking into account the working efficiencies of the engine 10 and the motor 20 and the possible ranges of power output from the respective power sources.

Referring to the map of FIG. 8, the hybrid vehicle of the embodiment starts by the EV drive. In the area of the EV drive, the hybrid vehicle runs in the state of the input clutch 18 in OFF position. At the time point when the hybrid vehicle starting by the EV drive reaches a driving state in the vicinity of the boundary between the MG area and the EG area in the map of FIG. 8, the control unit 70 changes the input clutch 18 to ON position and starts the engine 10. The input clutch 18 in ON position enables the engine 10 to be rotated by the motor 20. The control unit 70 instructs the fuel injection and the ignition at a specific timing when the speed of the engine 10 rises to a preset level. The control unit 70 also controls the VVT mechanism to change the open and close timings of the intake valve and the exhaust valve to the timings suitable for the operations of the engine 10.

Once the engine 10 starts, the hybrid vehicle runs only with the engine 10 as the working power source in the EG area. On the start of a drive in the EG area, the control unit 70 shuts down all the transistors included in the driving circuits 51 and 52. This makes the motor 20 at a race.

The control unit 70 changes over the working power source according to the driving conditions of the vehicle and simultaneously switches over the speed of the transmission 100. Like the change-over of the working power source, the switch-over of the speed is based on a map, in which available speeds are mapped to the respective driving conditions of the vehicle. Different maps are provided for the respective gearshift positions. The map of FIG. 8 also shows available speeds mapped to the respective driving conditions of the vehicle at the drive position (D), the fourth position (4), and the third position (3). As clearly understood from this map, the control unit 70 switches over the speed to decrease the gear ratio with an increase in vehicle speed.

In a drive at the drive position (D), the speeds up to the fifth speed ($5^{th}$) in the map of FIG. 8 are available for the change-speed gear. In a drive at the fourth position (4), the speeds up to the fourth speed ($4^{th}$) in the map of FIG. 8 are available for the change-speed gear. At the position 4, the $4^{th}$ speed is used even in the area of the $5^{th}$ speed in the map of FIG. 8. In a drive at the third position (3), the speeds up to the third speed ($3^{rd}$) in the map of FIG. 8 are available for the change-speed gear.

Figure 9:
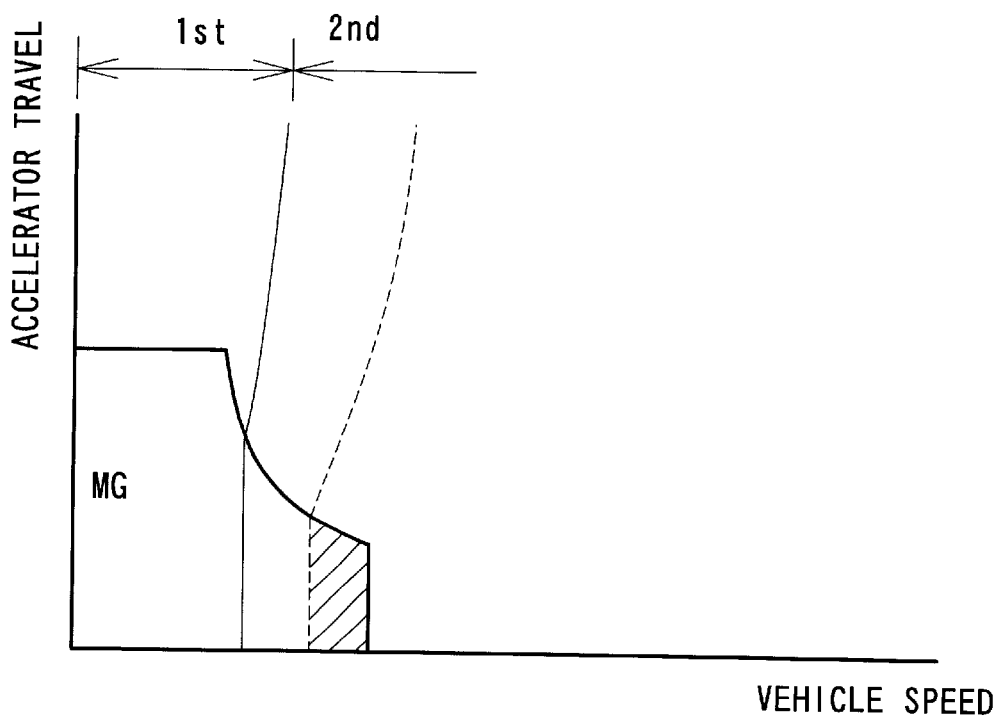
FIG. 9 is a map showing the available speeds mapped to the respective driving conditions of the vehicle at the position 2.

At the second position (2) and the low position (L), different maps intrinsic to the respective gearshift positions are used to control the change-speed gear. FIG. 9 is a map showing the available speeds mapped to the respective driving conditions of the vehicle at the position 2. At the position 2, the first speed ($1^{st}$) and the second speed ($2^{nd}$) are available for the change-speed gear. In the map of FIG. 9 with regard to the position 2, the boundary on which the change-speed gear is switched over between the $1^{st}$ speed and the $2^{nd}$ speed is identical with the boundary in the map of FIG. 8 with regard to the position D. The difference between the position 2 and the position D is the range of the MG area.

At the position 2, since the $3^{rd}$ speed is not available, a hatched area of FIG. 9, in which the $3^{rd}$ speed is used in the corresponding map of FIG. 8 with regard to the position D, may be omitted from the MG area. The technique of this embodiment, however, sets a wider MG area including the hatched area at the position 2. The curve of dotted line in FIG. 9 is given for the purpose of comparison with the map of FIG. 8 with regard to the position D. The curve of dotted line represents the boundary between the $2^{nd}$ speed and the $3^{rd}$ speed in the map with regard to the position D. Extending the area corresponding to the $2^{nd}$ speed in the MG area enables the motor 20 to be sufficiently used as the power source at the position 2, thereby improving the fuel consumption of the hybrid vehicle. It is preferable that the area corresponding to the $2^{nd}$ speed is set by taking into account the rating of the motor 20, in order to ensure the drive feeling in the extended area (that is, the hatched area in FIG. 9) substantially equivalent to the drive feeling in the corresponding area at the position D.

Figure 10:
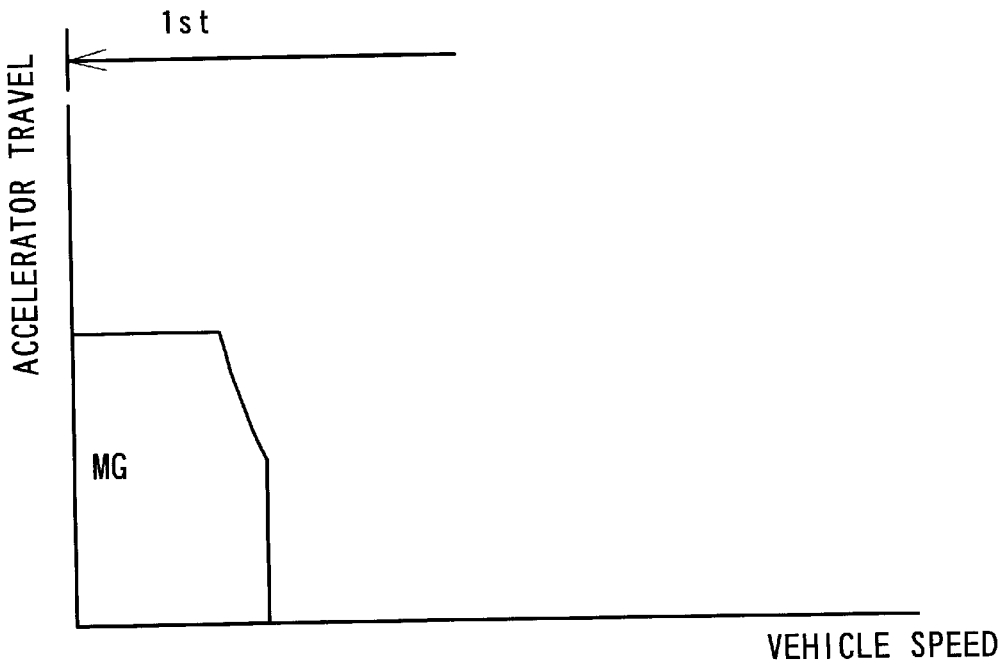
FIG. 10 is a map showing the available speed according to the driving conditions of the vehicle at the position L.

FIG. 10 is a map showing the available speed according to the driving conditions of the vehicle at the position L. Only the $1^{st}$ speed is available for the change-speed gear at the position L. Because of the same reasons as discussed above with regard to the map at the position 2, the range of the MG area at the position L is different from the range at the position 2. The MG area at the position L is set to be greater than the area corresponding to the $1^{st}$ speed in the MG area in the map of FIG. 9 with regard to the position 2.

Figure 11:
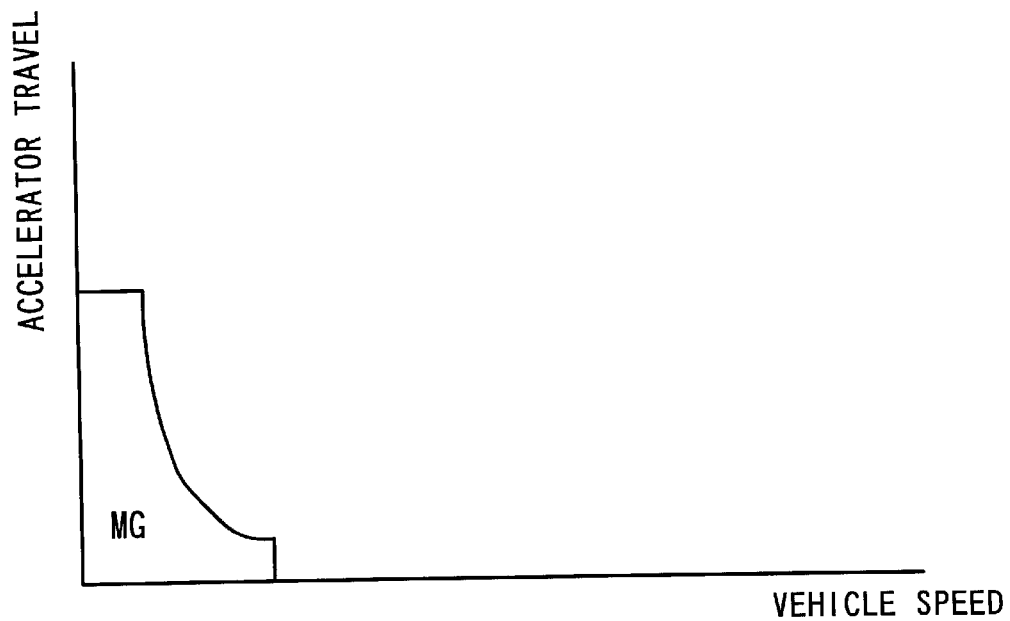
FIG. 11 is a map showing the available speed according to the driving conditions of the vehicle at the position R.

FIG. 11 is a map showing the available speed according to the driving conditions of the vehicle at the position R. Since the vehicle drives back at the position R, the range of the MG area is set independently of the maps at the gearshift positions of forward drive.

A kick-down speed control is performed, other than the general switch-over of the speed according to the map. The kick-down speed control shifts the change-speed gear to the higher speed having a higher gear ratio in response to an abrupt step-on of the accelerator pedal by the driver. In the case of the sports mode switch 163 in ON position, the respective maps are modified to extend the areas of the lower speeds having lower gear ratios. The process of such switch-over control follows the control procedure carried out in a conventional vehicle that uses only the engine as the power source and has an automatic transmission. A variety of settings other than those shown in FIGS. 8 through 11 may be applied for the relationship between the available speeds and the driving conditions of the vehicle, according to the gear ratio of the transmission 100.

In the maps of FIGS. 8 through 11, the EV drive and the engine drive are selectively used according to the driving conditions of the vehicle. The control unit 70 of the embodiment also provides other maps, in which the hybrid vehicle runs by the engine drive in the whole drive area. These maps are similar to those of FIGS. 8 through 11, except that the areas of the EV drive, that is, the areas MG, are omitted. In these other maps, for the purpose of the improved fuel consumption, the operation of the engine 10 is stopped in principle while the hybrid vehicle is at a stop.

The following describes the reason why the two different maps are provided for each gearshift position. The EV drive requires electric power. In the case where the fuel cells system 60 ensures a sufficient supply of electric power, the control unit 70 selectively uses the EV drive and the engine drive in each drive area. In the case where the fuel cells system 60 can not ensure a sufficient supply of electric power, on the other hand, the EV drive is not suitable, so that the hybrid vehicle runs by the engine drive in any drive area. When the hybrid vehicle falls into a state that does not ensure a sufficient supply of electric power after the start of the vehicle by the EV drive, the control unit 70 sets the engine drive even if the driving state of the vehicle is within the MG area. The details of such control will be discussed later.

The hybrid vehicle of the embodiment has two braking mechanisms, that is, wheel braking applied in response to a step-on operation of the brake pedal by the driver and power source braking with the torques applied from the engine 10 and the motor 20. The braking with the torque applied from the motor 20 is generally called the regenerative braking. This braking procedure causes the motor 20 to recover the kinetic energy of the hybrid vehicle in the form of electric power. The battery 50 is charged with the recovered electric power. The power source braking is applied when the driver releases the step-on of the accelerator pedal. The step-on operation of the brake pedal causes the braking force, that is, the sum of the power source braking and the wheel braking, to be applied to the vehicle.

In the hybrid vehicle of the embodiment, the control unit 70 controls the engine 10 and the motor 20, so as to enable the drives discussed above. The control unit 70 executes the control operations provided for the various drive modes of the vehicle. The following describes the details of the control processes carried out in typical drive modes in the hybrid vehicle of the embodiment.

C. EV Drive Control Process

Figure 12:
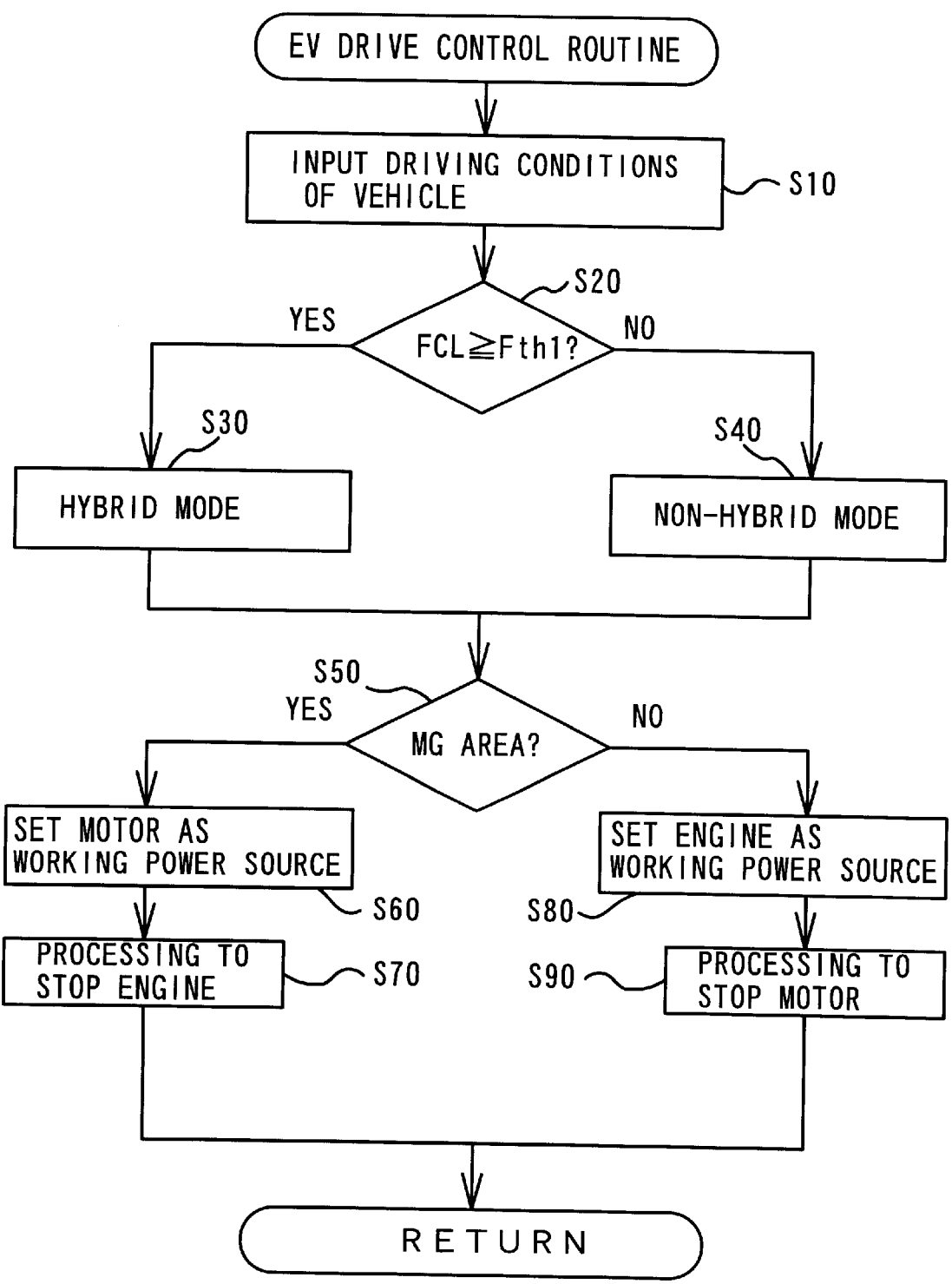
FIG. 12 is a flowchart showing an EV drive control routine executed in the first embodiment.

FIG. 12 is a flowchart showing an EV drive control routine, which is periodically executed by the CPU in the control unit 70 at preset time intervals. When the program enters the EV drive control routine of FIG. 12, the CPU first receives the inputs regarding the driving conditions of the vehicle at step S10. The concrete processing of step S10 receives the inputs from the variety of sensors shown in FIG. 7. Among the diversity of inputs, the pieces of information on the gearshift position, the vehicle speed, the accelerator travel, and the remaining quantity FCL of the FC fuel for the fuel cell 60 are especially involved in the subsequent processing.

The CPU subsequently selects the drive mode based on the input remaining quantity FCL of the FC fuel at step S20. In the case where the input remaining quantity FCL is not less than a predetermined level Fth1, the CPU determines that the fuel cells are available for the drive and thereby selects a hybrid mode at step S30. The setting of the predetermined level Fth1 will be described later. The hybrid mode has the MG area, in which the hybrid vehicle runs with the power of the motor 20, as shown in the maps of FIGS. 8 through 11. In the case where the input remaining quantity FCL is less than the predetermined level Fth1, on the other hand, the CPU determines that the fuel cells are not available for the drive and thereby selects a non-hybrid mode at step S40. The selection of the non-hybrid mode causes the hybrid vehicle to run with the engine 10 as the working power source in the whole drive area. The operation of the engine 10 is stopped in principle while the hybrid vehicle is at a stop. The non-hybrid mode is equivalent to the setting in which the MG area shown in FIG. 8 is narrowed to the range under the stationary conditions of the hybrid vehicle (that is, both the vehicle speed and the accelerator travel are equal to zero). In the case of selection of the non-hybrid mode, the maps of FIGS. 8 through 11 are replaced by the maps including the MG area narrowed to the range under the stationary conditions of the hybrid vehicle. The technique of the embodiment selects the hybrid mode and the non-hybrid mode in this manner. The MG area in the map used in the non-hybrid mode is shown as an area MG' by the broken line in FIG. 8. In the non-hybrid mode, this MG' area is applied for each gearshift position.

After setting the drive mode based on the remaining quantity FCL of the FC fuel, the CPU determines whether or not the current driving state of the vehicle corresponds to the MG area at step S50. The MG area is defined by the relationship between the vehicle speed and the accelerator travel with regard to each gearshift position as shown in the maps of FIGS. 8 through 11. In the case of selection of the hybrid mode, the CPU determines whether or not the current driving state of the vehicle corresponds to the MG area, based on the various pieces of information input at step S10. In the case of selection of the non-hybrid mode, on the other hand, the maps with the narrowed range of the MG area, that is, with the MG' area shown in FIG. 8, are used in place of the maps of FIGS. 8 through 11. Namely it is determined that only the driving state of the vehicle that is at a stop corresponds to the MG area.

When it is determined at step S50 that the current driving state of the vehicle corresponds to the MG area, the CPU sets the motor 20 as the working power source at step S60, in order to implement the EV drive. Here the motor 20 is driven in the following manner. The concrete procedure of step S60 first regulates the changeover switch 84 of the electric power supply, so as to connect the fuel cell 60 with the motor 20. The procedure then sets on a flag, which represents allowance or prohibition of a drive of the motor 20, and specifies the target driving conditions of the motor 20, that is, the target revolving speed and the target torque of the motor 20. In the technique of this embodiment, the motor 20 is actually driven according to a separate control routine. The processing of step S60 thus carries out the setting of data, which are to be transferred to the separate control routine. The target revolving speed is specified by multiplying the vehicle speed input at step S10 by the gear ratio of the transmission 100 and the gear ratio of the differential gear 16. The target torque is specified in a map, which has been set in advance according to the vehicle speed and the accelerator travel. The target driving conditions specified in this manner are transferred to the separate control routine, so that the motor 20 is driven under the target driving conditions.

Figure 13:
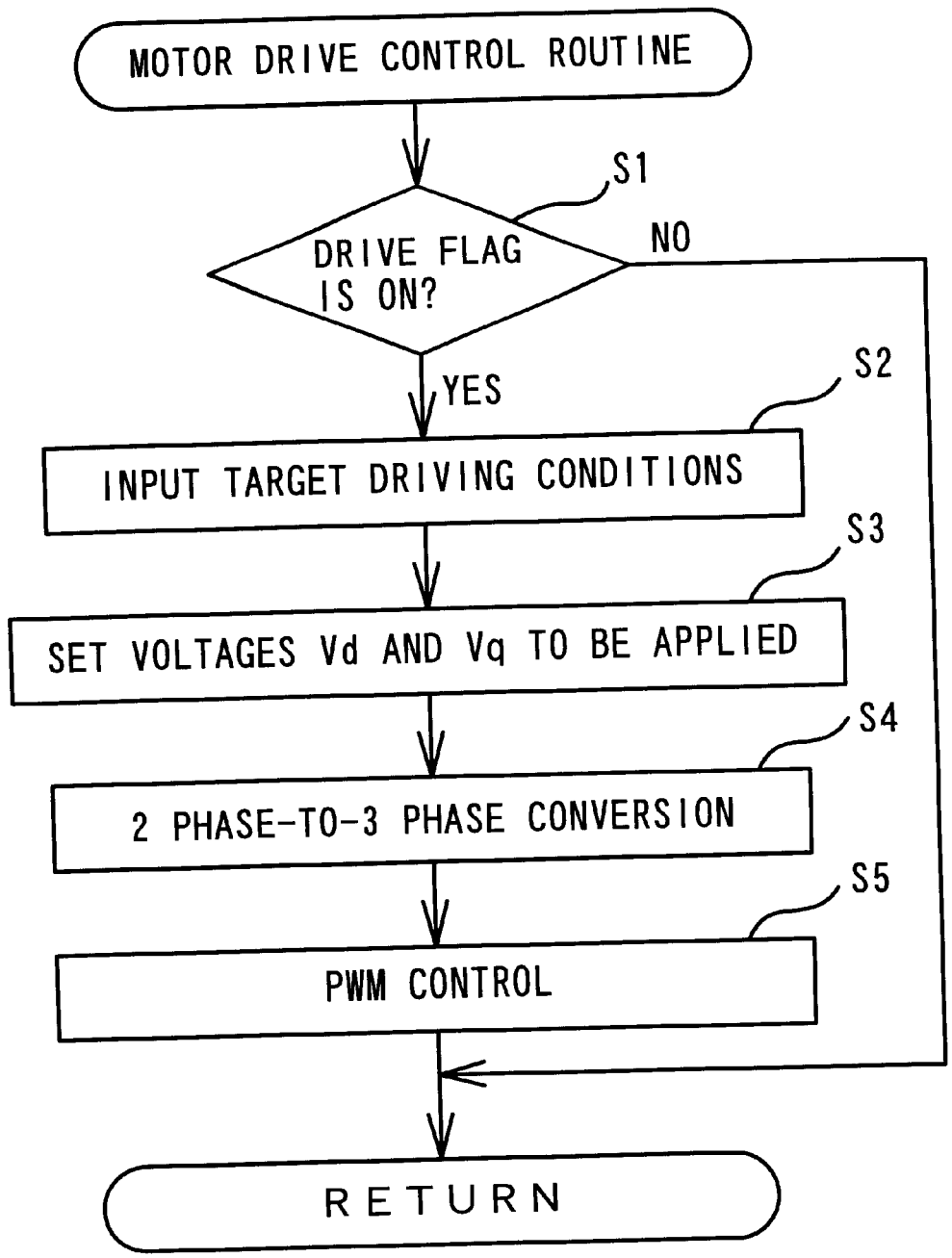
FIG. 13 is a flowchart showing a motor drive control routine executed in the first embodiment.

The control process of driving the motor 20 is described with the flowchart of FIG. 13, which shows a motor drive control routine. When the program enters the motor drive control routine, the CPU first determines at step S1 whether or not a drive flag, which allows a drive of the motor 20, is set on. When the drive flag of the motor 20 is off, the CPU determines that the motor 20 is not to be driven and exits from the motor drive control routine without any further processing.

When the drive flag of the motor 20 is set on, on the other hand, the CPU receives the inputs regarding the target driving conditions of the motor 20, that is, the target revolving speed and the target torque of the motor 20, at step S2. The target driving conditions have been set in advance by the EV drive control routine shown in the flowchart of FIG. 12 or another drive control routine. The CPU sets voltages Vd and Vq to be applied to the motor 20, based on the input target driving conditions at step S3. The voltages Vd and Vq respectively represent the voltages in the directions of the d axis and the q axis in the motor 20. In this embodiment, a known vector control procedure is applied to control the synchronous motor. The vector control procedure regards the voltages in the directions of the d axis and the q axis rotating with a rotation of the rotor as essential parameters for regulating the output torque of the motor 20. These voltages have been set in advance according to the target revolving speed and the target torque and stored in the form of a table. The CPU refers to the table and reads the voltages Vd and Vq to be applied to the motor 20 corresponding to the target driving conditions input at step S2.

After setting the voltages Vd and Vq in the directions of the d axis and the q axis, the CPU converts the voltages Vd and Vq into voltages to be applied to the respective coils of the U, V, and W phases of the motor 20 at step S4. This conversion is referred to as the two phase-to-three phase conversion. The conversion is implemented by multiplying the voltages Vd and Vq in the directions of the d axis and the q axis by a known matrix corresponding to the rotating position of the rotor. At subsequent step S5, the CPU carries out PWM control of the transistors, based on the respective phase voltages thus specified. The PWM control regulates the on-off ratio of the respective transistors connected to the respective phases, based on the voltages. The CPU accordingly controls the operation of the motor 20.

Referring back to the flowchart of FIG. 12, the description again regards the EV drive control process. As discussed previously, the hybrid vehicle runs only with the motor 20 as the working power source in the MG area. When the motor 20 is set as the working power source by the above procedure, the CPU carries out the processing to stop the operation of the engine 10 at step S70. The concrete procedure of step S70 sets off a flag, which represents allowance or prohibition of a drive of the engine 10. The operation of the engine 10 is actually stopped according to a separate engine operation control routine. When the hybrid vehicle runs by the EV drive, the EV drive indicator 222 lights up to inform the driver of the execution of the EV drive.

The technique of this embodiment takes into account the characteristics of the fuel cell 60 and uses the battery 50 transiently at the beginning of the drive of the fuel cell 60 when the motor 20 is set as the working power source at step S60. The fuel cell 60 utilizes the electrochemical reactions and generally has a time delay between the issuance of the requirement for power generation and the actual supply of desired electric power. At the beginning of the drive of the fuel cell 60, there is a fair possibility that the fuel cell 60 can not generate a sufficient quantity of electric power required for the drive. The technique of the embodiment uses the battery 50 to compensate for the insufficiency of electric power generated by the fuel cell 60, thereby eliminating the adverse effects due to the time delay. When the fuel cell 60 enables the output of desired electric power, the fuel cell 60 is set as the only working electric power supply. In order to attain such control, the motor 20 is connected to both the battery 50 and the fuel cell 60, and the switching of the respective driving circuits 51 and 52 is controlled to gradually vary the voltages output from the respective electric power supplies. One modified procedure may use only the fuel cell 60 as the working electric power supply, irrespective of the time delay.

When it is determined at step S50 that the current driving state of the vehicle does not correspond to the MG area, on the contrary, the CPU sets the engine 10 as the working power source at step S80 and carries out the processing to stop the operation of the motor 20 at step S90. The concrete procedure of steps S80 and S90 sets off the flag, which represents allowance or prohibition of the drive of the motor 20, and sets on the flag, which represents allowance or prohibition of the drive of the engine 10. The target driving conditions of the engine 10 are set according to the vehicle speed and the accelerator travel. The CPU repeatedly executes the series of the processing, so as to control the EV drive.

The predetermined level Fth1 used as the criterion in the EV drive control routine is set in the following manner. The predetermined level Fth1 is a threshold value used to determine whether or not the fuel cell 60 is available as the working electric power supply. An arbitrary value of greater than zero is set to the predetermined level Fth1. When the predetermined level Fth1 is set equal to zero, the fuel cell 60 is used as the working electric power supply as long as the FC fuel remains. When only the EV drive is to be considered, setting the predetermined level Fth1 equal to zero is desirable for the improved driving efficiency and environmental properties. In the case of setting the predetermined level Fth1 equal to zero, however, if there is a requirement of using the fuel cell 60 in another drive mode, the fuel cell 60 may not be used as the electric power supply since the FC fuel has been used up in the EV drive mode.

The technique of this embodiment takes into account the drive modes other than the EV drive mode and sets a positive value to the predetermined level Fth1 in the EV drive control routine of FIG. 12. Such setting of the predetermined level Fth1 effectively prevents the FC fuel for the fuel cell 60 from being completely used up. In the hybrid vehicle of the embodiment, the electric power supply is required in a variety of drive modes other than the EV drive mode. For the better driving efficiency and environmental properties, some drive mode has a higher demand for the electric power supply than the EV drive mode. In order to enable the fuel cell 60 to be used as the working electric power supply in such a drive mode, the technique of the embodiment restricts the consumption of the FC fuel for the fuel cell 60 in the EV drive mode. Namely the fuel cell 60 is used as the working electric power supply only when the remaining quantity FCL of the FC fuel is not less than the predetermined level Fth1, that is, only when there is some margin of the FC fuel.

The above control procedure appropriately selects one of the hybrid mode and the non-hybrid mode according to the remaining quantity FCL of the FC fuel and causes the hybrid vehicle to be driven in the selected mode. The remaining quantity FCL of the FC fuel is one of the parameters that represent the power generation sustaining ability of the fuel cell 60. In the control procedure of the embodiment, when the remaining quantity CL of the FC fuel is less than the predetermined level Fth1 and it is determined that the output sustaining ability of the fuel cell 60 is lowered, the driving state of the hybrid vehicle is changed to the non-hybrid mode. This procedure restricts the use of the fuel cell 60. The arrangement effectively prevents the FC fuel from being excessively consumed in the EV drive mode and enables the fuel cell 60 to be used as the electric power supply in other drive modes. This enables the fuel cell 60 to be used in the drive mode of high effectiveness and thereby improves the driving efficiency and the environmental properties of the hybrid vehicle.

The above control procedure selects either one of the hybrid mode and the non-hybrid mode according to the remaining quantity FCL of the FC fuel. One modified procedure gradually narrows the range of the MG area according to the remaining quantity FCL of the FC fuel. When the remaining quantity FCL of the FC fuel is lowered to or below a preset level, for example, the MG area is narrowed to the range defined by the one-dot chain line in FIG. 8. With a further decrease in remaining quantity FCL, the MG area is further narrowed. The engine generally has poor fuel consumption at the time of starting the hybrid vehicle. This modified procedure desirably restricts the consumption of the FC fuel, while enabling the hybrid vehicle to run by the EV drive at the time of start. The range of the MG area may be narrowed in a stepwise manner or in a continuous manner according to the remaining quantity FCL of the FC fuel. In any case, with a decrease in remaining quantity FCL of the FC fuel, the area of higher driving efficiency of the engine in the previous range of the MG area is replaced by the engine drive area. The reduction of the MG area is desirable from the viewpoint of the better driving efficiency.

D. Auxiliary Machinery Drive Control Process

Figure 14:
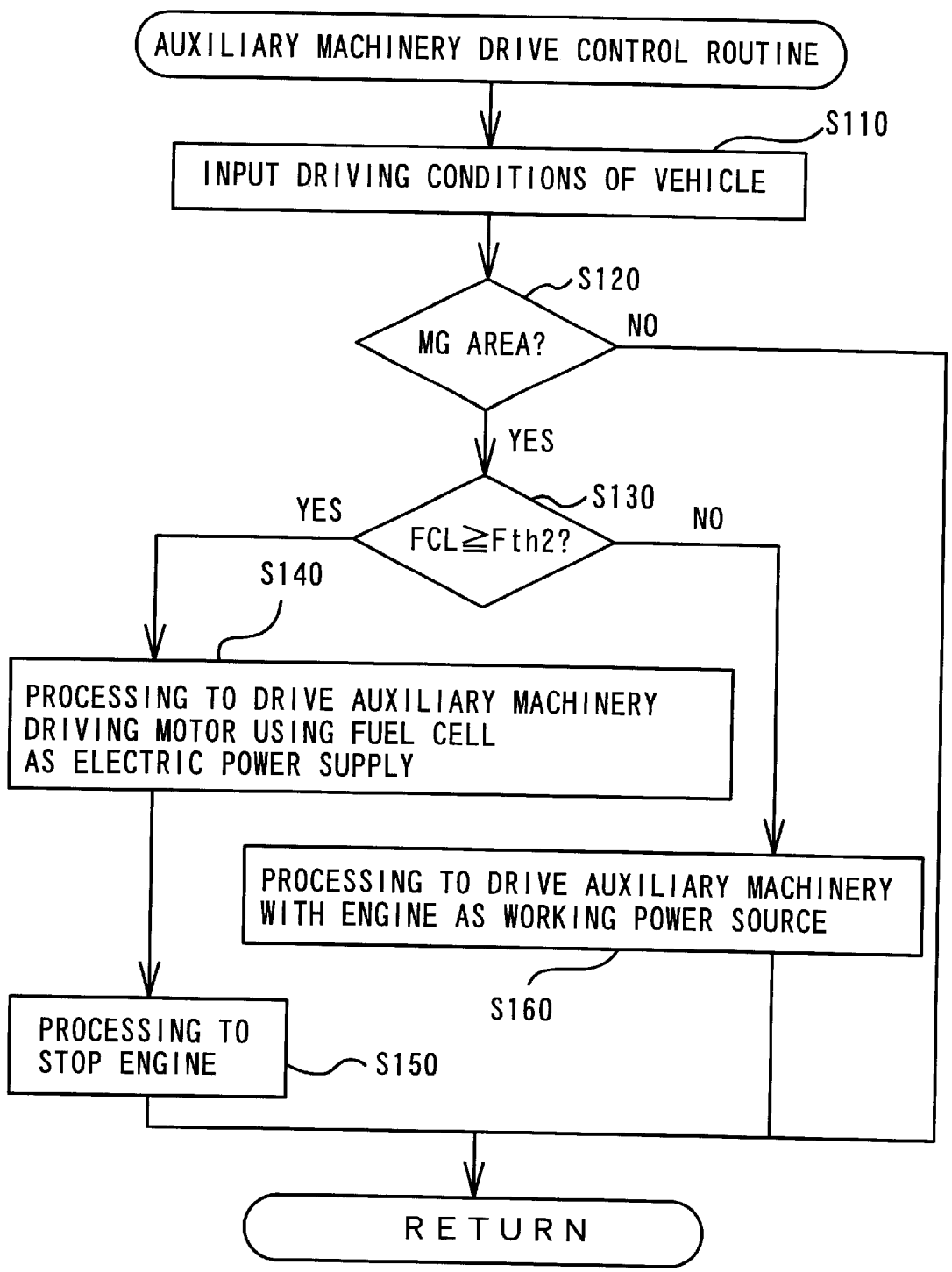
FIG. 14 is a flowchart showing an auxiliary machinery drive control routine executed in the first embodiment.

FIG. 14 is a flowchart showing an auxiliary machinery drive control routine. As discussed above with FIG. 1, in the hybrid vehicle of the embodiment, the power-driven auxiliary machinery 82 is driven with the power of the engine 10 and the auxiliary machinery driving motor 80. The auxiliary machinery drive control routine controls the use of the power sources to drive the power-driven auxiliary machinery 82. This routine is periodically executed by the CPU in the control unit 70 at preset time intervals. When the program enters the routine, the CPU first receives the inputs regarding the driving conditions of the vehicle at step S110. The concrete processing of step S110 receives the inputs from the variety of sensors shown in FIG. 7. Among the diversity of inputs, the pieces of information on the gearshift position, the vehicle speed, the accelerator travel, and the remaining quantity FCL of the FC fuel for the fuel cell 60 are especially involved in the subsequent processing.

The CPU then determines whether or not the current driving state of the vehicle corresponds to the MG area at step S120. The details of the determination are identical with those discussed in the EV drive control routine. When it is determined at step S120 that the current driving state does not correspond to the MG area, it means that the engine 10 is being driven. In this case, it is possible to drive the power-driven auxiliary machinery 82 with the power of the engine 10. The CPU accordingly exits from the auxiliary machinery drive control routine without any further processing.

When it is determined at step S120 that the current driving state corresponds to the MG area, on the other hand, the operation of the engine 10 is stopped in principle. While the engine 10 is at a stop, it is required to drive the auxiliary machines, such as the air conditioner and the power steering. In the MG area, if there is an available electric power supply, the power-driven auxiliary machinery 82 is driven by the auxiliary machinery driving motor 80. In order to determine whether or not the fuel cell 60 is available to drive the power-driven auxiliary machinery 82, the CPU compares the observed remaining quantity FCL of the FC fuel with a predetermined level Fth2 at step S130. The setting of the predetermined level Fth2 will be discussed later.

In the case where the remaining quantity FCL is not less than the predetermined level Fth2 at step S130, the CPU carries out the processing to drive the auxiliary machinery driving motor 80 with the fuel cell 60 used as the electric power supply at step S140. The concrete procedure of step S140 first regulates the changeover switch 83 of the electric power supply, so as to connect the fuel cell 60 with the auxiliary machinery drive motor 80. The procedure then sets on a flag, which represents allowance or prohibition of a drive of the auxiliary machinery driving motor 80, and specifies the target driving conditions of the auxiliary machinery driving motor 80, that is, the target revolving speed and the target torque of the auxiliary machinery driving motor 80. In order to reduce the loading of the auxiliary machinery driving motor 80, the procedure releases the auxiliary machinery clutch 19, which connects the engine 10 with the power-driven auxiliary machinery 82.

In the technique of the embodiment, the auxiliary machinery driving motor 80 is actually driven according to a separate control routine. The processing of step S140 thus carries out the setting of data, which are to be transferred to the separate control routine. Specific values, which have been determined in advance according to the auxiliary machine to be driven, are set to the target revolving speed and the target torque of the auxiliary machinery driving motor 80. The target driving conditions specified in this manner are transferred to the separate control routine, so that the auxiliary machinery driving motor 80 is driven under the target driving conditions. The control process of the auxiliary machinery driving motor 80 is identical with the control process of the motor 20 shown in the flowchart of FIG. 13. While the auxiliary machinery driving motor 80 is used to drive the power-driven auxiliary machinery 82, the CPU carries out the processing to stop the operation of the engine 10 at step S150. The concrete procedure of step S150 sets off the flag, which represents allowance or prohibition of a drive of the engine 10. The operation of the engine 10 is actually stopped according to a separate engine operation control routine.

When the fuel cell 60 is selected as the working electric power supply, as in the case of the EV drive control routine discussed above, the battery 50 is used as the auxiliary electric power supply by taking into account a response delay of the fuel cell 60 to output electric power in the auxiliary machinery drive control routine. The battery 50 is used to compensate for the insufficiency of electric power output from the fuel cell 60. When the fuel cell 60 enables the output of desired electric power, the changeover switch 83 is regulated to set the fuel cell 60 as the only working electric power supply.

In the case where the remaining quantity FCL of the FC fuel is less than the predetermined level Fth2 at step S130, on the other hand, the fuel cell 60 is not used as the working electric power supply. In this case, there is no available electric power supply. The CPU accordingly carries out the processing to drive the power-driven auxiliary machinery 82 with the engine 10 used as the power source at step S160. The concrete procedure of step S160 sets off the flag, which represents allowance or prohibition of a drive of the auxiliary machinery driving motor 80, and sets on the flag, which represents allowance or prohibition of a drive of the engine 10. The auxiliary machinery clutch 19 is then coupled to enable the power output from the engine 10 to be transmitted to the power-driven auxiliary machinery 82. The CPU repeatedly executes the series of the processing to control the operation of the power-driven auxiliary machinery 82.

The processing of step S160 causes the engine 10 to be driven, but it is not always required to output the power of the engine 10 to the axle 17. For example, while the hybrid vehicle is at a stop, the output of power from the engine 10 to the axle 17 is not required. It is, however, required to drive the power-driven auxiliary machinery 82 even while the hybrid vehicle is at a stop. In the technique of the embodiment, the processing of step S160 also regulates the input clutch 18 disposed between the engine 10 and the motor 20. Namely the procedure determines whether or not the output of power from the engine 10 to the axle 17 is required, and couples the input clutch 18 in the case where the output of power is required. The procedure releases the input clutch 18, on the contrary, in the case where the output of power is not required. The object of this control is to enable the engine 10 to drive the power-driven auxiliary machinery 82 efficiently. One possible modification keeps the input clutch 18 in the coupling state, irrespective of the requirement of the power output to the axle 17.

The predetermined level Fth2 used as the criterion in the auxiliary machinery drive control routine is set in the following manner. The predetermined level Fth2 is a threshold value used to determine whether or not the fuel cell 60 is available as the working electric power supply to drive the power-driven auxiliary machinery 82. An arbitrary value of greater than zero is set to the predetermined level Fth2. When the predetermined level Fth2 is set equal to zero, the fuel cell 60 is used as the working electric power supply as long as the FC fuel remains. The technique of the embodiment sets the predetermined level Fth2 by taking into account the relation to the predetermined level Fth1 used as the criterion in the EV drive control routine.

In the case where the non-hybrid mode is selected in the EV drive control routine, the remaining quantity FCL of the FC fuel is less than the predetermined level Fth1. In the technique of this embodiment, in order to improve the driving efficiency of the hybrid vehicle as much as possible even in such cases, the operation of the engine 10 is stopped while the hybrid vehicle is at a stop. In other words, it is determined that the driving state of the hybrid vehicle that is at a stop corresponds to the MG area in the non-hybrid mode. If the predetermined level Fth2 is set greater than the predetermined level Fth1, the condition of step S130 is always unsatisfied, and the power-driven auxiliary machinery 82 is driven by the engine 10 at step S160. The predetermined level Fth2 should thus be smaller than the predetermined level Fth1, in order to improve the driving efficiency of the hybrid vehicle in the non-hybrid mode by stopping the operation of the engine 10 while the hybrid vehicle is at a stop.

In the case where the hybrid mode is selected in the EV drive control routine, on the other hand, the remaining quantity FCL of the FC fuel is not less than the predetermined level Fth1. If the predetermined level Fth2 is set smaller than the predetermined level Fth1, the condition of step S130 is always satisfied. As long as the FC fuel remains to enable the EV drive, the power-driven auxiliary machinery 82 is driven with the electric power of the fuel cell 60. This preferably improves the driving efficiency of the hybrid vehicle.

As described above, the technique of the embodiment sets the predetermined level Fth2 used as the criterion in the auxiliary machinery drive control routine to be less than the predetermined level Fth1 used as the criterion in the EV drive control routine. Namely the fuel cell 60 is used preferentially in the auxiliary machinery drive control routine over in the EV drive control routine. Even in the case of selection of the non-hybrid mode, this procedure enables the power-driven auxiliary machinery 82 to be driven with the electric power output from the fuel cell 60 until the FC fuel is consumed to or below the predetermined level Fth2. This arrangement checks the drive of the engine 10 and desirably improves the driving efficiency and the environmental properties of the hybrid vehicle. In a possible modification, the predetermined level Fth2 may be set independently of the predetermined level Fth1.

The auxiliary machinery drive control routine discussed above selectively uses either the fuel cell 60 or the engine 10 as the working energy output source to drive the power-driven auxiliary machinery 82 according to the remaining quantity FCL of the FC fuel. In the case where the output sustaining ability of the fuel cell 60 is lowered, the engine is used to drive the power-driven auxiliary machinery 82. This procedure restricts the use of the fuel cell 60. The arrangement effectively prevents the FC fuel from being excessively consumed in the process of driving the power-driven auxiliary machinery 82 and enables the fuel cell 60 to be used as the electric power supply in other drive modes. This enables the fuel cell 60 to be used in the drive mode of high effectiveness and thereby improves the driving efficiency and the environmental properties of the hybrid vehicle.

The above control procedure selectively uses the fuel cell 60 or the engine 10 as the energy output source to drive the power-driven auxiliary machinery 82. One modified procedure gradually varies the output ratio of the fuel cell 60 to the engine 10 according to the remaining quantity FCL of the FC fuel. For example, when the remaining quantity FCL of the FC fuel decreases to or below a preset level, the modified control procedure starts the operation of the engine 10 while reducing the output of the fuel cell 60, so as to drive the power-driven auxiliary machinery 82 with the power of both the auxiliary machinery driving motor 80 and the engine 10. With a further decrease in remaining quantity FCL, the output of the fuel cell 60 is gradually decreased, and the power-driven auxiliary machinery 82 is eventually driven only with the power of the engine 10. The output ratio may be varied in a stepwise manner or in a continuous manner according to the remaining quantity FCL of the FC fuel.

E. Charging Control Process

Figure 15:
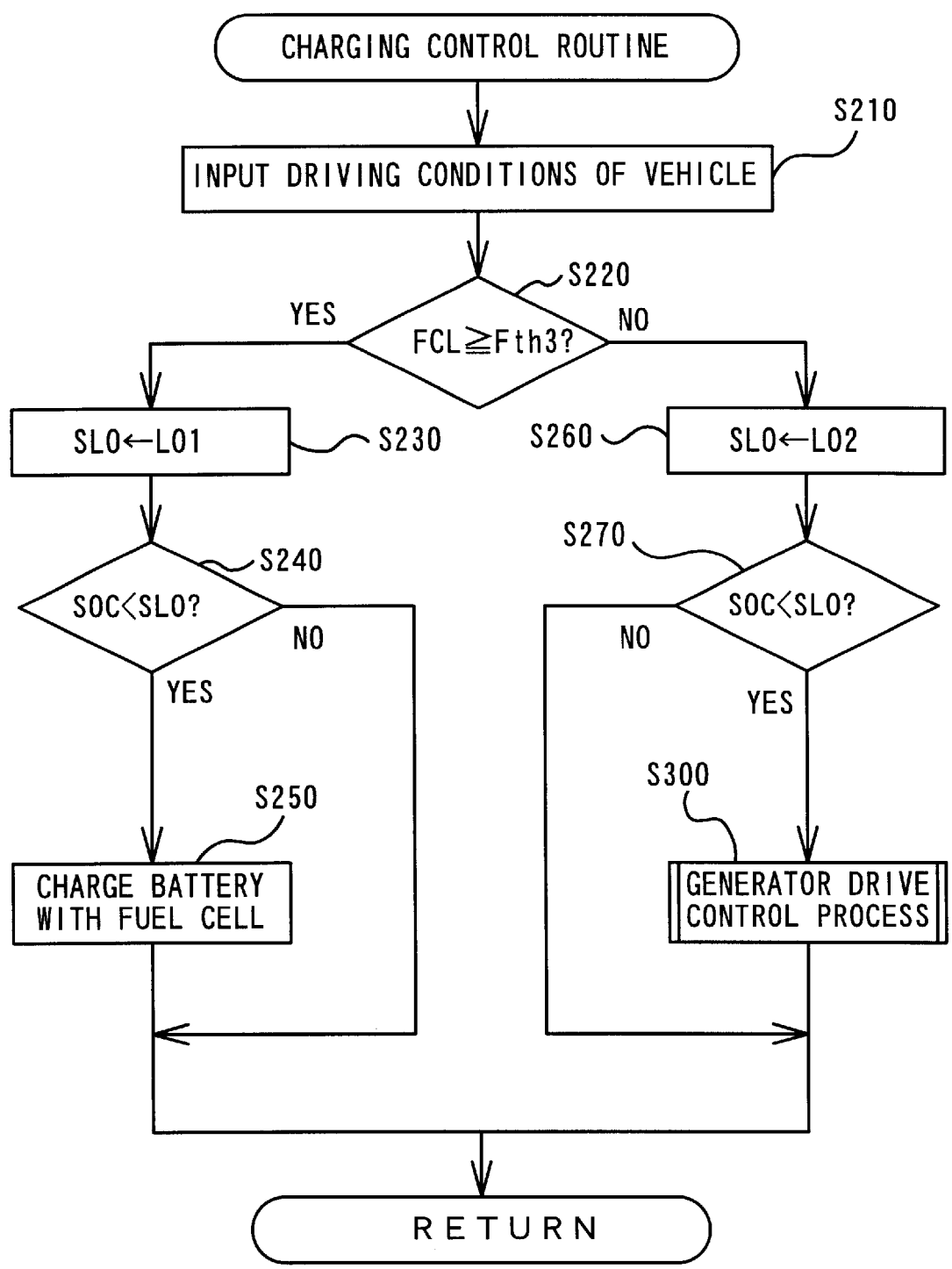
FIG. 15 is a flowchart showing a charging control routine executed in the first embodiment.

FIG. 15 is a flowchart showing a charging control routine, which controls the charge level of the battery 50 to a preset state. The hybrid vehicle of the embodiment drives the motor 20 by the regenerative operation and thereby causes the kinetic energy of the vehicle to be regenerated in the form of electric power in the course of braking. The battery 50 is charged with the regenerated electric power. The electric power of the battery 50 is, however, consumed continuously by the operation of the control unit 70, the operation of power-driven equipment, such as lighting equipment, and the spontaneous discharge. When the remaining charge of the battery 50 decreases to or below an insufficient level under such circumstances, the charging control routine functions to charge the battery 50 either with the fuel cell 60 or the engine 10 used as the energy output source.

When the program enters the charging control routine of FIG. 15, the CPU first receives the inputs regarding the driving conditions of the vehicle at step S210. The concrete processing of step S210 receives the inputs from the variety of sensors shown in FIG. 7. Among the diversity of inputs, the pieces of information on the gearshift position, the remaining charge SOC of the battery 50, the vehicle speed, the accelerator travel, and the remaining quantity FCL of the FC fuel for the fuel cell 60 are especially involved in the subsequent processing. The CPU then compares the observed remaining quantity FCL of the FC fuel with a predetermined level Fth3 at step S220. The predetermined level Fth3 used as the criterion in the charging control routine is set in the following manner. The predetermined level Fth3 is a threshold value used to determine whether or not the fuel cell 60 is available to charge the battery 50. An arbitrary value of greater than zero is set to the predetermined level Fth3. This arrangement enables the selection of the charging process of the battery 50 according to the remaining quantity FCL of the FC fuel, that is, according to the output sustaining ability of the fuel cell 60.

In the case where the remaining quantity FCL of the FC fuel is not less than the predetermined level Fth3 at step S220, the program determines that the fuel cell 60 has a sufficient output sustaining ability and carries out the processing to cause the battery 50 to be charged with the electric power output from the fuel cell 60. At step S230, the CPU substitutes a predetermined reference value LO1 into a variable SLO, which is used as the criterion of determining whether or not the battery 50 is to be charged. The setting of the reference value LO1 will be described below. The CPU then compares the observed remaining charge SOC of the battery 50 with the variable SLO at step S240. In the case where the remaining charge SOC of the battery 50 is less than the variable SLO, the control procedure regulates the changeover switch 84 to connect the fuel cell 60 with the battery 50 and causes the battery 50 to be charged with the electric power generated by the fuel cell 60 at step S250. In the case where the remaining charge SOC of the battery 50 is not less than the variable SLO, on the other hand, the CPU exits from the charging control routine without charging the battery 50.

As described above, the charging operation of the battery 50 is carried out when the remaining charge SOC of the battery 50 is less than the variable SLO. This control operation regulates the remaining charge SOC of the battery 50 to or above the variable SLO. In the case of charging the battery 50 with the electric power of the fuel cell 60, the remaining charge SOC of the battery 50 is regulated to or above the reference value LO1. From the viewpoint of the energy efficiency of the vehicle, it is not always preferable to keep a high charge level of the battery 50 mounted on the hybrid vehicle, as discussed below.

Figure 16:
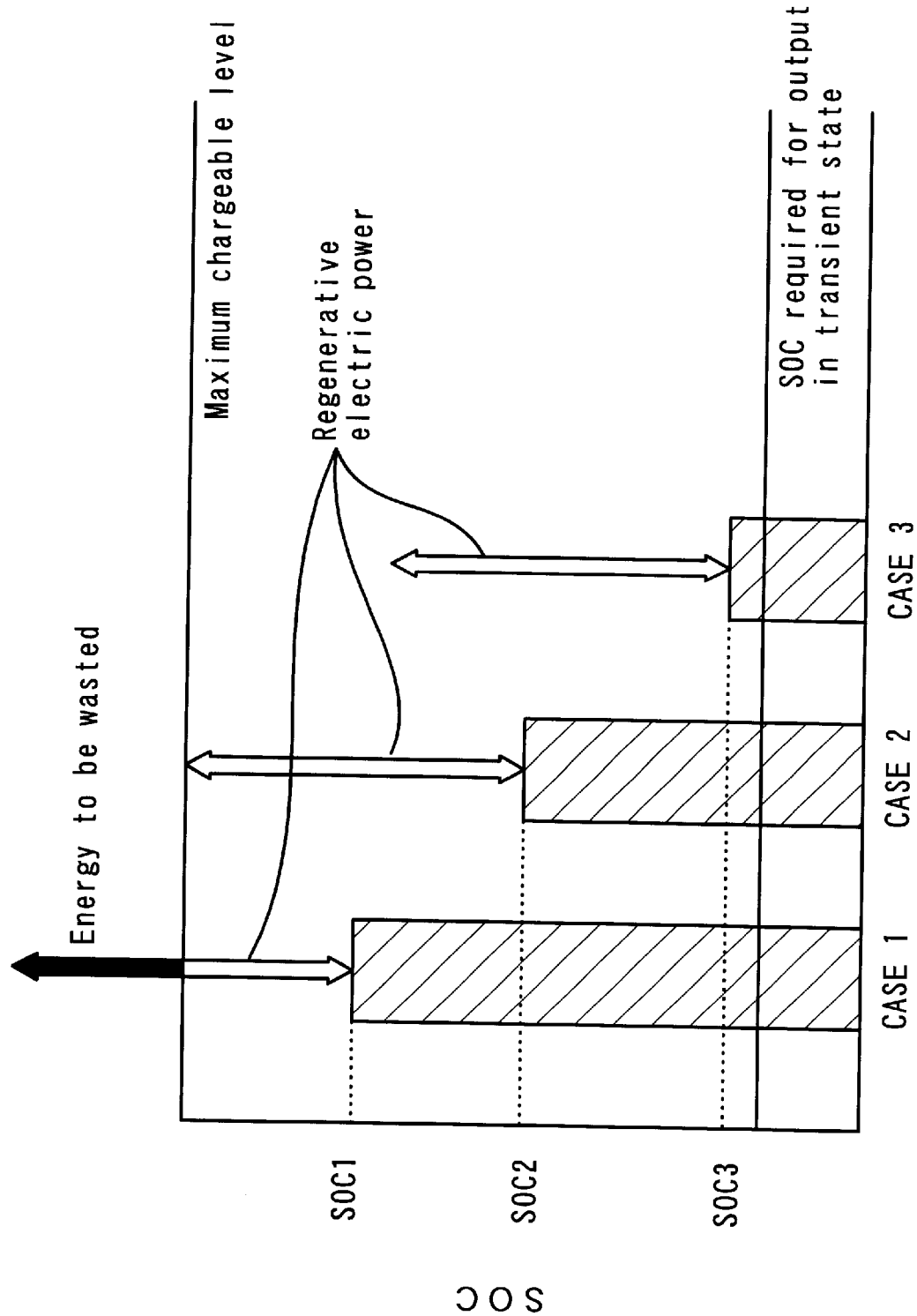
FIG. 16 shows the relationship between the charge level of a battery and the effective use of regenerative electric power.

FIG. 16 shows the relationship between the charge level of the battery 50 and the effective use of regenerative electric power. In the example of FIG. 16, the charge level of the battery 50 is varied in three stages, that is, cases 1 through cases 3. In the case 1, the remaining charge SOC of the battery 50 has a relatively high charge level SOC1. The hatched area represents the charge remaining in the battery 50. It is here assumed that the hybrid vehicle is under the regenerative braking. The electric power obtained by the regenerative braking (hereinafter referred to as the regenerative electric power) actually varies according to the vehicle speed before and after the braking control and the weight of the vehicle. The graph of FIG. 16 shows the mean regenerative electric power. In the case 1 where a large value is set to the reference value LO1, the remaining charge SOC of the battery 50 is kept at a relatively high level, so that all the regenerative electric power is not used to charge the battery 50 in a chargeable range of the battery 50. Namely part of the regenerative electric power (the closed arrow) is wasted in the case 1. The hybrid vehicle can not use the kinetic energy of the vehicle corresponding to this closed arrow, thereby having a lowered energy efficiency.

In the case 2, the remaining charge SOC of the battery 50 has a medium charge level SOC2. In this state, all the regenerative electric power is effectively used to charge the battery 50 in the chargeable range of the battery 50. In the case 3, the remaining charge SOC of the battery 50 has a low charge level SOC3. In this state, all the regenerative electric power is effectively used to charge the battery 50. In the cases 2 and 3, the hybrid vehicle can efficiently use the kinetic energy of the vehicle. In order to effectively use the regenerative electric power, it is desirable that the battery 50 has a low charge level.

The remaining charge SOC of the battery 50 should, on the other and, be kept at or above a sufficient level that ensures the output of the required electric power. As described previously, the electric power of the battery 50 is used to compensate for the response delay of the fuel cell 60. For that purpose, it is required to output a relatively large quantity of electric power. The technique of this embodiment accordingly sets the charge level SOC3 shown in FIG. 16 to the reference value LO1, which corresponds to the target charge level of the battery 50.

Figures 17, 18:
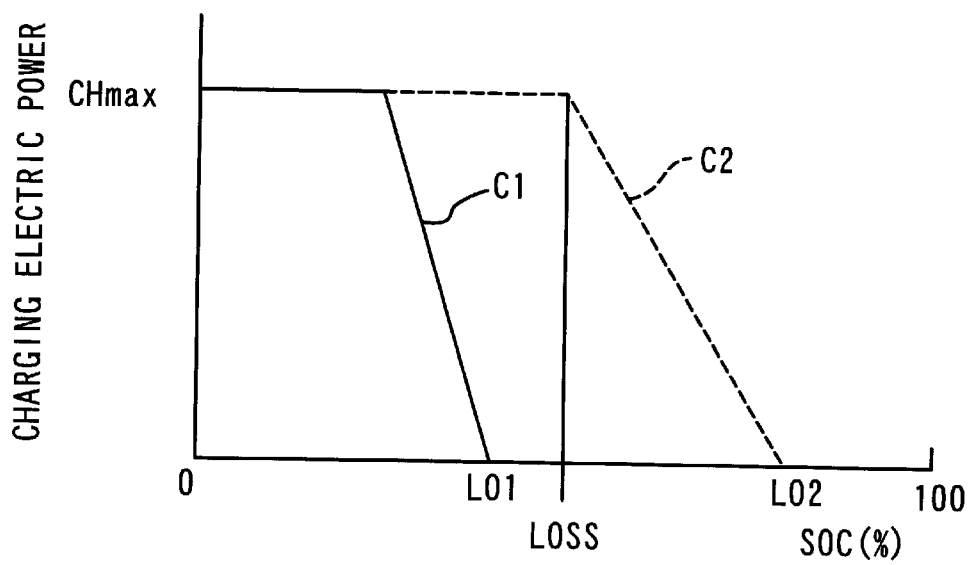
FIG. 17 is a graph showing a variation in charging electric power plotted against the remaining charge SOC of the battery.
FIG. 18 shows the selection of generators according to the driving state of the vehicle.

In order to keep the charge level of the battery 50 at or above the reference value LO1, the technique of the embodiment varies the quantity of power generation of the fuel cell 60 according to the charge level of the battery 50 at step S250. FIG. 17 is a graph showing a variation in charging electric power plotted against the remaining charge SOC of the battery 50. The charging electric power represents the electric power supplied to charge the battery 50. A graph C1 of the solid line shows the charging electric power by the fuel cell 60. As clearly shown in the graph of FIG. 17, the charging operation is carried out when the remaining charge SOC of the battery 50 is less than the reference value LO1. The charging electric power is determined according to the difference between the remaining charge SOC and the reference value or the target charge level LO1. The charging electric power is set high against the low remaining charge SOC and then decreases with an increase in remaining charge SOC that approaches to the target charge level LO1. The charging electric power should be set within the range of a maximum chargeable electric power CHmax of the battery 50. This control procedure enables the remaining charge SOC of the battery 50 to quickly approach to the target charge level LO1. The settings shown in FIG. 17 are only illustrative, and the variation in charging electric power according to the remaining charge SOC may follow a curve or a stepwise graph. The charging electric power may alternatively be determined by taking into account the remaining quantity FCL of the FC fuel as well as the difference between the remaining charge SOC and the reference value LO1.

Referring back to the charging control routine of FIG. 15, in the case where the remaining quantity FCL of the FC fuel is less than the predetermined level Fth3 at step S220, the program determines that the fuel cell 60 has an insufficient output sustaining ability and carries out the processing to cause the battery 50 to be charged without using the fuel cell 60. At step S260, the CPU substitutes a predetermined reference value LO2 into the variable SLO, which is used as the criterion of determining whether or not the battery 50 is to be charged.

Basically any arbitrary value may be set to the reference value LO2. In this embodiment, the reference value LO2 is set higher than the reference value LO1 in the chargeable range with the regenerative electric power (see FIG. 16). The relationship between the reference value LO2 and the reference value LO1 is shown in the graph of FIG. 17. The reference value LO2 corresponds to a target charge level when the fuel cell 50 has the lowered output sustaining ability. As mentioned previously, the reference value LO1 corresponds to the target charge level when the fuel cell 60 has a sufficient output sustaining ability. In this state, if the electric power supplied from the battery 50 is less than the required electric power for the lighting and other electrical equipment, the insufficiency is compensated with the electric power output from the fuel cell 60. The reference value LO1 is thus set equal to a relatively low level. It is, on the other hand, preferable to set the reference value LO2 equal to a relatively high level, so that the battery 50 can store the sufficient electric power for the requirement of the electrical equipment. The technique of this embodiment accordingly sets a relatively large value to the reference value LO2.

After substituting the reference value LO2 into the variable SLO, the CPU compares the observed remaining charge SOC of the battery 50 with the variable SLO at step S270.

In the case where the remaining charge SOC is less than the variable SLO, the CPU carries out a generator drive control process and causes the battery 50 to be charged without using the fuel cell 60 at step S300. In the case where the remaining charge SOC is not less than the variable SLO, on the other hand, the CPU exits from the charging control routine without charging the battery 50.

As carried out in the process of power generation of the fuel cell 60 (step S250), the charging electric power is determined according to the difference between the remaining charge SOC of the battery 50 and the target charge level LO2 in the process of power generation at step S300. As shown by a graph C2 of the dotted line in FIG. 17, the charging electric power increases with a decrease in remaining charge SOC of the battery 50 from the target charge level LO2. The setting of the charging electric power should be within the range of the maximum chargeable electric power CHmax of the battery 50.

The generator drive control process varies the charging electric power according to the generator used for charging. FIG. 18 shows the selection of generators according to the driving state of the vehicle. The hybrid vehicle of the embodiment has the two generators available to charge the battery 50, that is, the motor 20 and the auxiliary machinery driving motor 80 shown in FIG. 1. Each of the motors 20 and 80 carries out the regenerative operation with the power of the engine 10, so as to generate electric power. The rotation of the drive shaft 15 can be transmitted to the motor 20, so that the regenerative operation of the motor during the braking control enables the kinetic energy of the vehicle to be converted to electric power.

In the structure of the embodiment, the motor 20 and the auxiliary machinery driving motor 80 are selectively used to carry out power generation as shown in FIG. 18. The table of FIG. 18 shows all the possible cases of power generation without using the fuel cell 60, and include the case that the remaining charge SOC of the battery 50 is not less than the reference value LO2. Such power generation is performed according to a separate control routine from the charging control routine shown in the flowchart of FIG. 15, for example, in response to a requirement of large electric power that leads to abrupt consumption of the electric power of the battery 50. The table of FIG. 18 also shows the case of power generation carried out under the non-driving conditions, that is, in the course of regenerative braking.

Figure 19:
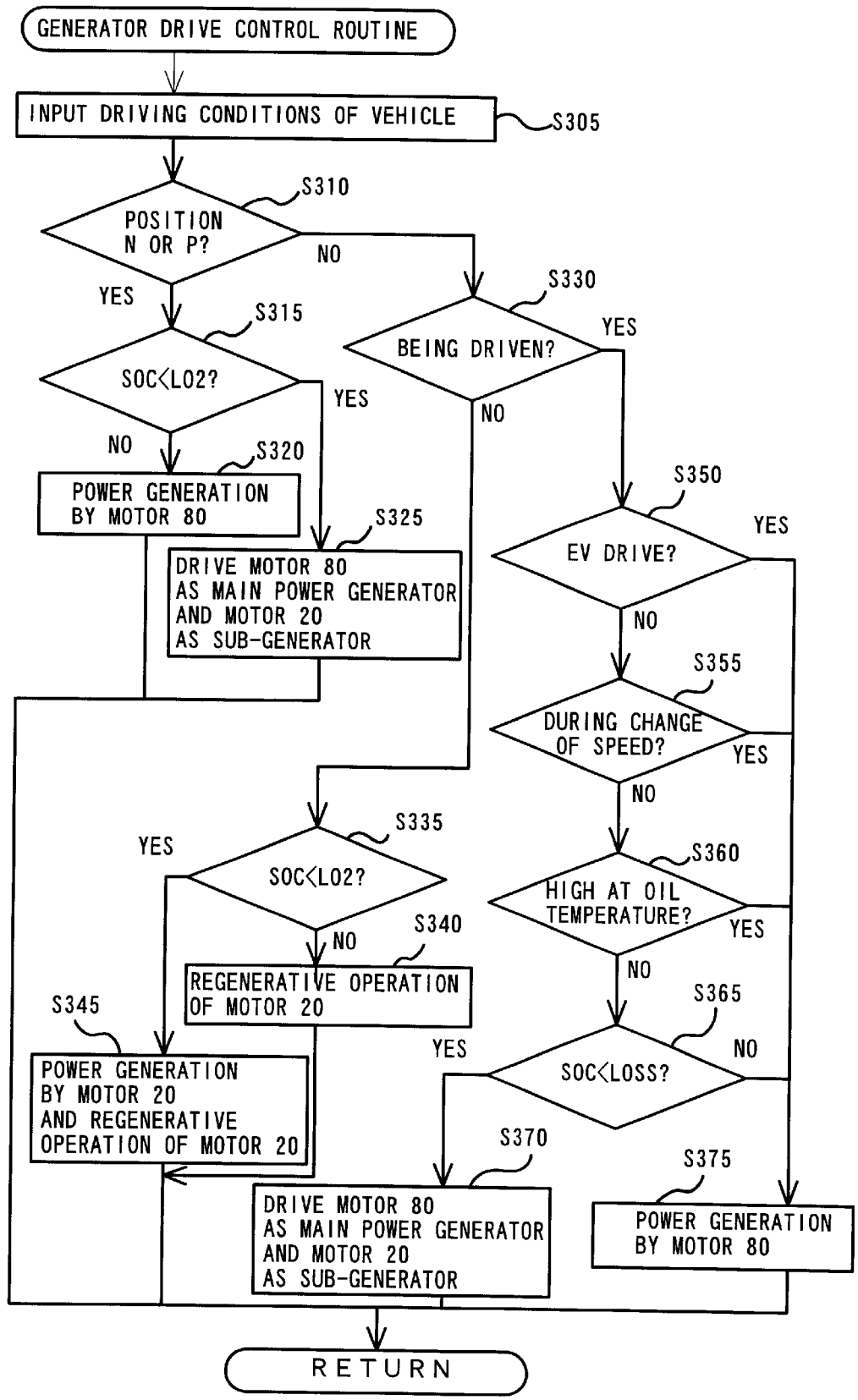
FIG. 19 is a flowchart showing a generator drive control routine executed in the first embodiment.

The selection of the generators shown in FIG. 18 is controlled by a generator drive control routine shown in the flowchart of FIG. 19. When the program enters the generator drive control routine of FIG. 19, the CPU first receives the inputs regarding the driving conditions of the vehicle at step S305. Among the diversity of inputs, the pieces of information on the gearshift position, the vehicle speed, the accelerator travel, the AT oil temperature, and the remaining charge SOC of the battery 50 are the inputs especially involved in the selection of the generators shown in FIG. 18.

At subsequent step S310, the CPU determines whether or not the current gearshift position is the neutral (N) or the parking (P) position, based on the inputs. No power is output to the drive shaft 15 at the position N or at the position P. When the current gearshift position is either at the position N or at the position P, it is determined that the hybrid vehicle is at a stop. One modified procedure determines whether or not the hybrid vehicle is at a stop, based on the vehicle speed, in place of or in addition to the current gearshift position.

When it is determined at step S310 that the current gearshift position is either at the position N or at the position P, the selection of the proper generators is carried out according to the remaining charge SOC of the battery 50. The CPU compares the observed remaining charge SOC with the target charge level LO2 at step S315. In the case where the remaining charge SOC is less than the target charge level LO2, relatively high charging electric power is required. Both the auxiliary machinery driving motor 80 as a main generator and the motor 20 as a sub-generator carry out the power generation to charge the battery 50 at step S325. In the case where the remaining charge SOC is not less than the target charge level LO2, on the other hand, high charging electric power is not required. Only the auxiliary machinery driving motor 80 accordingly carries out the power generation to charge the battery 50 at step S320. In any case, the operations of the engine 10, the motor 20, and the auxiliary machinery driving motor 80 are controlled to output the charging electric power according to the difference between the remaining charge SOC of the battery 50 and the target charge level LO2 as shown in the graph of FIG. 17.

The power generation by the auxiliary machinery driving motor 80 as the main generator is carried out while the auxiliary machinery clutch 19 is coupled to enable the transmission of power of the engine 10 to the auxiliary machinery driving motor 80. The power generation by the motor 20 as the sub-generator is carried out while the input clutch 18 is coupled to enable the transmission of power of the engine 10 to the motor 20. At the positions N and P, the transmission 100 is set in the state that does not allow the output of power to the drive shaft 15. In the case where only the auxiliary machinery driving motor 80 carries out power generation, the input clutch 18 is released to effectively use the power output from the engine 10.

When it is determined at step S310 that the current gearshift position is not either at the position N or at the position P, on the other hand, the CPU determines whether or not the hybrid vehicle is being driven at step S330. The determination of step S330 is based on the accelerator travel. In the case where the accelerator travel is in a full closed state, it is determined that the hybrid vehicle is not being driven. Otherwise, it is determined that the hybrid vehicle is being driven. While the hybrid vehicle is at a stop at the gearshift position other than the position N or the position P or while the hybrid vehicle is being braked, it is determined that the hybrid vehicle is not being driven.

When it is determined at step S330 that the hybrid vehicle is not being driven, the CPU compares the remaining charge SOC of the battery 50 with the target charge level LO2 at step S335. In the case where the remaining charge SOC of the battery 50 is not less than the target charge level LO2, the charging operation of the battery 50 is not required in principle. The CPU accordingly controls the motor 20 to carry out the Regenerative operation in the course of braking, in order to improve the energy efficiency of the hybrid vehicle.

In the case where the remaining charge SOC of the battery 50 is less than the target charge level LO2, on the other hand, the power generation is required to recover the charge level of the battery 50. The CPU accordingly causes the auxiliary machinery driving motor 80 to carry out power generation and causes the motor 20 to carry out the regenerative operation at step S345. As described above with regard to steps S320 and S325, the power generation of the auxiliary machinery driving motor 80 is carried out with the power of the engine 10. The processing of step S345 is, however, performed while the hybrid vehicle is at a run. The input clutch 18 between the engine 10 and the motor 20 is accordingly kept in the state during the run. In the case of the EV drive, the input clutch 18 is released. In the case of the engine drive, the input clutch 18 is coupled.

The charging electric power at step S345 is also set according to the difference between the remaining charge SOC and the target charge level LO2. Here the operations of the engine 10 and the auxiliary machinery driving motor 80 are controlled, in order to cause the auxiliary machinery driving motor 80 to generate electric power that compensates for the regenerative electric power obtained by the motor 20.

When it is determined at step S330 that the hybrid vehicle is being driven, on the other hand, the selection of the proper generators is carried out, based on the determination of whether or not it is required to use the motor 20 for power generation as well as on the determination of whether or not the motor 20 is ready for power generation. The CPU first determines whether or not the hybrid vehicle runs by the EV drive at step S350. In the state of the EV drive, the hybrid vehicle runs with the motor as the power source as described previously. The motor 20 can thus not be used as the generator during the EV drive. When it is determined at step S350 that the hybrid vehicle runs by the EV drive, the auxiliary machinery driving motor 80 is driven with the power of the engine 10, so as to carry out the power generation at step S375. In this case, the engine 10 is driven for power generation, although the hybrid vehicle runs by the EV drive.

When it is determined at step S350 that the hybrid vehicle does not run by the EV drive, the CPU then determines whether or not the speed is being changed at step S355. In the transient state where the coupling in the transmission 100 is being changed, the torque output to the drive shaft 15 often varies. Although not specifically described here, the hybrid vehicle of the embodiment carries out a variety of control operations, in order to attain the smooth change of the speed. For example, during the change of the speed, the minute torque regulation is carried out with the torque of the motor 20, so as to prevent an abrupt variation in torque output to the drive shaft 15. In another example, the speed of the engine 10 is varied by means of the power of the motor 20, in order to make the speed of the engine 10 synchronous with the required revolving speed of the drive shaft 15 before and after the change of the speed. The torque regulation of the motor 20 to keep the revolving speed at a fixed level enables the torque output from the engine 10 to be estimated according to the target torque of the motor 20. The estimation is fed back to the control of the engine 10. In the structure of the embodiment, the motor 20 is used for the smooth change of the speed. If the motor 20 carries out power generation during the change of the speed, such effects can not be expected. The technique of the embodiment accordingly causes only the auxiliary machinery driving motor 80 to carry out the power generation during the change of the speed at step S375. In the case where the motor is not used during the change of the speed, however, the motor 20 may be driven for the power generation.

When it is determined at step S355 that the speed is not being changed, the CPU then determines whether or not the input AT oil temperature is higher than a preset level at step S360. The AT oil temperature represents the oil temperature in the torque converter 30. In the event that the motor 20 is used as a generator, there is a high possibility that a slip occurs between the input and output shafts of the torque converter 30. Such a slip heightens the AT oil temperature. When the AT oil temperature is higher than the preset level, the technique of the embodiment locks up the input and the output, in order to restrict the slip in the torque converter 30 and control the temperature increase. In this state, the motor 20 can not be effectively used as the generator, so that only the auxiliary machinery driving motor 80 is used for power generation at step S375.

When the AT oil temperature is not higher than the preset level, on the other hand, the CPU compares the observed remaining charge SOC of the battery 50 with a preset reference value LOSS at step S365. The reference value LOSS is set lower than the target charge level LO2 and is used as the criterion to determine whether or not the rapid charging of the battery 50 is required (see the graph of FIG. 17). In the case where the remaining charge SOC is less than the reference value LOSS, the rapid charging of the battery 50 is required. Both the auxiliary machinery driving motor 80 as the main generator and the motor 20 as the sub-generator carry out the power generation to charge the battery 50 rapidly at step S370. In the case where the remaining charge SOC is not less than reference value LOSS, on the other hand, the rapid charging of the battery 50 is not required. Only the auxiliary machinery driving motor 80 is accordingly driven for power generation at step S375.

In another drive mode where the gearshift position is at either the position N or the position P, when the remaining charge SOC of the battery 50 is less than the target charge level LO2, both the auxiliary machinery driving motor 80 and the motor 20 are driven for power generation at step S325. In the drive mode defined as above, on the other hand, when the remaining charge SOC is less than the reference value LOSS, which is lower than the target charge level LO2, both the auxiliary machinery driving motor 80 and the motor 20 are driven for power generation at step S370. This is because the power generation by the motor 20 is not desirable during the run of the hybrid vehicle. The power generation by the motor 20 during the run of the hybrid vehicle may cause a torque variation due to the loading to be output to the drive shaft 15 and damage the ride of the vehicle. The technique of the embodiment accordingly drives the motor 20 for power generation when the remaining charge SOC of the battery 50 becomes less than the reference value LOSS, which is lower than the target charge level LO2, and the rapid charging of the battery 50 is highly demanded. As in the case of another drive mode, the motor 20 may be driven for power generation when the remaining charge SOC becomes less than the target charge level LO2.

The charging control process discussed above selectively uses the fuel cell 60 and the engine 10 as the working energy output source to charge the battery 50, based on the output sustaining ability of the fuel cell 60. In the case of charging the battery 50 with the fuel cell 60, the small value is set to the target charge level LO1 of the battery 50. This arrangement controls the electric power output from the fuel cell 60 and restricts the consumption of the FC fuel. When the remaining quantity FCL of the FC fuel decreases to or below the predetermined level Fth3, the battery 50 is charged by means of the engine 10. This arrangement also controls the consumption of the FC fuel. Such selective use desirably prevents the FC fuel from being excessively consumed in the process of charging the battery 50, thereby improving the driving efficiency and the environmental properties of the hybrid vehicle.

The charging control process regulates the charging electric power of the battery 50, based on the difference between the remaining charge SOC of the battery 60 and the target charge level LO1 or LO2. This procedure enables the charge level of the battery 50 to be quickly recovered to the target level. In the case where the battery 50 is charged with the electric power generated with the power of the engine 10, the auxiliary machinery driving motor 80 and the motor 20 are selectively used according to the various conditions including the required charging electric power. This arrangement enables the rapid and adequate charging of the battery 50.

The charging control process discussed above selectively uses the fuel cell 60 and the engine 10 according to the remaining quantity FCL of the FC fuel. One modified procedure gradually varies the output ratio of the fuel cell 60 to the engine 10 according to the remaining quantity FCL of the FC fuel. In this modified arrangement, the battery 50 is charged with the outputs from both the fuel cell 60 and the engine 10. The output ratio of the fuel cell 60 is gradually lowered while the output ratio of the engine 10 is gradually heightened, with a decrease in remaining quantity FCL of the FC fuel. The charging control process discussed above selectively uses either one of the target charge levels LO1 and LO2 according to the selection of the working energy output source. One possible modification may vary the target charge level of the battery 50 in a continuous manner or in a stepwise manner according to the selection of the working energy output source. For example, in the case of charging the battery 50 with the fuel cell 60, the target charge level may be lowered gradually with a decrease in remaining quantity FCL of the FC fuel.

F. Second Embodiment

The following describes another hybrid vehicle in a second embodiment according to the present invention. The first embodiment and its modified examples regard the hybrid vehicle that is driven with the power output to only one axle. The technique of the first embodiment is, however, not restricted to this structure, but is applicable to a hybrid vehicle that is driven with the power output to two axles, that is, a four wheel-drive hybrid vehicle. The application to the four wheel-drive hybrid vehicle is described below as the second embodiment.

Figure 20:
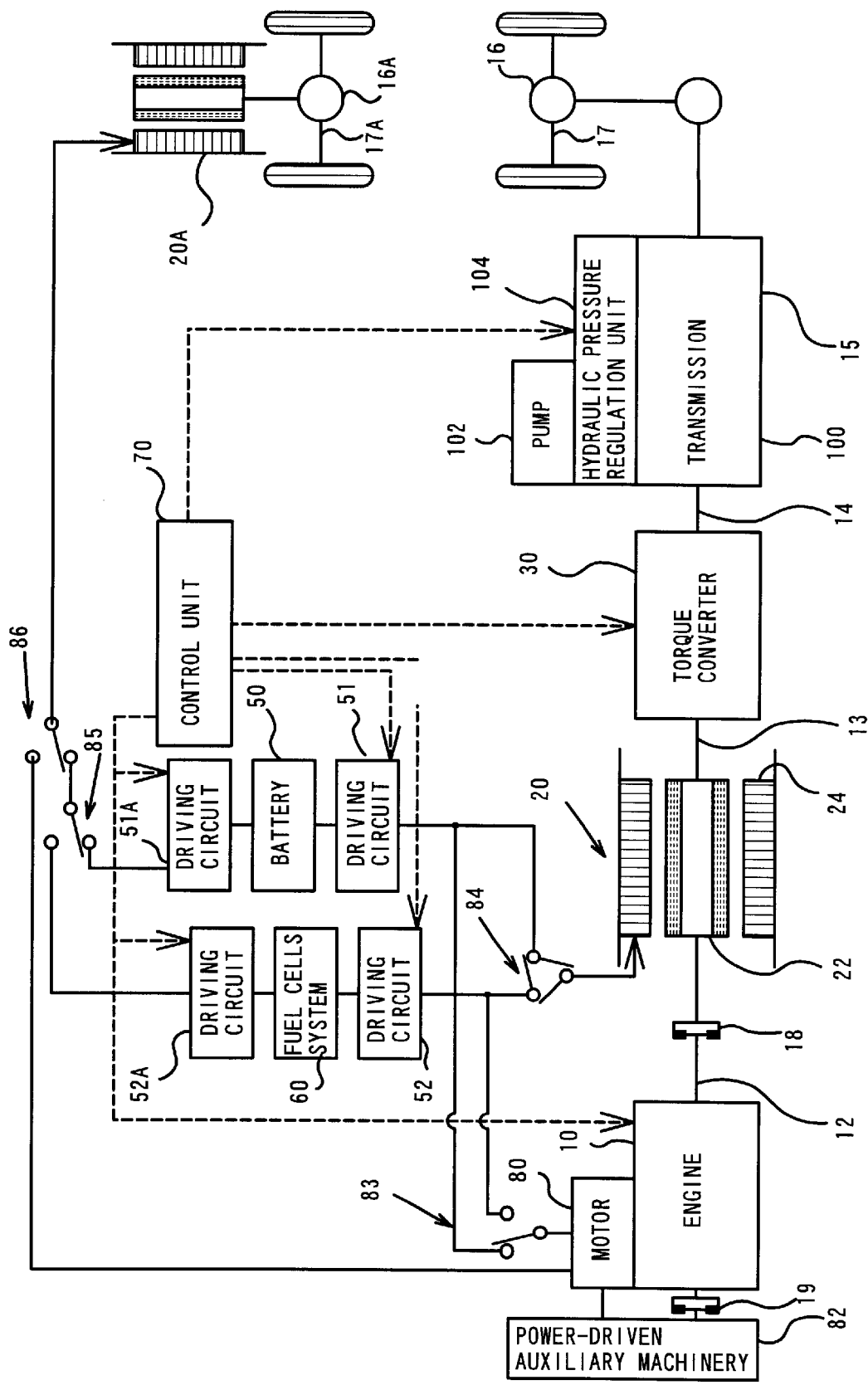
FIG. 20 schematically illustrates the structure of another hybrid vehicle in a second embodiment according to the present invention.

FIG. 20 schematically illustrates the structure of the hybrid vehicle in the second embodiment. The difference from the first embodiment is that power may be output to two axles 17 and 17A in the hybrid vehicle of the second embodiment. The structure of the second embodiment enables the driver to arbitrarily set the output of power to the axle 17A. A 4WD mode switch for specifying the four-wheel drive is disposed near the gearshift lever 162, in place of the sports mode switch 163 of the first embodiment shown in FIG. 5. Only when the 4WD mode switch is set in ON position, the power is output to both the axles 17 and 17A. When the 4WD mode switch is in OFF position, the power is output only to the axle 17 as in the case of the hybrid vehicle of the first embodiment. This structure is not essential, and one possible modification causes the power to be always output to both the axles 17 and 17A.

The mechanism of outputting power to the axle 17 is identical with that discussed in the first embodiment. This power output mechanism includes the engine 10, the motor 20, the torque converter 30, and the transmission 100 that are connected in series. Like the structure of the first embodiment, the electric power may be supplied from both the battery 50 and the fuel cell 60 to the motor 20.

Power is output to the axle 17A, on the other hand, through the following power output mechanism. A motor 20A is coupled with the axle 17A via a differential gear 16A. Like the motor 20, the motor 20A is a three-phase synchronous motor. The motor 20A may receive a supply of electric power from any of the battery 50, the fuel cell 60, and the auxiliary machinery driving motor 80. The supplies of electric power output from the battery 50 and the fuel cell 60 are fed to the motor 20A via driving circuits 51A and 52A, respectively. Like the driving circuits 51 and 52, the driving circuits 51A and 52A are constructed as transistor inverters. The auxiliary machinery driving motor 80 generates electric power with the power of the engine 10. Electric power generated by the auxiliary machinery driving motor 80 may be supplied directly to the motor 20A.

The working electric power supply used to supply electric power to the motor 20A is specified by changing the state of connection of changeover switches 85 and 86. As shown in FIG. 20, the changeover switch 86 changes the state of connection to select the working electric power supply between either one of the battery 50 and the fuel cell 60 and the auxiliary machinery driving motor 80. The changeover switch 85 changes the state of connection to select the working electric power supply between the battery 50 and the fuel cell 60. In the structure of the second embodiment, the battery 50 is used as the auxiliary electric power supply to compensate for the response delay of the fuel cell 60.

The axles 17 and 17A may be used as the front axle and the rear axle or vice versa. In the structure where the engine 10 is mounted on the front part of the vehicle, if the axle 17 is set as the rear axle, a propeller shaft is required to transmit the mechanical power output from the engine 10 through the vertical axis of the vehicle to the rear axle. If the axle 17A is set as the rear axle, on the other hand, the propeller shaft is not required. Disposing the axle 17 close to the engine 10 advantageously simplifies the structure of the power system.

The variety of control processes discussed in the first embodiment are also applied to the structure of the second embodiment. For example, the details of the EV drive control process carried out in the second embodiment are substantially similar to those of the first embodiment shown in FIG. 12. In the structure of the second embodiment, both the motors 20 and 20A are driven during the EV drive, so that a greater quantity of electric power is consumed. It is thus desirable that the hybrid vehicle runs by the EV drive when the fuel cell 60 has a sufficient output sustaining ability. From this point of view, it is desirable in the second embodiment that a greater value is set to the predetermined level Fth1 used as the criterion at step S20 in the EV drive control routine of FIG. 12, compared with the first embodiment.

The details of the auxiliary machinery drive control process and the charging control process carried out in the second embodiment are also substantially similar to those of the first embodiment shown in FIGS. 14 and 15. In the charging control process of the second embodiment, the regenerative operation of the motor 20A may be carried out in addition to the regenerative operation of the motor 20. At step S345 in the generator drive control routine of FIG. 19, it is desirable that the processing causes the motor 20A, in addition to the motor 20, to carry out the regenerative operation.

Figure 21:
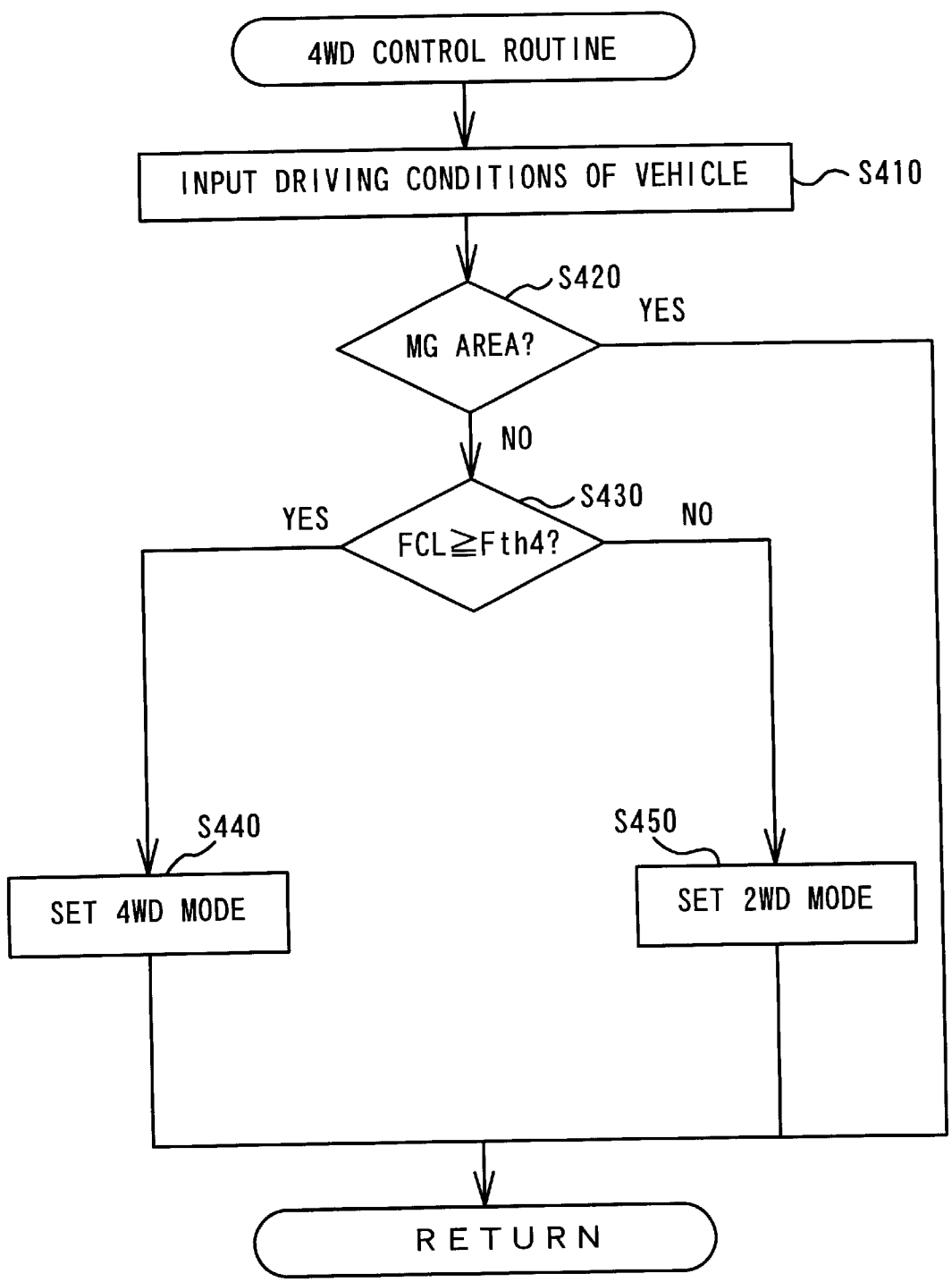
FIG. 21 is a flowchart showing a 4WD control routine executed in the second embodiment.

The hybrid vehicle of the second embodiment further carries out a 4WD control process intrinsic to the structure of the second embodiment. The 4WD control process properly selects either the 4WD mode or the 2WD mode according to the remaining quantity FCL of the FC fuel. FIG. 21 is a flowchart showing a 4WD control routine. When the program enters the 4WD control routine, the CPU first receives the inputs regarding the driving conditions of the vehicle at step S410. Among the diversity of inputs, the pieces of information on the vehicle speed, the accelerator travel, and the remaining quantity FCL of the FC fuel for the fuel cell 60 are involved in the subsequent processing.

The CPU then determines whether or not the current driving state of the vehicle corresponds to the MG area at step S420. The determination of step S420 is based on the vehicle speed and the accelerator travel in the same manner as the determination of step S50 in the EV drive control routine of FIG. 12. When the current driving state corresponds to the MG area, both the motors 20 and 20A are driven, so that the CPU exits from the 4WD control routine without any further processing.

When the current driving state does not correspond to the MG area, on the other hand, either the 4WD mode or the 2WD mode is selected according to the remaining quantity FCL of the FC fuel. The CPU compares the observed remaining quantity FCL of the FC fuel with a predetermined level Fth4 at step S430. In the case where the remaining quantity FCL of the FC fuel is not less than the predetermined level Fth4, the CPU determines that the fuel cell 60 has a sufficient output sustaining ability and sets the 4WD mode at step S440. When the driving state is not in the MG area, the power is output from the engine 10 to one axle. The motor 20A linked with the other axle is driven with the electric power output from the fuel cell 60.

In the case where the remaining quantity FCL of the FC fuel is less than the predetermined level Fth4, on the other hand, the CPU determines that the fuel cell 60 does not have a sufficient output sustaining ability and sets the 2WD mode at step S450. The operation of the motor 20A is accordingly stopped. In this case, a preferable arrangement informs the driver of the selection of the 2WD mode, in order to ensure a smooth drive without making the driver feel uneasy.

The predetermined level Fth4 is used as the criterion to determine whether or not the consumption of electric power to drive the motor 20A is allowed. Any arbitrary value may be set to the predetermined level Fth4. In the technique of the embodiment, a relatively large value is set to the predetermined level Fth4 by taking into account the fact that the hybrid vehicle can be driven with the power of the engine 10 even when the motor 20A is not driven. Namely the 4WD mode is selected only when the remaining quantity FCL of the FC fuel has a sufficient margin.

The 4WD control process discussed above selects either one of the 4WD mode and the 2WD mode according to the remaining quantity FCL of the FC fuel. In the 2WD mode, the motor 20A is not driven, so that the consumption of the FC fuel is restricted. The control procedure thus prevents the FC fuel from being excessively consumed during the drive in the 4WD mode, and thereby improves the driving efficiency and the environmental properties of the hybrid vehicle.

Instead of selecting either the 4WD mode or the 2WD mode, the output of the motor 20A may be gradually reduced with a decrease in remaining quantity FCL of the FC fuel. The reduction of the output may be implemented in a stepwise manner or in a continuous manner. This modified structure makes the best use of the advantages of the 4WD structure in the allowable range of the FC fuel, while saving the FC fuel.

Like the hybrid vehicle of the first embodiment, the hybrid vehicle of the second embodiment attains a drive of excellent driving efficiency and environmental properties, while restricting the consumption of the FC fuel. The motor 20 may be omitted from the structure of the second embodiment according to the requirements.

G. Third Embodiment

Figure 22:
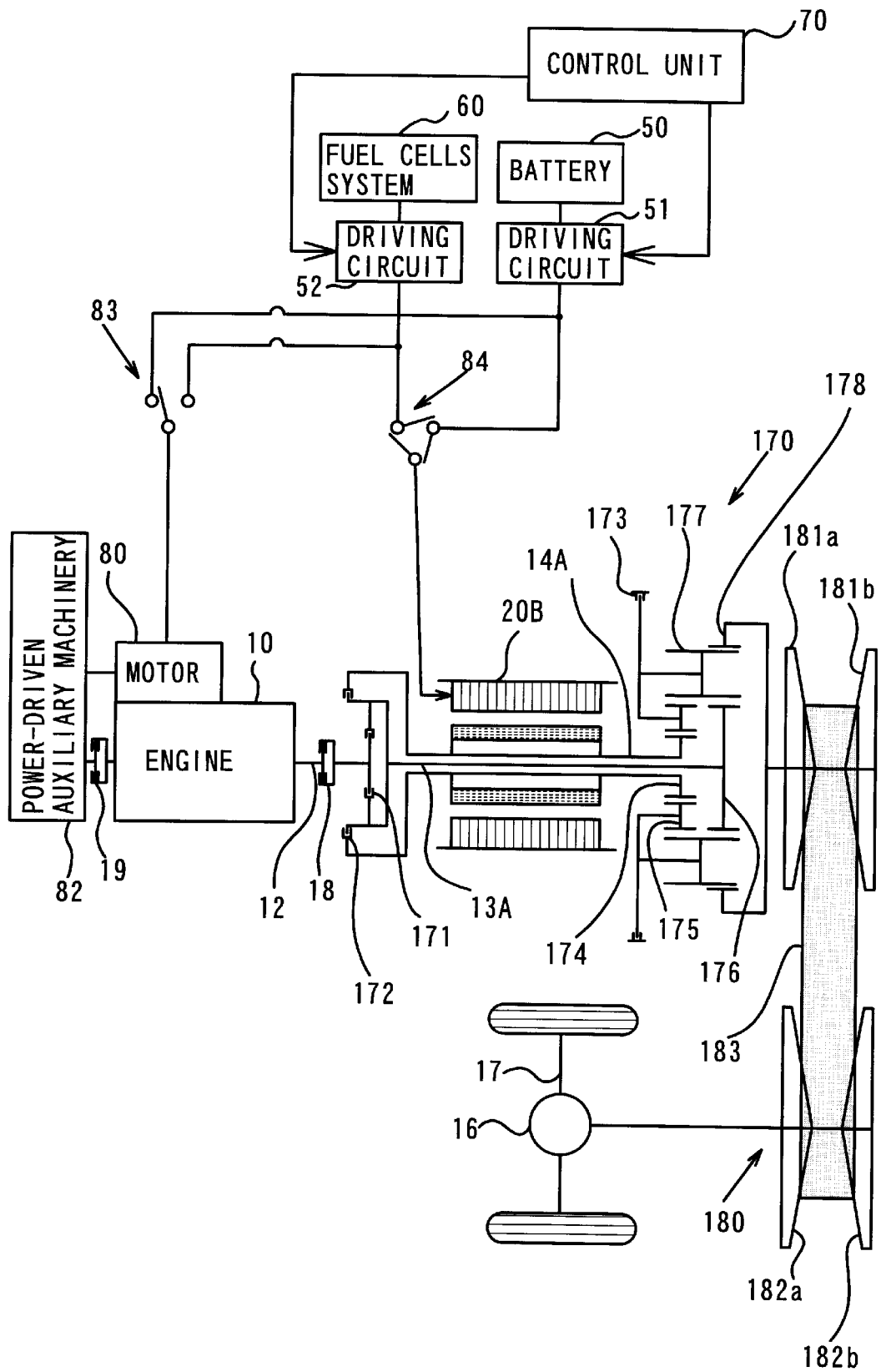
FIG. 22 schematically illustrates the structure of still another hybrid vehicle in a third embodiment according to the present invention.

The following describes still another hybrid vehicle in a third embodiment according to the present invention. FIG. 22 schematically illustrates the structure of the hybrid vehicle in the third embodiment. The difference between the third embodiment and the first embodiment is the mechanism of transmitting power of the engine 10 and a motor 20B to the axle 17. In the structure of the third embodiment, the transmission mechanism has a continuously variable transmission 180 (hereinafter referred to as CVT) and a sub-transmission 170, which is disposed before the CVT 180 to change the speed of the power transmitted to the CVT 180.

The CVT 180 is a known mechanism, in which two pairs of pulleys 181a,181b and 182a,182b are arranged to make rotating shafts parallel to each other, and the power is transmitted between the two pairs of pulleys 181a,181b and 182a,182b via a belt 183. The interval between the paired pulleys 181a and 181b or 182a and 182b is varied by means of the hydraulic pressure, so that the effective diameter of the contact of the paired pulleys with the belt 183 is varied. The CVT 180 of this configuration causes the power output from the power sources, that is, the engine 10 and the motor 20B, to be converted in a continuously variable manner and transmitted to the axle 17.

In the structure of the third embodiment, the sub-transmission 170 is disposed before the CVT 180, in order to extend the possible change-speed gear range of the power. The sub-transmission 170 has two planetary gear units combined with clutches 171 and 172 that change over the pathway of power input. The first planetary gear unit includes a sun gear 174 and pinion gears 175 and 177. The second planetary gear unit includes a sun gear 176, the pinion gear 177, and a ring gear 178. The pinion gear 177 is commonly used in the first and the second planetary gear units. The first planetary gear unit further includes a brake 173 that stops rotations of the pinion gears 175 and 177.

The power is input into the sub-transmission 170 of the above configuration through the following pathways. The motor 20B is linked with the sun gear 174 of the first planetary gear unit and transmits power to the sun gear 174. The engine 10 is linked with both the sun gears 174 and 176 via the clutches 171 and 172, respectively. When the clutch 171 is laid off, the power of the engine 10 is not transmitted to the sub-transmission 170. When the clutch 171 is laid on, on the other hand, the power of the engine 10 is transmitted to the sun gear 176. When both the clutches 171 and 172 are laid on, the power of the engine 10 is transmitted to both the sun gears 174 and 176. The sub-transmission 170 changes the speed of the power output from the engine 10 and the motor 20B and transmits the converted power to the CVT 180 by switching the on-off conditions of the clutches 171 and 172 and the brake 173.

FIG. 23 shows the state of connection in the sub-transmission 170. The open circle represents the coupling of the clutch or the brake. The open triangle represents the presence of a slip, and the cross represents the release of the clutch or the brake. As shown in the table of FIG. 23, the coupling of the clutches 171 and 172 and the brake 173 enables the conversion of the power input into the CVT 180 at the corresponding gear ratio. In the table of FIG. 23, ρ1 and ρ2 are defined as:

ρ1=number of teeth of ring gear 177/number of teeth of sun gear 174

ρ2=number of teeth of ring gear 177/number of teeth of sun gear 176

The hybrid vehicle of the third embodiment has the battery 50 and the fuel cell 60 as the available electric power supplies of the motor 20B and the auxiliary machinery driving motor 80 and the respective driving circuits 51 and 52. This structure is identical with that of the first embodiment and is not specifically described here. The operations of the respective constituents, such as the driving circuits 51 and 52, the engine 10, the sub-transmission 170, and the CVT 180, are controlled by the control unit 70 in the same manner as the first embodiment. For the clarity of illustration, the outputs of control signals from the control unit 70 are omitted from the illustration of FIG. 22.

In the same manner as the first embodiment, the hybrid vehicle of the third embodiment starts a drive by using the motor 20B as the power source. At this moment, the clutch 171 is released, and the power of the engine 10 is not transmitted to the axle 17. When the vehicle speed reaches a predetermined level, the clutch 171 is coupled in the presence of a slip. The hybrid vehicle thus runs with the power of the engine 10. This corresponds to the state of the $2^{nd}$ (low speed) in the table of FIG. 23. With a further increase in vehicle speed, the clutch 171 is completely coupled, and the hybrid vehicle runs with the power of the engine 10. This corresponds to the state of the $2^{nd}$ in the table of FIG. 23. In this driving state, the hybrid vehicle may be driven only with the power of the engine 10. In the case of a relatively large accelerator travel, the motor 20B may also be driven to output power and assist the engine 10.

Figure 24:
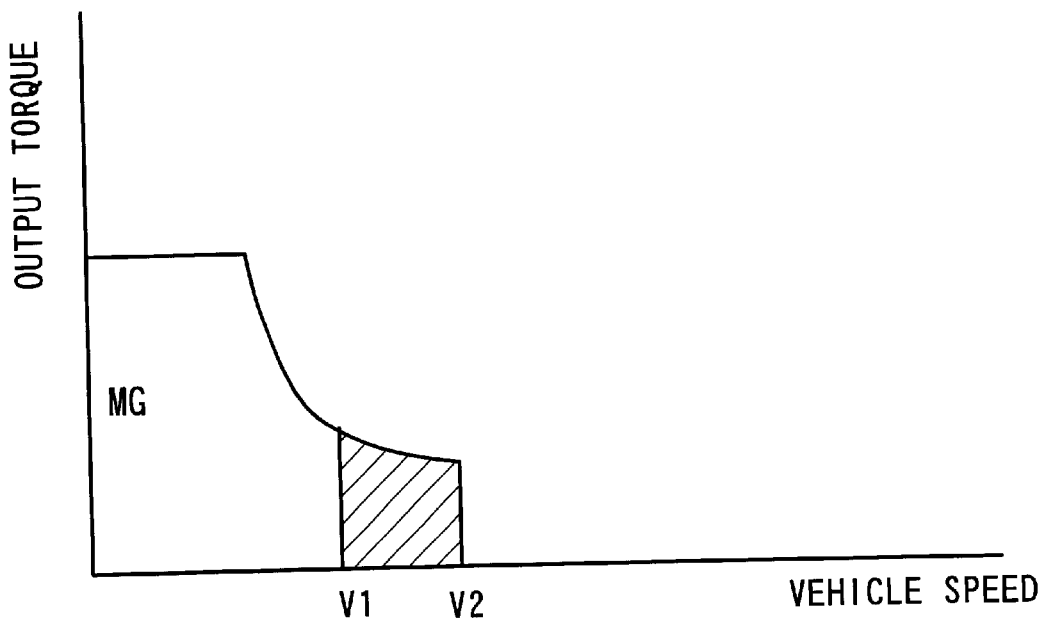
FIG. 24 is a map showing the state of change in the sub-transmission.
Figure 25:
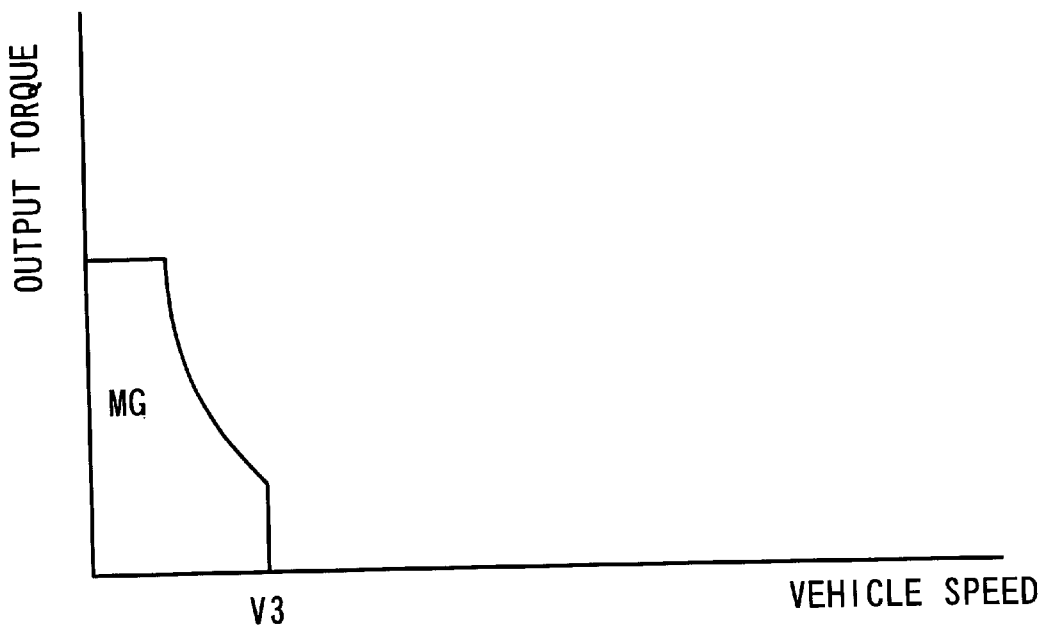
FIG. 25 is a map showing the state of change in the sub-transmission at the position R.

The control of the sub-transmission 170 is carried out according to maps similar to those discussed in the first embodiment. FIG. 24 is a map showing the state of change in the sub-transmission 170, and FIG. 25 is a map showing the state of change in the sub-transmission 170 at the position R when the vehicle moves back. In the MG area, the clutch 171 is laid off, and the hybrid vehicle is driven with only the power of the motor 20B. The residual area is the engine drive area, in which the power of the engine 10 is used to drive the hybrid vehicle. The hatched area in FIG. 24 corresponds to an intermediate area between the MG area and the engine drive area, in which the clutch 171 is coupled in the presence of a slip. Velocities V1, V2, and V3 set as boundaries of the respective areas are regulated in each vehicle, in order to attain the favorable drive feeling.

Figure 26:
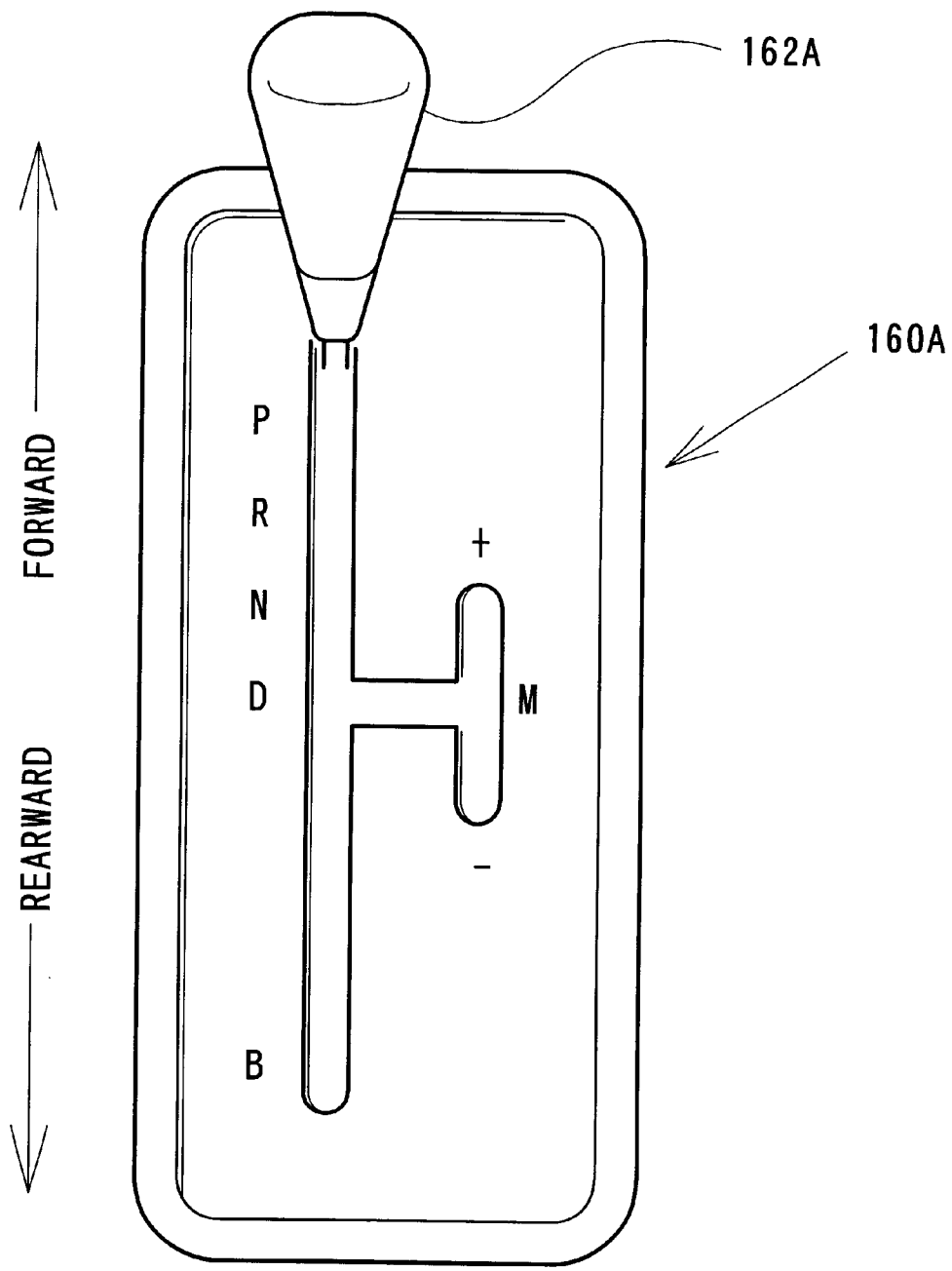
FIG. 26 shows an operation unit for selecting the gearshift position in the hybrid vehicle of the third embodiment.

In the CTV 180, the gear ratio is regulated against the required torque, which is set based on the accelerator travel, according to a predetermined map. In the hybrid vehicle of the third embodiment, the driver may manually regulate the gear ratio of the CVT 180 through operation of an operation unit 160A. FIG. 26 shows the operation unit 160A for selecting the gearshift position in the hybrid vehicle of the third embodiment. The operation unit 160A has positions B and M, in addition to the positions P, R, N, and D of the first embodiment. At the position B, a gearshift lever 162A is movable between a rear most position and a middle position. As the driver pulls the gearshift lever 162 towards the rear most position, the output torque increases. Namely the change speed pattern of the CVT 180 is regulated according to the position of the gearshift lever 162A.

The driver may select the position M by sliding the gearshift lever 162A rightward from the position D. At the M position, the gearshift lever 162A is movable forward (that is, the '+' position) and backward (that is, the '−' position') from the center as the standard position. The '+' position and the '−' position of the gearshift lever 162A respectively function as the '+' switch and the '−' switch. When the driver unhands the gearshift lever 162A, the gearshift lever 162A is kept at the central standard position. At the position M, when the driver sets the '+' switch on through the operation of the gearshift lever 162A, the output torque increases with an increase in frequency of the on operation of the '+' switch. In a similar manner, when the driver sets the '−' switch on through the operation of the gearshift lever 162A, the output torque decreases with an increase in frequency of the on operation of the '−' switch. The change speed pattern of the CVT 180 is accordingly regulated in a stepwise manner.

Figure 27:
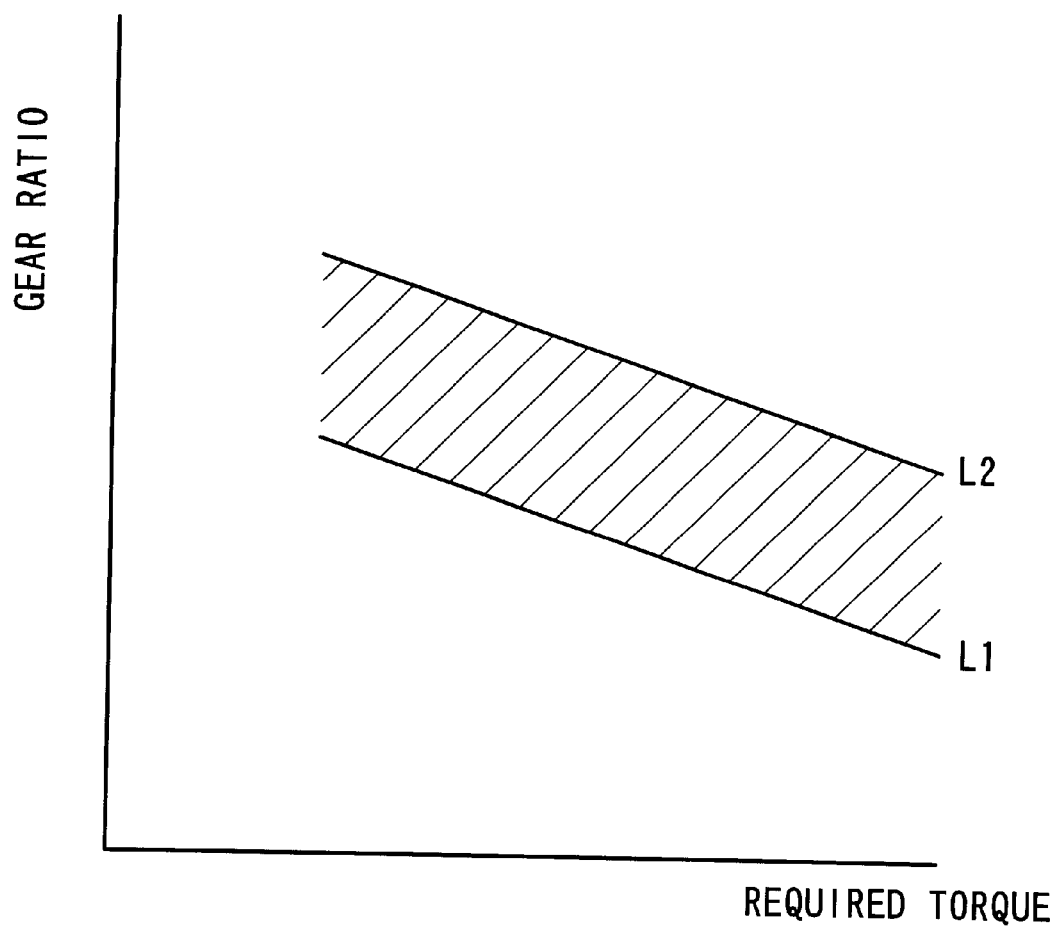
FIG. 27 is a map showing a typical change speed pattern of a CVT in the hybrid vehicle of the third embodiment.

FIG. 27 is a map showing a typical change speed pattern of the CVT 180. In the structure of the third embodiment, the change speed pattern lowers the gear ratio of the CVT 180, in order to enhance the output torque with an increase in required torque or accelerator travel. The change speed pattern illustrated in the map of FIG. 27 linearly varies, but a variety of other settings may be applied for the change speed pattern to fit the drive feeling of the driver. The arrangement of this embodiment allows the driver to manually regulate the change speed pattern of the CVT 180 as mentioned above. The hatched area shown in the map of FIG. 27 represents an allowable range of regulation. A straight line L1 shown in FIG. 27 represents the change speed pattern of the CVT 180 in the case of setting a largest possible output torque. A straight line L2 represents the change speed pattern of the CVT 180 in the case of setting a smallest possible output torque. At the position B, the change speed pattern is varied continuously between the straight lines L1 and L2. At the position M, the change speed pattern is varied in a stepwise manner between the straight lines L1 and L2. The variation of the change speed pattern between the straight lines L1 and L2 is implemented by proportionally partitioning the gear ratios on these lines L1 and L2 according to the regulation of the driver or by translating these lines L1 and L2.

Figure 28:
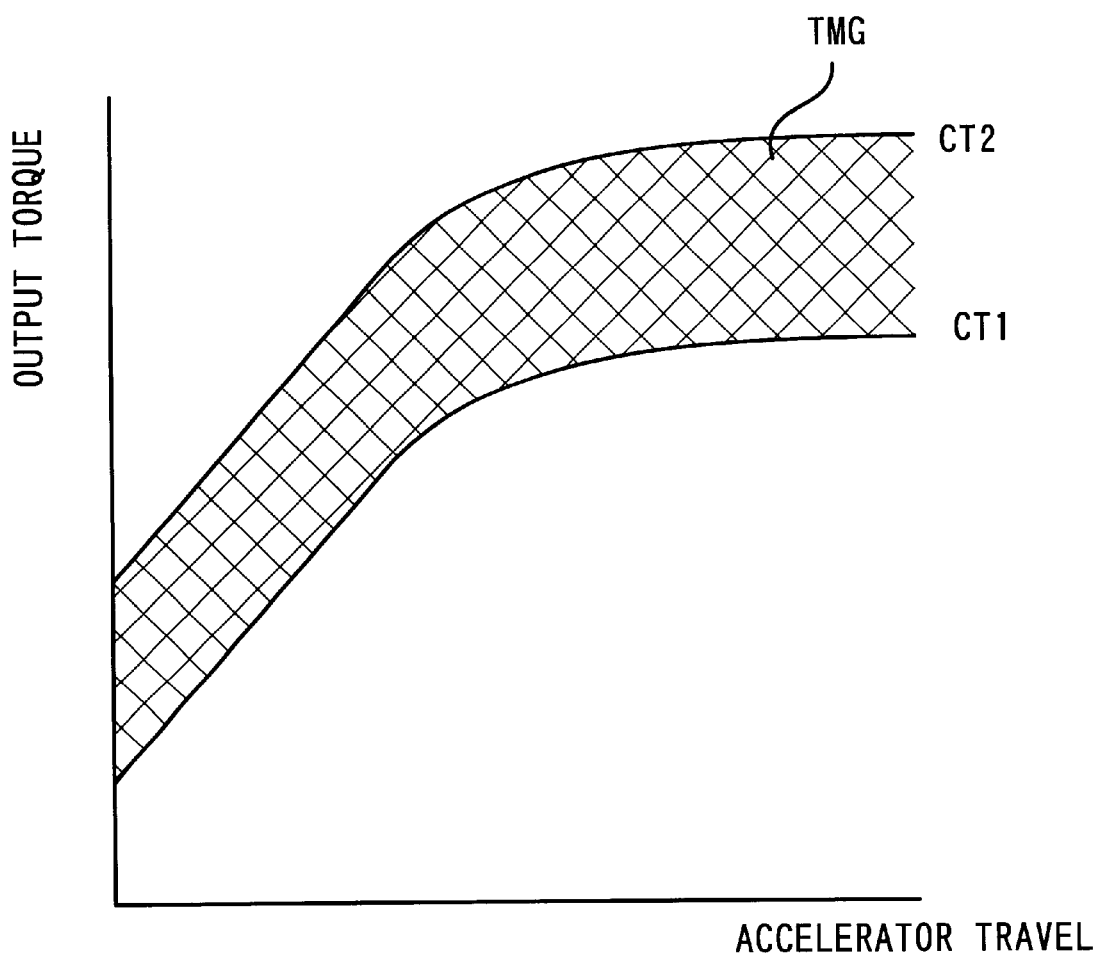
FIG. 28 is a map showing a variation in output torque against the accelerator travel in an engine drive area.

In the hybrid vehicle of the third embodiment, the motor 20B outputs power to assist the engine 10. FIG. 28 is a map showing a variation in output torque against the accelerator travel in an engine drive area. The engine 10 outputs the torque varying against the accelerator travel as defined by a curve CT1, whereas the motor 20B outputs the torque corresponding to a hatched area TMG. A curve CT2 thus represents a variation in total torque.

In the hybrid vehicle of the third embodiment, the assist torque of the motor 20B varies with a variation in remaining quantity of the FC fuel according to a control procedure discussed below. The total output torque of the engine 10 and the motor 20B varies in the hatched area TMB of FIG. 28 according to this control procedure. In order to prevent a significant variation in torque output to the axle 17, the gear ratio of the CVT 180 may be regulated to compensate for the variation in assist torque.

Figure 29:
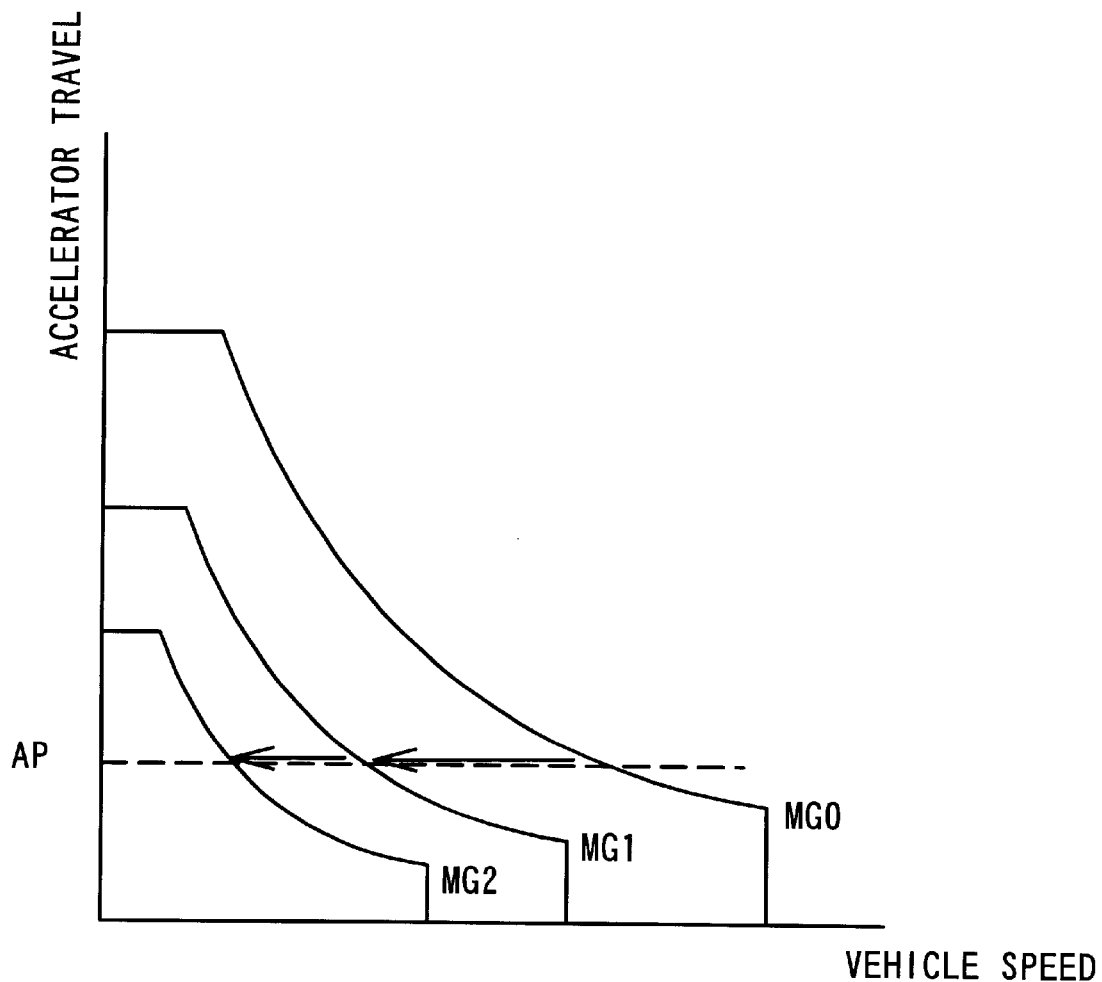
FIG. 29 is a map showing a process of changing the range of the MG area according to the remaining quantity of the FC fuel.

In the structure of the third embodiment, the control procedure varies the range of the MG area, in which the hybrid vehicle drives with the power of the motor 20B, as well as the assist torque of the motor 20B according to the remaining quantity of the FC fuel. FIG. 29 is a map showing a process of changing the range of the MG area according to the remaining quantity of the FC fuel. An area MG0 in FIG. 29 corresponds to the MG area in FIG. 24. The technique of the third embodiment narrows the MG area or the motor drive area, in which the hybrid vehicle drives with the power of the motor 20B, from the area MG0 to an area MG1 and further to MG2 with a decrease in remaining quantity of the FC fuel. Narrowing the motor drive area restricts the consumption of the FC fuel. The relationship between the remaining quantity of the FC fuel and the range of the MG area has been set in advance in the form of a map.

Figure 30:
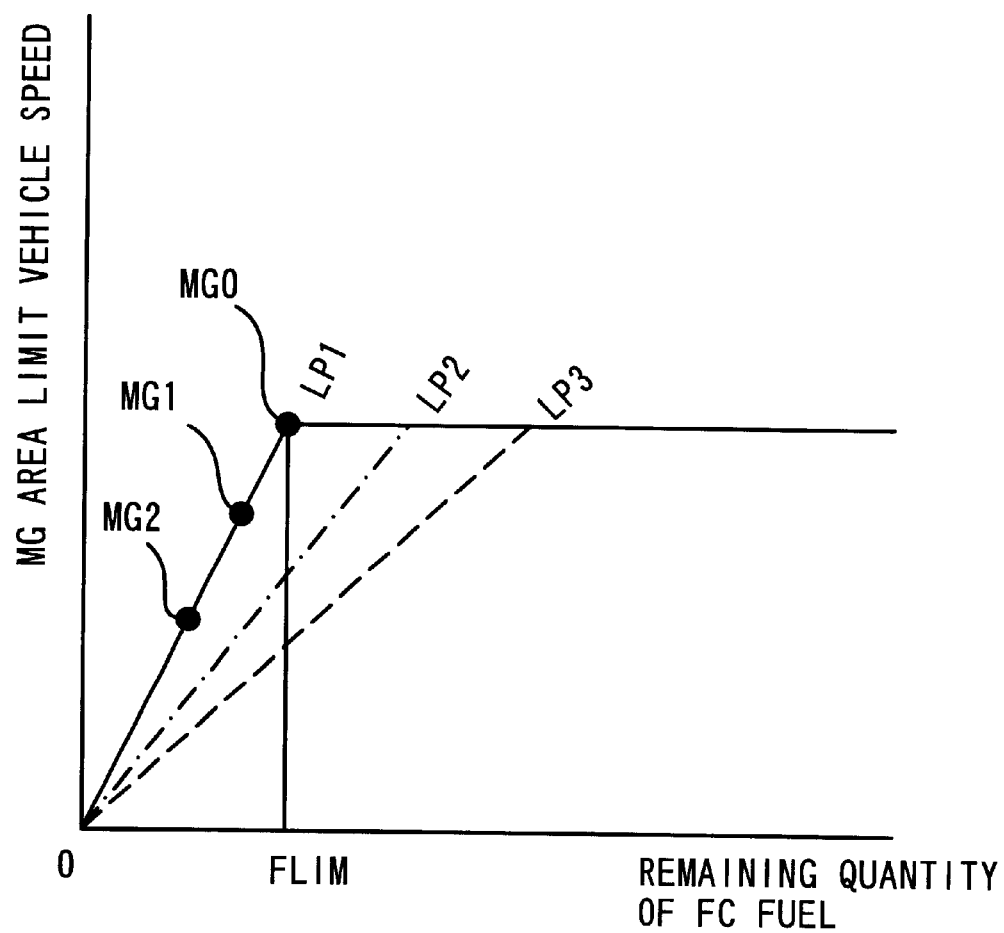
FIG. 30 is an exemplified map showing a variation in range of the MG area against the remaining quantity of the FC fuel.

FIG. 30 is an exemplified map showing a variation in range of the MG area against the remaining quantity of the FC fuel. More concretely, the example of FIG. 30 shows a variation in maximum velocity in the MG area with regard to a fixed accelerator travel AP shown in the map of FIG. 29 (hereinafter referred to as the MG area limit vehicle speed) against the remaining quantity of the FC fuel. A plurality of such maps are provided with regard to several values of accelerator travel.

When the remaining quantity of the FC fuel is not less than a predetermined value FLIM, that is, when it is determined that a sufficient quantity of the FC fuel remains, the technique of the third embodiment sets the motor drive area to the widest range. In this state, the MG area limit vehicle speed has a value corresponding to the area MG0 shown in FIG. 29. When the remaining quantity of the FC fuel becomes less than the predetermined value FLIM, the technique narrows the motor drive area, in order to restrict the use of the motor 20B and reduce the consumption of the FC fuel. The MG area limit vehicle speed thus lowers along a straight line LP1 with a decrease in remaining quantity of the FC fuel. In the example of FIG. 30, the MG area limit vehicle speed varies linearly according to the remaining quantity of the FC fuel. Other settings may also be applicable to vary the MG area limit vehicle speed non-linearly.

The control procedure of the third embodiment changes the pattern of narrowing the range of the MG area according to the rate of change in remaining quantity of the FC fuel. The description above regards the pattern of narrowing the range of the MG area along the straight line LP1. In the technique of the third embodiment, the range of the MG area may, however, be narrowed along other lines according to the rate of change in remaining quantity of the FC fuel as shown in the map of FIG. 30. In the case of an abrupt consumption of the FC fuel, that is, in the case of an abrupt decrease in remaining quantity of the FC fuel, the reduction of the MG area starts while a relatively large quantity of the FC fuel still remains as shown by straight lines LP2 and LP3 in FIG. 30. In the case of the abrupt consumption of the FC fuel, it is required to quickly narrow the range of the MG area and control the consumption of the FC fuel. A variety of settings may be applicable for the mapping of the rate of change in remaining quantity of the FC fuel to the pattern of narrowing the range of the MG area, in order to attain the drive fitting the favorable drive feeling of the driver while saving the FC fuel.

Figure 31:
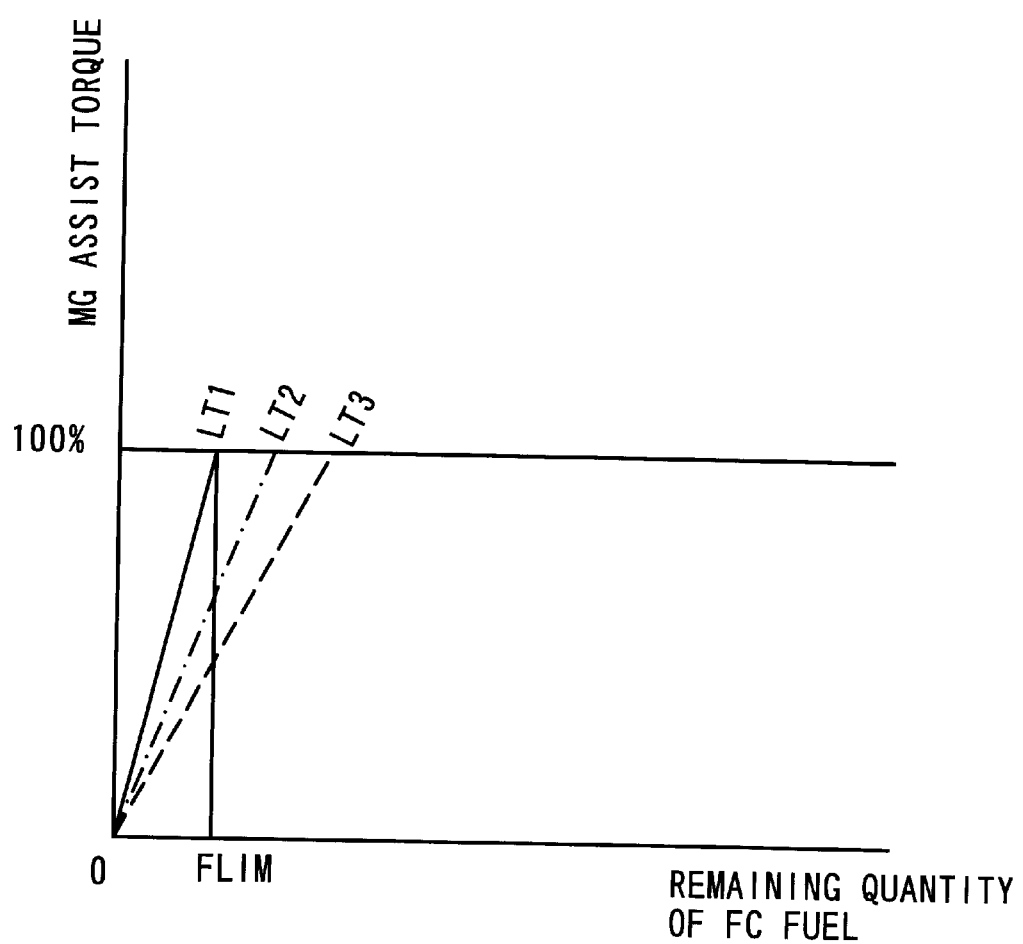
FIG. 31 is a map showing the relationship between the assist torque and the remaining quantity of the FC fuel.

For the same purpose as that of the reduction of the MG area with a decrease in remaining quantity of the FC fuel, the technique of the third embodiment varies the assist torque of the motor 20B according to the remaining quantity of the FC fuel. The variation in assist torque has been set in advance in the form of a map. FIG. 31 is a map showing the relationship between the assist torque and the remaining quantity of the FC fuel. Like the reduction of the MG area, when the remaining quantity of the FC fuel becomes less than the predetermined value FLIM, the assist torque gradually decreases from the level of 100% along a straight line LT1. In the technique of the third embodiment, the value of the assist torque is specified by the map of FIG. 28. In the case of the assist torque equal to 100%, the torque corresponding to the hatched area of FIG. 28 is output according to the accelerator travel. The total output torque of the engine 10 and the motor 20B thus follows the curve CT2 shown in FIG. 28. In the case of the assist torque equal to 0%, on the other hand, the total output torque follows the curve CT1 shown in FIG. 28.

The predetermined value FLIM is used in common in the maps of FIGS. 30 and 31, in order to make the decrease of the assist torque in combination with the reduction of the MG area. It is, however, not necessary that the remaining quantity of the FC fuel starting the reduction of the MG area is identical with the remaining quantity of the FC fuel starting the decrease of the assist torque. The map of FIG. 31 may be set independently of the map of FIG. 30.

In the same manner as the reduction of the MG area, the control procedure of the third embodiment changes the variation pattern of the assist torque according to the rate of change in remaining quantity of the FC fuel. In the case of an abrupt consumption of the FC fuel, that is, in the case of an abrupt decrease in remaining quantity of the FC fuel, the reduction of the assist torque starts while a relatively large quantity of the FC fuel still remains as shown by straight lines LT2 and LT3 in FIG. 31. Like the control of the MG area, in the case of the abrupt consumption of the FC fuel, the control procedure reduces the output of the motor 20B at an earlier timing, so as to restrict the consumption of the FC fuel. The map of the assist torque against the remaining quantity of the FC fuel is provided for each rate of change in remaining quantity of the FC fuel. A variety of settings may be applicable for the mapping of the rate of change in remaining quantity of the FC fuel to the variation pattern of the assist torque, in order to attain the drive fitting the favorable drive feeling of the driver while saving the FC fuel.

Figure 32:
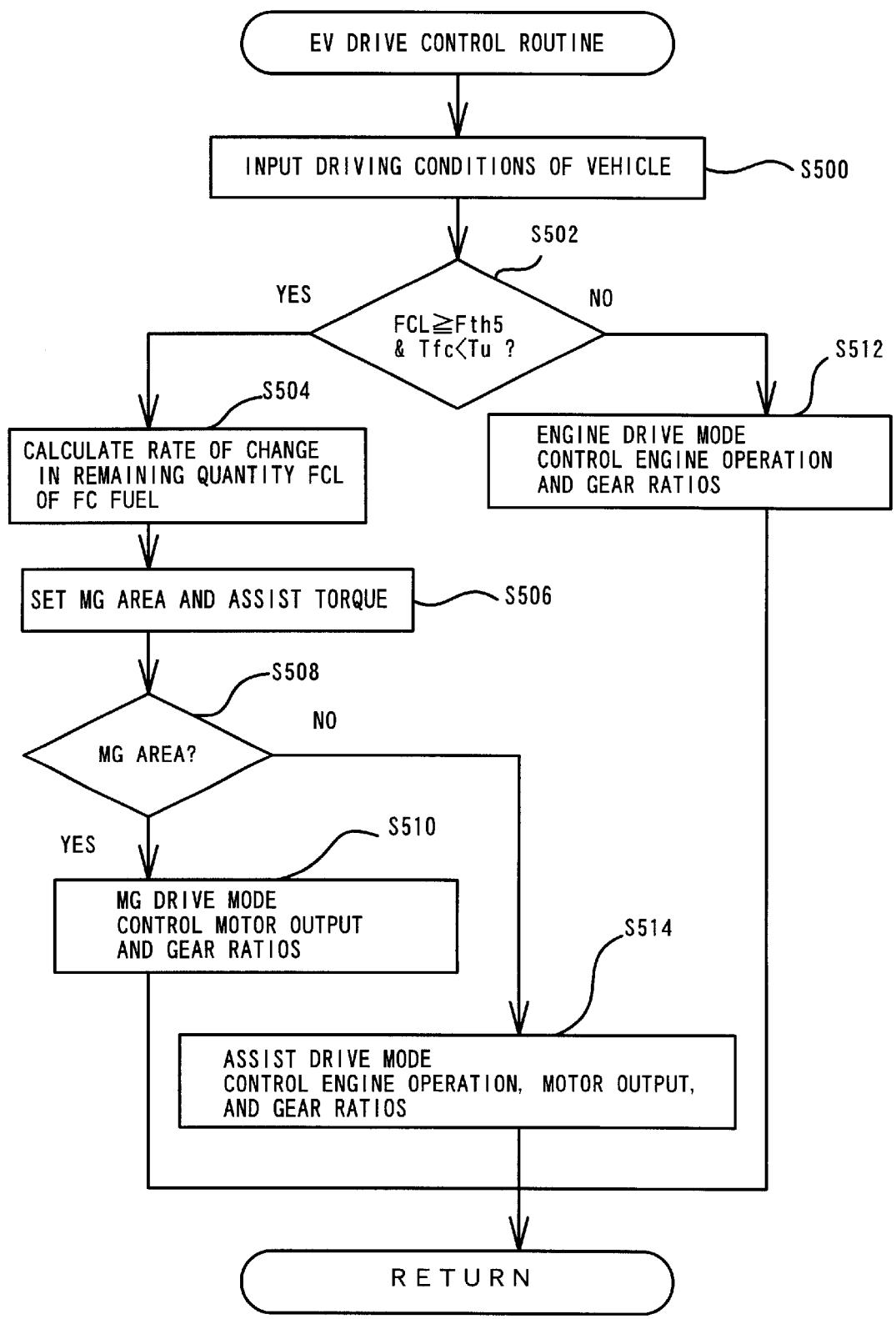
FIG. 32 is a flowchart showing an EV drive control routine executed in the third embodiment.

The CPU in the control unit 70 executes the following control process to implement the above control procedure. FIG. 32 is a flowchart showing an EV drive control routine executed in the third embodiment. When the program enters the EV drive control routine of FIG. 32, the CPU first receives the inputs regarding the driving conditions of the vehicle at step S500. The concrete processing of step S500 receives the inputs from the variety of sensors shown in FIG. 7 in the same manner as the EV drive control routine of the first embodiment. Among the diversity of inputs, the pieces of information on the gearshift position, the vehicle speed, the accelerator travel, and the remaining quantity FCL of the FC fuel for the fuel cell 60 are especially involved in the subsequent processing.

The CPU determines whether or not the fuel cell 60 is in the available state according to the following two conditions at step S502. The first condition is whether or not the remaining quantity FCL of the FC fuel is not less than a predetermined level Fth5. Like the predetermined level Fth1 used in the EV drive control routine of the first embodiment, the predetermined level Fth5 is a threshold value used to determine whether or not the fuel cell 60 is available as the working electric power supply. In the case where the remaining quantity FCL of the FC fuel is less than the predetermined level Fth5, it is determined that the use of the fuel cell 60 is not allowed. The second condition is whether or not an observed temperature Tfc of the fuel cell 60 is lower than a preset level Tu. The preset level Tu is an upper limit temperature that allows stable operation of the fuel cell 60. In the case where the observed temperature Tfc is not lower than the preset level Tu, it is determined that the use of the fuel cell 60 is not allowed. If at least one of these two conditions is unsatisfied, it is determined that the fuel cell 60 is not available as the working electric power supply. In this case, the CPU does not use the motor 20B, which is driven with the electric power of the fuel cell 60, as the power source, but causes the hybrid vehicle to run only with the power of the engine 10 at step S512. Under such conditions, the operation of the engine 10 and the gear ratios of the sub-transmission 170 and the CVT 180 are regulated to output the required torque according to the gearshift position and the accelerator travel.

When it is determined at step S502 that the fuel cell 60 is in the available state, the CPU calculates the rate of change in remaining quantity FCL of the FC fuel at step S504 and sets the MG area and the assist torque according to the calculated rate of change at step S506. As discussed previously, the technique of the third embodiment changes the range of the MG area and varies the assist torque according to the remaining quantity FCL of the FC fuel and its rate of change. The processing of steps S504 and S506 implements such settings. The concrete procedure refers to the maps of FIGS. 30 and 31 to set the MG area and the assist torque according to the remaining quantity FCL of the FC fuel and its rate of change. The maps are provided with regard to discrete values of the remaining quantity FCL and its rate of change. Interpolation of the map should thus be performed according to the requirements.

One modified procedure sets the MG area and the assist torque according to the remaining quantity FCL of the FC fuel and subsequently corrects the settings according to the rate of change in remaining quantity FCL of the FC fuel. This procedure advantageously saves the capacity required for storing the maps, while increasing the required arithmetic operations. Another modified procedure does not directly use the remaining quantity FCL of the FC fuel as the parameter, but carries out the processing of step S506 based on the state of loading applied to the fuel cell 60. An exemplified process of this modification continuously monitors the electric power output from the fuel cell 60 and executes the processing of step S506 based on the integral of the monitored electric power. The electric power output from the fuel cell 60 represents the rate of change in loading applied to the fuel cell 60. This is accordingly regarded as the parameter equivalent to the rate of change in remaining quantity FCL of the FC fuel. The measurement of the electric power output from the fuel cell 60 may thus replace the processing of step S504. The evaluation of the state of loading applied to the fuel cell 60 may not be based on the electric power output from the fuel cell 60, but be based on the power output from the motor 20B, which is driven with the fuel cell 60 used as the electric power supply.

At subsequent step S508, the CPU determines whether or not the current driving state of the vehicle corresponds to the MG area set at step S506 as discussed above, based on the current vehicle speed and the required torque. When it is determined at step S508 that the current driving state of the vehicle corresponds to the MG area, the hybrid vehicle is driven with the motor 20B as the power source at step S510. Under such conditions, the operation of the motor 20B and the gear ratios of the sub-transmission 170 and the CVT 180 are regulated to output the required torque according to the gearshift position and the accelerator travel.

When it is determined at step S508 that the current driving state of the vehicle does not correspond to the MG area, on the other hand, the hybrid vehicle is driven with both the engine 10 as the main power source and the motor 20B to assist the engine 10 at step S514. Under such conditions, the operations of the engine 10 and the motor 20B and the gear ratios of the sub-transmission 170 and the CVT 180 are regulated to output the torque shown in FIG. 28 according to the accelerator travel. This control process adequately changes the working power source and enables the hybrid vehicle of the third embodiment to drive with the properly regulated assist torque of the motor 20B.

In the hybrid vehicle of the third embodiment discussed above, the working power source is changed according to the remaining quantity of the FC fuel. This arrangement desirably controls the consumption of the FC fuel, like the first and the second embodiments. The technique of the third embodiment further regulates the range of the MG area and the torque of the motor 20B according to the rate of change in remaining quantity of the FC fuel, thereby controlling the consumption of the FC fuel more appropriately. For example, in the case of an abrupt consumption of the FC fuel, the control procedure quickly lowers the output of the motor 20B, so as to decrease the output of the fuel cell 60. This preferably prevents the FC fuel from being consumed excessively. In the case of a gentle consumption of the FC fuel, on the other hand, the control procedure enables the fuel cell 60 to be effectively used, so as to attain a drive of high driving efficiency and excellent environmental properties. The arrangement of the third embodiment enables the output control of the fuel cell 60 that sufficiently follows a dynamic change of the consumption of the FC fuel due to the varied driving state of the vehicle. Such output control enables the fuel cell 60 to be effectively used in a wide drive range.

The third embodiment regards the hybrid vehicle with the CVT 180 mounted thereon. The advantage of this structure is to enable the output of the motor 20B to be flexibly varied according to the remaining quantity of the FC fuel and its rate of change. The CVT 180 is, however, not essential for the control that varies the output of the motor 20B according to the remaining quantity of the FC fuel and its rate of change. The technique of the third embodiment is applicable to the structure of the first embodiment with the stepwise transmission mounted thereon. Like the first and the second embodiments, the output control executed in the structure of the third embodiment with the CVT 180 mounted thereon may be implemented without considering the rate of change in remaining quantity of the FC fuel. This modification advantageously simplifies the control process. The EV drive control process is discussed in the third embodiment. The idea of varying the output of the fuel cell according to the remaining quantity of the FC fuel and its rate of change is also applicable to the various control processes discussed in the first embodiment, such as the charging control process.

H. Fourth Embodiment

The following describes a fourth embodiment according to the present invention. The hybrid vehicle of the fourth embodiment has the same hardware structure as that of the hybrid vehicle of the first embodiment shown in FIG. 1. The basic operations of the fourth embodiment are also identical with those of the first embodiment. The hybrid vehicle of the fourth embodiment is driven by properly using the engine 10 and the motor 20 according to the maps of FIGS. 8 through 11. The motor 20 is driven with the electric power output from the fuel cell 60. The technique of the first embodiment controls the operation of the motor 20 according to the remaining quantity of the FC fuel. The technique of the fourth embodiment, on the other hand, controls the operation of the engine 10 according to the remaining quantity of the fuel for the engine 10, that is, the remaining quantity of gasoline.

Figure 33:
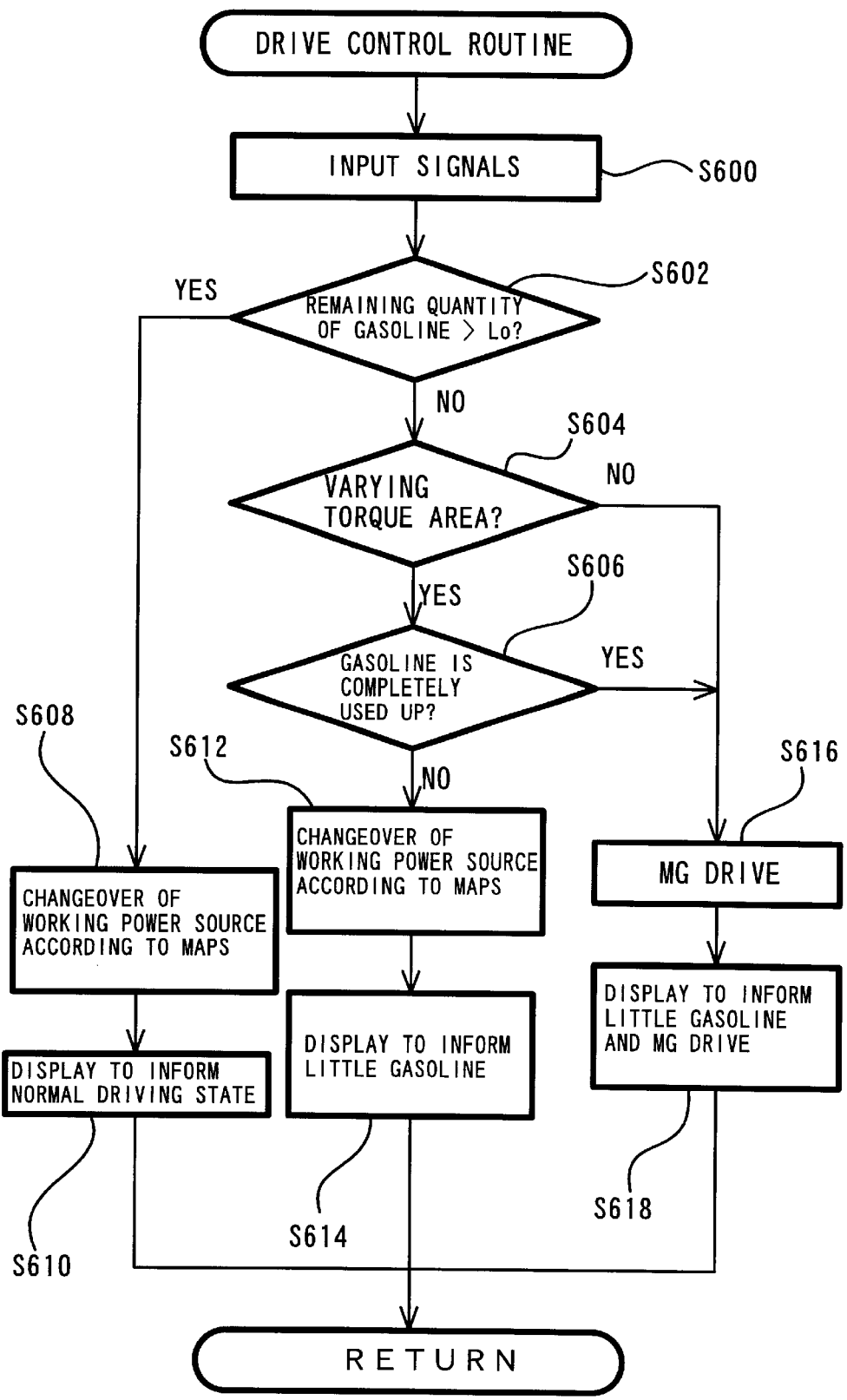
FIG. 33 is a flowchart showing a drive control routine executed in a fourth embodiment according to the present invention.

FIG. 33 is a flowchart showing a drive control routine executed in the fourth embodiment. Like the EV drive control routine of the first embodiment, the CPU of the control unit 70 repeatedly executes this drive control routine to control the proper use of the engine 10 and the motor 20 during a drive.

When the program enters the drive control routine of FIG. 33, the CPU first receives the input signals at step S600. The concrete processing of step S600 receives the variety of signals shown in FIG. 7, such as the signal representing the remaining quantity of gasoline. The CPU then compares the input remaining quantity of gasoline with a predetermined reference value Lo at step S602. The result of the comparison determines whether or not there is a sufficient quantity of gasoline to allow a smooth drive of the vehicle. The setting of the predetermined reference value Lo will be discussed later. In the case where the remaining quantity of gasoline is greater than the predetermined reference value Lo, that is, when it is determined at step S602 that there is a sufficient quantity of gasoline, the working power source is suitably selected between the engine 10 and the motor 20 according to the maps of FIGS. 8 through 11, which are set as the basic drive patterns, at step S608. The CPU then makes a display to inform the driver that the hybrid vehicle is in the normal driving state at step S610. The display is made, for example, by lighting up an indicator that is provided on the instrument panel shown in FIG. 6.

When it is determined at step S602 that there is only an insufficient quantity of gasoline, on the other hand, the operation of the engine 10 is controlled in the following manner. The CPU first determines whether or not the current driving state of the vehicle, that is, the current vehicle speed and torque, is within a varying torque area at step S604. In the varying torque area, the difference between the output torque of the engine 10 and the output torque of the motor 20 is not a negligible level. As estimated from the map of FIG. 8, the motor 20 is suitable for the drive in a low speed area. The area of high speed and high torque is accordingly included in the varying torque area. The varying torque area is also affected by the quantity of electric power supplied from the fuel cell 60 or the battery 50 to the motor 20 and the selected gear ratio. In the arrangement of the fourth embodiment, the varying torque area has been set in advance in the form of a map, on the premise that the gear ratio is changed according to the maps of FIGS. 8 through 11.

When it is determined at step S604 that the current driving state of the vehicle is not included in the varying torque area, the changeover of the working power source between the engine 10 and the motor 20 does not make the driver feel uneasy. Since the remaining quantity of gasoline is little, the control procedure does not use the engine 10 but selects the motor 20 as the working power source to drive the hybrid vehicle at step S616. Even when the driving state of the vehicle is within the engine drive area where the engine 10 is selected as the working power source according to the maps of FIGS. 8 through 11, the processing of step S616 causes the hybrid vehicle to run not with the engine 10 but with the motor 20 as the working power source. This is different from the normal driving state. The CPU accordingly makes a display to inform the driver that the remaining quantity of gasoline is little and that the hybrid vehicle runs by the MG drive at step S618. The display is made, for example, by lighting the indicator up in a different color, by flashing the indicator, or by any other suitable technique.

When it is determined at step S604 that the current driving state of the vehicle is included in the varying torque area, on the other hand, the changeover of the working power source between the engine 10 and the motor 20 makes the driver feel uneasy. In this case, it is desirable to continue the drive according to the basic drive patterns as far as possible, for the better drive feeling. The control procedure of the embodiment thus determines whether or not gasoline has been completely used up at step S606. On the occasion that even a little quantity of gasoline remains, the working power source is suitably selected between the engine 10 and the motor 20 according to the maps of FIGS. 8 through 11 at step S612. The CPU then makes a display to inform the driver that the remaining quantity of gasoline is little at step S614. The display may be made by any technique applied for the display of step S618. The state that gasoline has been completely used up at step S606 does not mean that gasoline in the fuel tank is equal to 0 liter but implies that there is little available fuel effectively used for a drive of the vehicle.

Figure 34:
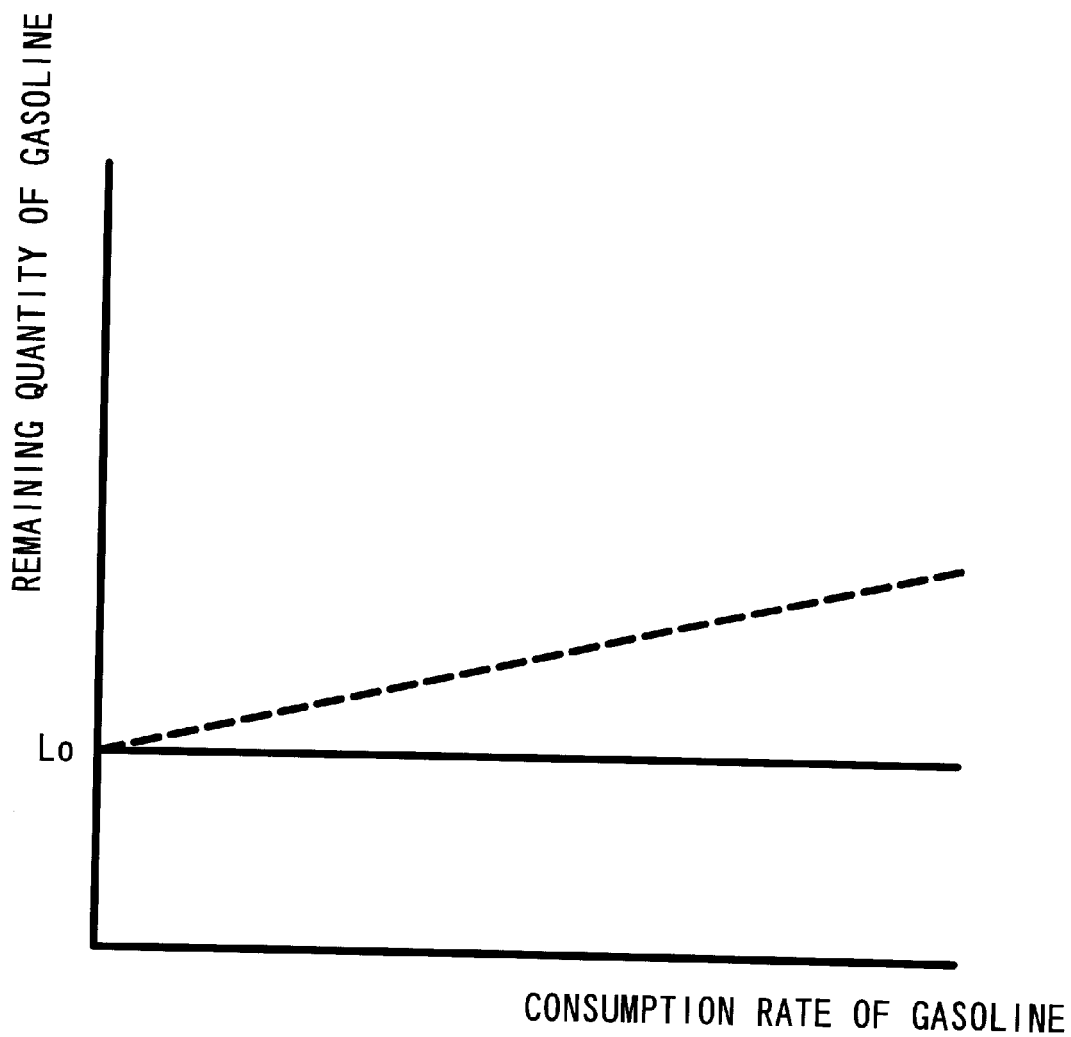
FIG. 34 shows a process of setting a reference value Lo, which is compared with the remaining quantity of gasoline.

The technique of the fourth embodiment controls the operation of the engine 10 according to the remaining quantity of gasoline. The decision over the requirement of controlling the operation of the engine 10 is based on the comparison between the remaining quantity of gasoline and the predetermined reference value Lo. The reference value Lo is determined in the following manner. FIG. 34 shows a process of setting the reference value Lo, which is compared with the remaining quantity of gasoline. The graph of FIG. 34 shows the relationship between the reference value Lo and the consumption rate of gasoline. Basically any arbitrary value may be set to the reference value Lo. As shown by the solid line, the reference value Lo may be a fixed value set regardless of the consumption rate of gasoline. As shown by the broken line, the reference value L0 may alternatively be varied with a variation in consumption rate of gasoline. In the example of FIG. 34, the reference value Lo increases with an increase in consumption rate of gasoline. At the high consumption rate of gasoline, even a little delay of controlling the operation of the engine 10 causes gasoline to be excessively consumed. It is thus preferable to set a large value to the reference value Lo, in order to prevent the excessive consumption of gasoline. In the example of FIG. 34, the reference value Lo is linearly varied according to the consumption rate of gasoline. The reference value Lo may, however, be varied non-linearly or in a stepwise manner.

The reference value Lo may be set, based on the idea adopted to set the predetermined level Fth of the FC fuel, which is used as the criterion to determine whether the use of the fuel cell 60 is allowed or forbidden, in the first embodiment. Setting a greater value to the reference value Lo tends to restrict the use of the engine 10. Setting a smaller value to the reference value Lo, on the contrary, tends to recommend the use of the engine 10. When a drive of high speed and high torque is demanded, for example, a small value is set to the reference value Lo to recommend the preferential use of the engine 10.

The reference value Lo is also regarded as a parameter relating to the time margin between the detection of little remaining quantity of gasoline and the actual control of the operation of the engine 10. According to the drive control process discussed above, even if the remaining quantity of gasoline is less than the predetermined reference value Lo, the use of the engine 10 continues when the current driving state of the vehicle is included in the varying torque area. In the case where a large value is set to the reference value Lo, the control procedure enables the timely reduction of the vehicle speed according to the display of little remaining quantity of gasoline. This leads to the smooth change of the working power source to the motor 20 without making the driver feel uneasy. In the case where a small value is set to the reference value Lo, on the other hand, gasoline may be completely used up while the driving state of the vehicle is still within the varying torque area. In this case, there is a possibility that the working power source is forcibly changed to the motor 20. The forcible change of the working power source causes a significant variation in drive torque, thereby undesirably making the driver feel uneasy and shocked and damaging the good ride of the vehicle. An appropriate value that enables the efficient use of the working power source without making the driver feel uneasy should be set to the reference value Lo by comprehensively considering the variety of factors discussed above.

The hybrid vehicle of the fourth embodiment discussed above is driven by selectively using the engine 10 and the motor 20 as the working power source according to the remaining quantity of gasoline. With a decrease in remaining quantity of gasoline, the control procedure restricts the use of the engine 10 and changes the working power source to the motor 20. The changeover of the working power source is performed in the driving state where the drive torque does not remarkably vary. The hybrid vehicle of the fourth embodiment thus attains the efficient use of the power sources without making the driver feel uneasy and without causing an accidental stop of the vehicle due to the complete consumption of gasoline.

H1. First Modification of Fourth Embodiment

The fourth embodiment discussed above regards the general control procedure to selectively use the engine 10 and the motor 20 as the working power source. The hybrid vehicle runs with the motor 20 at a low speed and changes the working power source to the engine 10 at a speed of or over a preset level. Controlling the changeover of the working power source according to the remaining quantity of gasoline effectively prevents the engine 10 from being used in an undesired manner, that is, prevents gasoline from being excessively consumed. This control procedure is described below as a first modification of the fourth embodiment.

Figure 35:
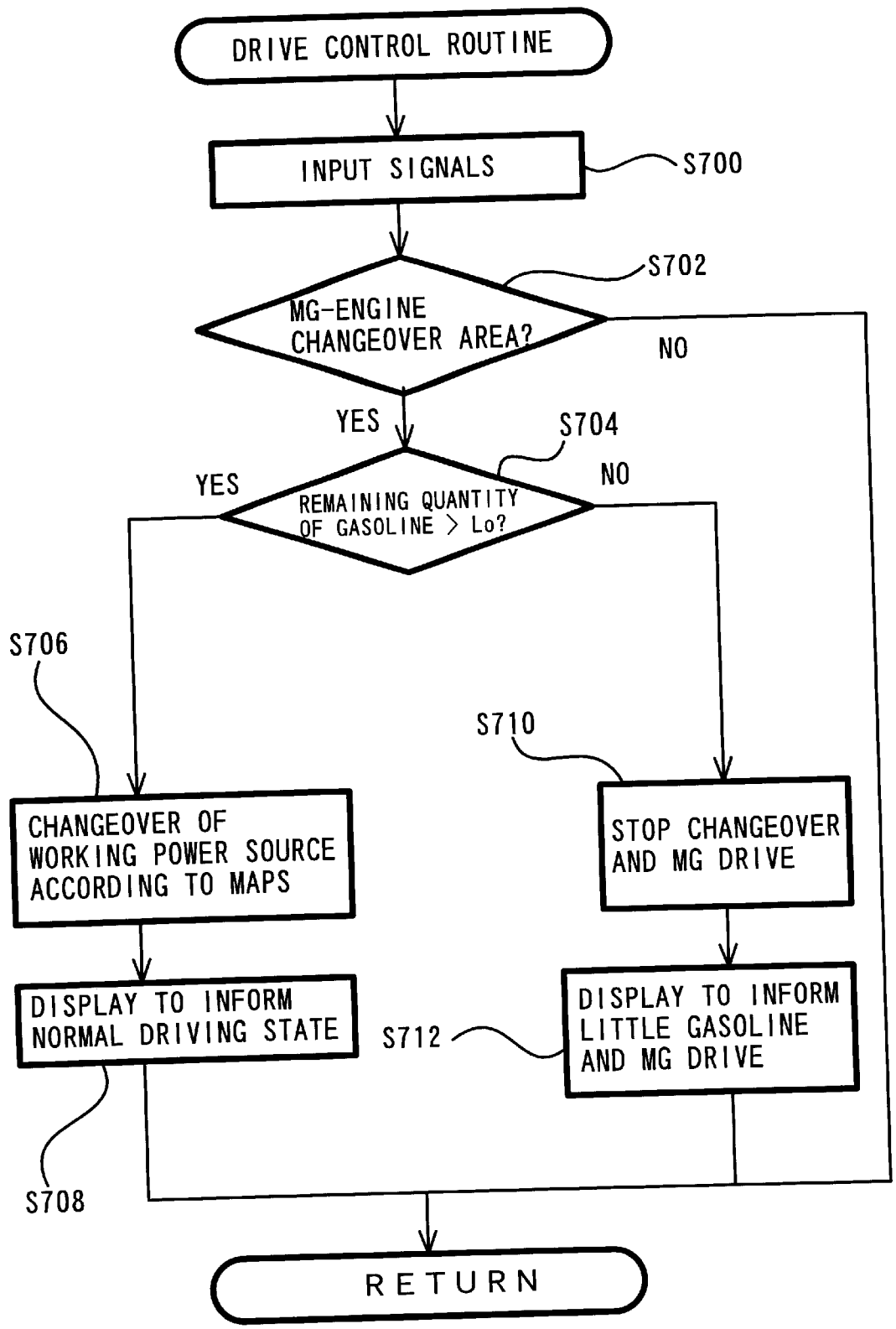
FIG. 35 is a flowchart showing another drive control routine as a first modification of the fourth embodiment.

FIG. 35 is a flowchart showing a drive control routine executed in the first modification of the fourth embodiment. This routine is carried out when the vehicle is accelerated gradually from the low speed. When the program enters the routine of FIG. 35, the CPU of the control unit 70 first receives the input signals at step S700 and determines whether or not the current driving state of the vehicle is included in a changeover area from MG drive to engine drive at step S702. The decision of step S702 is based on the maps of FIGS. 8 through 11. In the case where the driving state of the vehicle does not reach the changeover area, the current driving state, that is, the MG drive, should be continued. The CPU accordingly exits from the drive control routine of FIG. 35 without any further processing.

In the case where the driving state of the vehicle reaches the changeover area from the MG drive to the engine drive, the CPU determines whether or not the changeover should be carried out actually according to the remaining quantity of gasoline. The remaining quantity of gasoline is thus compared with the predetermined reference value Lo at step S704. When it is determined at step S704 that there is a sufficient quantity of gasoline, the working power source is suitably selected between the engine 10 and the motor 20 according to the maps of FIGS. 8 through 11, which are set as the basic drive patterns, at step S706. In the same manner as the drive control process of the fourth embodiment, the CPU then makes a display to inform the driver that the hybrid vehicle is in the normal driving state at step S708.

When it is determined at step S704 that the remaining quantity of gasoline is not greater than the predetermined reference value Lo, on the other hand, the use of the engine 10 is restricted. Even when the driving state of the vehicle recommends the changeover of the working power source to the engine 10 according to the maps of FIGS. 8 through 11, the CPU stops the changeover to the engine 10 and continues the MG drive at step S710. In the same manner as the drive control process of the fourth embodiment, the CPU then makes a display to inform the driver that the remaining quantity of gasoline is little and that the hybrid vehicle runs by the MG drive at step S712.

The drive control process of the first modification discussed above adequately controls the changeover of the working power source to the engine 10 according to the remaining quantity of gasoline. Like the technique of the fourth embodiment, the technique of the first modification effectively prevents the excessive consumption of gasoline and enables the power sources to be used efficiently. In the case of little gasoline, the control procedure of the first modification forbids the changeover of the working power source to the engine 10. Unlike the fourth embodiment, the technique of the first modification protects the driver from an abrupt variation in drive feeling and an unexpected shock without considering the difference between the output torques of the engine 10 and the motor 20.

In the drive control process of the first modification, the reference value Lo may be set arbitrarily by taking into account the various factors discussed in the fourth embodiment. The control procedure of the first modification controls the changeover of the working power source to the engine 10, in order to prevent the failure of continuous drive of the engine 10 due to the shortage of gasoline. It is accordingly desirable to set a relatively large value to the reference value Lo. This arrangement allows the changeover of the working power source to the engine 10 only when a sufficiently quantity of gasoline remains to ensure the continuous drive of the engine 10. This accordingly attains the drive fitting the favorable drive feeling of the driver. The reference value Lo may be a fixed value or may alternatively be varied according to a variety of parameters relating to the drive of the vehicle.

The control procedure of the first modification forbids the drive of the engine 10 once the remaining quantity of gasoline decreases to or below the predetermined reference value Lo, unless another supply of gasoline is fed to the hybrid vehicle. A diversity of other techniques may, however, be applicable for the processing carried out when the remaining quantity of gasoline is not greater than the predetermined reference value Lo. One available technique carries out the changeover of the working power source to the engine 10 when the driver steps on the accelerator pedal to a preset depth to show a true requirement of the output of high torque.

H2. Second Modification of Fourth Embodiment

The first modification refers to the structure of controlling the changeover of the working power source to the engine 10 based on only the remaining quantity of gasoline. Another possible procedure controls the changeover by taking into account of the output torques of the engine 10 and the motor 20 as well as the remaining quantity of gasoline. This control procedure is described below as a second modification of the fourth embodiment.

Figure 36:
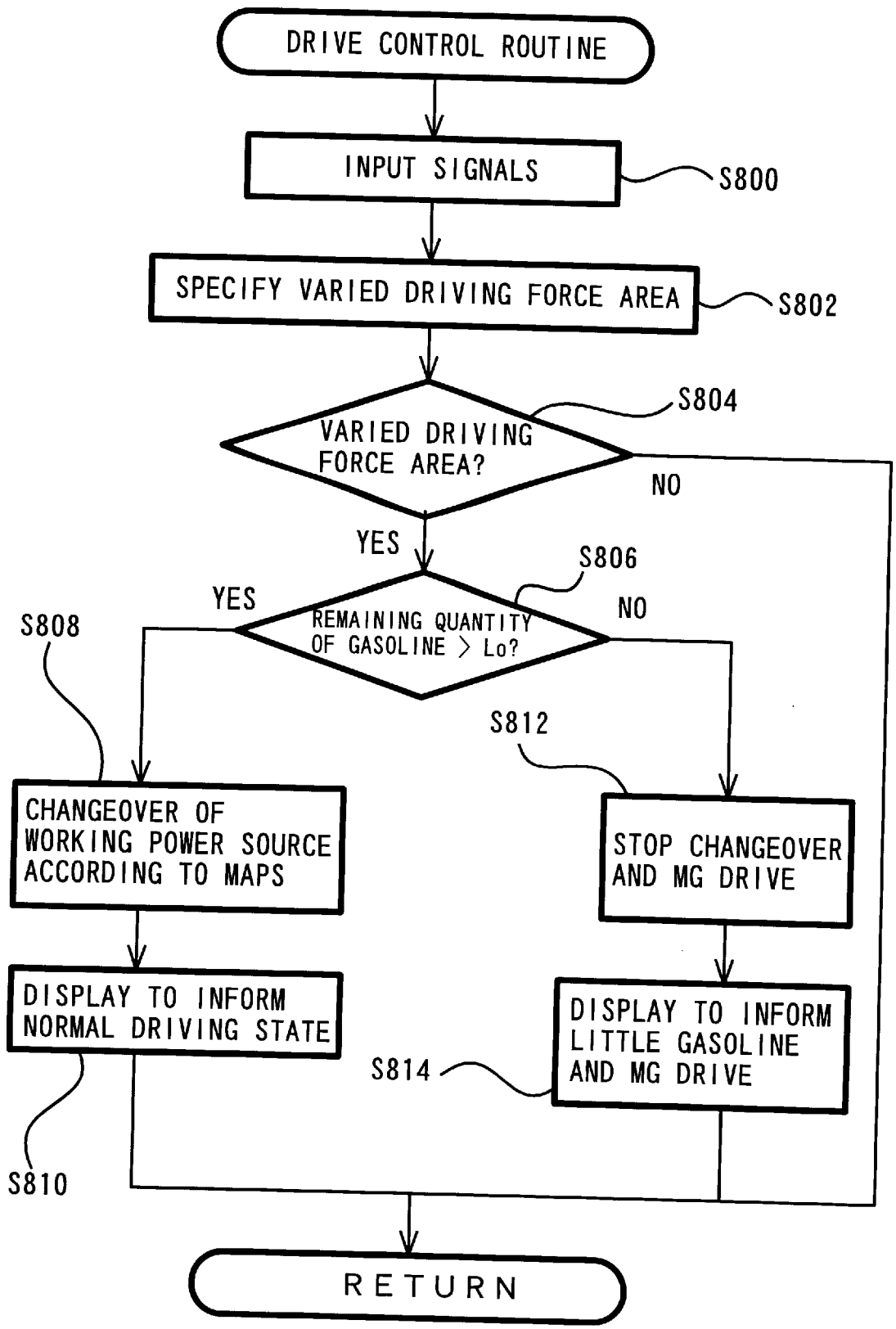
FIG. 36 is a flowchart showing still another drive control routine as a second modification of the fourth embodiment.

FIG. 36 is a flowchart showing a drive control routine executed in the second modification of the fourth embodiment. This routine is also carried out when the vehicle is accelerated gradually from the low speed. When the program enters the routine of FIG. 36, the CPU of the control unit 70 first receives the input signals at step S800 and specifies a varied driving force area based on the input signals at step S802.

The varied driving force area is synonymous with the varying torque area discussed in the fourth embodiment. The varying torque area in the fourth embodiment represents a relatively fixed area set in advance in the form of a map. The varied driving force area in the second modification, on the other hand, represents an area dynamically varying according to the working conditions of the respective constituents of the vehicle. This is the reason of the different terminology.

As described previously in the fourth embodiment, in the varied driving force area, the difference between the output torque of the engine 10 and the output torque of the motor 20 is not a negligible level. The varied driving force area is substantially equal to the engine drive area in the maps of FIGS. 8 through 11. The varied driving force area is affected by the quantity of electric power supplied from the fuel cell 60 or the battery 50 to the motor 20, the warm-up state of the fuel cell 60 and the engine 10, and the gear ratio used for the drive. The processing of step S802 specifies the varied driving force area by taking into account such effects. The concrete procedure of the second modification provides maps for setting the varied driving force area corresponding to a variety of conditions and interpolates a suitable one of the maps to specify the varied driving force area.

At subsequent step S804, the CPU determines whether or not the current driving state of the vehicle is included in the varied driving force area thus specified. When the vehicle is accelerated gradually from the low speed, the driving state of the vehicle is first within an even driving force area, in which the equivalent torques are output from the motor 20 and the engine 10. With an increase in vehicle speed, the driving state shifts to the varied driving force area. The processing of step S804 thus determines whether or not the driving state of the vehicle has shifted from the even driving force area to the varied driving force area. When it is determined at step S804 that the current driving state of the vehicle has not yet been shifted to the varied driving force area but still remains in the even driving force area, the changeover of the working power source to the engine 10 is not required. The CPU accordingly exits from the drive control routine of FIG. 36 without any further processing.

When it is determined at step S804 that the current driving state of the vehicle is included in the varied driving force area, on the other hand, in the same manner as the drive control process of the first modification, the control procedure of the second modification controls the changeover of the working power source to the engine 10 according to the remaining quantity of gasoline. The CPU thus compares the remaining quantity of gasoline with the predetermined reference value Lo at step S806. In the case where the remaining quantity of gasoline is greater than the predetermined reference value Lo, the changeover of the working power source to the engine 10 is carried out according to the maps of FIGS. 8 through 11 at step S808. In the same manner as the drive control process of the fourth embodiment, the CPU then makes a display to inform the driver that the hybrid vehicle is in the normal driving state at step S810.

When it is determined at step S806 that the remaining quantity of gasoline is not greater than the predetermined reference value Lo, on the other hand, the use of the engine 10 is restricted. Even when the driving state of the vehicle recommends the changeover of the working power source to the engine 10 according to the maps of FIGS. 8 through 11, the CPU stops the changeover to the engine 10 and continues the MG drive at step S812. In the same manner as the drive control process of the fourth embodiment, the CPU then makes a display to inform the driver that the remaining quantity of gasoline is little and that the hybrid vehicle runs by the MG drive at step S814.

The drive control process of the second modification exerts the same effects as those of the drive control process of the first modification. The changeover of the working power source to the engine 10 is carried out only when the driving state of the vehicle has shifted to the varied driving force area. This arrangement ensures the preferential use of the motor 20 and thereby reduces the consumption of gasoline. This accordingly implements the effective use of the power sources and improves the driving efficiency and the environmental properties of the hybrid vehicle.

The techniques of the above embodiments and their modifications control the output characteristics of the fuel cell 60, based on at least one of the output sustaining ability of the fuel cell 60 and its rate of change, thereby improving the driving efficiency and the environmental properties of the hybrid vehicle. In these embodiments and modifications, the remaining quantity of the FC fuel is used as the parameter to define the output sustaining ability of the fuel cell 60. A variety of other parameters, for example, the temperature of the fuel cell 60, may also be used as the parameter.

I. Fifth Embodiment

I1. Structure of System

Figure 37:
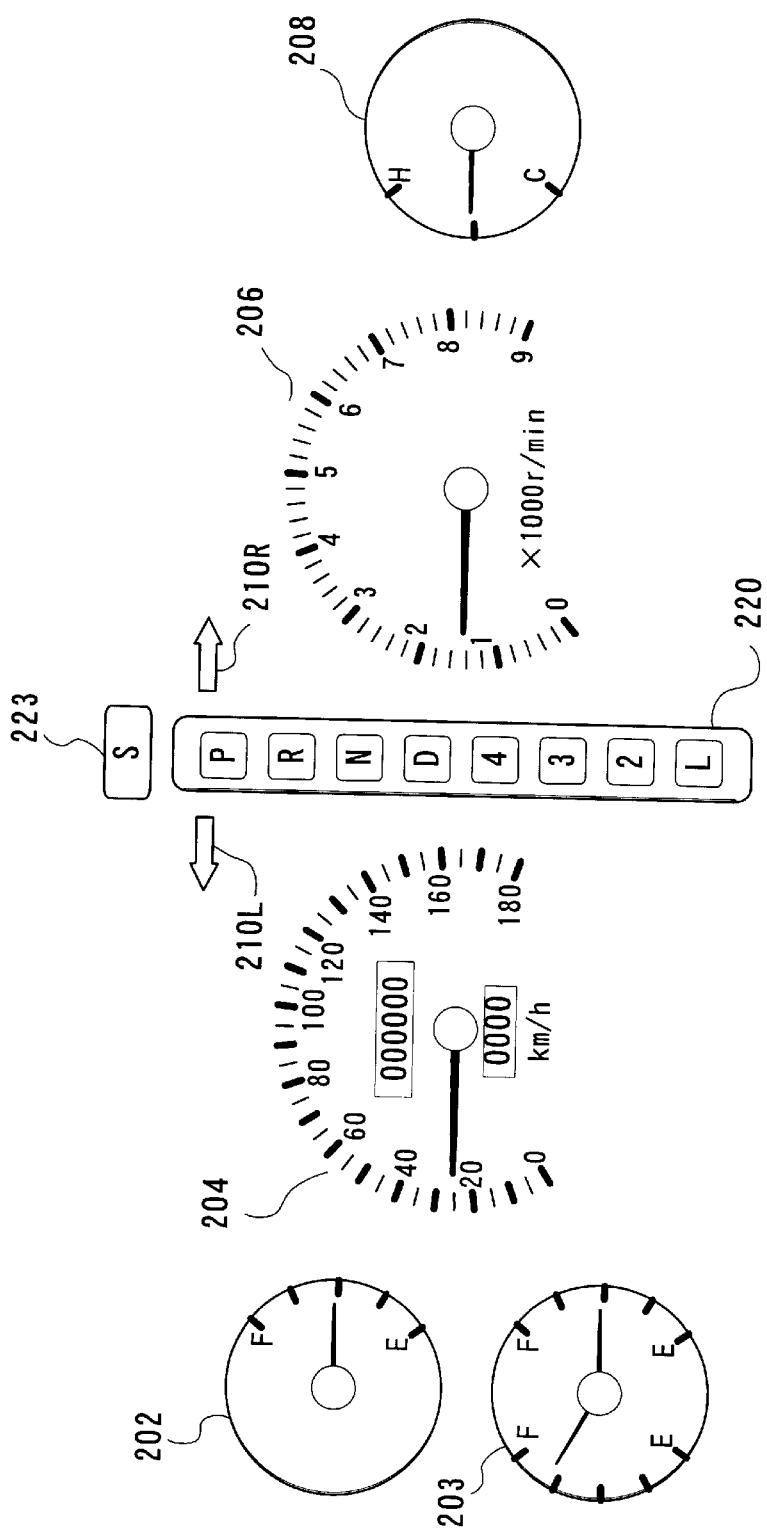
FIG. 37 shows an instrument panel in a hybrid vehicle of a fifth embodiment according to the present invention.

The following describes a fifth embodiment according to the present invention. The hybrid vehicle of the fifth embodiment has the same hardware structure as that of the hybrid vehicle of the first embodiment shown in FIG. 1. As discussed in the first embodiment and shown in FIG. 5, the operation unit 160 has the sports mode switch 163. When the sports mode switch 163 is in ON position, the maps are modified to set the lower speeds to the change-speed gear. The selection of the sports mode is displayed on an instrument panel in the hybrid vehicle. FIG. 37 shows the instrument panel in the hybrid vehicle of the fifth embodiment. A sports mode indicator 223 is provided above the gearshift position indicator 220 on the substantial center of the instrument panel. The sports mode indicator 223 lights up when the sports mode switch 163 is set on.

I2. EV Drive Control Process

Figure 38:
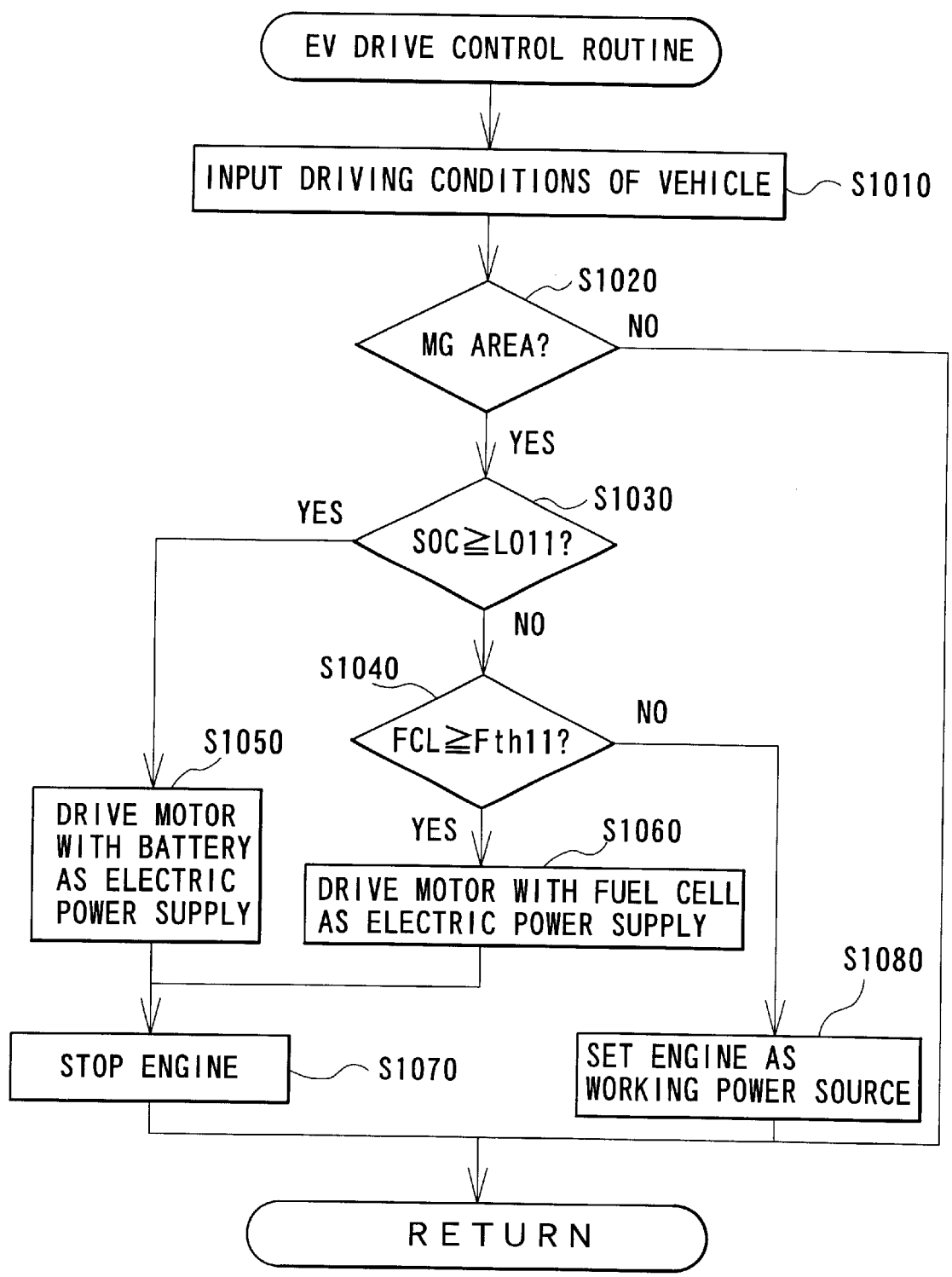
FIG. 38 is a flowchart showing an EV drive control routine executed in the fifth embodiment.

FIG. 38 is a flowchart showing an EV drive control routine executed in the fifth embodiment. The CPU of the control unit 70 periodically executes this routine at preset time intervals. When the program enters the EV drive control routine of FIG. 38, the CPU first receives the inputs regarding the driving conditions of the vehicle at step S1010 and determines whether or not the current driving state of the vehicle corresponds to the MG area according to the maps of FIGS. 8 through 11 discussed in the first embodiment at step S1020. When it is determined at step S1020 that the current driving state of the vehicle does not correspond to the MG area, the CPU exits from the EV drive control routine of FIG. 38 without any further processing.

When it is determined at step S1020 that the current driving state of the vehicle corresponds to the MG area, on the other hand, the CPU carries out the processing to properly use the battery 50 and the fuel cell 60 as the working electric power supply. For the proper use of the working electric power supply between the battery 50 and the fuel cell 60, the CPU compares the observed remaining charge SOC of the battery 50 with a predetermined reference value LO11 at step S1030. The reference value LO11 is arbitrarily set according to the factors discussed previously with FIG. 16.

In the case where the remaining charge SOC of the battery 50 is not less than the predetermined reference value LO11 at step S1030, it is determined that the battery 50 has a high charge level. The CPU accordingly drives the motor 20 with the battery 50 as the working electric power supply at step S1050, and stops the operation of the engine 10 at step S1070, in order to use only the motor 20 as the working power source.

In the case where the remaining charge SOC of the battery 50 is less than the predetermined reference value LO11 at step S1030, on the other hand, it is determined that the battery 50 has a low charge level and forbids the output of electric power from the battery 50. The control process then determines whether or not the fuel cell 60 is available for the electric power supply. For this purpose, the observed remaining quantity FCL of the FC fuel for the fuel cell 60 is compared with a predetermined level Fth11 at step S1040. The predetermined level Fth11 is arbitrarily set according to the factors discussed in the first embodiment. When the remaining quantity FCL of the FC fuel is not less than the predetermined level Fth11 at step S1040, it is determined that the fuel cell 60 is available for the electric power supply. The CPU accordingly drives the motor 20 with the fuel cell 60 as the working electric power supply at step S1060. Simultaneously the CPU sets the target driving conditions of the motor 20 in the same manner as the processing of step S60 in the EV drive control routine of the first embodiment. The CPU then stops the operation of the engine 10 at step S1070, in order to use only the motor 20 as the working power source.

When the remaining quantity FCL of the FC fuel is less than the predetermined level Fth11 at step S1040, on the other hand, the use of the fuel cell 60 for the electric power supply is forbidden. In this case, there is no available electric power supply. Although the driving state of the vehicle is within the MG area, the CPU gives up the EV drive using the motor 20 as the working power source and drives the hybrid vehicle with the engine 10 as the working power source at step S1080. The CPU repeatedly executes the series of the processing, so as to control the drive in the MG area.

Figure 39:
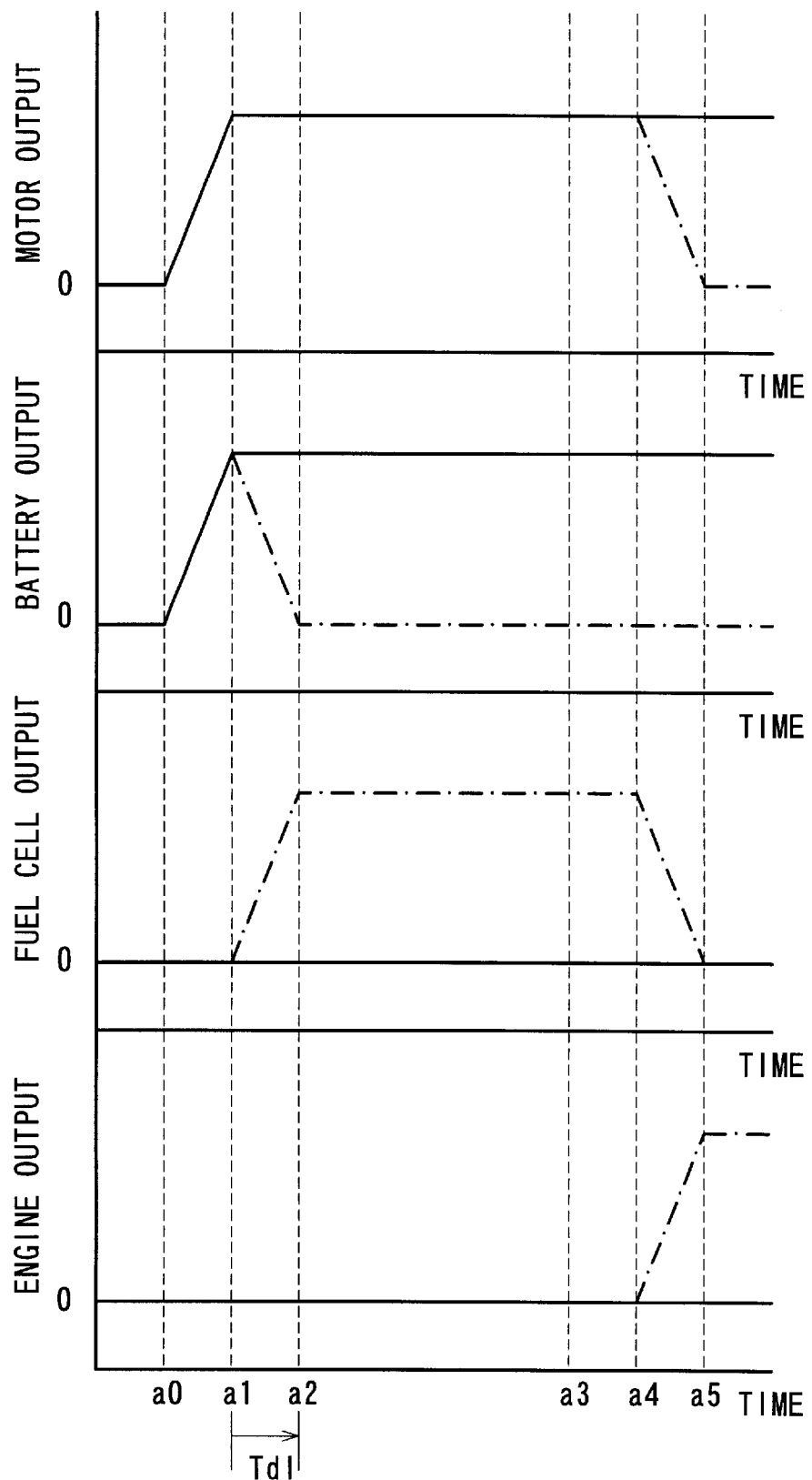
FIG. 39 shows variations in outputs from the respective power sources and electric power supplies in the EV drive control process.

FIG. 39 shows variations in outputs from the respective power sources and electric power supplies in the EV drive control process. The graphs of FIG. 39 show variations in output of the motor 20, output of the battery 50, output of the fuel cell 60, and output of the engine 10 with the elapse of time in the case where the hybrid vehicle, which has been at a stop, starts the EV drive. At a time point a0, the hybrid vehicle starts the EV drive. It is assumed that the remaining charge SOC of the battery 50 is not less than the predetermined reference value LO11 at this moment. Under such conditions, the EV drive of the hybrid vehicle starts with the battery 50 as the working electric power supply. After the time point a0, the motor output and the battery output thus respectively rise to preset levels. Since neither the fuel cell 60 nor the engine 10 is used at this moment, the fuel cell output and the engine output are kept equal to zero.

At a time point a1, the motor output reaches a required level. The graphs of the solid line show the variations in the case where the battery 50 still has a sufficient level of remaining charge SOC after the time point a1. In this case, the motor output reaches plateau at the required level, and the battery output also has a fixed value. Neither the fuel cell 60 nor the engine 10 is used yet, so that the fuel cell output and the engine output are kept equal to zero.

The graphs of the one-dot chain line show the variations in the case where the remaining charge SOC of the battery 50 becomes less than the predetermined reference value LO11 at the time point a1. In this case, the working electric power supply used to drive the motor 20 is changed from the battery 50 to the fuel cell 60. The fuel cell 60 starts driving at the time point a1, but has a relatively slow rise of the output. At a time point a2, the electric power output from the fuel cell 60 reaches a sufficient level. During a time delay Td1 between the time point a1 and the time point a2, in which the output of electric power from the fuel cell 60 does not reach the sufficient level, the electric power of the battery 50 is used to compensate for the insufficiency of electric power. As shown by the graph of the one-dot chain line, the electric power of the battery 50 is thus not discontinuously lowered to zero at the time point a1, but gradually decreases to zero in the time delay Td1. After the time point a2, the motor 20 is driven only with the fuel cell 60 as the working electric power supply.

At a time point a4, the remaining quantity FCL of the FC fuel becomes less than the predetermined level Fth11. Under such conditions, the operation of the motor 20 is stopped, and the working power source used to drive the hybrid vehicle is changed from the motor 20 to the engine 10. As shown by the graphs of the one-dot chain line, the output of the motor 20 decreases while the output of the engine 10 increases in a time period between the time point a4 and a time point a5. The graphs of FIG. 39 show only an example. The respective outputs vary according to a variety of patterns; for example, the motor output is varied in the course of the EV drive using the motor 20 as the working power source.

The EV drive control process of the fifth embodiment enables the hybrid vehicle to run by the EV drive in the MG area by selectively using the battery 50 and the fuel cell 60. In the case of the high charge level of the battery 50, the battery 50 is used as the electric power supply, irrespective of the remaining quantity FCL of the FC fuel for the fuel cell 60. In the structure of the fifth embodiment, the battery 50 is used preferentially over the fuel cell 60 as the working electric power supply. When both the battery 50 and the fuel cell 60 are not available for the electric power supply, the hybrid vehicle drives with the engine 10 as the power source.

The battery 50 may be charged with electric power during a run of the hybrid vehicle, so as to be recovered to the original charge level before the consumption. The EV drive control process preferentially uses the reversible electric power supply, that is, the battery 50, and thereby restricts the use of the irreversible electric power supply, that is, the fuel cell 60. Namely this arrangement saves the FC fuel for the desired driving state of the fuel cell 60. The control procedure of the fifth embodiment ensures the appropriate use of the electric power supplies in a wide drive range, thereby enabling the power source of high driving efficiency and excellent environmental properties to be sufficiently used.

The control process of the fifth embodiment preferentially uses the electric power of the battery 50 and thereby improves the energy efficiency of the vehicle. In the hybrid vehicle of the fifth embodiment, the motor 20 carries out the regenerative operation, so as to enable the kinetic energy of the vehicle to be regenerated in the form of electric power in the course of braking. In the case where the remaining charge SOC of the battery 50 is close to the full charge level, most part of the regenerative electric power can not be accumulated in the battery 50. Namely the kinetic energy of the vehicle is not efficiently utilized. The control procedure of this embodiment, on the other hand, preferentially uses the electric power of the battery 50. This enables a large portion of the regenerative electric power to be accumulated in the battery 50 and used for a subsequent drive. The control process of the fifth embodiment thus improves the energy efficiency of the hybrid vehicle.

I3. Auxiliary Machinery Drive Control Process

Figure 40:
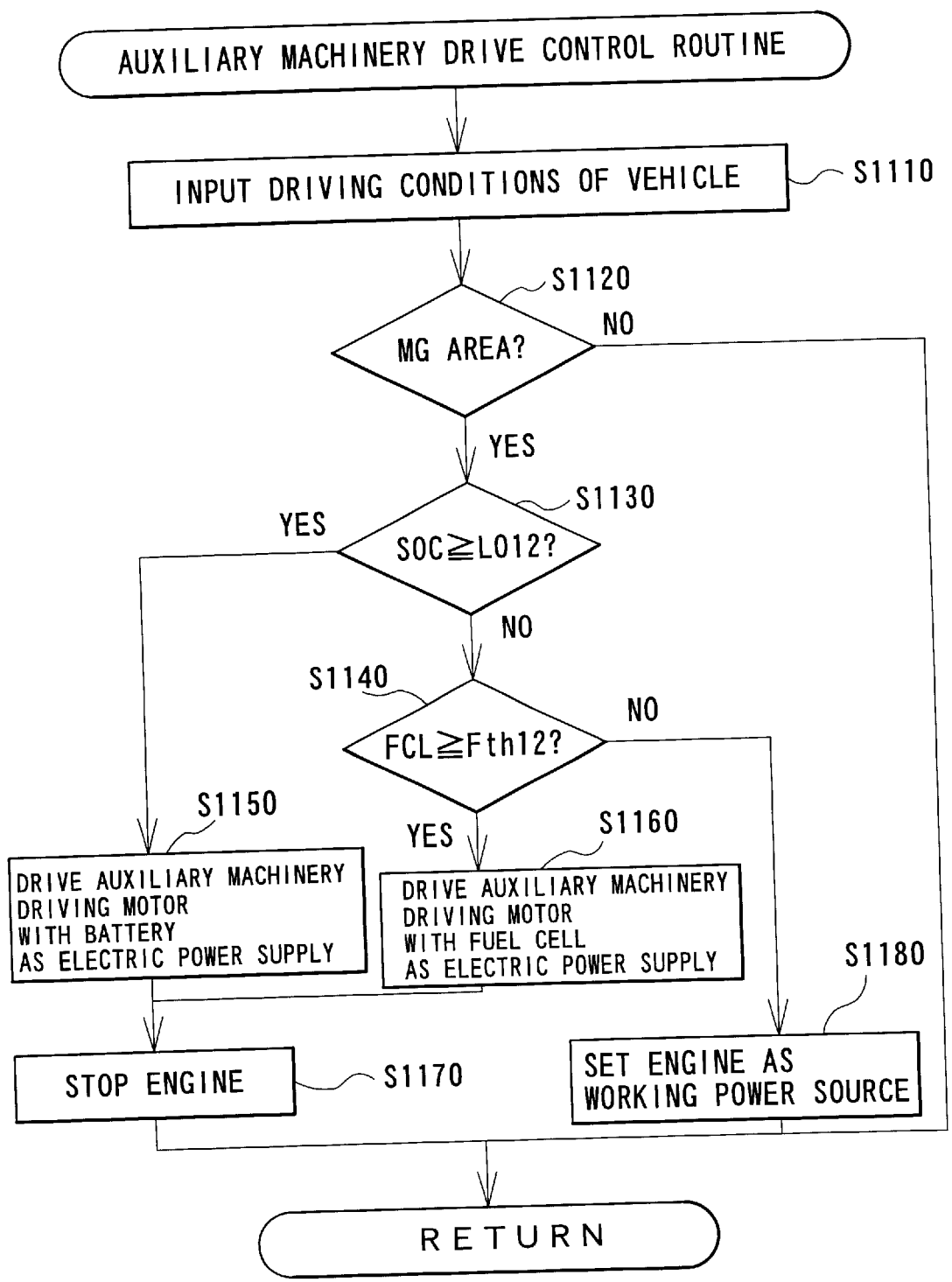
FIG. 40 is a flowchart showing an auxiliary machinery drive control routine executed in the fifth embodiment.

FIG. 40 is a flowchart showing an auxiliary machinery drive control routine executed in the fifth embodiment. The auxiliary machinery drive control routine controls the use of the power sources and the electric power supplies to drive the power-driven auxiliary machinery 82. This routine is periodically executed by the CPU in the control unit 70 at preset time intervals. When the program enters the routine, the CPU first receives the inputs regarding the driving conditions of the vehicle at step S1110.

The CPU then determines whether or not the current driving state of the vehicle corresponds to the MG area at step S1120. When the current driving state does not correspond to the MG area, it means that the engine 10 is working to drive the hybrid vehicle. In this case, the power-driven auxiliary machinery 82 can be driven with the power of the engine 10. The CPU thus exits from the auxiliary machinery drive control routine of FIG. 40 without any further processing.

When it is determined at step S1120 that the current driving state corresponds to the MG area, on the other hand, the operation of the engine 10 is stopped in principle. While the engine 10 is at a stop, it is still required to drive the auxiliary machines, such as the air-conditioner and the power steering. In the MG area, if there is an available electric power supply, the power-driven auxiliary machinery 82 is driven with the auxiliary machinery driving motor 80. The CPU thus carries out the processing to selectively use the battery 50 and the fuel cell 60 for the working electric power supply to drive the auxiliary machines. For the proper use of these electric power supplies, the CPU compares the observed remaining charge SOC of the battery 50 with a predetermined reference value LO12 at step S1130. The reference value LO12 is set arbitrarily according to the factors discussed in the first embodiment.

In the case where the remaining charge SOC of the battery 50 is not less than the predetermined reference value LO12 at step S1130, the CPU determines that the battery 50 has a high charge level. The CPU accordingly drives the auxiliary machinery driving motor 80 with the battery 50 as the working electric power supply at step S1150 and stops the operation of the engine 10 at step S1170. In the process of stopping the operation of the engine 10, the input clutch 18 is coupled to prepare for the requirement of the subsequent output of power from the engine 10 to the axle 17.

In the case where the remaining charge SOC of the battery 50 is less than the predetermined reference value LO12 at step S1130, on the other hand, the CPU determines that the battery 50 has a low charge level and does not allow the use of the battery 50 for the working electric power supply. The CPU then determines whether or not the fuel cell 60 is available for the electric power supply. For the purpose of the determination, the CPU compares the observed remaining quantity FCL of the FC fuel for the fuel cell 60 with a predetermined level Fth12 at step S1140. The predetermined level Fth12 is set arbitrarily according to the factors discussed in the first embodiment. In the case where the remaining quantity FCL of the FC fuel is not less than the predetermined level Fth12 at step S1140, the CPU determines that the fuel cell 60 is available for the working electric power supply. The CPU accordingly drives the auxiliary machinery driving motor 80 with the fuel cell 60 as the electric power supply at step S1160 and stops the operation of the engine 10 at step S1170.

In the case where the remaining quantity FCL of the FC fuel for the fuel cell 60 is less than the predetermined level Fth12 at step S1140, on the other hand, the CPU does not allow the use of the fuel cell 60 for the working electric power supply. In this case, there is no available electric power supply. The CPU accordingly drives the power-driven auxiliary machinery 82 with the engine 10 as the power source at step S1180. The CPU repeatedly executes the series of the processing, so as to control the operation of the power-driven auxiliary machinery 82.

The processing of step S1180 causes the engine 10 to be driven, but it is not always required to output the power of the engine 10 to the axle 17. For example, while the hybrid vehicle is at a stop, the output of power from the engine 10 to the axle 17 is not required. It is, however, required to drive the power-driven auxiliary machinery 82 even while the hybrid vehicle is at a stop. In the technique of the fifth embodiment, the processing of step S1180 also regulates the input clutch 18 disposed between the engine 10 and the motor 20. Namely the procedure determines whether or not the output of power from the engine 10 to the axle 17 is required, and couples the input clutch 18 in the case where the output of power is required. The procedure releases the input clutch 18, on the contrary, in the case where the output of power is not required. The object of this control is to enable the engine 10 to drive the power-driven auxiliary machinery 82 efficiently. One possible modification keeps the input clutch 18 in the coupling state, irrespective of the requirement of the power output to the axle 17.

In the case of the activation of the engine 10 at step S1180, the power required to charge the battery 50, in addition to the required driving power corresponding to the auxiliary machine of interest, should be set as the target driving conditions of the engine 10. When it is required to drive the engine 10 at step S1180, the remaining charge SOC of the battery 50 is less than the predetermined reference value LO12 while the remaining quantity FCL of the FC fuel for the fuel cell 60 is less than the predetermined level Fth12. Namely neither the battery 50 nor the fuel cell 60 is available for the working electric power supply. The engine 10 is accordingly driven to charge the rechargeable battery 50 and make the battery 50 ready for the future use as the electric power supply. The power of the engine 10 is transmitted to the auxiliary machinery driving motor 80 via the power-driven auxiliary machinery 82. The auxiliary machinery driving motor 80 is thus driven with the power of the engine 10 to generate electric power and charge the battery 50 with the generated electric power. In this state, the changeover switch 83 of the electric power supplies is connected to the battery 50.

When the remaining charge SOC of the battery 50 is recovered to the sufficient charge level with the elapse of time after the drive of the power-driven auxiliary machinery 82 with the engine 10 starts, the working power source to drive the auxiliary machine is changed again from the engine 10 to the auxiliary machinery driving motor 80 using the battery 50 as the electric power supply. The control procedure, however, carries out the changeover of the working power source from the engine 10 to the auxiliary machinery driving motor 80 after the sufficient recovery of the charge level of the battery 50, in order to prevent the frequent changeover of the working power source between the engine 10 and the auxiliary machinery driving motor 80. For this purpose, the reference value LO12 used as the criterion of the determination at step S1130 is varied to a sufficiently large value, which allows the continuous operation of the auxiliary machinery driving motor 80 for a predetermined time period. The varied reference value LO12 is returned to the original value at step S1130 at the time point when the drive of the auxiliary machinery driving motor 80 with the battery 50 as the electric power supply resumes.

Figure 41:
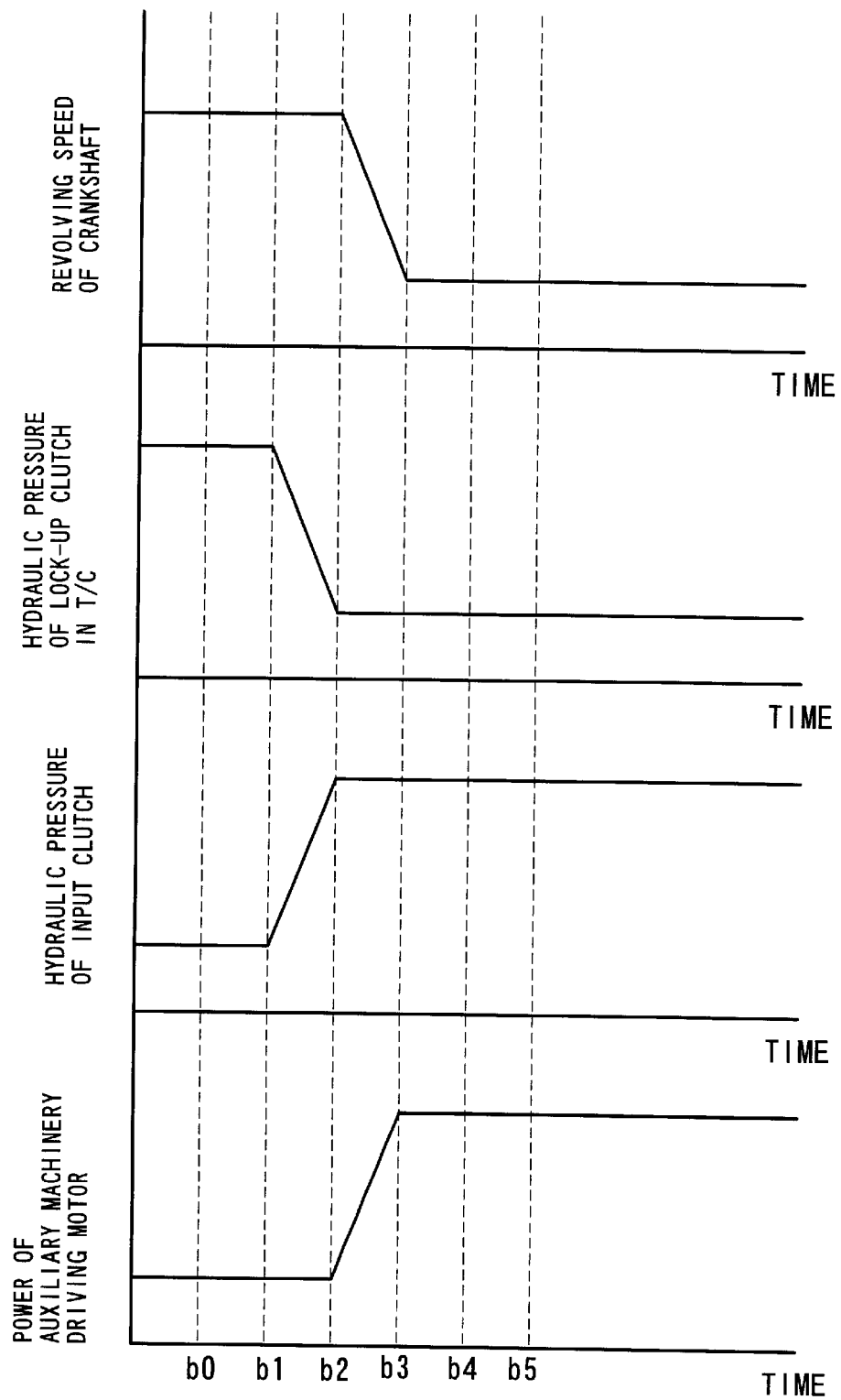
FIG. 41 shows the process of changing over the working power source in the auxiliary machinery drive control process.

FIG. 41 shows the process of changing over the working power source in the auxiliary machinery drive control process. The graphs of FIG. 41 show variations in revolving speed of the crankshaft 12 of the engine 10, hydraulic pressure of the lock-up clutch in the torque converter 30, hydraulic pressure of the input clutch 18, and power of the auxiliary machinery driving motor 80 with the elapse of time in the process of changing the working power source to drive the power-driven auxiliary machinery 82 from the engine 10 to the auxiliary machinery driving motor 80. At a time point b1, the decision is made to change over the working power source to drive the auxiliary machine from the engine 10 to the auxiliary machinery driving motor 80. This corresponds to the execution of the processing at step S1150, based on the result of the decision at step S1130 in the flowchart of FIG. 40.

While the power-driven auxiliary machinery 82 is driven with the engine 10 as the power source, the input clutch 18 is released as described previously. When the power-driven auxiliary machinery 82 is driven by means of the auxiliary machinery driving motor 80, on the other hand, the input clutch 18 is coupled to prepare for the output of power to the axle 17. As shown by the graph of FIG. 41, the hydraulic pressure of the input clutch 18 increases after the time point b1, so that the engine 10 is connected to the motor 20. At this moment, the engine 10 is still being rotated. The direct linkage of the engine 10 with the motor 20 may thus cause an unexpected torque to be output to the axle. Simultaneously with the coupling of the input clutch 18, the control procedure accordingly reduces the hydraulic pressure of the lock-up clutch in the torque converter 30, so as to release the lock-up clutch. The release of the lock-up clutch causes a slip between the input shaft and the output shaft of the torque converter 30, thereby avoiding the problems discussed above. At a time point b2, the coupling of the input clutch 18 and the release of the lock-up clutch are completed. At this time point, the control procedure stops the operation of the engine 10 and starts the operation of the auxiliary machinery driving motor 80. The power-driven auxiliary machinery 82 is then driven with the power of the auxiliary machinery driving motor 80.

The following describes the setting of the reference value LO12 with FIG. 16 discussed in the first embodiment. In the same manner as the EV drive control process of the first embodiment, the low charge level SOC3 shown in FIG. 16 is set to the reference value LO12 by taking into account the marginal charge in the course of regenerative braking, the electric power required in the transient period when the working electric power supply is being changed to the fuel cell 60, and the reduced consumption of the FC fuel for the fuel cell 60. The auxiliary machinery drive control process varies the reference value LO12 to allow the charging of the battery 50 while the power-driven auxiliary machinery 82 is driven with the engine 10. In this case, the high charge level SOC1 shown in FIG. 16 is set to the reference value LO12.

The auxiliary machinery drive control routine of FIG. 40 is periodically executed as mentioned previously. The auxiliary machinery drive control routine is accordingly executed after it has been determined that there is no available electric power supply in the previous cycle of the routine and the drive of the auxiliary machine with the engine 10 has started. It is again determined whether or not the battery 50 is available for the working electric power supply at step S1130. Here it is assumed that the reference value LO12 used as the criterion of the decision is fixed to the low charge level SOC3 shown in FIG. 16. Even the slight charging of the battery 50 with the power of the engine 10 causes the remaining charge SOC of the battery 50 to reach or exceed the reference value SOC3. As a result, it is determined at step S1130 that the battery 50 is available for the working electric power supply. The procedure accordingly stops the drive of the auxiliary machine by means of the engine 10 and the charging of the battery 50, and causes the auxiliary machine to be driven by means of the auxiliary machinery driving motor 80 using the battery 50 as the electric power supply. The remaining charge SOC of the battery 50 is however, only a little greater than the reference value SOC3. The consumption of electric power by driving the auxiliary machinery driving motor 80 then causes the remaining charge SOC of the battery 50 to decrease to or below the reference value SOC3 within a very short time. Setting the fixed value SOC3 to the reference value LO12 thus undesirably causes the frequent change of the working power source between the engine 10 and the auxiliary machinery driving motor 80 using the electric power of the battery 50.

The control procedure of the fifth embodiment, however, varies the reference value LO12 from the low charge level SOC3 to the high charge level SOC1 shown in FIG. 16, at the time point when charging the battery 50,with the engine 10 has started. This ensures the continuous charge of the battery 50 until the remaining charge SOC of the battery 50 reaches or exceeds the high charge level SOC1. When the remaining charge SOC of the battery 50 reaches or exceeds the reference value SOC1, the drive of the auxiliary machinery driving motor 80 starts with the battery 50 as the electric power supply, based on the result of the decision at step S1130. At the time point when the drive of the auxiliary machinery driving motor 80 starts, the reference value LO12 is returned to the low charge level SOC shown in FIG. 16. This arrangement ensures the continuous drive of the auxiliary machinery driving motor 80 until the remaining charge SOC of the battery 50 decreases to or below the low charge level SOC3. This gives a kind of hysteresis to the setting of the reference value LO12. The arrangement of the fifth embodiment accordingly enables the smooth change of the working power source between the engine 10 and the auxiliary machinery driving motor 80.

The maximum charging capacity of the battery 50 may be set to the reference value LO12 during the charging operation. Setting such a high reference value LO12, however, undesirably lengthens the operation time of the engine 10, which leads to disadvantages of the poor fuel consumption and environmental properties. In some cases, the auxiliary machinery drive control routine is ended and the hybrid vehicle starts driving in the course of charging the battery 50. Setting the high reference value LO12 may reduce the margin for charging the battery 50 with the regenerative electric power after the start of the drive. By taking into account these factors, the control procedure of this embodiment sets a high charge level, which is a little less than the maximum charging capacity, to the reference value LO12 during the charging operation.

The auxiliary machinery drive control process discussed above enables the power-driven auxiliary machinery 82 to be driven in the MG area by selectively using the battery 50 and the fuel cell 60 as the working electric power supply. In the case where the battery 50 has a high charge level, the control procedure of the fifth embodiment uses the battery 50 for the working electric power supply, irrespective of the remaining quantity FCL of the FC fuel for the fuel cell 60. Namely the procedure uses the battery 50 preferentially over the fuel cell 60 for the electric power supply. When neither the battery 50 nor the fuel cell 60 is available for the electric power supply, the power-driven auxiliary machinery 82 is driven with the engine 10 as the power source. Simultaneously with the drive of the auxiliary machine by means of the engine 10 as the power source, the battery 50 may be charged with the power of the engine 10.

The preferential use of the battery 50 over the fuel cell 60 preferably restricts the use of the irreversible electric power supply, that is, the fuel cell 60. Namely this arrangement saves the FC fuel for the desired driving state of the fuel cell 60. The control procedure of the fifth embodiment ensures the appropriate use of the electric power supplies in a wide drive range. The preferential use of the electric power of the battery 50 ensures the margin for charging the battery 50 in the course of regenerative braking, thereby improving the energy efficiency of the vehicle.

I4. Power Assist Control Process

Figure 42:
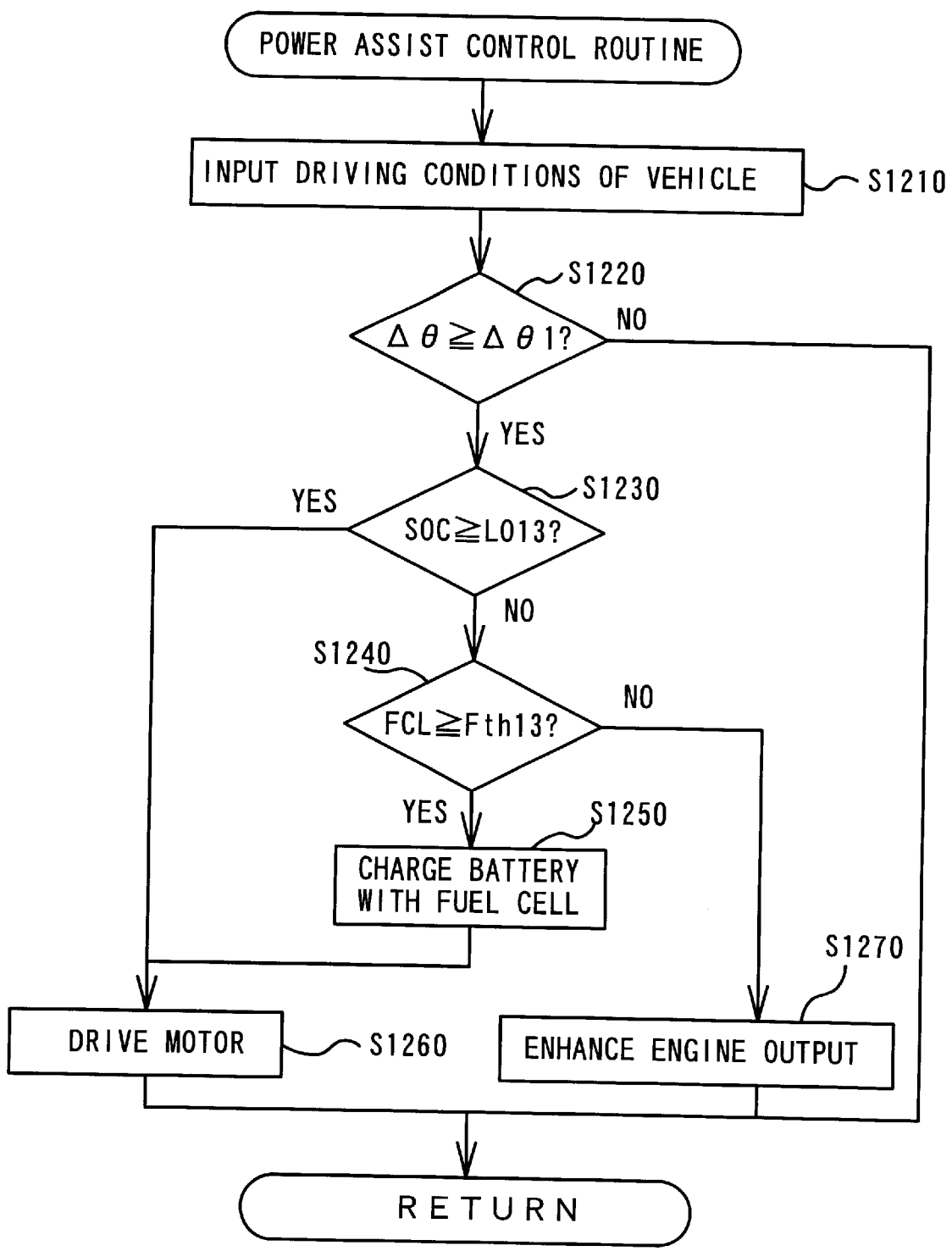
FIG. 42 is a flowchart showing a power assist control routine executed in the fifth embodiment.

FIG. 42 is a flowchart showing a power assist control routine executed in the fifth embodiment. In the hybrid vehicle of the fifth embodiment, the motor 20 may be driven in the course of the engine drive, so as to assist the output of the engine 10 and enable a drive with the output of a high torque. The power assist control routine controls the use of the power sources and the electric power supplies when the high torque is required and the hybrid vehicle runs with both the engine 10 and the motor 20 as the working power sources. The power assist control routine of FIG. 42 is periodically executed by the CPU in the control unit 70 at preset time intervals. When the program enters the routine of FIG. 42, the CPU first receives the inputs regarding the driving conditions of the vehicle at step S1210. The concrete processing of step S1210 receives the inputs from the variety of sensors shown in FIG. 7 discussed in the first embodiment. Among the diversity of inputs, the pieces of information on the gearshift position, the vehicle speed, the accelerator travel, the remaining charge SOC of the battery 50, and the remaining quantity FCL of the FC fuel for the fuel cell 60 are especially involved in the subsequent processing.

The CPU then compares a rate of change $\Delta\theta$ in accelerator travel, that is, a variation in accelerator travel per unit time, with a predetermined value $\Delta\theta 1$ at step S1220. The high torque is required, for example, in the case of the abrupt acceleration of the vehicle. In such cases, the accelerator pedal is abruptly stepped on. The control process of the embodiment thus determines whether or not a high torque is required, based on the rate of change $\Delta\theta$ in accelerator travel. In the case where the rate of change $\Delta\theta$ in accelerator travel is less than the predetermined value $\Delta\theta 1$ at step S1220, the CPU determines that the high torque is not required. This means that the power assist control to drive the motor 20 and assist the output of the engine 10 is not required. The CPU accordingly exits from the power assist control routine of FIG. 42 without any further processing.

In the case where the rate of change $\Delta\theta$ in accelerator travel is not less than the predetermined value $\Delta\theta 1$ at step S1220, the CPU determines that the high torque is required. The CPU thus performs the power assist control with the motor 20 and carries out the processing to selectively use the battery 50 and the fuel cell 60 as the working electric power supply to drive the motor 20. For this purpose, the CPU first compares the observed remaining charge SOC of the battery 50 with a predetermined reference value LO13 at step S1230. The reference value LO13 is set arbitrarily according to the factors discussed in the first embodiment.

In the case where the remaining charge SOC of the battery 50 is not less than the predetermined reference value LO13 at step S1230, the CPU determines that the battery 50 has a high charge level. The CPU accordingly drives the motor 20 with the battery 50 as the electric power supply at step S1260.

In the case where the remaining charge SOC of the battery 50 is less than the predetermined reference value LO13 at step S1230, on the other hand, the CPU determines that the battery 50 has a low charge level and does not allow the use of the electric power accumulated in the battery 50. The CPU then determines whether or not the fuel cell 60 is available for the working electric power supply. For this purpose, the CPU compares the observed remaining quantity FCL of the FC fuel for the fuel cell 60 with a predetermined level Fth13 at step S1240. The predetermined level Fth13 is set arbitrarily according to the factors discussed in the first embodiment. In the case where the remaining quantity FCL of the FC fuel is not less than the predetermined level Fth13 at step S1240, the CPU determines that the fuel cell 60 is available for the working electric power supply and drives the motor 20 with the fuel cell 60 as the electric power supply. The control procedure of the embodiment charges the battery 50 with the electric power of the fuel cell 60 at step S1250 and causes the motor 20 to be driven with the electric power of the battery 50 at step S1260.

The control process of the fifth embodiment charges the battery 50 with the electric power output from the fuel cell 60 by considering the characteristics of the fuel cell 60. As described previously, there is a certain time delay between the start of power generation in the fuel cell 60 and the actual supply of the sufficient electric power. In the power assist control process, there is a high possibility that the power to be output from the motor 20 varies frequently and thereby that the electric power to be output from the working electric power supply varies frequently. The electric power supply should thus output the electric power to sufficiently follow such a frequent variation. The fuel cell 60 having the above time delay, however, can not sufficiently follow such a frequent variation. From this point of view, the control process of the embodiment preferentially uses the battery 50 of good response as the working electric power supply, so that the battery 50 is charged with the electric power of the fuel cell 60. One possible modification connects both the battery 50 and the fuel cell 60 with the motor 20 as the available electric power supplies and regulates the switching operations of the driving circuits 51 and 52. This controls the two electric power supplies to output the electric power with a required response.

In the case where the remaining quantity FCL of the FC fuel for the fuel cell 60 is less than the predetermined level Fth13 at step S1240, on the other hand, the CPU does not allow the use of the fuel cell 60 for the working electric power supply. In this case, there is no available electric power supply. The CPU accordingly enhances the output of the engine 10 to a specific degree corresponding to the level of the power assist control at step S1270. In the case of no available electric power supply, the possible procedure may stop the power assist control, that is, the output of the high torque. In the case of stopping the output of the high torque, however, the response of the vehicle to an identical operation of the accelerator pedal is varied according to the state of the electric power supply. Such a variation undesirably makes the driver feel significantly uneasy. The control process of the embodiment thus enhances the output of the engine 10, in order to attain a substantially fixed response irrespective of the state of the electric power supply. The CPU repeatedly executes the series of the processing, so as to implement the power assist control.

Figure 43:
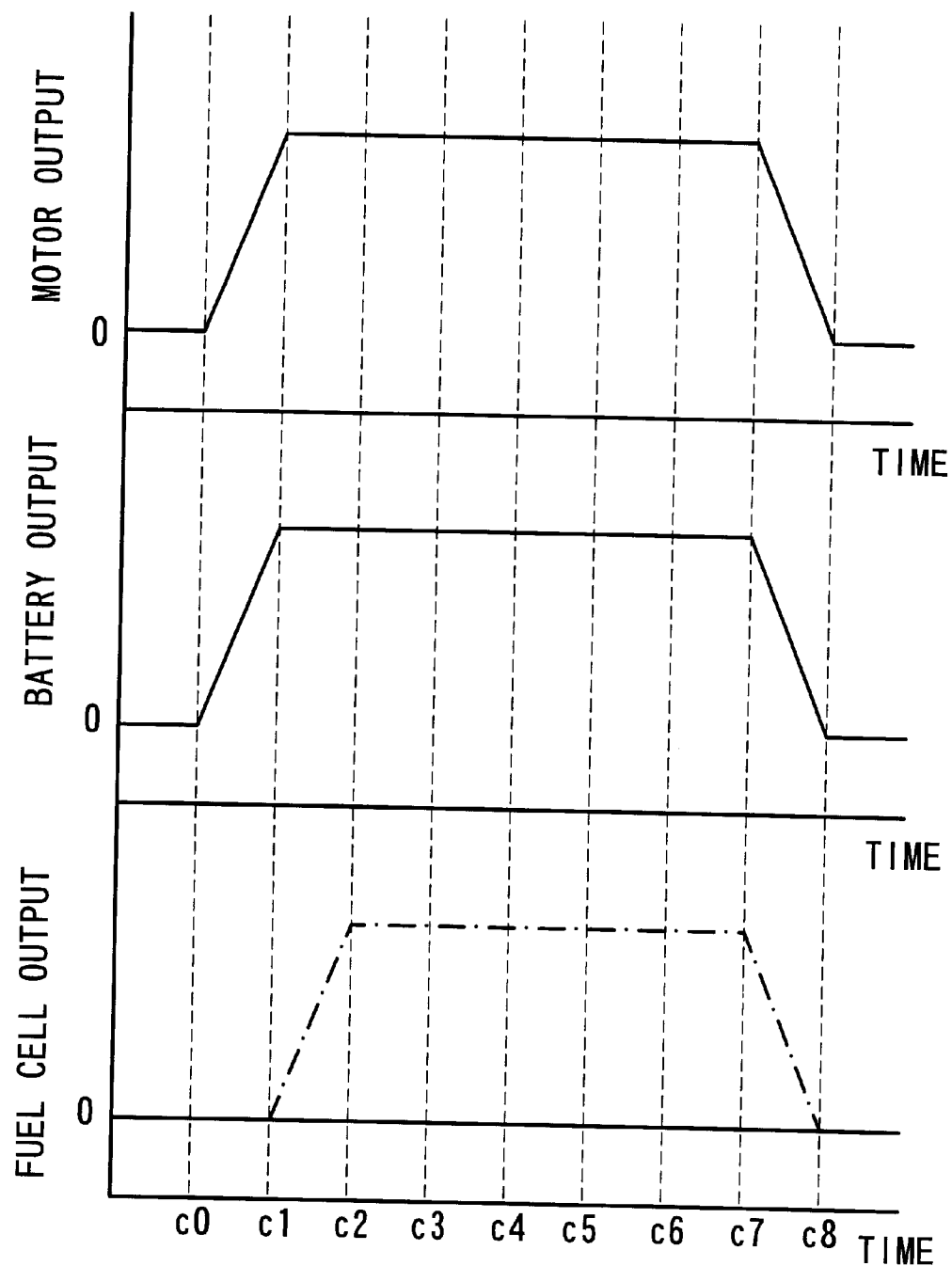
FIG. 43 shows the process of changing over the working electric power supply in the power assist control process.

FIG. 43 shows the process of changing over the working electric power supply in the power assist control process. The graphs of FIG. 43 show variations in output of the motor 20, output of the battery 50, and output of the fuel cell 60 with the elapse of time in the case of a requirement of the power assist control. At a time point c0, the requirement of the power assist control is issued. This corresponds to the decision at step S1220 that the rate of change $\Delta\theta$ in accelerator travel is not less than the predetermined value $\Delta\theta 1$ in the flowchart of FIG. 42.

In response to the requirement of the power assist control, the output of the motor 20 is enhanced after the time point c0 as shown by the graph of FIG. 43. The output of the motor 20 actually varies according to the step-on conditions of the accelerator pedal, although the output of the motor 20 linearly increases to a fixed value in the graph of FIG. 43. It is here assumed that the battery 50 has a sufficient level of remaining charge SOC at the time point c0. At this moment, the output of the fuel cell 60 is kept zero.

At a time point c1, the remaining charge SOC of the battery 50 becomes less than the predetermined reference value LO13. The fuel cell 60 accordingly starts driving at the time point c1 to output electric power as shown by the graph of the one-dot chain line. As discussed above, the processing of step S1250 charges the battery 50 with the electric power of the fuel cell 60 and causes the motor 20 to be driven with the electric power of the battery 50. Even after the enhanced output of power from the fuel cell 60, the output of the battery 50 is thus kept at the fixed value corresponding to the output of the motor 20. The electric power output from the battery 50 is practically generated by the fuel cell 60.

At a time point c7, the requirement of the power assist control is ended. Namely the rate of change $\Delta\theta$ in accelerator travel becomes less than the predetermined value $\Delta\theta 1$. This shifts the driving state of the hybrid vehicle to the engine drive and lowers the output of the motor 20 to zero. With the decrease in output of the motor 20, the outputs of both the battery 50 and the fuel cell 60 decrease. When the battery 50 has a sufficiently high level of remaining charge SOC, on the other hand, the output of the fuel cell 60 is kept zero as shown by the graph of the solid line.

The power assist control process discussed above enables the motor 20 to be driven in the engine drive area by selectively using the battery 50 and the fuel cell 60 as the working electric power supply to assist the output of the engine 10. The control process preferentially uses the battery 50 over the fuel cell 60 for the working electric power supply, thereby restricting the use of the irreversible electric power supply, that is, the fuel cell 60. The control procedure of the fifth embodiment ensures the appropriate use of the electric power supplies in a wide drive range. The preferential use of the electric power of the battery 50 ensures the margin for charging the battery 50 in the course of regenerative braking, thereby improving the energy efficiency of the vehicle.

When the charge level of the battery 50 has decreased to or below the predetermined reference value LO13, the power assist control process of the embodiment uses not only the fuel cell 60 but the battery 50 as the working electric power supplies. The combined use of the battery 50 and the fuel cell 60 enables the battery 50 to compensate for the poor response of the fuel cell 60 and thereby attains a drive of the motor 20 with a quick response to the requirement of the driver.

The power assist control process enhances the output of the engine 10 in the case where the remaining quantity FCL of the FC fuel for the fuel cell 60 becomes less than the predetermined level Fth13. The enhanced output desirably prevents the driver from feeling significantly uneasy due to the difference in response between in the presence of and in the absence of the available electric power supply. In the case of no available electric power supply, the control process of the embodiment does not cause the auxiliary machinery driving motor 80 to generate electric power and charge the battery 50. This ensures the output of the sufficient torque from the engine 10 in the absence of available electric power supply. The direct output of the power from the engine 10 to the axle 17 attains a drive with a higher efficiency, compared with the structure in which the power output from the engine 10 is once converted to electric power and then reconverted to power by the motor 20.

I5. Vehicle Stop- or Speed Reduction-time Control Process

Figure 44:
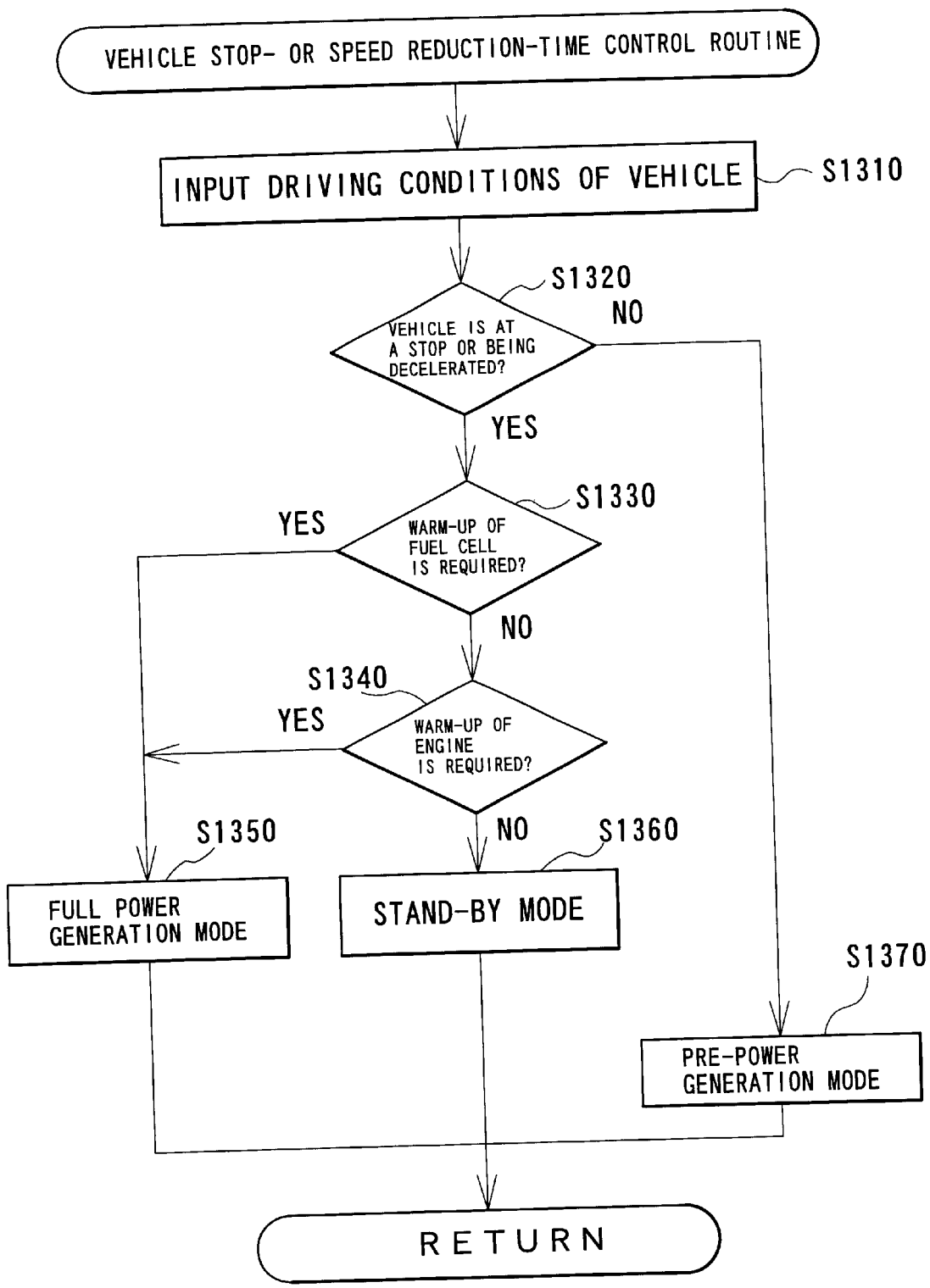
FIG. 44 is a flowchart showing a vehicle stop- or speed reduction-time control routine executed in the fifth embodiment.

FIG. 44 is a flowchart showing a vehicle stop- or speed reduction-time control routine executed in the fifth embodiment. The vehicle stop- or speed reduction-time control process regulates the working conditions of the fuel cell 60 while the vehicle is at a stop or during the speed reduction. This routine is also executed periodically by the CPU in the control unit 70 at preset time intervals. When the program enters the routine of FIG. 44, the CPU first receives the inputs regarding the driving conditions of the vehicle at step S1310. The concrete processing of step S1310 receives the inputs from the variety of sensors shown in FIG. 7 discussed in the first embodiment. Among the diversity of inputs, the pieces of information on the gearshift position, the vehicle speed, the accelerator travel, the on-off state of the parking brake, the amount of actuation of the brake pedal, the temperature of the fuel cell 60, and the water temperature in the engine 10 are especially involved in the subsequent processing.

The CPU then determines whether or not the hybrid vehicle is either at a stop or being decelerated at step S1320. The decision of step S1320 is based on a variety of conditions. The control process of the embodiment determines that the hybrid vehicle is either at a stop or being decelerated when at least one of the following conditions is satisfied: 'the gearshift position is either the position N or the position P', 'either the brake pedal or the parking brake is ON position', 'the accelerator travel is in the full closed position', 'the vehicle speed decreases', and the 'the vehicle speed is substantially equal to zero'.

When none of these conditions is satisfied, it is determined that the hybrid vehicle is either in a cruise or being accelerated. The CPU accordingly sets a pre-power generation mode to the working conditions of the fuel cell 60 at step S1370, and exits from this routine. The pre-power generation mode causes the fuel cell 60 to generate a fixed quantity of electric power in advance, so as to enable a quick start of power output in response to the requirement of the power generation. The quantity of electric power to be generated in the pre-power generation mode is determined appropriately according to the remaining quantity FCL of the FC fuel for the fuel cell 60 and the allowable time delay between the requirement of power generation to the fuel cell 60 and the actual output of electric power. As described previously, the hybrid vehicle of the embodiment does not always use the fuel cell 60 as the working electric power supply in each drive control process. The processing of step S1370 may thus be omitted.

When it is determined at step S1320 that the hybrid vehicle is either at a stop or being decelerated, on the other hand, the CPU subsequently determines whether or not the warm-up of the fuel cell 60 is required at step S1330. The fuel cell 60 of the low temperature requires a relatively long time before the start of power generation. In this state, the fuel cell 60 can not be fully utilized during a drive. When the temperature of the fuel cell 60 is not higher than a predetermined level and it is thereby determined at step S1330 that the warm-up of the fuel cell 60 is required, the fuel cell 60 is warmed up to make the response delay of the output of electric power from the fuel cell 60 within a preset range at step S1350. The concrete processing of step S1350 sets a full power generation mode to the working conditions of the fuel cell 60. The electric power output from the fuel cell 60 may be used to charge the battery 50 and drive a diversity of power-driven equipment mounted on the vehicle.

When it is determined at step S1330 that the warm-up of the fuel cell 60 is not required, the CPU subsequently determines whether or not the warm-up of the engine 10 is required at step S1340. The decision of step S1340 is based on the determination of whether the water temperature in the engine 10 is not lower than a predetermined level. When it is determined at step S1340 that the warm-up of the engine 10 is required, the engine 10 is warmed up. In a conventional vehicle, the warm-up of the engine 10 is attained by driving the engine 10 at a preset idle speed. This warm-up operation, however, undesirably lowers the fuel consumption and increases the emission to adversely affect the environment. The technique of the embodiment, on the other hand, causes the motor 20 to motor the engine 10 and warms the engine 10 up by utilizing the friction occurring in the cylinder of the engine 10 and the heat by pumping. This warm-up techniques requires the electric power to drive the motor 20. When it is determined at step S1340 that the warm-up of the engine 10 is required, the CPU sets the full power generation mode to the working conditions of the fuel cell 60 at step S1350, in order to ensure the sufficient supply of electric power.

When it is determined at step S1340 that the warm-up of the engine 10 is not required, the CPU determines that there will be no requirement of electric power for some time. The CPU accordingly sets a stand-by mode to the working conditions of the fuel cell 60 at step S1360. Like the pre-power generation mode (step S1370), the stand-by mode drives the fuel cell 60 to output a certain quantity of electric power. The quantity of electric power to be generated in the stand-by mode is, however, significantly smaller than that in the pre-power generation mode. In the stand-by mode, the fuel cell 60 is driven to output a certain level of electric power that protects the fuel cell 60 from a further temperature decrease and another requirement of warm-up, while the consumption of the FC fuel for the fuel cell 60 is restricted. The actual quantity of electric power to be generated in the stand-by mode is determined by taking into account the characteristics of the fuel cell 60.

In the flowchart of FIG. 44, the fuel cell 60 is driven in the stand-by mode at step S1360. One possible modification of the processing at step S1360 causes the fuel cell 60 to be selectively driven in the stand-by mode or stopped according to the remaining charge of the battery 50. In the case where the remaining charge of the battery 50 is not less than a predetermined reference value, there is little possibility that the output of electric power from the fuel cell 60 is required soon. The operation of the fuel cell 60 is accordingly stopped at step S1360. In the case where the remaining charge of the battery 50 is less than the predetermined reference value, on the other hand, there is a fair possibility that the output of electric power from the fuel cell 60 is required soon. The fuel cell 60 is accordingly driven in the stand-by mode at step S1360. Such selection for the working state of the fuel cell 60 is described below.

Figure 45:
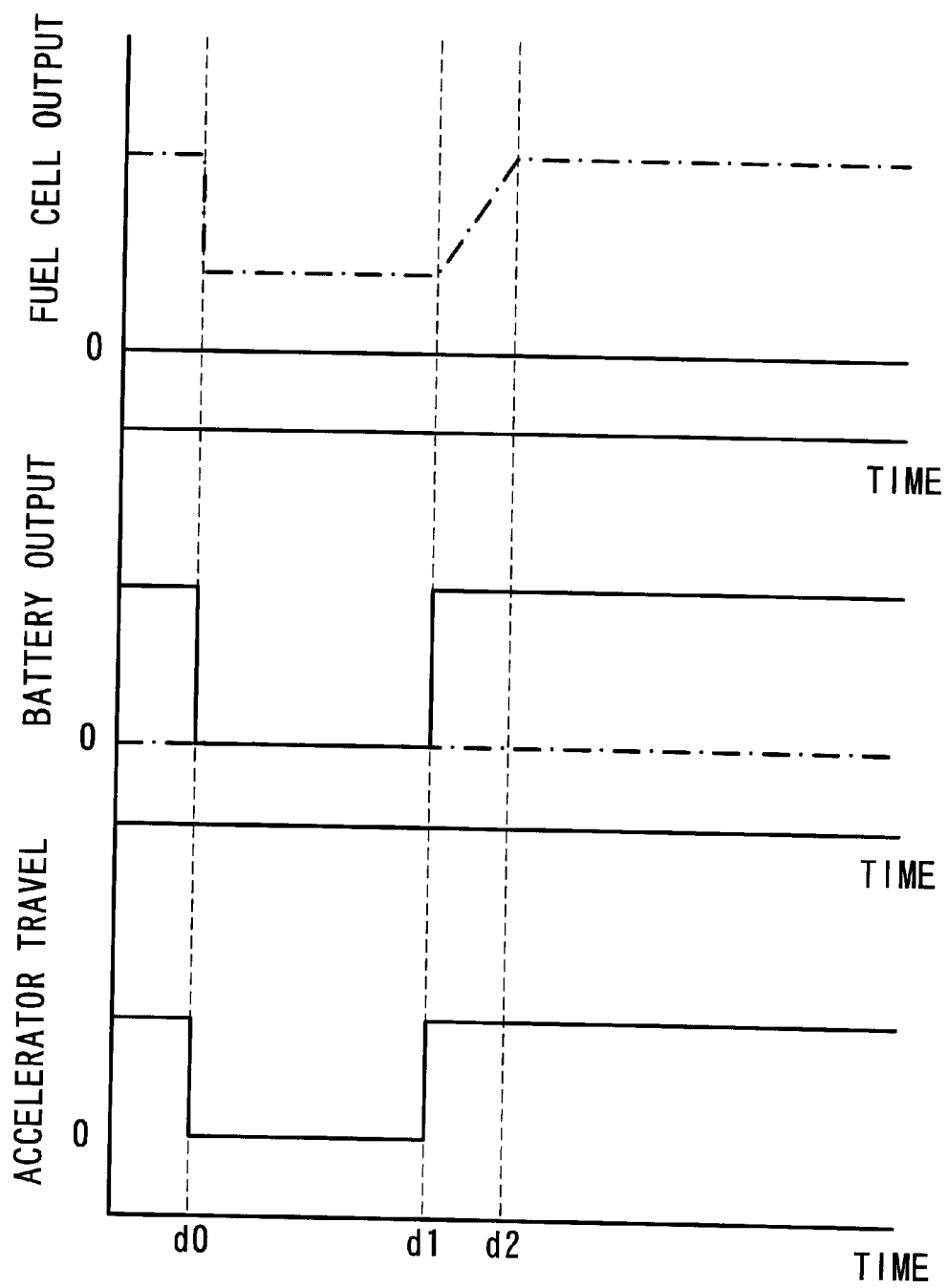
FIG. 45 shows the process of changing over the working electric power supply in the vehicle stop- or speed reduction-time control process.

FIG. 45 shows the process of changing over the working electric power supply in the vehicle stop- or speed reduction-time control process. In the example of FIG. 45, the working state of the fuel cell 60 is changed according to the remaining charge of the battery 50. The graphs of FIG. 45 show variations in output of the fuel cell 60, output of the battery 50, and accelerator travel with the elapse of time in the case where the accelerator pedal is set in the full closed state during a drive at a certain accelerator travel. The graphs of the solid line show the measurement results when the remaining charge of the battery 50 is not less than the predetermined reference value. The graphs of the one-dot chain line show the measurement results when the remaining charge of the battery 50 is less than the predetermined reference value.

At a time point d0, the accelerator pedal is set in the full closed state. This corresponds to the state in which at least one of the conditions is satisfied to determine that the hybrid vehicle is either at a stop or being decelerated at step S1320. In the case of no requirement of the warm-up of either the fuel cell 60 or the engine 10, the CPU executes the processing of step S1360 in the control routine of FIG. 44.

The description first regards the state in which the battery 50 has a high remaining charge, that is, the state shown by the graphs of the solid line. In the case where the battery 50 has a high remaining charge, the battery 50 is used preferentially over the fuel cell 60 as described previously in the variety of drive control processes. Before the time point d0, only the battery 50 has a certain level of output, while the output of the fuel cell 60 is kept zero. When at least one of the conditions is satisfied to determine that the vehicle is either at a stop or being decelerated at the time point d0, there is no requirement of further output of electric power. The output of the battery 50 accordingly decrease to zero. There is little possibility that the output of electric power from the fuel cell 60 is required soon. The operation of the fuel cell 60 is accordingly stopped at step S1360. Namely the output of the fuel cell 60 is kept zero.

In response to another step-on action of the accelerator pedal at a time point d1, none of the conditions is satisfied to determine that the vehicle is either at a stop or being decelerated at step S1320. The hybrid vehicle is accordingly driven with the power output from the motor 20. In the case where the battery 50 has a high remaining charge, the motor 20 is driven with the battery 50 as the working electric power supply. As shown by the graph of the solid line, the output of the battery 50 increases again to the certain level at and after the time point d1. The electric power of the fuel cell 60 is not required, so that the output of the fuel cell 60 is kept zero.

The description then regards the state in which the battery 50 has a low remaining charge, that is the state shown by the graphs of the one-dot chain line. The electric power accumulated in the battery 50 is not used because of the low remaining charge thereof. Before the time point d0, the fuel cell 60 outputs a certain level of electric power, while the output of the battery 50 is kept zero.

When the accelerator pedal is set in the full closed state at the time point d0 and at least one of the conditions is satisfied to determine that the vehicle is either at a stop or being decelerated, the processing of step S1360 is executed in the flowchart of FIG. 44. In the case where the battery 50 has a low remaining charge, there is a fair possibility that the output of electric power from the fuel cell 60 is required soon. The fuel cell 60 is accordingly driven in the stand-by mode to continuously output a very low level of electric power. The output of the battery 50 is still kept zero.

In response to another step-on action of the accelerator pedal at the time point d1, the hybrid vehicle runs by means of the motor 20, which is driven with the fuel cell 60 as the working electric power supply. As shown by the graph of the one-dot chain line, the output of the fuel cell 60 accordingly increases again to the certain level at and after the time point d1. Since the electric power of the battery 50 is not used, so that the output of the battery 50 is kept zero. The fuel cell 60 is driven in the stand-by mode in the time period between the time points d0 and d1, so as to ensure a relatively quick output of electric power. In the example discussed here, the electric power of the battery 50 is not used at all when the battery 50 has a low remaining charge. As discussed previously in the variety of drive control processes, however, the electric power of the battery 50 may be used to an allowable extent in the transient period before the fuel cell 60 ensures output of a sufficient level of electric power.

In the vehicle stop- or speed reduction-time control process discussed above, the fuel cell 60 is driven in the pre-power generation mode (step S1370 in the flowchart of FIG. 44) when there is a fair possibility that the output of electric power from the fuel cell 60 is required soon, for example, during a drive of the hybrid vehicle. This arrangement favorably shortens the response delay of the output of electric power from the fuel cell 60.

In the vehicle stop- or speed reduction-time control process of this embodiment, when there is little possibility that the output of electric power from the fuel cell 60 is required soon, the fuel cell 60 is driven in the stand-by mode (step S1360 in the flowchart of FIG. 44). This arrangement desirably prevents the FC fuel for the fuel cell 60 from being wasted. The modified procedure changes the working state of the fuel cell 60 between the stop and the driven in the stand-by mode according to the remaining charge of the battery 50. This further saves the FC fuel for the fuel cell 60.

In the flowchart of FIG. 44, the fuel cell 60 is driven in the stand-by mode when it is determined that the hybrid vehicle is either at a stop or being decelerated. The control process of this embodiment causes the fuel cell 60 to be driven to allow a quickest possible response when there is a fair possibility that the output of electric power from the fuel cell 60 is required soon. The control process, on the other hand, causes the fuel cell 60 to be driven to save the FC fuel when there is little possibility that the output of electric power from the fuel cell 60 is required soon. The control process shown in the flowchart of FIG. 44 is only an illustrative and regards the vehicle stop- or speed reduction-time as one of the exemplified occasions when there is little possibility that the output of electric power from the fuel cell 60 is required soon. The similar control process is adopted in any case where there is little possibility that enhancement of the output power is required soon.

The hybrid vehicle may have a GPS (global positioning system) and a VICS (vehicle information & communication system) mounted thereon to obtain traffic information on the planned route that the hybrid vehicle may take. In the hybrid vehicle of this structure, the above control process may be carried out not only at the time of stop or speed reduction of the vehicle but even during a drive of the vehicle. The GPS specifies the position of the vehicle on the map based on the input signals from the satellite. The VICS detects the traffic density on the planned route, which the hybrid vehicle may take, based on the traffic information transmitted from the outside. When the planned route has heavy traffic, there is little possibility that the abrupt enhancement of the power of the hybrid vehicle is required. In this case, the condition that 'the planned route has heavy traffic' is added to the conditions of the decision at step S1320 in the flowchart of FIG. 44. In the case of a traffic jam, the fuel cell 60 is driven. in the stand-by mode, in order to save the FC fuel. The fuel cell 60 may also be driven in the stand-by mode under a diversity of conditions, for example, in the case where the planned route has an upward slope.

As described above in the respective control processes, the hybrid vehicle of the fifth embodiment selectively uses the two electric power supplies, that is, the battery 50 and the fuel cell 60, according to the driving conditions of the vehicle. The hybrid vehicle also selectively uses the two power sources, that is, the motor 20 and the engine 10. This arrangement enables the hybrid vehicle to attain a drive of excellent fuel consumption and environmental properties.

I6. First Modification

The technique of the fifth embodiment discussed above selectively uses the engine 10 and the motor 20 as the working power source. The combined use of the engine 10 and the motor 20 is limited to only the power assist control process, which is executed in response to an abrupt step-on action of the accelerator pedal. One modified control procedure drives both the engine 10 and the motor 20 when the accelerator travel is not less than a predetermined value. This control procedure is discussed below as a first modification of the fifth embodiment.

Figure 46:
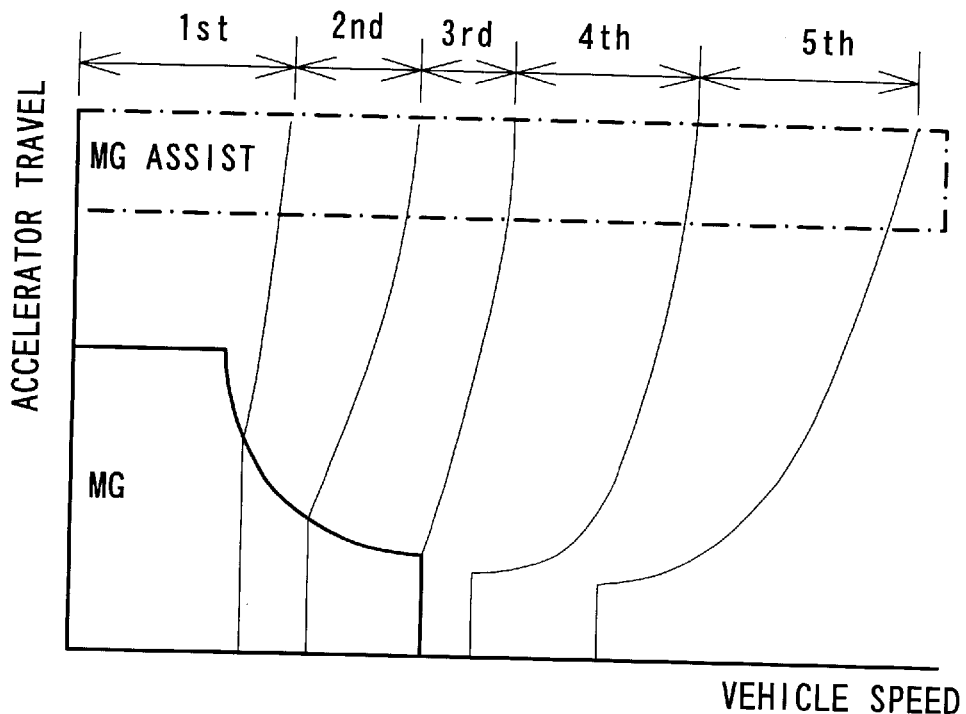
FIG. 46 is a map showing the available speeds mapped to the respective driving conditions of the vehicle in a first modification of the fifth embodiment.

The control procedure of the first modification uses maps different from those of FIGS. 8 through 11 discussed in the first embodiment to represent the relationship between the working power source and the available speeds. FIG. 46 is a map showing the available speeds mapped to the respective driving conditions of the vehicle in the control process of the first modification. The map of FIG. 46 shows available speeds mapped to the respective driving conditions of the vehicle at the drive position (D), the fourth position (4), and the third position (3). The settings of the MG area, in which the hybrid vehicle drives with the motor 20 as the working power source, and the available speeds of the transmission 100 in the map of FIG. 46 are identical with those in the map of FIG. 8. The difference from the map of FIG. 8 adopted in the control process of the fifth embodiment is that an MG assist area is set in a preset range of high accelerator travel in the map of FIG. 46 adopted in the control process of the first modification. In the MG assist area, both the engine 10 and the motor 20 are driven to output a high torque. This corresponds to the power assist control executed in the fifth embodiment. The MG assist area is set in advance in the maps adopted in the control process of the first modification. Whether or not the accelerator pedal is abruptly stepped on, the MG assist control is carried out when the driver steps on the accelerator pedal to or above a predetermined accelerator travel.

Figure 47:
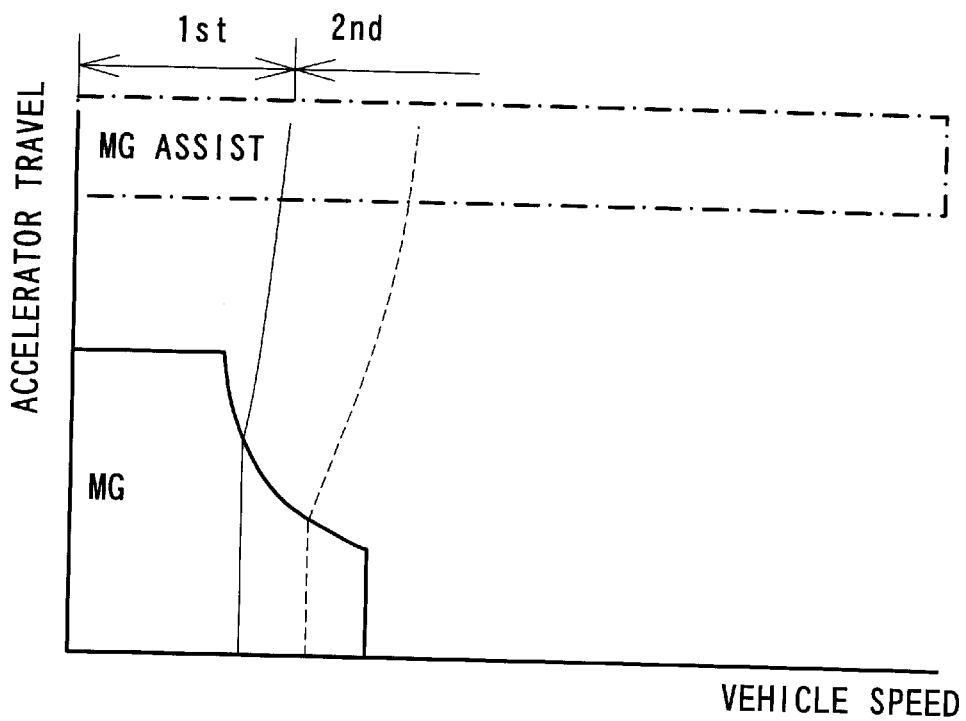
FIG. 47 is a map showing the available speeds mapped to the respective driving conditions of the vehicle at the position 2 in the first modification of the fifth embodiment.

The MG assist area is set at each gearshift position. FIG. 47 is a map showing the available speeds mapped to the respective driving conditions of the vehicle at the position 2 in the control process of the first modification. The settings of the MG area and the available speeds of the transmission 100 in the map of FIG. 47 are identical with those in the map of FIG. 9. In the map with regard to the position 2 adopted in the control process of the first modification, the MG assist area is also set in the preset range of high accelerator travel. The setting of the MG assist area in the map of FIG. 47 with regard to the position 2 is identical with that in the map of FIG. 46 with regard to the position D. The MG assist area may alternatively be set in a different range according to the gearshift position.

Figure 48:
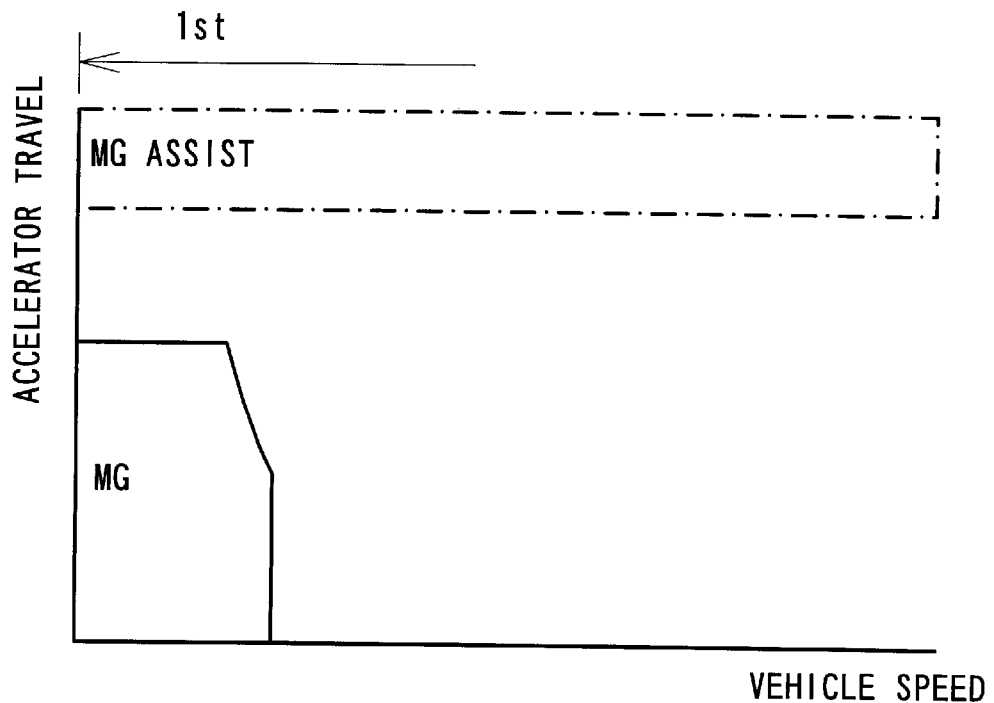
FIG. 48 is a map showing the available speed according to the driving conditions of the vehicle at the position L in the first modification of the fifth embodiment.
Figure 49:
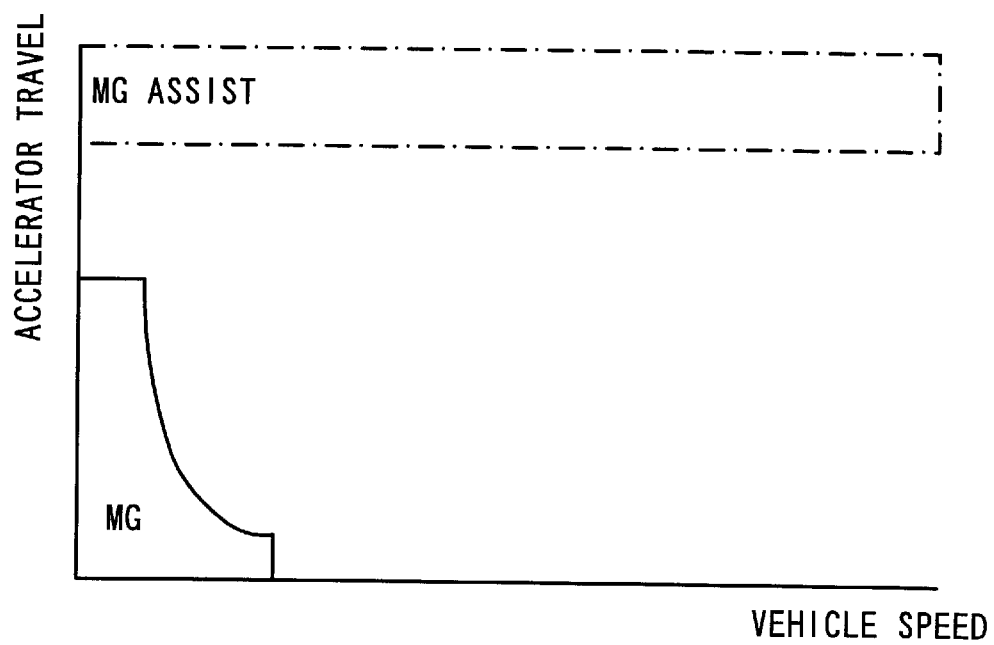
FIG. 49 is a map showing the available speed according to the driving conditions of the vehicle at the position R in the first modification of the fifth embodiment.

FIG. 48 is a map showing the available speed according to the driving conditions of the vehicle at the position L in the control process of the first modification. The settings of the MG area and the available speed of the transmission 100 in the map of FIG. 48 are identical with those in the map of FIG. 10. The setting of the MG assist area in the map of FIG. 48 with regard to the position L is identical with that in the map of FIG. 46 with regard to the position D. FIG. 49 is a map showing the available speed according to the driving conditions of the vehicle at the position R in the control process of the first modification. The settings of the MG area and the available speed of the transmission 100 in the map of FIG. 49 are identical with those in the map of FIG. 11. In the map with regard to the position R adopted in the control process of the first modification, the MG assist area is also set in the preset range of high accelerator travel. There is, however, a relatively little possibility that the high torque is required at the position R. The MG assist area may thus not be set at the position R.

Figure 50:
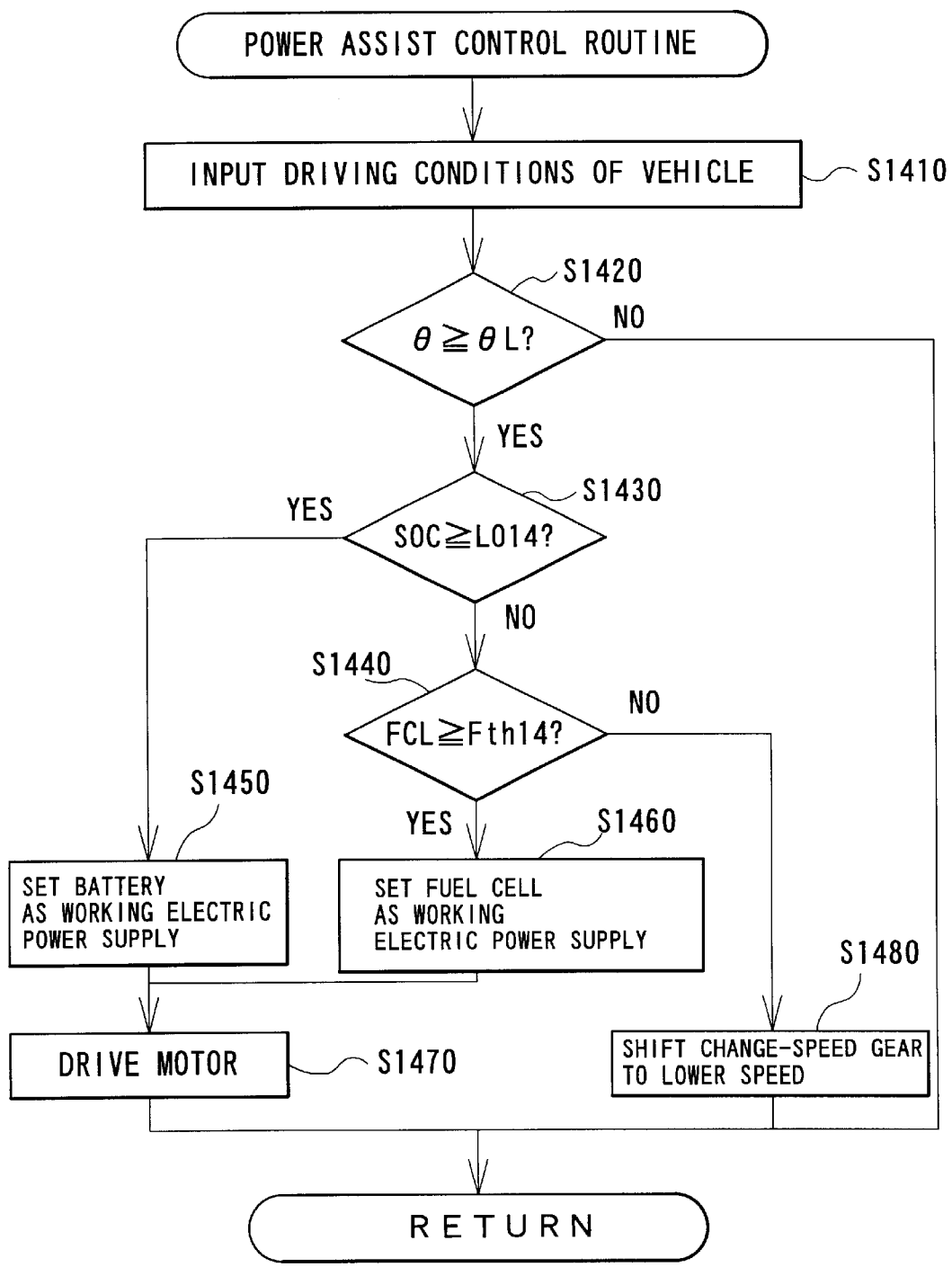
FIG. 50 is a flowchart showing a power assist control routine executed in the first modification of the fifth embodiment.

FIG. 50 is a flowchart showing a power assist control routine executed in the first modification of the fifth embodiment. The power assist control routine controls the use of the electric power supplies and the power sources in the MG assist area shown in the maps of FIGS. 46 through 49. In the same manner as the power assist control routine of the fifth embodiment, the CPU in the control unit 70 periodically executes this power assist control routine of FIG. 50 at preset time intervals. When the program enters the power assist control routine, the CPU first receives the inputs regarding the driving conditions of the vehicle at step S1410.

The CPU then compares the observed accelerator travel θ with a predetermined reference value θL at step S1420. The predetermined reference value θL represents a lowest possible accelerator travel in the MG assist area set in the maps of FIGS. 46 through 49 at the respective gearshift positions. A high torque is generally required on an upward slope or during a high-speed drive. In such cases, the accelerator travel increases. In the maps of FIGS. 46 through 49 adopted in the control process of the first modification, the MG assist area is set to enable output of a high torque in these conditions. In the case where the observed accelerator travel θ is less than the predetermined reference value θL at step S1420, it means that there is no requirement of high torque. In this case, activation of the motor 20 for the power assist control is not required. The CPU accordingly exits from the power assist control routine without any further processing.

In the case where the observed accelerator travel θ is not less than the predetermined reference value θL at step S1420, on the other hand, the CPU determines that the driving state of the vehicle corresponds to the MG assist area and that the high torque is required. The CPU accordingly carries out the power assist control and drives the motor 20 by selectively using the battery 50 and the fuel cell 60 as the working electric power supply. For the purpose of the appropriate selection of the working electric power supply, the CPU compares the remaining charge SOC of the battery 50 with a predetermined reference value LO14 at step S1430. Any value of greater than zero may be set arbitrarily to the reference value LO14. A relatively large electric power is required in the course of the power assist control with the motor 20. Setting an extremely small value to the reference value LO14 may prevent the battery 50 from compensating for the response delay of the output of electric power from the fuel cell 60 and supplying a sufficient level of electric power to the motor 20. The control procedure of the first modification accordingly sets a greater value to the reference value LO14 than the reference value LO11 used as the criterion of decision in the EV drive control routine of FIG. 38.

In the case where the remaining charge SOC of the battery 50 is not less than the predetermined reference value LO14 at step S1430, it is determined that the battery 50 has a high charge level. The CPU accordingly drives the motor 20 with the battery 50 as the working electric power supply at steps S1450 and S1470. The engine 10 continues the current driving state.

In the case where the remaining charge SOC of the battery 50 is less than the predetermined reference value LO14 at step S1430, on the other hand, it is determined that the battery 50 has a low charge level and that the use of the electric power accumulated in the battery 50 is not allowed. The CPU then determines whether or not the fuel cell 60 is available for the working electric power supply. For the purpose of such decision, the CPU compares the remaining quantity FCL of the FC fuel for the fuel cell 60 with a predetermined level Fth14 at step S1440. The predetermined level Fth14 is set arbitrarily. In the power assist control process of the first modification, there is little requirement of using the fuel cell 60. The predetermined level Fth14 used as the criterion of decision in the power assist control routine of the first modification is thus set greater than the predetermined level Fth11 used as the criterion of decision in the EV drive control routine of the fifth embodiment. In the case where the remaining quantity FCL of the FC fuel is not less than the predetermined level Fth14 at step S1440, it is determined that the fuel cell 60 is available for the working electric power supply. The CPU accordingly drives the motor 20 with the fuel cell 60 as the working electric power supply at steps S1460 and S1470. The engine 10 continues the current driving state.

The power assist control process of the first modification uses the fuel cell 60 directly as the working electric power supply. As described previously in the power assist control routine of the fifth embodiment shown in FIG. 42, however, the fuel cell 60 may be used to charge the battery 50. The control process of the first modification uses the fuel cell 60 directly as the working electric power supply since the power of the motor 20 has a relatively gentle variation. The power assist control of the first modification is executed in the case where the accelerator pedal is stepped on to or above the predetermined accelerator travel. This corresponds to the case of stationary requirement of high torque. In such cases, the motor 20 outputs a stationary torque to assist the power of the engine 10. The response delay of the fuel cell 60 accordingly has relatively little effects on the response of the vehicle. The arrangement of using the electric power of the fuel cell 60 directly to drive the motor 20 has a higher working efficiency than the arrangement of causing the electric power of the fuel cell 60 to be once accumulated in the battery 50 and subsequently output to drive the motor 20. The control process of the first modification uses the electric power of the fuel cell 60 directly to drive the motor 20 by taking into account both the response of the vehicle and the working efficiency.

In the case where the remaining quantity FCL of the FC fuel for the fuel cell 60 is less than the predetermined level Fth14 at step S1440, on the other hand, the use of the fuel cell 60 as the working electric power supply is not allowed. In this case, there is no available electric power supply. The CPU accordingly carries out the processing to enhance the torque output from the engine 10. In the control process of the first modification, the CPU shifts the change-speed gear to the lower speed at step S1480. The CPU may directly enhance the output of the engine 10, if there is some margin of the engine output. The power assist control of the first modification is, however, carried out while the engine 10 has already been outputting a high power. In most cases, the engine 10 accordingly does not have any margin for the enhanced output. From this point of view, the control process of the first modification shifts the change-speed gear to the lower speed, in order to cause the engine 10 to output a higher torque. This arrangement ensures a substantially fixed response, irrespective of the availability of the working electric power supply. The CPU repeatedly executes the series of the processing, so as to attain the power assist control.

Figure 51:
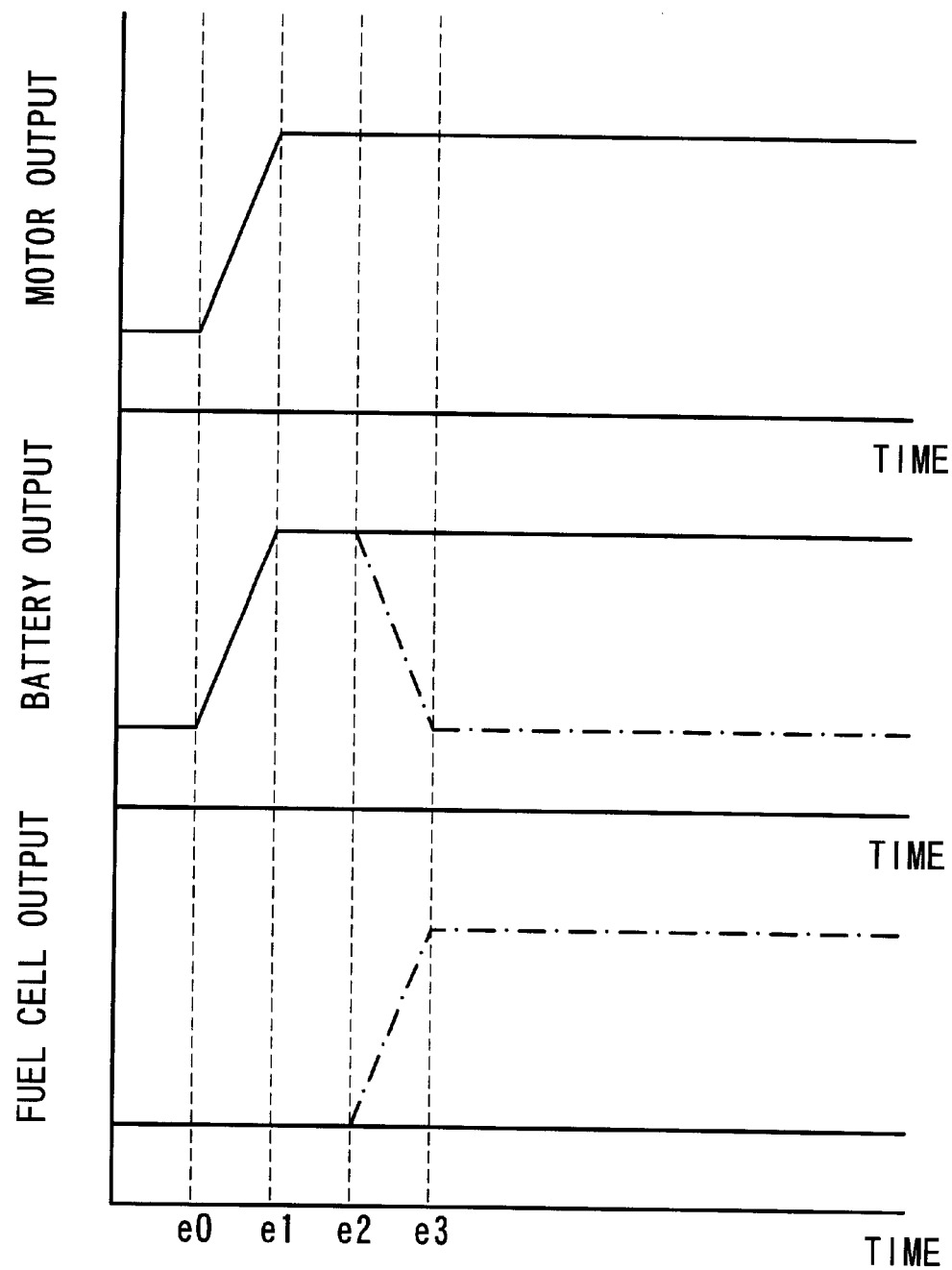
FIG. 51 shows the process of changing over the working electric power supply in the power assist control process.

FIG. 51 shows the process of changing over the working electric power supply in the power assist control process. The graphs of FIG. 51 show variations in output of the motor 20, output of the battery 50, and output of the fuel cell 60 with the elapse of time in the case where the accelerator pedal is stepped on to or above a predetermined accelerator travel during the engine drive. At a time point e0, the requirement of the power assist control is issued. This corresponds to the decision at step S1420 that the observed accelerator travel θ is not less than the predetermined reference value θL.

In response to the requirement of the power assist control, the output of the motor 20 is enhanced after the time point e0 as shown by the graph of FIG. 51. The output of the motor 20 actually varies according to the step-on conditions of the accelerator pedal, although the output of the motor 20 linearly increases to a fixed value in the graph of FIG. 51. It is here assumed that the battery 50 has a sufficient level of remaining charge SOC at the time point e0. At this moment, the output of the fuel cell 60 is kept zero.

At a time point e2, the remaining charge SOC of the battery 50 becomes less than the predetermined reference value LO14. The fuel cell 60 accordingly starts driving at the time point e2 to output electric power as shown by the graph of the one-dot chain line. The output of the battery 50 decreases with an increase in output of the fuel cell 60. At a time point e3, the working electric power supply is completely changed over to the fuel cell 60. The graphs of the solid line show the variations when the battery 50 has a high charge level. In this case, the output of the battery 50 is kept at a fixed value corresponding to the required power of the motor 20, whereas the output of the fuel cell 60 is kept zero.

The power assist control process discussed above selectively uses the battery 50 and the fuel cell 60 to drive the motor 20 in the engine drive area, so as to assist the power of the engine 10. The control process of the first modification uses the battery 50 preferentially over the fuel cell 60 as the working electric power supply, thereby restricting the use of the irreversible electric power supply, that is, the fuel cell 60. The control procedure of the first modification ensures the appropriate use of the electric power supplies in a wide drive range. The preferential use of the electric power of the battery 50 ensures the margin for charging the battery 50 in the course of regenerative braking, thereby improving the energy efficiency of the vehicle.

The power assist control process enhances the output of the engine 10 in the case where the remaining quantity FCL of the FC fuel for the fuel cell 60 becomes less than the predetermined level Fth14. The enhanced output desirably prevents the driver from feeling significantly uneasy due to the difference in response between in the presence of and in the absence of the available electric power supply. In the case of no available electric power supply, the control process of the first modification does not cause the auxiliary machinery driving motor 80 to generate electric power and charge the battery 50. This ensures the output of the sufficient torque from the engine 10 in the absence of available electric power supply. The direct output of the power from the engine 10 to the axle 17 attains a drive with a higher efficiency, compared with the structure in which the power output from the engine 10 is once converted to electric power and then reconverted to power by the motor 20.

I7. Second Modification

The fifth embodiment and its first modification execute the power assist control in response to a step-on action of the accelerator pedal. One modified arrangement enables the driver to arbitrarily select the execution or non-execution of the power assist control through an operation of a specific switch. This control procedure is discussed below as a second modification of the fifth embodiment.

The control procedure of the second modification provides two different sets of maps to represent the relationship between the working power source and the available speeds. One set consists of the standard maps shown in FIGS. 8 through 11 of the first embodiment. The other set of maps corresponds to a power mode. The power mode is a specific drive mode, in which a higher torque is output at each combination of vehicle speed and accelerator travel. The maps in the power mode are obtained by extending the range using the lower speed as the speed-change gear in the respective maps of FIGS. 8 through 11. The drive in the power mode is implemented when the driver turns on the sports mode switch 163 placed near the gearshift lever 162 (see FIG. 5 of the first embodiment). The control process of the second modification drives the motor 20 to assist the power of the engine 10 when the power mode is set on. The following describes the proper use of the electric power supplies and the power sources in the power mode. In the second modification, the power mode control process is executed in the case where the change-speed gear in the transmission 100 is varied in response to the on operation of the sports mode switch 163. The power mode control process may alternatively be carried out when a specific drive mode is selected to allow the driver to manually vary the change-speed gear of the transmission 100.

Figure 52:
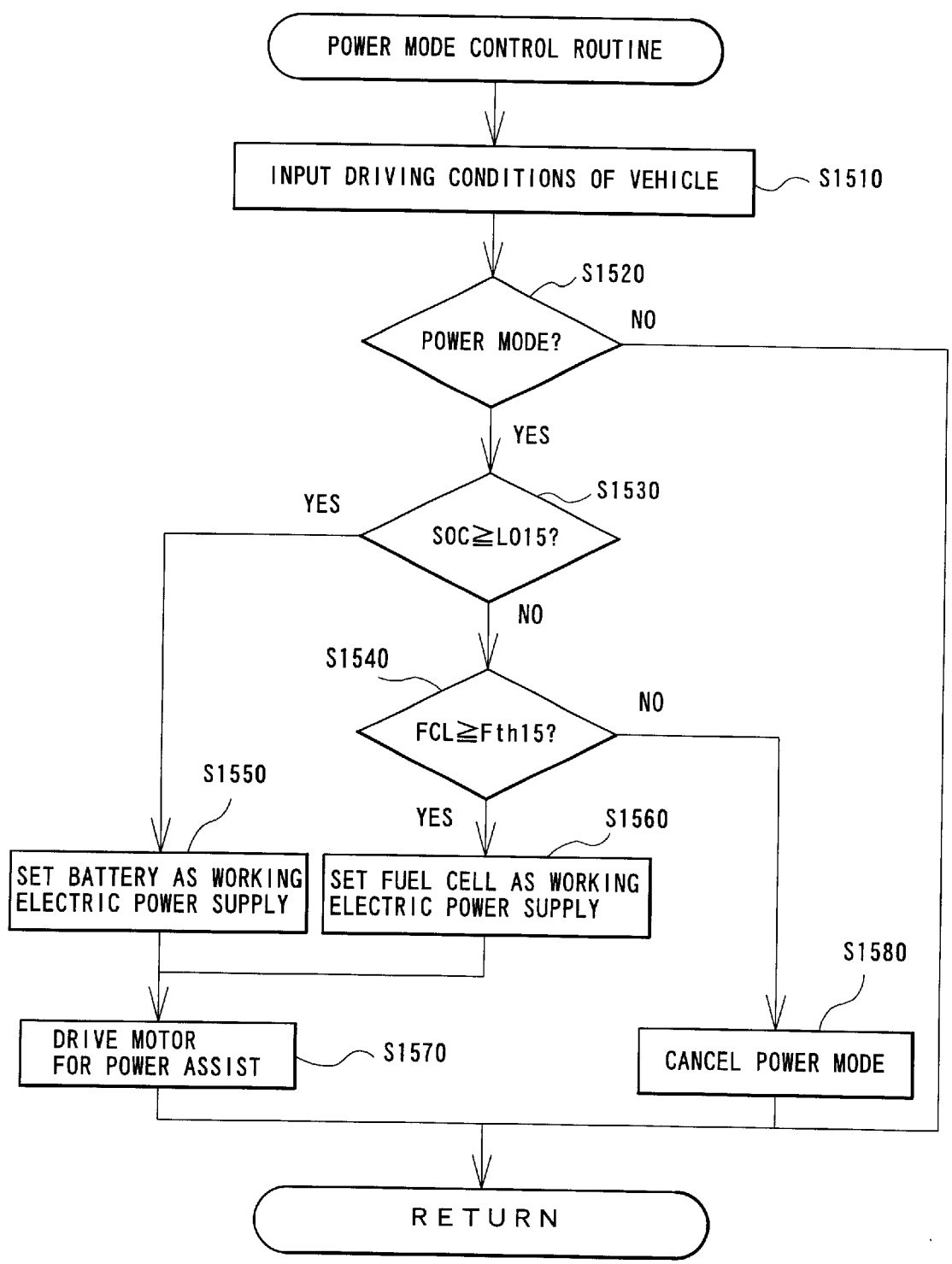
FIG. 52 is a flowchart showing a power mode control routine executed in a second modification of the fifth embodiment.

FIG. 52 is a flowchart showing a power mode control routine executed in the second modification of the fifth embodiment. The power mode control routine controls the use of the electric power supplies and the power sources in response to an on operation of the sports mode switch 163. In the same manner as the power assist control routine of the fifth embodiment, the CPU in the control unit 70 periodically executes this power mode control routine of FIG. 52 at preset time intervals. When the program enters the power mode control routine, the CPU first receives the inputs regarding the driving conditions of the vehicle at step S1510.

The CPU then determines whether or not the power mode has been selected at step S1520. The decision of step S1520 is based on the on-off state of the sports mode switch 163. In the case of no selection of the power mode, activation of the motor 20 for the power assist control is not required. The CPU accordingly exits from the power mode control routine of FIG. 52 without any further processing.

When it is determined at step S1520 that the power mode has been selected, on the other hand, the CPU carries out the power assist control and drives the motor 20 by selectively using the battery 50 and the fuel cell 60 as the working electric power supply. For the purpose of the appropriate selection of the working electric power supply, the CPU compares the remaining charge SOC of the battery 50 with a predetermined reference value LO15 at step S1530. Any value of greater than zero may be set arbitrarily to the reference value LO15.

In the case where the remaining charge SOC of the battery 50 is not less than the predetermined reference value LO15 at step S1530, it is determined that the battery 50 has a high charge level. The CPU accordingly carries out the processing to drive the motor 20 with the battery 50 as the working electric power supply at steps S1550 and S1570. The concrete procedure steps S1550 and S1570 first regulates the changeover switch 84 of the electric power supply, so as to connect the battery 50 with the motor 20. The procedure then sets on a flag, which represents allowance or prohibition of a drive of the motor 20, and specifies the target driving conditions of the motor 20, that is, the target revolving speed and the target torque of the motor 20. The target revolving speed is specified by multiplying the vehicle speed input at step S1510 by the gear ratio of the transmission 100 and the gear ratio of the differential gear 16. The target torque is specified in a map, which has been set in advance according to the vehicle speed and the rate of change in accelerator travel. The target driving conditions specified in this manner are transferred to a separate control routine, so that the motor 20 is driven under the target driving conditions. Here the engine 10 continues the current driving state.

In the case where the remaining charge SOC of the battery 50 is less than the predetermined reference value LO15 at step S1530, on the other hand, it is determined that the battery 50 has a low charge level and that the use of the electric power accumulated in the battery 50 is not allowed. The CPU then determines whether or not the fuel cell 60 is available for the working electric power supply. For the purpose of such decision, the CPU compares the remaining quantity FCL of the FC fuel for the fuel cell 60 with a predetermined level Fth15 at step S1540. The predetermined level Fth15 is used as the criterion of the determination of whether or not the fuel cell is available for the working electric power supply. Any value of greater than zero may be set arbitrarily to the predetermined level Fth15. In the power mode control process of the second modification, there is little requirement of using the fuel cell 60. The predetermined level Fth15 used as the criterion of decision in the power mode control routine of the second modification is thus set greater than the predetermined level Fth11 used as the criterion of decision in the EV drive control routine of the fifth embodiment. In the case where the remaining quantity FCL of the FC fuel is not less than the predetermined level Fth15 at step S1540, it is determined that the fuel cell 60 is available for the working electric power supply. The CPU accordingly carries out the processing to drive the motor 20 with the fuel cell 60 as the working electric power supply at steps S1560 and S1570. The concrete procedure of steps S1560 and S1570 first regulates the change-over switch 84 of the electric power supply, so as to connect the fuel cell 60 with the motor 20. The procedure then sets on the flag, which represents allowance or prohibition of the drive of the motor 20, and specifies the target driving conditions of the motor 20, that is, the target revolving speed and the target torque of the motor 20. The settings of the target driving conditions are discussed above in the processing of steps S1550 and S1570. Here the engine 10 also continues the current driving state.

In the case where the remaining quantity FCL of the FC fuel for the fuel cell 60 is less than the predetermined level Fth15 at step S1540, on the other hand, the use of the fuel cell 60 as the working electric power supply is not allowed. In this case, there is no available electric power supply. The CPU accordingly cancels the power mode at step S1580. Unlike the power assist control processes of the fifth embodiment and its first modification, this procedure does not enhance the output of the engine 10. This is because the power mode is selected intentionally by the driver. The power assist mode discussed in the fifth embodiment and its first modification is set according to the step-on conditions of the accelerator pedal, regardless of the intention of the driver. A substantially fixed response is thus expected, irrespective of the availability of the working electric power supply. The power mode is, however, set arbitrarily by the positive action of the driver. In the case of no available electric power supply, the display is made to inform the driver of prohibition of the selection of the power mode. This effectively prevents the driver from feeling uneasy. The control process of the second modification cancels the power mode at step S1580 and simultaneously flashes the sports mode indicator 223 (see FIG. 37) on the instrument panel in front of the driver, so as to inform the driver of cancellation of the power mode. Alternatively the control process may enhance the torque output from the engine 10 at step S1580.

Figure 53:
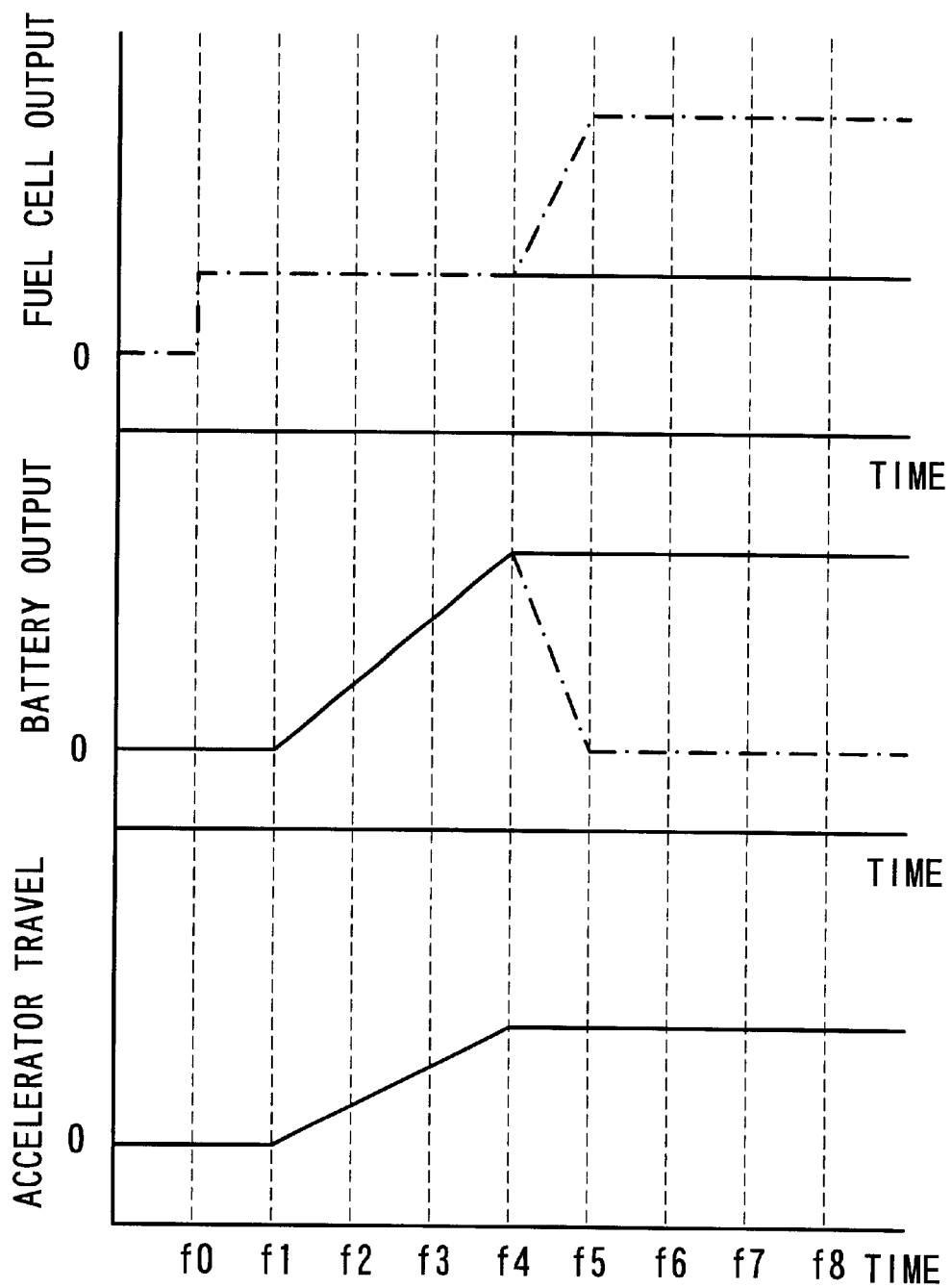
FIG. 53 shows the process of changing over the working electric power supply in the power mode control process.

FIG. 53 shows the process of changing over the working electric power supply in the power mode control process. The graphs of FIG. 53 show variations in output of the fuel cell 60, output of the battery 50, and accelerator travel with the elapse of time when the sports mode switch 163 is pressed on during the engine drive. At a time point f0, the sports mode switch 163 is turned on to set the power mode. In the power mode, there is a possibility that the output of electric power from the fuel cell 60 is required. The fuel cell 60 is accordingly driven in the stand-by mode to output a low level of electric power after the time point f0 as shown by the graph of FIG. 53.

When the driver steps on the accelerator pedal at a time point f1, the required output of the motor 20 increases. In the case where the battery 50 has a high charge level at this moment, the output of the battery 50 increases to supply electric power to the motor 20. Since the battery 50 is used as the working electric power supply, the fuel cell 60 is kept in the stand-by mode.

In the case where the battery 50 still has the high charge level after a time point f4, the output of the battery 50 is kept at a fixed value corresponding to the accelerator travel as shown by the graph of the solid line. Here the fuel cell 60 continues the drive in the stand-by mode. The graphs of the one-dot chain line show variations in the case where the remaining charge SOC of the battery 50 becomes less than the predetermined reference value LO15 at the time point f4. With a decrease in remaining charge SOC of the battery 50, the working electric power supply is changed over to the fuel cell 60. In this case, the output of the fuel cell 60 increases after the time point f4 as shown by the graph of the one-dot chain line. The output of the battery 50 decreases to zero with the enhancement of the output of the fuel cell 60.

Figure 54:
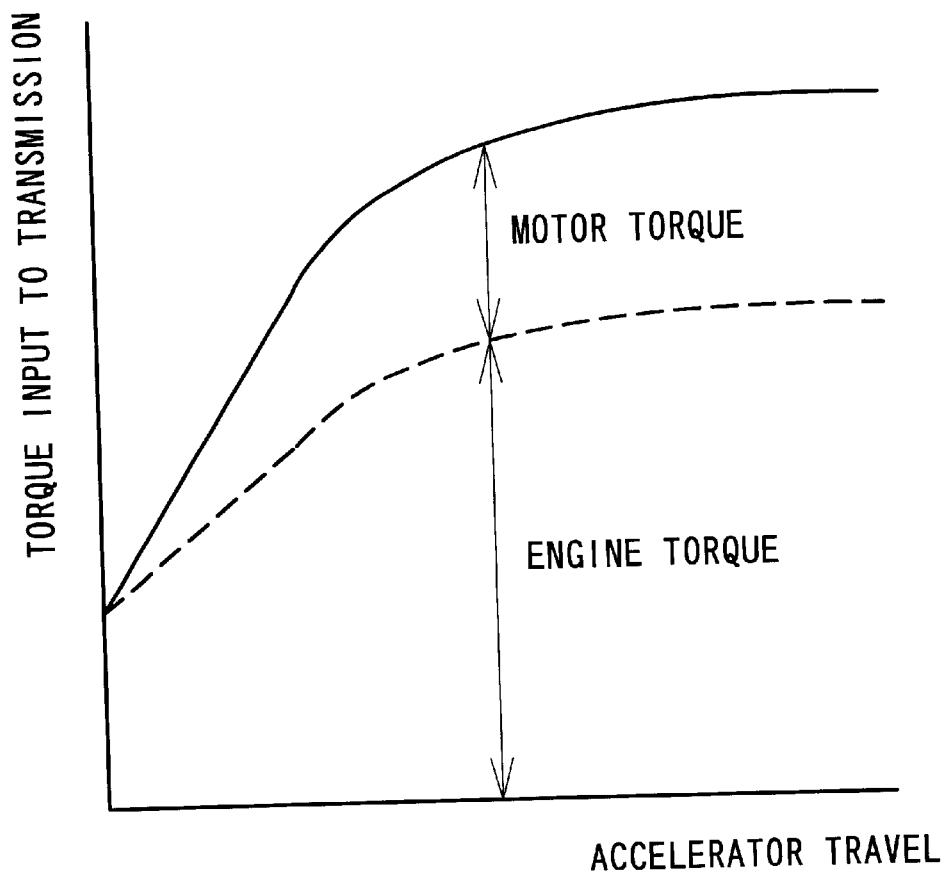
FIG. 54 shows a variation in power output in the power mode.

The power mode control process discussed above selectively uses the battery 50 and the fuel cell 60 to drive the motor 20 and attain the power assist control in the engine drive area, based on the intention of the driver. FIG. 54 shows a variation in power output in the power mode. The torque of the motor 20 output in addition to the torque of the engine 10 varies with a variation in accelerator travel. The total torque shown by the curve of the solid line is accordingly output to the drive shaft 15. The difference from the power assist control discussed in the fifth embodiment and its first modification is that the torque of the motor 20 is additionally output in any value of the accelerator travel. The addition of the torque of the motor 20 enhances the acceleration in response to the intention of the driver and thereby improves the controllability of the hybrid vehicle.

J. Sixth Embodiment

The following describes another hybrid vehicle in a sixth embodiment according to the present invention. The fifth embodiment and its modifications regard the hybrid vehicle that is driven with the power output to only one axle. The technique of the fifth embodiment is, however, not restricted to this structure, but is applicable to a hybrid vehicle that is driven with the power output to two axles, that is, a four wheel-drive hybrid vehicle. The application to the four wheel-drive hybrid vehicle is described below as the sixth embodiment.

Figure 55:
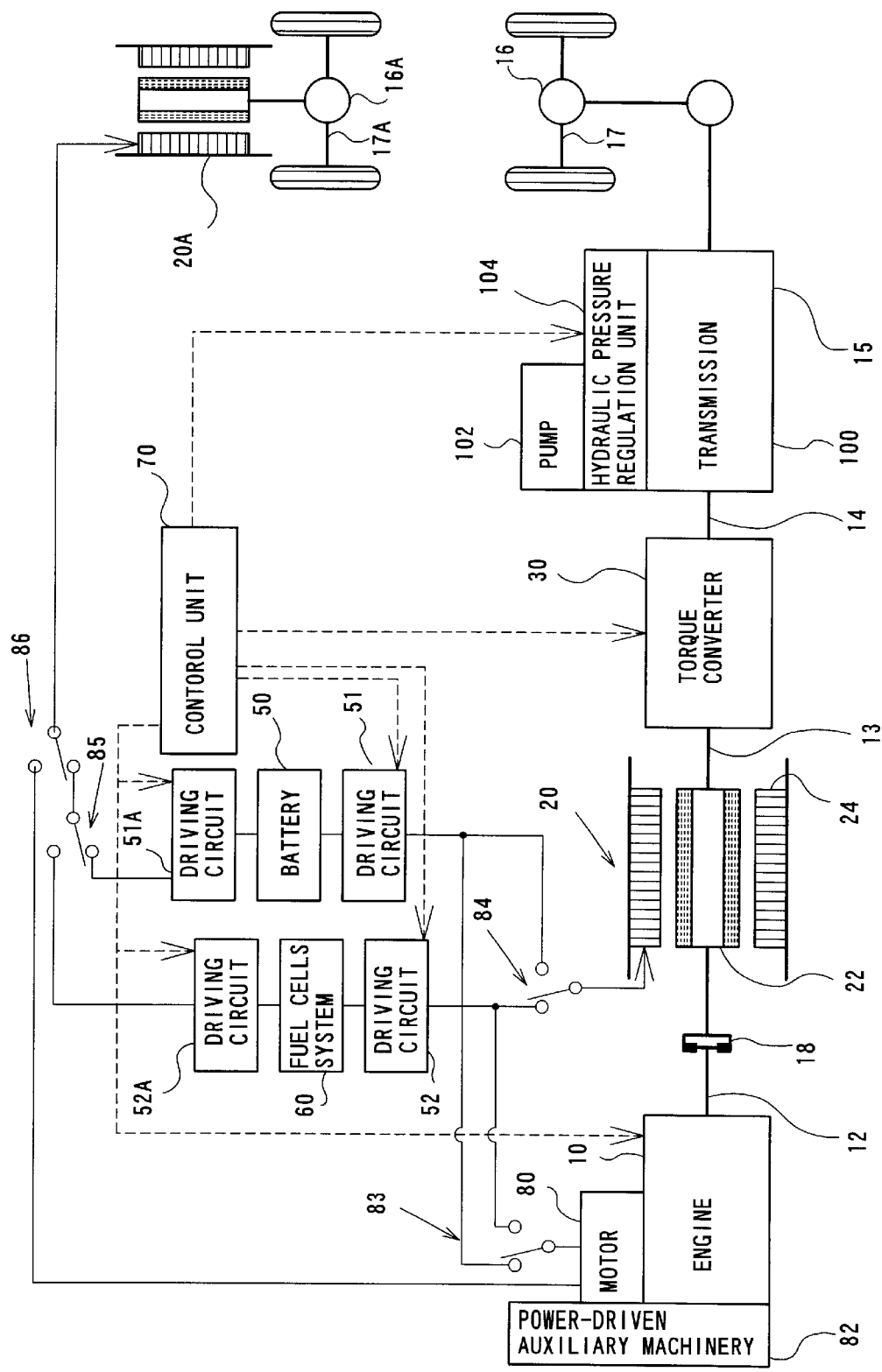
FIG. 55 schematically illustrates the structure of another hybrid vehicle in a sixth embodiment according to the present invention.

FIG. 55 schematically illustrates the structure of the hybrid vehicle in the sixth embodiment. The difference from the fifth embodiment is that power may be output to two axles 17 and 17A in the hybrid vehicle of the sixth embodiment. The structure of the sixth embodiment enables the driver to arbitrarily set the output of power to the axle 17A. A 4WD mode switch for specifying the four-wheel drive is disposed near the gearshift lever 162, in place of the sports mode switch 163 of the first embodiment shown in FIG. 5. Only when the 4WD mode switch is set in ON position, the power is output to both the axles 17 and 17A. When the 4WD mode switch is in OFF position, the power is output only to the axle 17 as in the case of the hybrid vehicle of the fifth embodiment. This structure is not essential, and one possible modification causes the power to be always output to both the axles 17 and 17A.

The mechanism of outputting power to the axle 17 is identical with that discussed in the first embodiment. This power output mechanism includes the engine 10, the motor 20, the torque converter 30, and the transmission 100 that are connected in series. Like the structure of the first embodiment, the electric power may be supplied from both the battery 50 and the fuel cell 60 to the motor 20.

Power is output to the axle 17A, on the other hand, through the following power output mechanism. A motor 20A is coupled with the axle 17A via a differential gear 16A. Like the motor 20, the motor 20A is a three-phase synchronous motor. The motor 20A may receive a supply of electric power from any of the battery 50, the fuel cell 60, and the auxiliary machinery driving motor 80. The supplies of electric power output from the battery 50 and the fuel cell 60 are fed to the motor 20A via driving circuits 51A and 52A, respectively. Like the driving circuits 51 and 52, the driving circuits 51A and 52A are constructed as transistor inverters. The auxiliary machinery driving motor 80 generates electric power with the power of the engine 10. Electric power generated by the auxiliary machinery driving motor 80 may be supplied directly to the motor 20A.

The working electric power supply used to supply electric power to the motor 20A is specified by changing the state of connection of changeover switches 85 and 86. As shown in FIG. 55, the changeover switch 86 changes the state of connection to select the working electric power supply between either one of the battery 50 and the fuel cell 60 and the auxiliary machinery driving motor 80. The changeover switch 85 changes the state of connection to select the working electric power supply between the battery 50 and the fuel cell 60.

The axles 17 and 17A may be used as the front axle and the rear axle or vice versa. In the structure where the engine 10 is mounted on the front part of the vehicle, if the axle 17 is set as the rear axle, a propeller shaft is required to transmit the mechanical power output from the engine through the vertical axis of the vehicle to the rear axle. If the axle 17A is set as the rear axle, on the other hand, the propeller shaft is not required. Disposing the axle 17 close to the engine 10 advantageously simplifies the structure of the power system.

The variety of control processes discussed in the fifth embodiment are also applied for the selective use of the power sources and the electric power supplies to output power to the axle 17 in the structure of the sixth embodiment. The following describes the selective use of the electric power supplies used to drive the motor 20A, which outputs power to the axle 17A.

Figure 56:
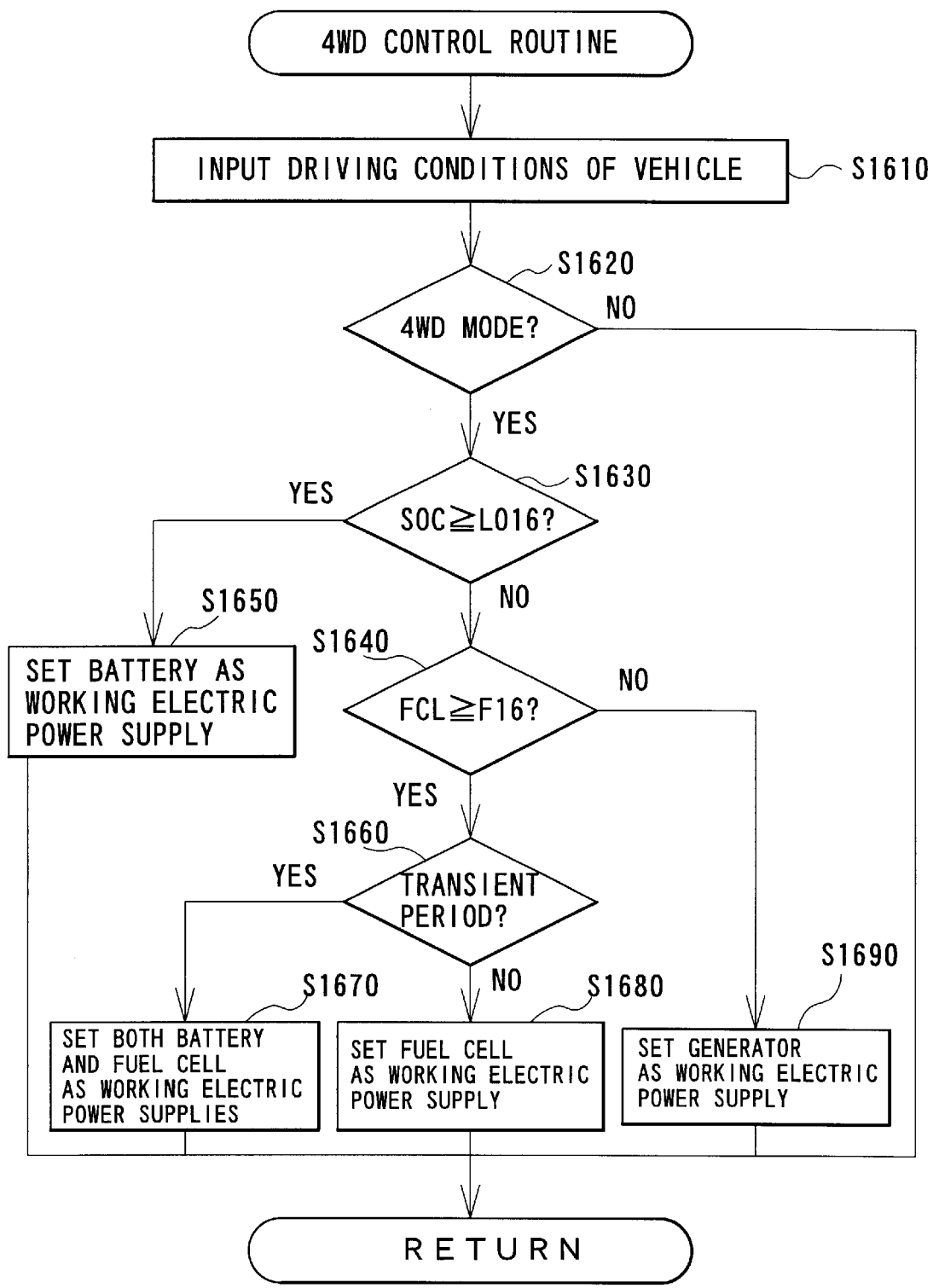
FIG. 56 is a flowchart showing a 4WD control routine executed in the sixth embodiment.

FIG. 56 is a flowchart showing a 4WD control routine executed in the sixth embodiment. This routine is carried out periodically by the CPU in the control unit 70 at preset time intervals. When the program enters the 4WD control routine, the CPU first receives the inputs regarding the driving conditions of the vehicle at step S1610. Among the diversity of inputs, the pieces of information on the on-off state of the 4WD mode switch, the gearshift position, the vehicle speed, the accelerator travel, the remaining charge SOC of the battery 50, and the remaining quantity FCL of the FC fuel for the fuel cell 60 are especially involved in the subsequent processing.

The CPU then determines whether or not the 4WD mode has been selected at step S1620. The decision of step S1620 is based on the on-off state of the 4WD mode switch. In the case of no selection of the 4WD model, activation of the motor 20A is not required. The CPU accordingly exits from the 4WD control routine of FIG. 56 without any further processing.

When it is determined at step S1620 that the 4WD mode has been selected, the CPU carries out the processing to select the working electric power supply of the motor 20A. As mentioned above, there are three electric power supplies available to drive the motor 20A. For the purpose of the appropriate selection of the working electric power supply, the CPU compares the remaining charge SOC of the battery 50 with a predetermined reference value LO16 at step S1630. Any value of greater than zero may be set arbitrarily to the reference value LO16. In the control process of the sixth embodiment, the reference value LO16 is determined to ensure the output of sufficient electric power from the battery 50 to supplement the insufficiency of electric power output from the fuel cell 60 in the transient period before the fuel cell 60 ensures output of a sufficient level of electric power.

In the case where the remaining charge SOC of the battery 50 is not less than the predetermined reference value LO16 at step S1630, the CPU determines that the battery 50 has a high charge level and thereby drives the motor 20A with the battery 50 as the working electric power supply at step S1650. In the case where the remaining charge SOC of the battery 50 is less than the predetermined reference value LO16 at step S1630, on the other hand, the CPU determines that the battery 50 has a low charge level and that the use of the electric power accumulated in the battery 50 is not allowed. The CPU then determines whether or not the fuel cell 60 is available for the working electric power supply. For the purpose of such decision, the CPU compares the remaining quantity FCL of the FC fuel for the fuel cell 60 with a predetermined level Fth16 at step S1640. Any value of greater than zero may be set arbitrarily to the predetermined level Fth16. Since the driver intentionally selects the 4WD mode through the positive operation, there is little requirement of driving the motor 20A with the electric power of the fuel cell 60 in the 4WD mode. The predetermined level Fth16 is accordingly set greater than, for example, the predetermined level Fth11 in the EV drive control routine of the fifth embodiment. In the case where the remaining quantity FCL of the FC fuel for the fuel cell 60 is not less than the predetermined level Fth16 at step S1640, the CPU determines that the fuel cell 60 is available for the working electric power supply and drives the motor 20A with the fuel cell 60 as the working electric power supply at steps S1660 through S1680.

In the case where the motor 20A is driven with the fuel cell 60 as the working electric power supply, the control process gradually changes over the working electric power supply from the battery 50 to the fuel cell 60 by taking into account the response delay of the fuel cell 60. The concrete procedure to change the working electric power supply is similar to the processing of the fifth embodiment. In response to the selection of the fuel cell 60 as the working electric power supply, the CPU determines at step S1660 whether or not the current state corresponds to the transient period before the fuel cell 60 ensures output of a sufficient level of electric power. The decision is based on the difference between the required electric power to be output from the fuel cell 60 and the electric power actually output from the fuel cell 60. When the difference exceeds a preset range, it is determined that the current state corresponds to the transient period. When the difference does not exceed the preset range, on the other hand, it is determined that the current state does not correspond to the transient period.

When it is determined at step S1660 that the current state corresponds to the transient period, the CPU drives the motor 20A with both the fuel cell 60 and the battery 50 as the working electric power supplies at step S1670. As discussed in the fifth embodiment, the difference between the required electric power and the electric power actually output from the fuel cell 60 is compensated with the electric power of the battery 50. When it is determined at step S1660 that the current state does not correspond to the transient period, on the contrary, the fuel cell 60 ensures output of a sufficient level of electric power. The CPU accordingly drives the motor 20A with only the fuel cell 60 as the working electric power supply at step S1680.

In the case where the remaining quantity FCL of the FC fuel for the fuel cell 60 is less than the predetermined level Fth16 at step S1640, on the other hand, the use of the fuel cell 60 as the working electric power supply is not allowed. In this case, the CPU drives the motor 20A with the generator, that is, the auxiliary machinery driving motor 80, as the working electric power supply at step S1690. The auxiliary machinery driving motor 80 is thus driven in specific driving conditions corresponding to the quantity of electric power to be regenerated. Namely the auxiliary machinery driving motor 80 is driven with a negative torque. The auxiliary machinery driving motor 80 is driven with the power of the engine 10, so that the required power of the engine 10 is enhanced simultaneously. The CPU repeatedly executes the series of the processing, so as to control the drive in the 4WD mode.

Figure 57:
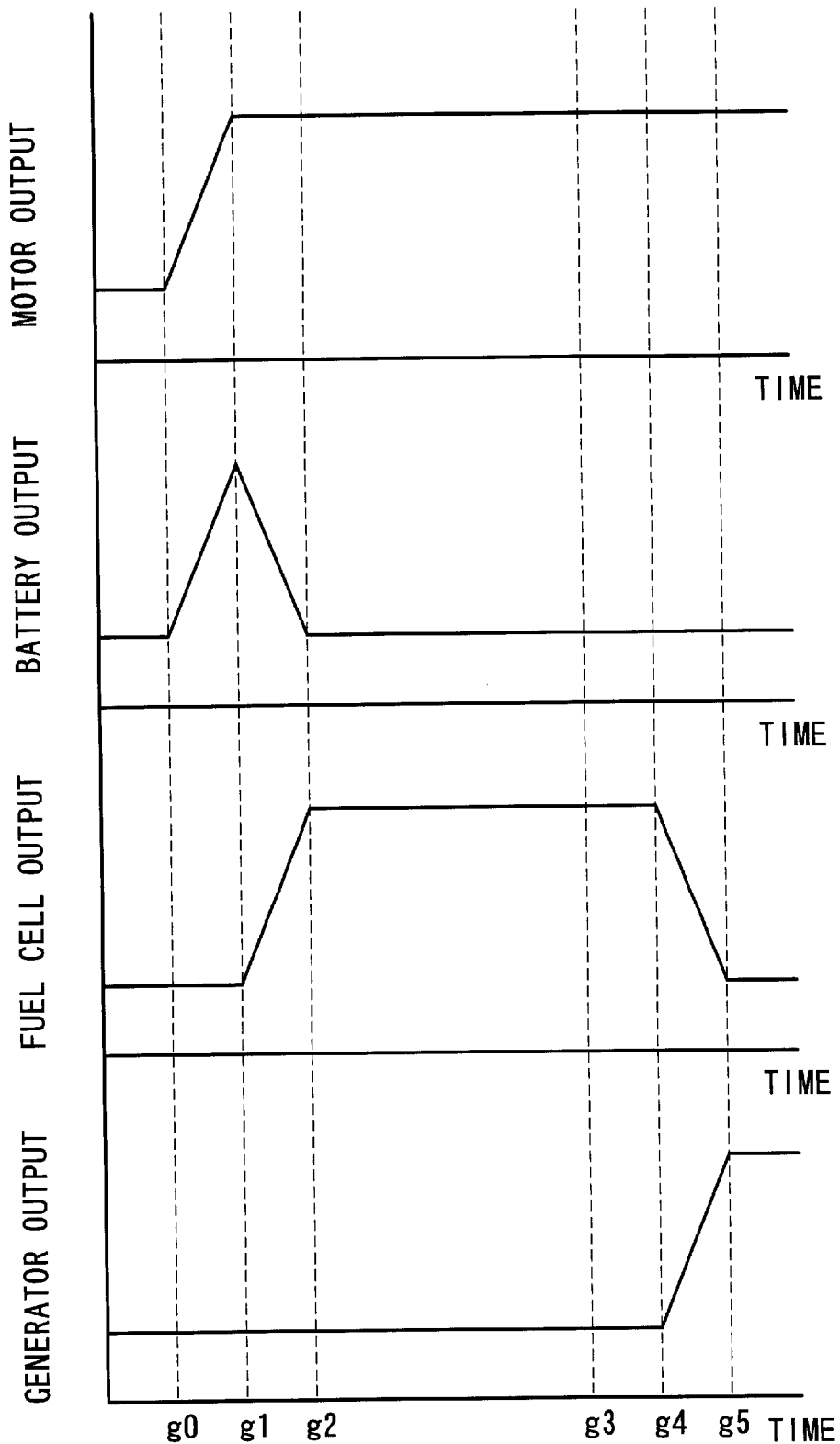
FIG. 57 shows variations in outputs of the respective power sources and electric power supplies in the 4WD control process.

FIG. 57 shows variations in outputs of the respective power sources and electric power supplies in the 4WD control process. The graphs of FIG. 57 show variations in output of the motor 20A, output of the battery 50, output of the fuel cell 60, and output of the generator 80 with the elapse of time when the 4WD mode is set on during the drive. At a time point g0, the 4WD mode is selected. Here it is assumed that the remaining charge SOC of the battery 50 is not less than the predetermined reference value LO16. Under such conditions, the motor 20A is driven with the battery 50 as the working electric power supply. The output of the motor 20A and the output of the battery 50 thus respectively rise to predetermined levels after the time point g0. Neither the fuel cell 60 nor the generator 80 is used in this state, and their outputs are kept zero.

At a time point g1, the remaining charge SOC of the battery 50 becomes less than the predetermined reference value LO16. Under such conditions, the working electric power supply to drive the motor 20A is changed from the battery 50 to the fuel cell 60. The fuel cell 60 starts driving at the time point g1, but there is a certain response delay of the output of electric power from the fuel cell 60. At a time point g2, the output of the fuel cell 60 reaches a sufficient level. The period between the time points g1 and g2 accordingly corresponds to the transient period. In the transient period, the electric power of the battery 50 is used to supplement the insufficiency of electric power output from the fuel cell 60. As shown by the graphs of FIG. 57, the output of the fuel cell 60 gradually increases while the output of the battery 50 gradually decreases in the transient period between the time points g1 and g2. After the time point g2, the motor 20A is driven with only the fuel cell 60 as the working electric power supply.

At a time point g4, the remaining quantity FCL of the FC fuel for the fuel cell 60 becomes less than the predetermined level Fth16. Under such conditions, the working electric power supply to drive the motor 20A is changed from the fuel cell 60 to the generator 80. As shown by the graphs of FIG. 57, the output of the fuel cell 60 gradually decreases while the output of the generator 80 gradually increases in the period between the time points g4 and g5. After the time point g5, the motor 20A is driven with only the generator 80 as the working electric power supply. The graphs of FIG. 57 are only illustrative. The variations in respective outputs may follow other variation patterns; for example, the output of the motor 20A may be varied in the course of the four-wheel drive using the motor 20A as the power source.

The 4WD control process of the sixth embodiment discussed above causes the hybrid vehicle to attain the four-wheel drive by selectively using the battery 50, the fuel cell 60, and the generator 80 for the working electric power supply in response to the selection of the 4WD mode. The battery 50, the fuel cell 60, and the generator 80 are preferentially used as the electric power supply in this sequence.

The battery 50 may be charged during the drive of the hybrid vehicle and recovered to the original charge level before the consumption. The 4WD control process of the sixth embodiment preferentially uses the reversible electric power supply, that is, the battery 50, and thereby restricts the use of the irreversible electric power supply, that is, the fuel cell 60. Namely this arrangement saves the FC fuel for the desired driving state of the fuel cell 60. The control procedure of the sixth embodiment ensures the appropriate use of the electric power supplies in a wide drive range, thereby enabling the power source of high driving efficiency and excellent environmental properties to be sufficiently used. The preferential use of the electric power of the battery 50 ensures the margin for charging the battery 50 in the course of regenerative braking, thereby improving the driving efficiency of the hybrid vehicle.

In the 4WD control process of the sixth embodiment, the fuel cell 60 is used preferentially over the generator 80. The enhanced output of the engine 10 is required in the case of using the electric power of the generator 80. This is disadvantageous from the viewpoints of the fuel consumption and the environmental properties. The preferential use of the fuel cell 60 reduces the possibility of such disadvantages.

K. Seventh Embodiment

K1. Structure of System

The fifth embodiment and the sixth embodiment regard the hybrid vehicles where the power of the engine is directly transmittable to the drive shaft. The technique of the fifth embodiment is, however, also applicable to the structure in which the power of the engine is used only for power generation. The hybrid vehicle of this structure is described below as a seventh embodiment according to the present invention.

Figure 58:
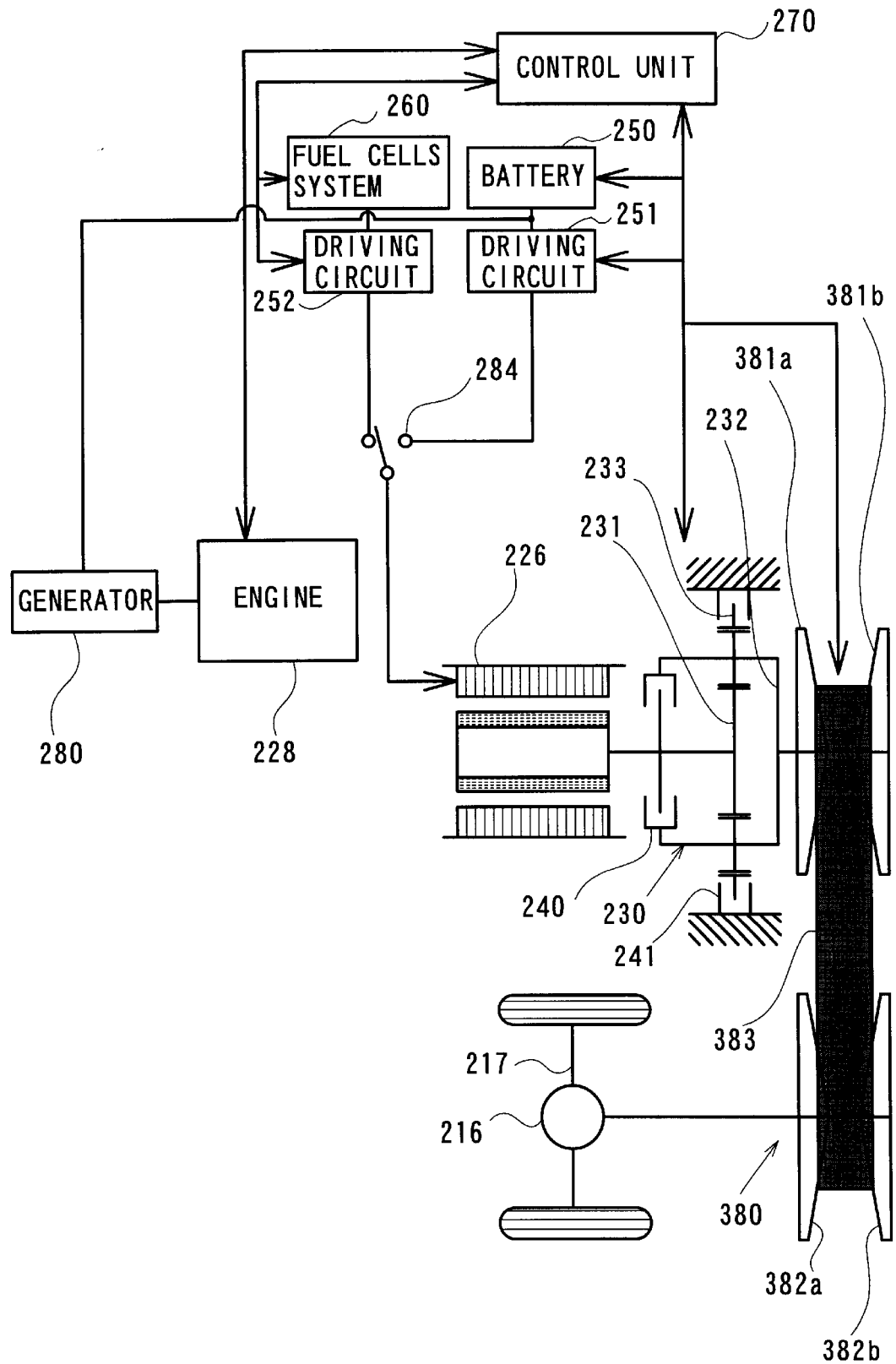
FIG. 58 schematically illustrates the structure of still another hybrid vehicle in a seventh embodiment according to the present invention.

FIG. 58 schematically illustrates the structure of the hybrid vehicle of the seventh embodiment. The hybrid vehicle includes an engine 228 and a motor 226 as power sources to output mechanical power. A fuel cells system 260 (hereinafter referred to as the fuel cell 260) and a battery 250 are provided as electric power supplies of the motor 226. The fuel cell 260 and the battery 250 are connected to the motor 226 respectively via driving circuits 252 and 251. These constituents are identical with the engine 10, the motor 20, the fuel cell 60, the battery 50, and the driving circuits 52 and 51 incorporated in the hybrid vehicle of the first embodiment. In the hybrid vehicle of the seventh embodiment, however, the engine 228 is used only as an auxiliary power source and has a relatively small displacement of about 50 cc.

An output shaft of the engine 228 is linked with a generator 280, so that the power of the engine 228 is not directly transmittable to an axle 217. The power output from the engine 228 is converted to electric power by the generator 280 and used to charge the battery 250 and drive the motor 226. In this sense, the motor 226 is provided with the combination of the engine 228 and the generator 280 as the third electric power supply, in addition to the fuel cell 260 and the battery 250. The selection of the working electric power supply is controlled through the operations of a changeover switch 284 and the driving circuits 252 and 251.

The motor 226 is linked with the axle 217 via a transmission mechanism, which includes a planetary gear unit 230, a continuously variable transmission (hereinafter referred to as the CVT) 380, and a differential gear 216. The connection of the motor 226 with the planetary gear unit 230 is discussed in detail. A rotor of the motor 226 is linked with a sun gear 231 of the planetary gear unit 230 and also with a planetary carrier 232 via a clutch 240. The planetary carrier 232 is coupled with a pair of input pulleys 381a and 381b of the CVT 380 and functions as the output shaft of the planetary gear unit 230. A ring gear 233 included in the planetary gear unit 230 has a brake 241 that controls rotation of the ring gear 233. When the clutch 240 is coupled and the brake 241 is released, the rotor of the motor 226 is in direct connection with the CVT 380. When the clutch 240 is released and the brake 241 is coupled, on the other hand, the power of the motor 226 is converted to have the reduced revolving speed according to the gear ratio of the planetary gear unit 230 and transmitted to the CVT 380. This is based on the function of the planetary gear unit discussed in the first embodiment.

The CVT 380 has a belt 383 spanned between the pair of input pulleys 381a and 381b and a pair of output pulleys 382a and 382b. The interval between the paired input pulleys 381a and 381b or the paired output pulleys 382a and 382b is varied by means of the hydraulic pressure, so that the effective diameter of the contact of the paired pulleys with the belt 383 is varied. The CVT 380 of this configuration enables the conversion of power in a continuously variable manner and the transmission of the converted power. The hybrid vehicle of the seventh embodiment controls the operations of the clutch 240, the brake 241, and the CVT 380, thereby enabling the output torque of the motor 226 to be converted in a wide range and output to the axle 217. The control processes of the seventh embodiment are executed according to a variety of maps by the control unit 270, like the control processes of the fifth embodiment executed by the control unit 70.

K2. EV Drive Control Routine

Figure 59:
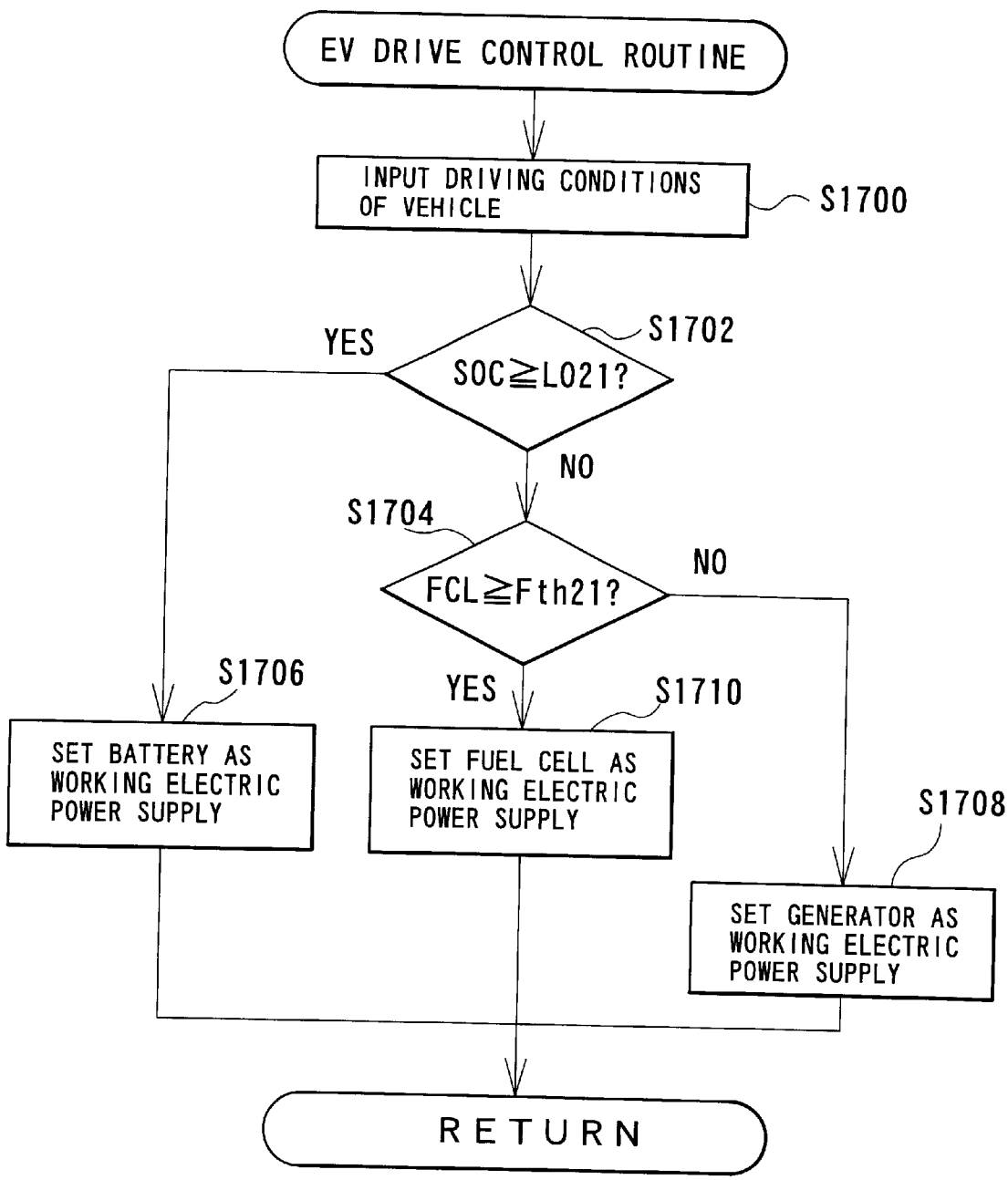
FIG. 59 is a flowchart showing an EV drive control routine executed in the seventh embodiment.

The hybrid vehicle of the seventh embodiment has the battery 250, the fuel cell 260, and the generator 280 as the electric power supplies of the motor 226. The selection of the working electric power supply is controlled by an EV drive control process discussed below. FIG. 59 is a flowchart showing an EV drive control routine executed in the seventh embodiment. The EV drive control process preferentially uses the battery 250, the fuel cell 260, and the generator 280 as the working electric power supply in this sequence. In the case of the insufficient remaining charge SOC of the battery 250, the fuel cell 260 is driven to carry out power generation. In the case of the incapability of the fuel cell 260, for example, due to the insufficient remaining quantity FCL of the FC fuel for the fuel cell 260, the generator 280 is used for power generation. In this sense, the combination of the engine 228 with the generator 280 is regarded as the auxiliary electric power supply.

When the program enters the EV drive control routine of FIG. 59, the CPU first receives the inputs regarding the driving conditions of the vehicle at step S1700. The CPU then compares the remaining charge SOC of the battery 250 with a predetermined reference value LO21 at step S1702. In the case where the remaining charge SOC is not less than the predetermined reference value LO21 at step S1702, the motor 226 is driven with the battery 250 as the working electric power supply at step S1706. In the case where the remaining charge SOC is less than the predetermined reference value LO21 at step S1702, on the other hand, the CPU compares the remaining quantity FCL of the FC fuel for the fuel cell 260 with a predetermined level Fth21 at step S1704. In the case where the remaining quantity FCL of the FC fuel is not less than the predetermined level Fth21 at step S1704, the motor 226 is driven with the fuel cell 260 as the working electric power supply at step S1710. In the case where the remaining quantity FCL of the FC fuel is less than the predetermined level Fth21 at step S1704, on the other hand, the CPU determines that the fuel cell 260 is not available for the working electric power supply. The CPU accordingly drives the engine 228 and causes the generator 280 to carry out power generation and function as the working electric power supply to drive the motor 226 at step S1708. The reference value LO21 and the predetermined level Fth21 are set according to the variety of factors discussed in the first embodiment.

K3. Fuel Cell Activation Control Process

Even when the fuel cell 260 is selected as the working electric power supply in the EV drive control routine of FIG. 59, if the fuel cell 260 does not enable the output of a sufficient level of electric power, for example, due to the lack of the warm-up, the hybrid vehicle of the seventh embodiment executes a fuel cell activation control process, so as to compensate the insufficiency of electric power with the electric power of the battery 250 and the generator 280.

Figure 60:
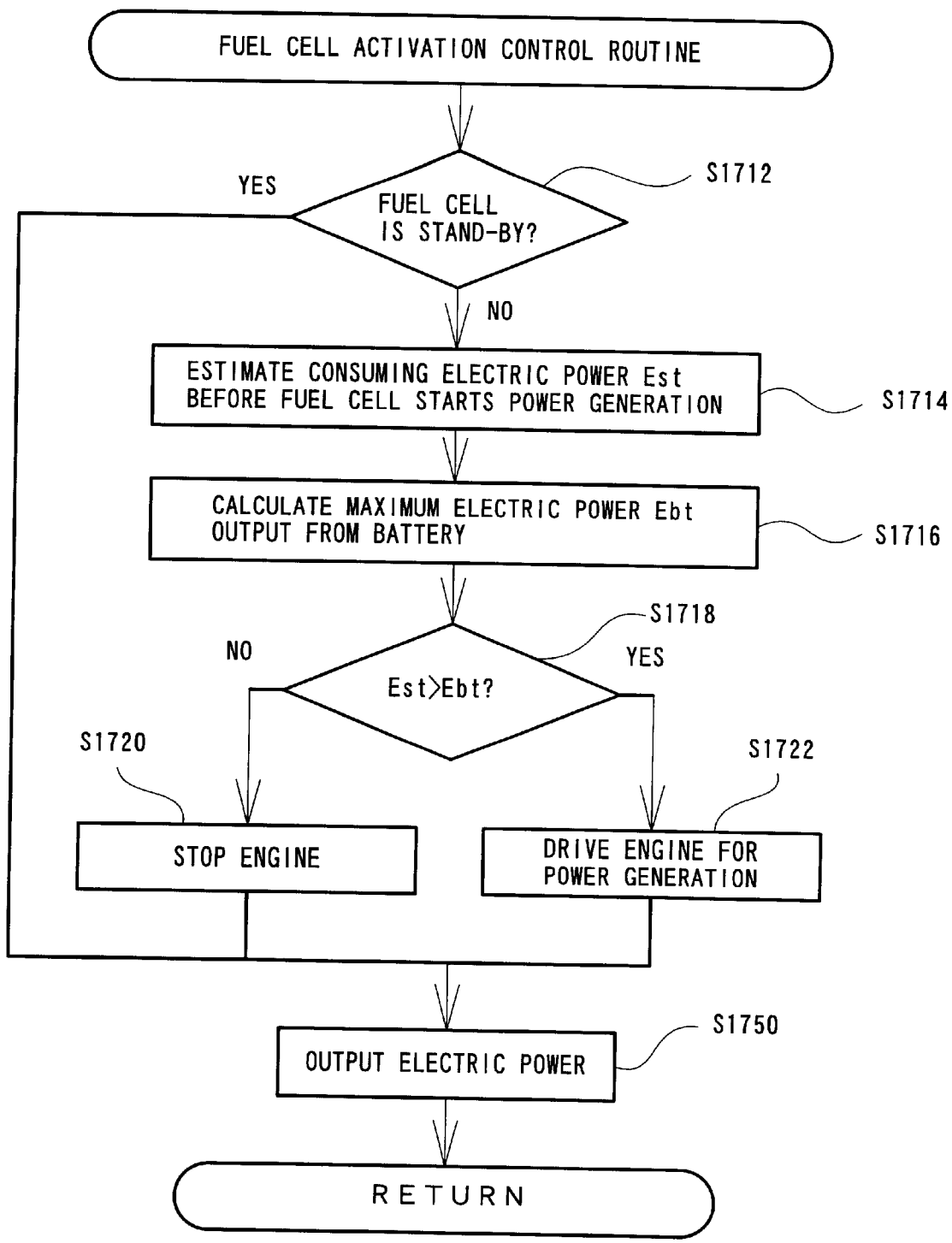
FIG. 60 is a flowchart showing a fuel cell activation control routine executed in the seventh embodiment.

FIG. 60 is a flowchart showing a fuel cell activation control routine executed in the seventh embodiment. This routine is carried out when the power generation of the fuel cell 260 is required at step S1710 in the EV drive control routine of FIG. 59. The fuel cell activation control routine may be executed whenever the power generation of the fuel cell 260 is required at step S1710 or alternatively only when the fuel cell 260 has not yet been warmed up and is cold.

When the program enters the fuel cell activation control routine of FIG. 60, the CPU first determines whether or not the fuel cell 260 is stand-by at step S1712. The decision of step S1712 is based on the determination of whether or not the temperature of the fuel cell 260 is sufficiently high to allow immediate power generation. When the fuel cell 260 is stand-by, the fuel cell 260 is capable of immediate power generation. The output of electric power from the fuel cell 260 is thus initiated immediately without any further processing at step S1750.

When the fuel cell 260 is not stand-by, on the other hand, the CPU carries out the processing to compensate the insufficient electric power with the electric power of the battery 250 and the generator 280 until the fuel cell 260 is warmed up to the temperature that allows power generation. The CPU first estimates consuming electric power Est, which is required before the fuel cell 260 starts power generation, at step S1714. The estimated consuming electric power Est includes electric power required to drive the motor 226 for a run of the hybrid vehicle, as well as electric power consumed by air-conditioning equipment and lighting equipment. When the fuel cell 260 is warmed up with electricity supplied to a heater, the estimated consuming electric power Est further includes the electric power required for the warm-up.

Figure 61:
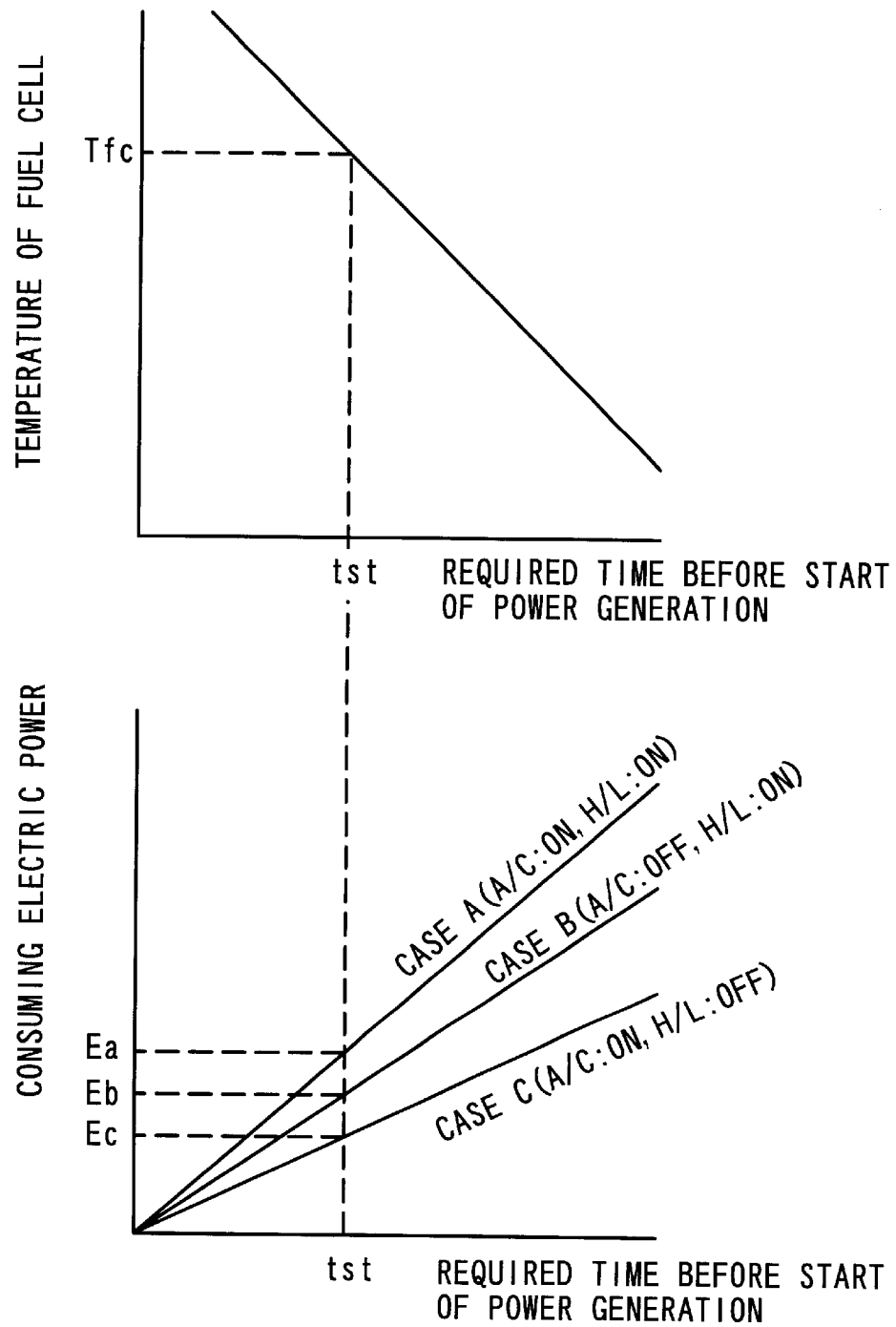
FIG. 61 is maps used for specifying consuming electric power Est.

The technique of the seventh embodiment specifies the consuming electric power Est according to maps based on the temperature of the fuel cell 260. FIG. 61 is maps used for specifying the consuming electric power Est. The upper drawing is a map showing a variation in required time before the start of power generation from the fuel cell 260 plotted against the temperature of the fuel cell 260. As shown by the broken line, the required time read from the map is tst when the temperature of the fuel cell 260 is equal to Tfc. The higher temperature of the fuel cell 260 naturally shortens the required time. The map illustrated here has the linear variation in temperature of the fuel cell 260 against the required time. The map may, however, be set based on experiments or analyses according to the structure of the fuel cell 260 and may have a non-linear variation.

The lower drawing is maps showing variations in consuming electric power plotted against the required time. In the control process of this embodiment, three different maps are provided according to the on-off states of the air-conditioning equipment (A/C) and the lighting equipment (H/L). In CASE A, both the air-conditioning equipment and the lighting equipment are ON. In CASE B, only the lighting equipment is ON. In CASE C, only the air-conditioning equipment is ON. As shown by the broken lines, the consuming electric power read from the maps is Ea, Eb, and Ec in the respective three cases when the required time is equal to tst. Although the three maps are provided for the above three cases in this embodiment, a larger number of maps may further be provided according to the on-off state of power-driven equipment other than the air-conditioning equipment and the lighting equipment. Maps may have non-linear variations. The consuming electric power is generally proportional to the required time. The consuming electric power may thus be obtained by arithmetic operations, instead of using the maps. The consuming electric power is actually varied according to the driving conditions of the vehicle, for example, the torque to be output from the motor 226. The maps of this embodiment set the largest possible values estimated in the respective cases.

Referring back to the flowchart of FIG. 60, after estimating the consuming electric power Est, the CPU calculates maximum electric power Ebt that can be output from the battery 250 at step S1716. The maximum electric power Ebt is obtained from the remaining charge SOC of the battery 250.

The CPU then compares the estimated consuming electric power Est with the maximum electric power Ebt that can be output from the battery 250 at step S1718. In the case where the consuming electric power Est is greater than the maximum electric power Ebt, the CPU determines that the compensation of electric power can not be attained only by the battery 250. The CPU accordingly starts driving the engine 228 and the generator 280 for power generation at step S1722. The required electric power is then output from both the battery 250 and the generator 280 at step S1750. In the case where the consuming electric power Est is not greater than the maximum electric power Ebt, on the other hand, the CPU determines that the compensation of electric power can be attained only by the battery 250. The CPU accordingly stops the operation of the engine 228 and the generator 280 for power generation at step S1720. The required electric power is then output from the battery 250 at step S1750.

Figure 62:
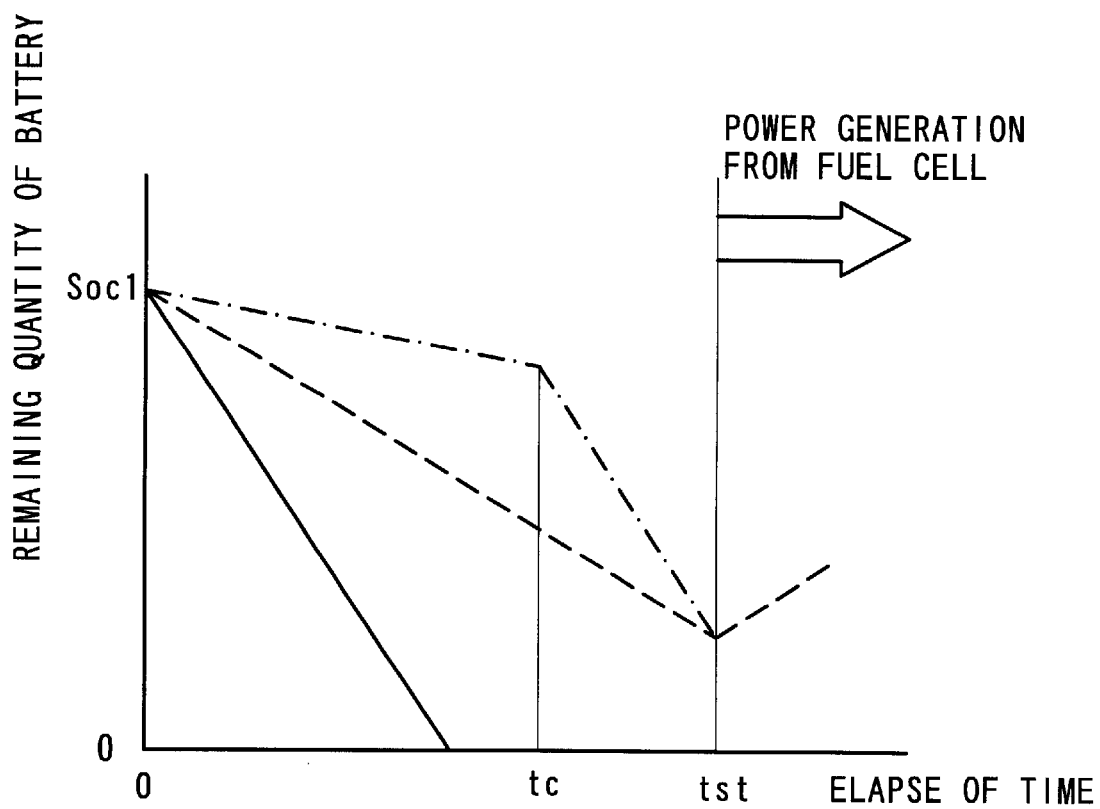
FIG. 62 is a graph showing a variation in remaining charge of the battery in the case of activation of the fuel cell.

The advantages of the fuel cell activation control process executed in the seventh embodiment are discussed in a concrete example. FIG. 62 is a graph showing a variation in remaining charge SOC of the battery 250 in the case of activation of the fuel cell 260. A response delay of the fuel cell 260 between the issuance of the requirement of power generation from the fuel cell 260 and the actual supply of sufficient electric power from the fuel cell 260 is expressed as tst. The battery 250 has a remaining charge Soc1 at a time point when the requirement of power generation is issued.

The graph of the solid line in FIG. 62 represents a variation in remaining charge SOC of the battery 250 in the case where the response delay of the fuel cell 260 is compensated only with the electric power of the battery 250. If only the battery 250 is used for the compensation, there is a fair possibility that the electric power of the battery 250 is completely exhausted before the fuel cell 260 starts power generation as shown by the graph of the solid line. This, of course, depends upon the driving conditions of the hybrid vehicle and the remaining charge SOC of the battery 250, though. In order to reduce such possibility, the initial remaining charge SOC of the battery 250 should be an extremely large value. This causes a large value to be set to the predetermined reference value LO21 used as the criterion at step S1702 in the EV drive control routine of FIG. 59. Even a little consumption of electric power from the battery 250 causes the working electric power supply to be changed to the fuel cell 260. This undesirably leads to the excessive use of the fuel cell 260.

The graph of the broken line in FIG. 62 represents a variation in remaining charge SOC of the battery 250 in the case where the fuel cell activation control routine of this embodiment shown in FIG. 60 is executed. When it is determined that the initial remaining charge Soc1 of the battery 250 is not sufficient for the compensation of electric power until the fuel cell 260 starts power generation, the engine 228 and the generator 280 start driving. This arrangement preferably controls the decrease in remaining charge SOC of the battery 250 and enables the fuel cell 260 to start power generation before the electric power of the battery 250 is completely exhausted. Once the fuel cell 260 starts power generation, the battery 250 can be charged to have a gradually increasing remaining charge SOC.

The following describes the method of setting the drive point of the engine 228 in the case where the combination of the engine 228 and the generator 280 is used for the compensation of electric power. The drive point of the engine 228 should be set to ensure output of a sufficient level of power that prevents the electric power of the battery 250 from being completely exhausted within the time period tst before the fuel cell 260 starts power generation. As long as the output of such power is guaranteed, the drive point of the engine 228 may be set arbitrarily. For example, as shown by the graph of the one-dot chain line in FIG. 62, high power may be output from the engine 228 to further restrict the consumption of electric power accumulated in the battery 250. Under the condition of the output of such high power, the drive of the engine 228 may be stopped at a time point tc. In this case, only the battery 250 is used for the compensation of electric power after the time point tc. Such control is readily implemented by repeatedly executing the fuel cell activation control routine of FIG. 60 at preset timings until the fuel cell 260 starts power generation. The early stop of the engine 228 may improve the fuel consumption and the environmental properties of the hybrid vehicle. The drive point of the engine 228 may be set to output a high level of power that does not require the electric power of the battery 250 at all or to output a higher level of power that allows the battery 250 to be charged.

Figure 63:
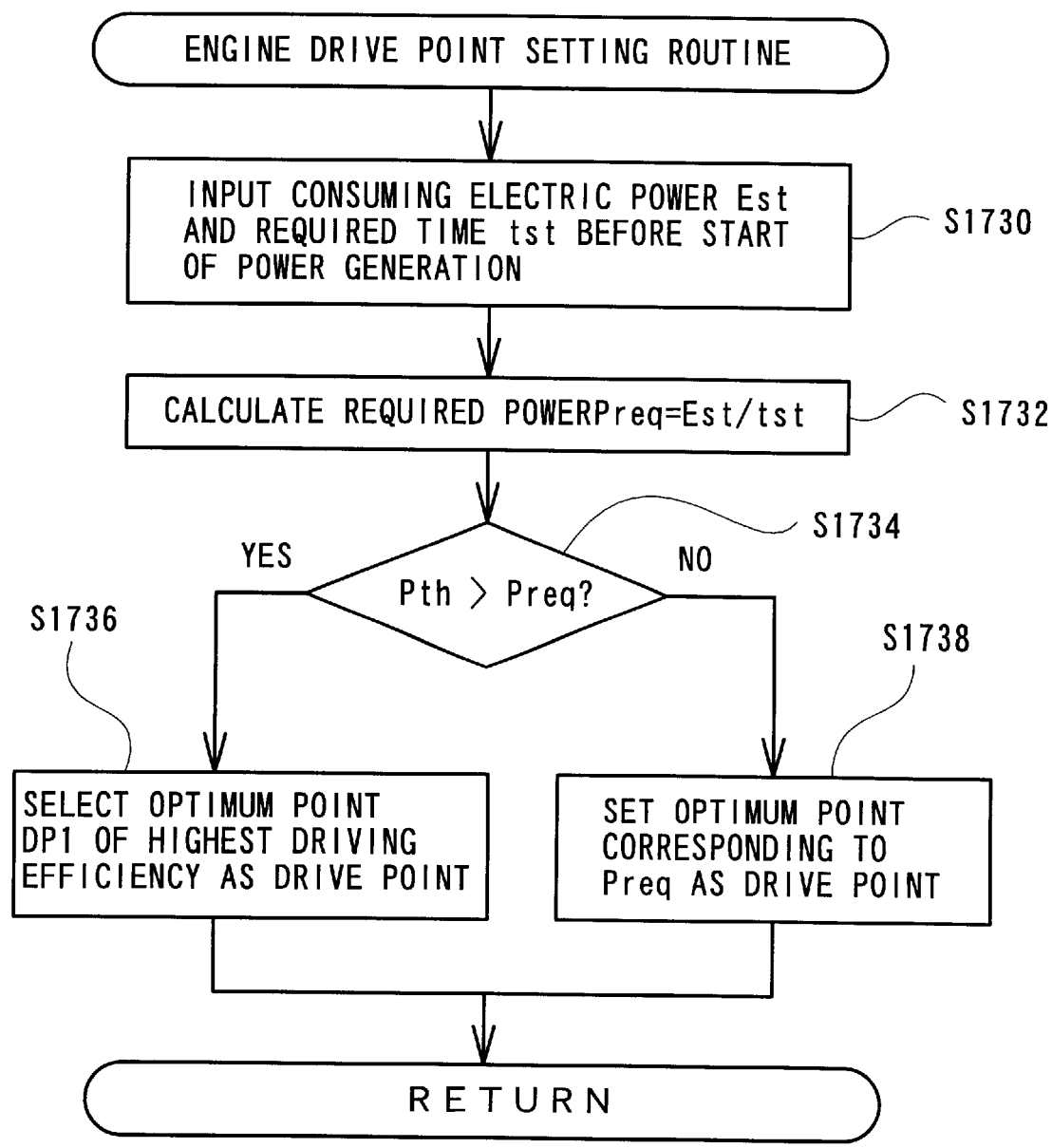
FIG. 63 is a flowchart showing an engine drive point setting routine.

The drive point may be set arbitrarily as long as the output of the minimum required power is guaranteed. The drive point may be selected among a plurality of drive points set in advance. The technique of the embodiment, however, sets the drive point of the engine 228 by giving a preference to the driving efficiency, based on the ideas discussed below. FIG. 63 is a flowchart showing an engine drive point setting routine. This routine is executed when the drive of the engine 228 is required at step S1722 in the fuel cell activation control routine of FIG. 60.

When the program enters the engine drive point setting routine of FIG. 63, the CPU first receives the inputs regarding the estimated consuming electric power Est and the required time tst before the fuel cell 260 starts power generation at step S1730. The CPU then calculates required power Preq from the inputs according to an equation of Preq=Est/tst at step S1732. The required power Preq is on the assumption that the consuming electric power Est is output in a substantially uniform manner in the time period tst. Some margin may be added to the required power Preq by taking into account a diversity of losses and a possible variation in consuming electric power.

Figure 64:
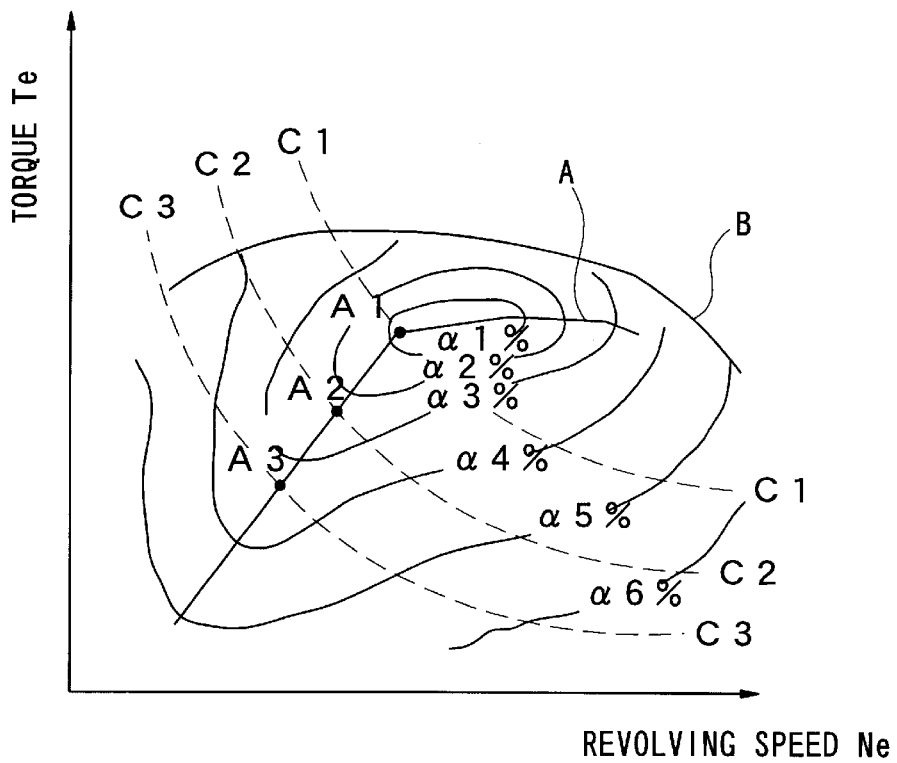
FIG. 64 is a graph showing the relationship between the drive point of the engine and the driving efficiency.

The drive point of the engine 228 is set, based on the required power Preq calculated as discussed above, according to the following ideas. FIG. 64 is a graph showing the relationship between the drive point of the engine and the driving efficiency. A curve B defines limits of revolving speed and torque in a drivable range of the engine 228. Curves α1, α2, . . . , α6 are equal driving efficiency curves, and the driving efficiency decreases in this order. Curves C1, C2, and C3 are equal power curves, on each of which the output power of the engine 228, that is, the product of the revolving speed and the torque of the engine 228, is fixed. The driving efficiency of the engine 228 varies with variations in revolving speed and torque. Setting powers to be output C1, C2, and C3 determines drive points A1, A2, and A3 of the highest driving efficiency. A curve A represents a set of such drive points of the highest driving efficiency against the respective powers. The curve A is called a working curve.

Figure 65:
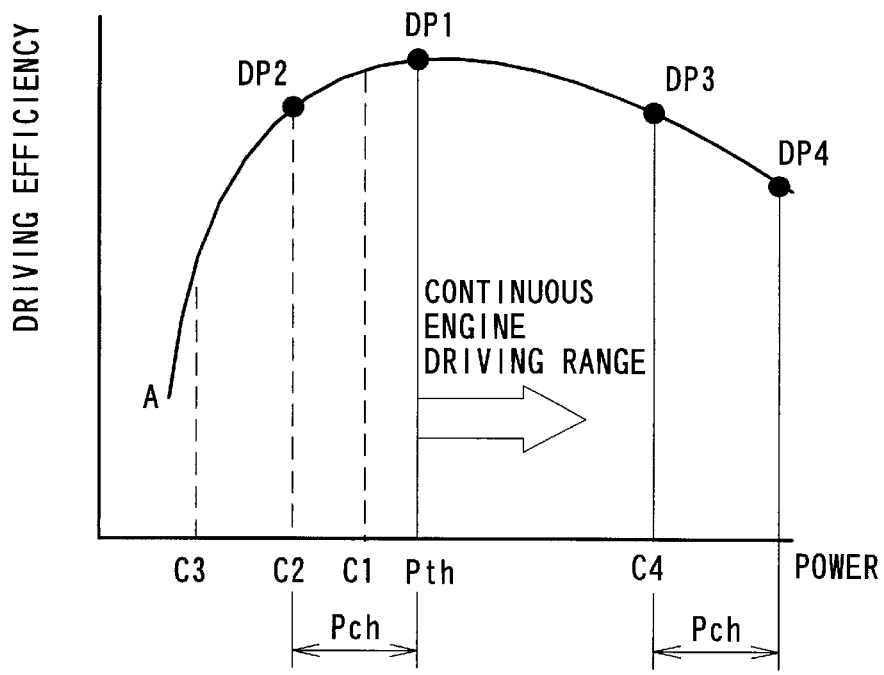
FIG. 65 is a graph showing the relationship between the power and the driving efficiency when the engine is driven on a working curve.

FIG. 65 is a graph showing the relationship between the power and the driving efficiency when the engine is driven on the working curve. The driving efficiency reaches its maximum at a drive point DP1 where a predetermined level of power Pth is output, and gradually decreases with a deviation of the power from the predetermined level Pth. In this sense, Pth is considered as the optimum power. In the actual driving conditions, some extremes may appear, but the drive point that outputs the optimum power Pth and attains the highest driving efficiency is not varied.

The technique of the embodiment gives a preference to the driving efficiency and basically sets the optimum power Pth to the drive point of the engine 228. In the case where the minimum required power Preq to compensate for the insufficiency of electric power output from the battery 250 is less than the optimum power Pth, for example, in the case of the output power C2 shown in FIG. 65, the output power from the engine 228 includes a marginal power Pch. The battery 250 may thus be charged with this marginal power Pch. When the required power Preq is less than the optimum power Pth, the engine 228 is driven not at a drive point DP2 corresponding to the required power Preq but at the drive point DP1 that allows output of the marginal power Pch. This enhances the driving efficiency of the engine 228.

In the case where the minimum required power Preq is greater than the optimum power Pth, for example, in the case of the output power C4 shown in FIG. 65, driving the engine 228 at the drive point DP1 makes the power output from the engine 228 insufficient. The engine 228 should thus be driven at a drive point DP3 corresponding to the required power Preq, although the driving efficiency of the engine 228 is slightly lowered at the drive point DP3. If the marginal power Pch is further required to charge the battery 250 under these conditions, the drive point of the engine 228 is shifted to a drive point DP4 shown in FIG. 65. This further lowers the driving efficiency of the engine 228. It is accordingly desirable that the engine 228 is driven at the drive point corresponding to the required power Preq, which does not enable output of the marginal power, when the required power Preq is greater than the optimum power Pth.

The technique of this embodiment sets the drive point of the engine 228 based on the ideas discussed above. Referring back to the flowchart of FIG. 63, when the required power Preq of the engine 228 is greater than the optimum power Pth at step S1734, the drive point DP1 corresponding to the optimum power Pth is selected as the drive point at step S1736. Otherwise the drive point corresponding to the required power Preq on the working curve A is selected as the drive point at step S1738. The engine 228 is driven at the selected drive point, in order to allow the compensation of electric power with a high efficiency.

In the hybrid vehicle of the seventh embodiment discussed above, in response to the requirement of power generation from the fuel cell 260, the battery 250 and the generator 280 are selectively used to compensate for the response delay of the fuel cell 260 and thereby ensure stable output of the required electric power. In the case of the shortage of electric power output from the battery 250, the generator 280 may be used for the further compensation. This enables the more stable output of the required electric power. The battery 250 is used preferentially over the generator 280 in the process of compensating the electric power. This improves the fuel consumption and the environmental properties of the hybrid vehicle.

L. Eighth Embodiment

L1. Structure of System

Figure 66:
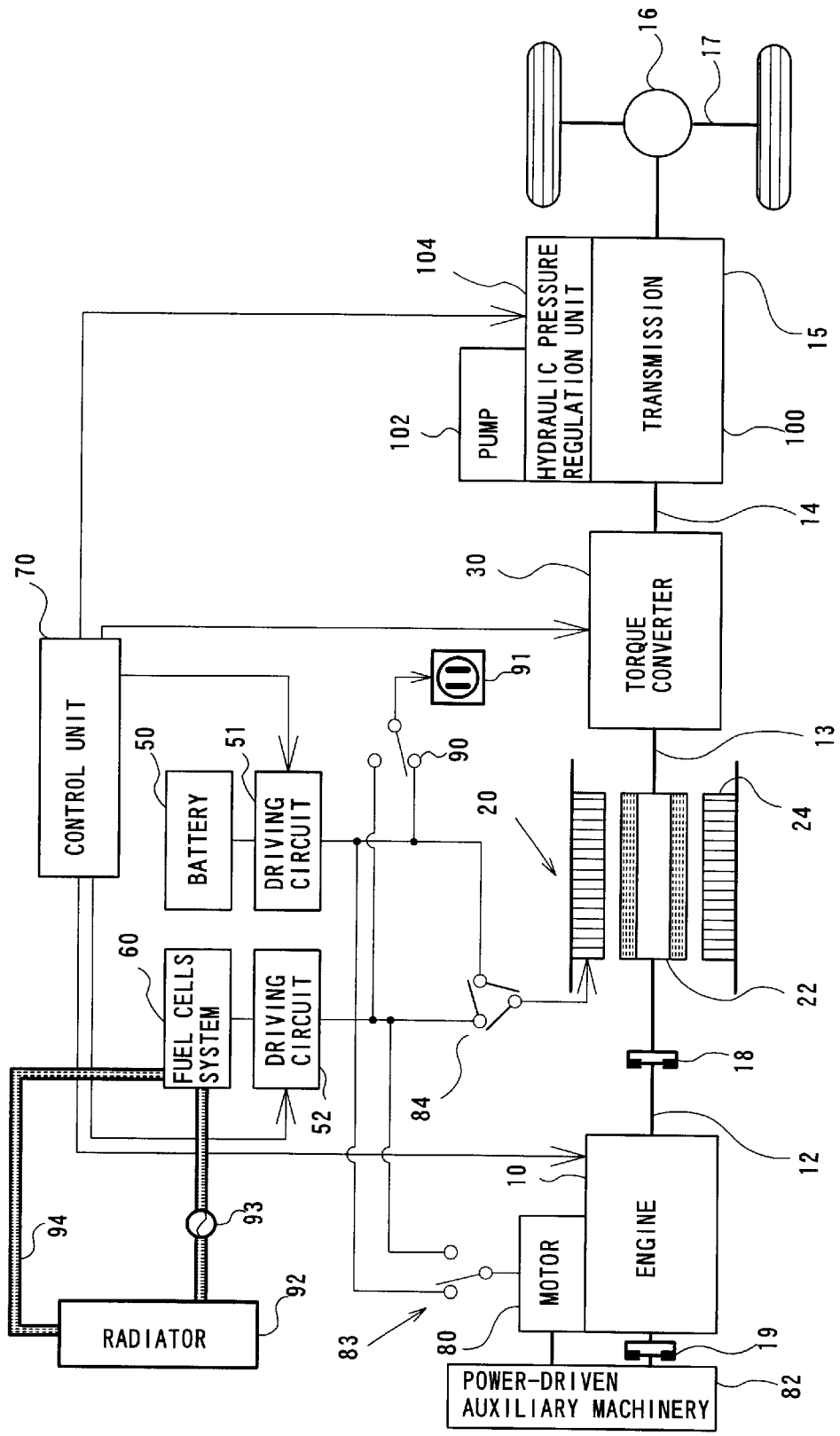
FIG. 66 schematically illustrates the structure of another hybrid vehicle in an eighth embodiment according to the present invention.

FIG. 66 schematically illustrates the structure of another hybrid vehicle in an eighth embodiment according to the present invention. The structure of the hybrid vehicle of the eighth embodiment is basically similar to the structure of the hybrid vehicle of the first embodiment. The hybrid vehicle of the eighth embodiment has a cooling system exclusively used for cooling down the fuel cell 60, in addition to the cooling system of the engine 10 that is not specifically illustrated in FIG. 66. The cooling system for the fuel cell 60 includes a radiator 92, a pump 93, and a coolant conduit 94, through which cooling water flows. The hybrid vehicles of the first through the seventh embodiments discussed above naturally have the equivalent cooling system for the engine 10 and the fuel cell 60, although not specifically illustrated nor described.

Figure 67:
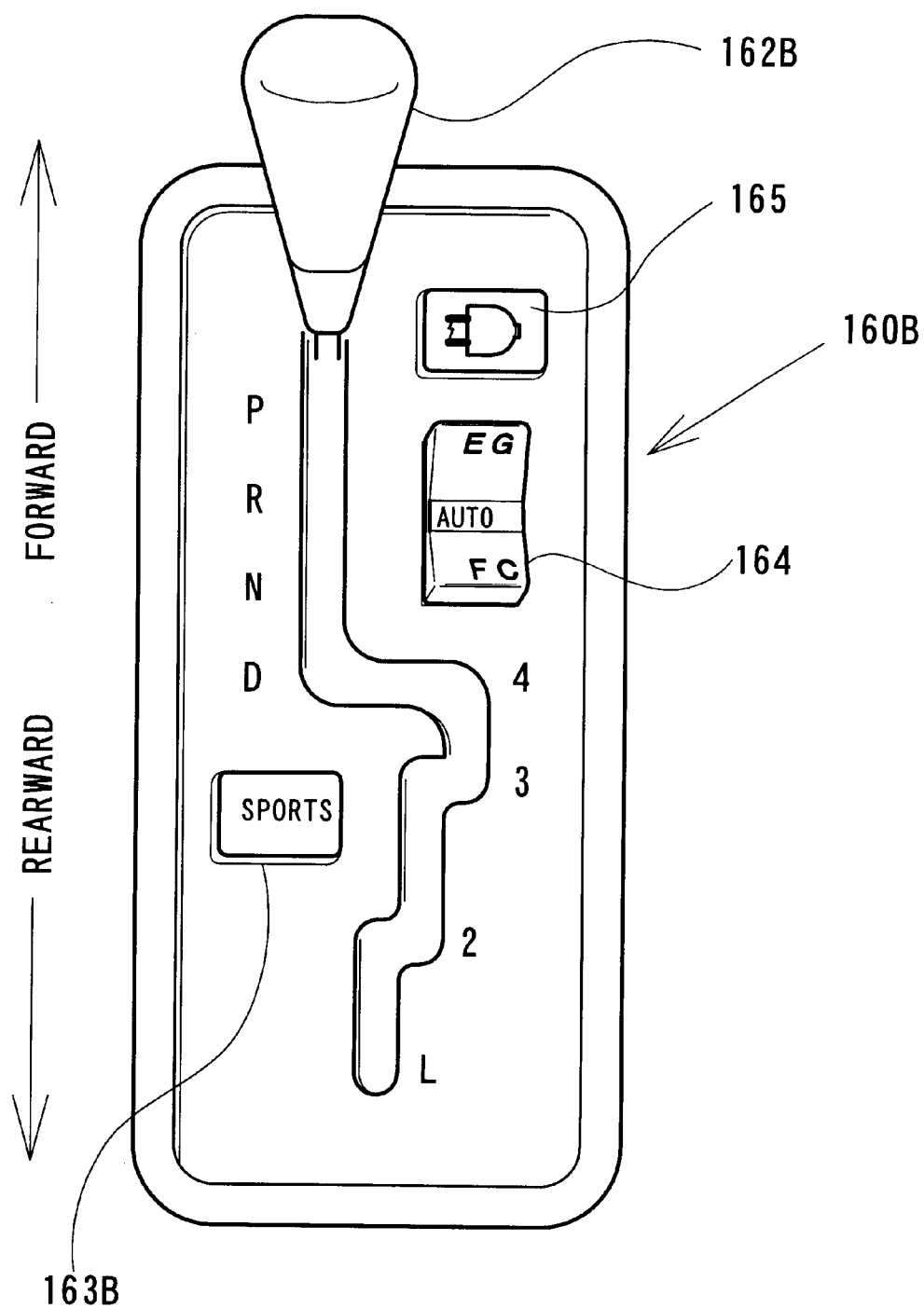
FIG. 67 shows an operation unit for selecting the gearshift position in the hybrid vehicle of the eighth embodiment.

The main difference from the first embodiment is that the hybrid vehicle of the eighth embodiment has an outlet 91 for taking electric power out and a changeover switch 90 for changing over the working electric power supply connected with the outlet 91. FIG. 67 shows an operation unit 160B for selecting the gearshift position in the hybrid vehicle of the eight embodiment.

The operation unit 160B has a gearshift lever 162B and a variety of switches, which are operated by the driver to specify the driving state of the vehicle, that is, a sports mode switch 163B, a power source changeover switch 164, and a manual power generation switch 165.

The power source changeover switch 164 is used to specify the selection of the working power source during a drive of the hybrid vehicle. The power source changeover switch 164 is axially movable relative to the central part having the display of 'AUTO' like the movement of a seesaw, so as to set three different drive modes. An engine (EG) mode is set when the power source changeover switch 164 is pressed forward by pushing the front part having the display of 'EG'. An FC mode is set when the power source changeover switch 164 is pressed rearward by pushing the rear part having the display of 'FC'. An auto mode is set when the power source changeover switch 164 is in neutral position. The details of the respective drive modes will be discussed later with the control process of this embodiment.

The manual power generation switch 165 allows the electric power to be taken out of the outlet 91. While the manual power generation switch 165 is in ON position, in the case where the hybrid vehicle is capable of supplying electric power, insertion of a plug into the outlet 91 enables activation of a diversity of electrical appliances according to the control process discussed below. While the manual power generation switch 165 is in OFF position, on the other hand, the outlet 91 is not usable regardless of the power generation ability of the hybrid vehicle.

The hybrid vehicle of the embodiment has the engine 10 and the fuel cell 60 as main energy output sources. The hybrid vehicle of this embodiment has a display to inform the driver of the energy source currently working to drive the hybrid vehicle, so as to make the driver feel easy.

Figure 68:
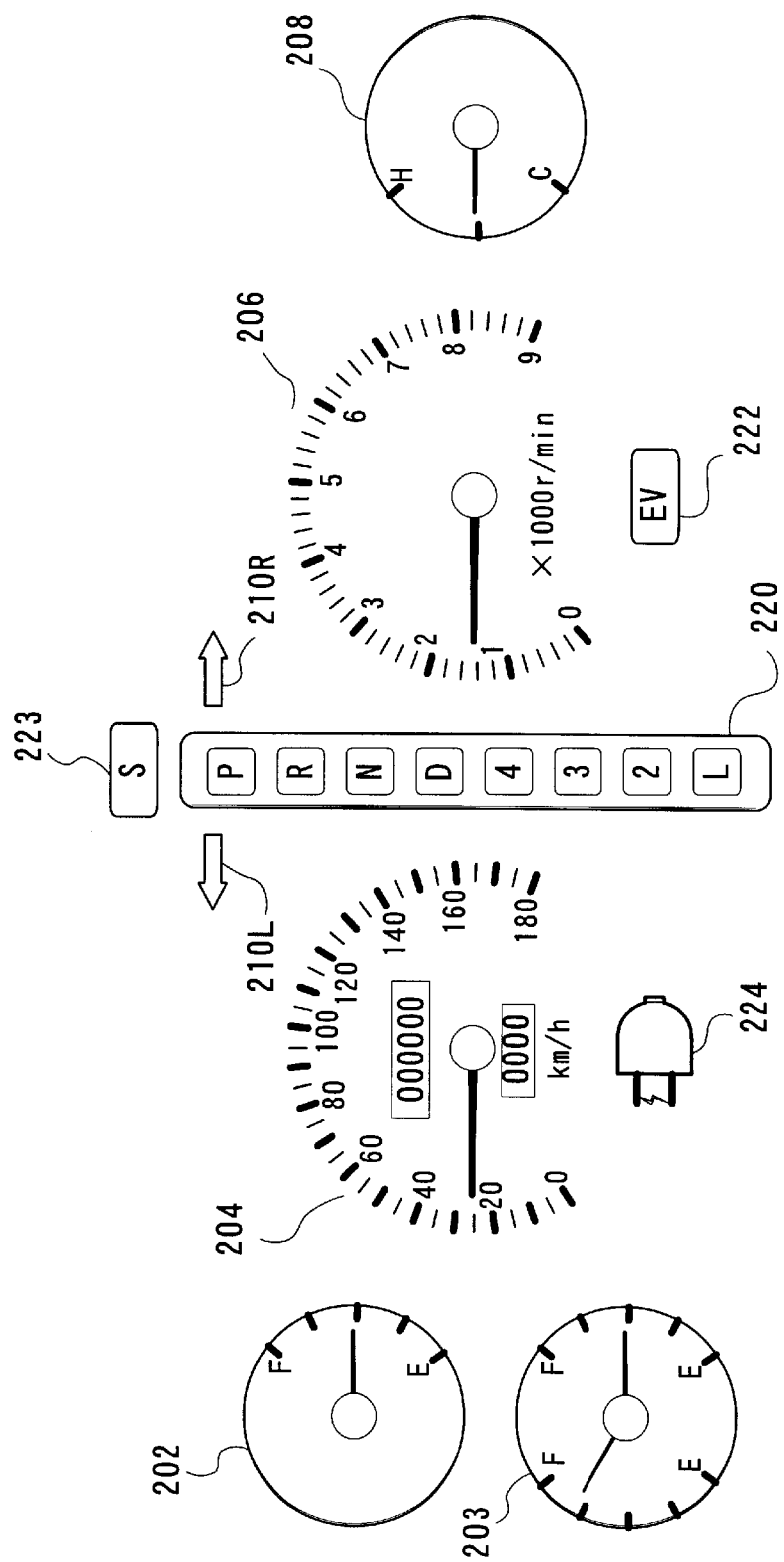
FIG. 68 shows an instrument panel in the hybrid vehicle of the eighth embodiment.

FIG. 68 shows an instrument panel in the hybrid vehicle of the eighth embodiment. This is similar to the instrument panel in the hybrid vehicle of the first embodiment. The instrument panel has the EV drive indicator 222, which is disposed below the tachometer 206 and lights up during a drive with the power of the motor 20. An external electric power supply indicator 224 is disposed below the speedometer 204 and lights up when electric power can be taken out of the outlet 91. The sports mode indicator 223 disposed above the gearshift position indicator 220 lights up when the sports mode switch 163 B is in ON position to set the sports mode.

L2. EV Drive Control Process

Figure 69:
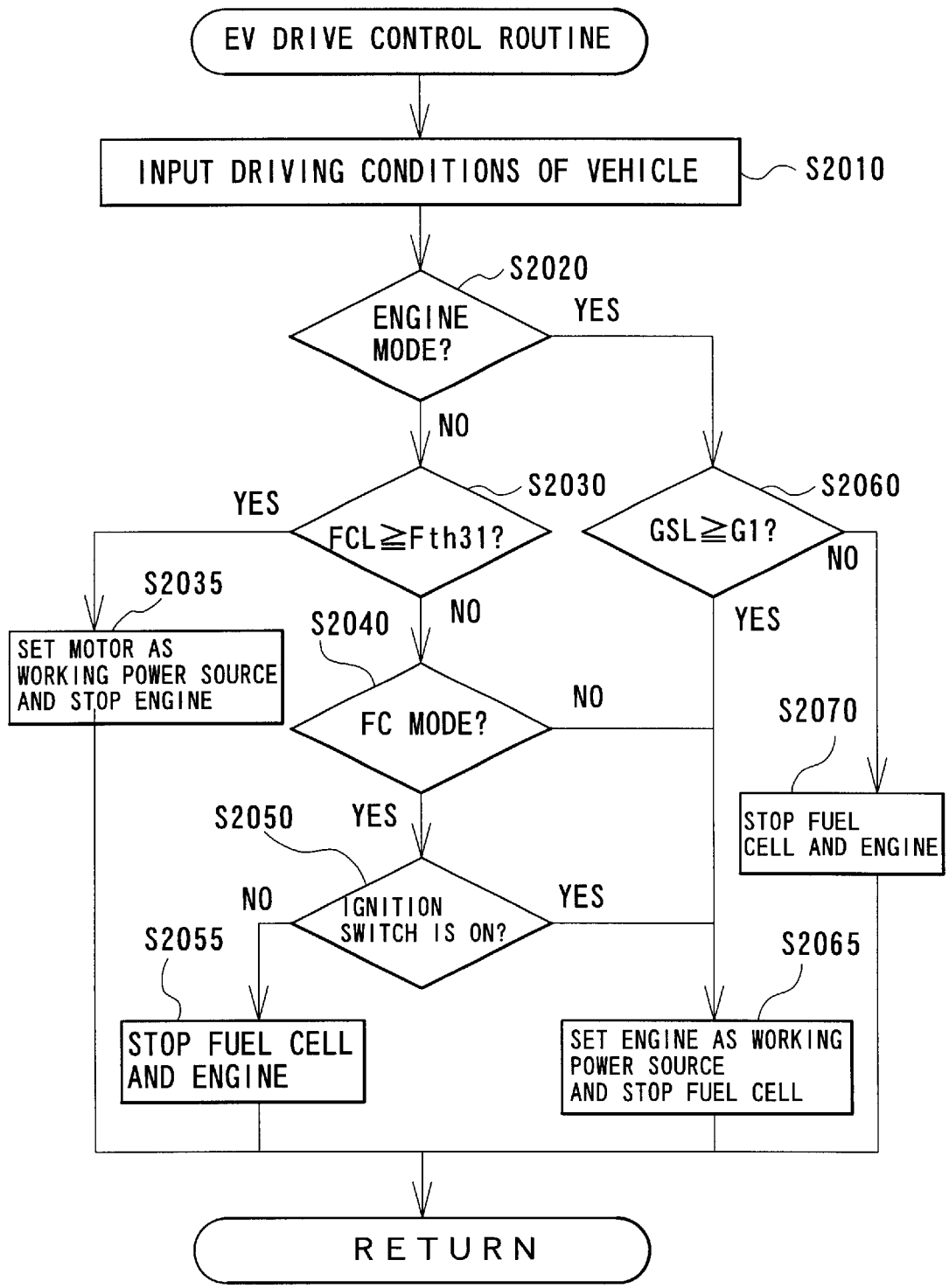
FIG. 69 is a flowchart showing an EV drive control routine executed in the eighth embodiment.

FIG. 69 is a flowchart showing an EV drive control routine executed in the eighth embodiment. The CPU in the control unit 70 periodically executes the EV drive control routine at preset time intervals. This routine is carried out when the driving state of the vehicle is in the MG area shown in the maps of FIGS. 8 through 11 discussed in the first embodiment. When the program enters the EV drive control routine of FIG. 69, the CPU first receives the inputs regarding the driving conditions of the vehicle at step S2010. The concrete processing of step S2010 receives the inputs from the variety of sensors shown in FIG. 7 discussed in the first embodiment. Among the diversity of inputs, the pieces of information on the gearshift position, the vehicle speed, the accelerator travel, the remaining quantity GSL of gasoline, the remaining charge SOC of the battery 50, the remaining quantity FCL of the FC fuel for the fuel cell 60, the on-off state of the ignition switch, and the state of the power source changeover switch 164 are especially involved in the subsequent processing.

The CPU then determines whether or not the engine mode is set, based on the input state of the power source changeover switch 164 at step S2020. In the engine mode, the hybrid vehicle runs only with the engine as the working power source. While the engine mode is set, even if the driving state of the vehicle is within the MG area, the hybrid vehicle does not run by the EV drive using the motor 20 as the working power source. When it is determined at step S2020 that the engine mode is set, the CPU subsequently compares the remaining quantity GSL of gasoline with a predetermined value G1 at step S2060. In the case where the remaining quantity GSL of gasoline is not less than the predetermined value G1 at step S2060, it is determined that the engine 10 is in drivable conditions. The hybrid vehicle is accordingly driven with the engine 10 as the working power source at step S2065. In the case where the remaining quantity GSL of gasoline is less than the predetermined value G1 at step S2060, on the other hand, it is determined that the drive of the engine 10 is to be stopped. The drive of the engine 10 is accordingly stopped at step S2070. In the engine mode, the motor 20 is also at a stop at step S2070.

The predetermined value G1 is used as the criterion of the determination of whether or not the drive of the engine 10 is allowed. Any value of greater than zero may be set arbitrarily to the predetermined value G1. Setting zero to the predetermined value G1 allows the drive in the engine mode until gasoline is completely exhausted. The technique of this embodiment sets a positive value to the predetermined value G1 by taking into account the point that the engine mode is arbitrarily selected by the driver. Namely the drive of the engine 10 may be forbidden in the engine mode while the engine 10 actually enables a further drive. The driver may continue the drive that selectively uses the motor 20 and the engine 10 as the working power source, for example, by selecting the auto mode.

When it is determined at step S2020 that the engine mode is not set, that is, in the case where either the auto mode or the FC mode is selected, the CPU carries out the processing to adequately select the working power source corresponding to the selected drive mode. The CPU first determines whether or not the fuel cell 60 is available for the electric power supply. For the purpose of such decision, the CPU compares the remaining quantity FCL of the FC fuel for the fuel cell 60 with a predetermined level Fth31 at step S2030. An arbitrary positive value is set to the predetermined level Fth31. In the case where the remaining quantity FCL of the FC fuel is not less than the predetermined level Fth31 at step S2030, it is determined that the fuel cell 60 is available for the electric power supply. The hybrid vehicle is accordingly driven with the motor 20 as the working power source at step S2035. The EV drive indicator 222 lights up to inform the driver of the selection of the motor 20 as the working power source, so as to prevent the driver from feeling uneasy. At this moment, the engine 10 is at a stop at step S2035.

In the case where the remaining quantity FCL of the FC fuel is less than the predetermined level Fth31 at step S2030, on the other hand, it is determined that the fuel cell 60 is not available for the electric power supply. The CPU subsequently determines whether or not the FC mode is set, based on the input state of the power source changeover switch 164 at step S2040. In the FC mode, the hybrid vehicle is driven with the fuel cell 60 as the working energy output source. In the auto mode, the hybrid vehicle is driven by selectively using the fuel cell 60 and the engine 10 as the working energy output source. When only an insufficient quantity of the FC fuel remains and the FC mode is not selected at step S2040, the hybrid vehicle is driven with the engine 10 as the working power source at step S2065. While the engine 10 is used as the working power source to drive the hybrid vehicle, the EV drive indicator 222 is off.

When the FC mode is selected at step S2040, on the other hand, the use of the engine 10 is forbidden in principle. The CPU subsequently determines whether or not the ignition switch is in ON position at step S2050. When the ignition switch is in OFF position, the drive of the engine 10 is forbidden while the operation of the fuel cell 60 is at a stop at step S2055. In this case, the hybrid vehicle does not have any working power source and stops. When the ignition switch is in ON position, on the other hand, it is determined that the driver requires a start of the engine 10, in other words, that the FC mode is cancelled. The hybrid vehicle is accordingly driven with the engine 10 as the working power source at step S2065.

While the engine 10 is used as the working power source to drive the hybrid vehicle at step S2065, the CPU simultaneously carries out the processing to increase the remaining charge SOC of the battery 50. The control process of this embodiment keeps the remaining charge SOC of the battery 50 to or above a predetermined threshold value. When the remaining charge SOC of the battery 50 is below the predetermined threshold value, the battery 50 is charged with the electric power output from the fuel cell 60 or with the electric power obtained by driving the auxiliary machinery driving motor 80 as the generator with the power of the engine 10. There is a fair possibility that the FC fuel is short in the case where the engine 10 is used as the working power source to drive the hybrid vehicle at step S2065. The threshold value of the battery 50 is accordingly raised to prepare for the requirement of the output of electric power.

The EV drive control process discussed above enables the hybrid vehicle to be driven by preferentially using the fuel cell 60 in the MG area. This attains a drive of excellent driving efficiency and environmental properties. In the hybrid vehicle of the eighth embodiment, the working power source used for the drive is arbitrarily specified by the driver through the operation of the power source changeover switch 164. This allows the drive well reflecting the intention of the driver and improves the facility of the hybrid vehicle.

Some examples are given to describe the improved facility of the hybrid vehicle by the arbitrary selection of the working power source. In a first example, when the driver needs to use the electric power of the fuel cell 60 via the outlet 91 at a destination, the driver selects the engine mode. Such selection desirably restricts the consumption of the FC fuel before the hybrid vehicle arrives at the destination, and enables the fuel cell 60 to be effectively used at the destination. In a second example, the working power source is selected according to the requirement with regard to the response of the vehicle. The fuel cell 60 generally has a poor response to output the electric power. The selection of the engine mode enables a drive of the hybrid vehicle with a high response. In a third example, the working power source is selected according to the requirement with regard to the noise reduction. The engine 10 generally has a large working noise. If the noise reduction is highly demanded, for example, in the case of a drive at a midnight, the FC mode is selected to attain a drive in stillness. As clearly understood from these examples, the arrangement of allowing the driver to arbitrarily select the working power source remarkably improves the facility of the hybrid vehicle.

In the EV drive control routine discussed above, when only an insufficient quantity of the FC fuel remains in the FC mode, the hybrid vehicle is at a stop until the ignition switch is set on (step S2055 in the flowchart of FIG. 69). When the hybrid vehicle stops due to the shortage of the FC fuel without drawing the attention of the driver, the driver may misjudge the malfunction of the vehicle. This significantly damages the facility of the hybrid vehicle. In order to avoid such misjudgment, it is desirable that the EV drive indicator 222 is flashed to inform the driver of the possibility of a stop when the remaining quantity FCL of the FC fuel approaches to the predetermined level Fth31 in the EV drive control process.

L3. External Electric Power Supply Activation Control Process

Figure 70:
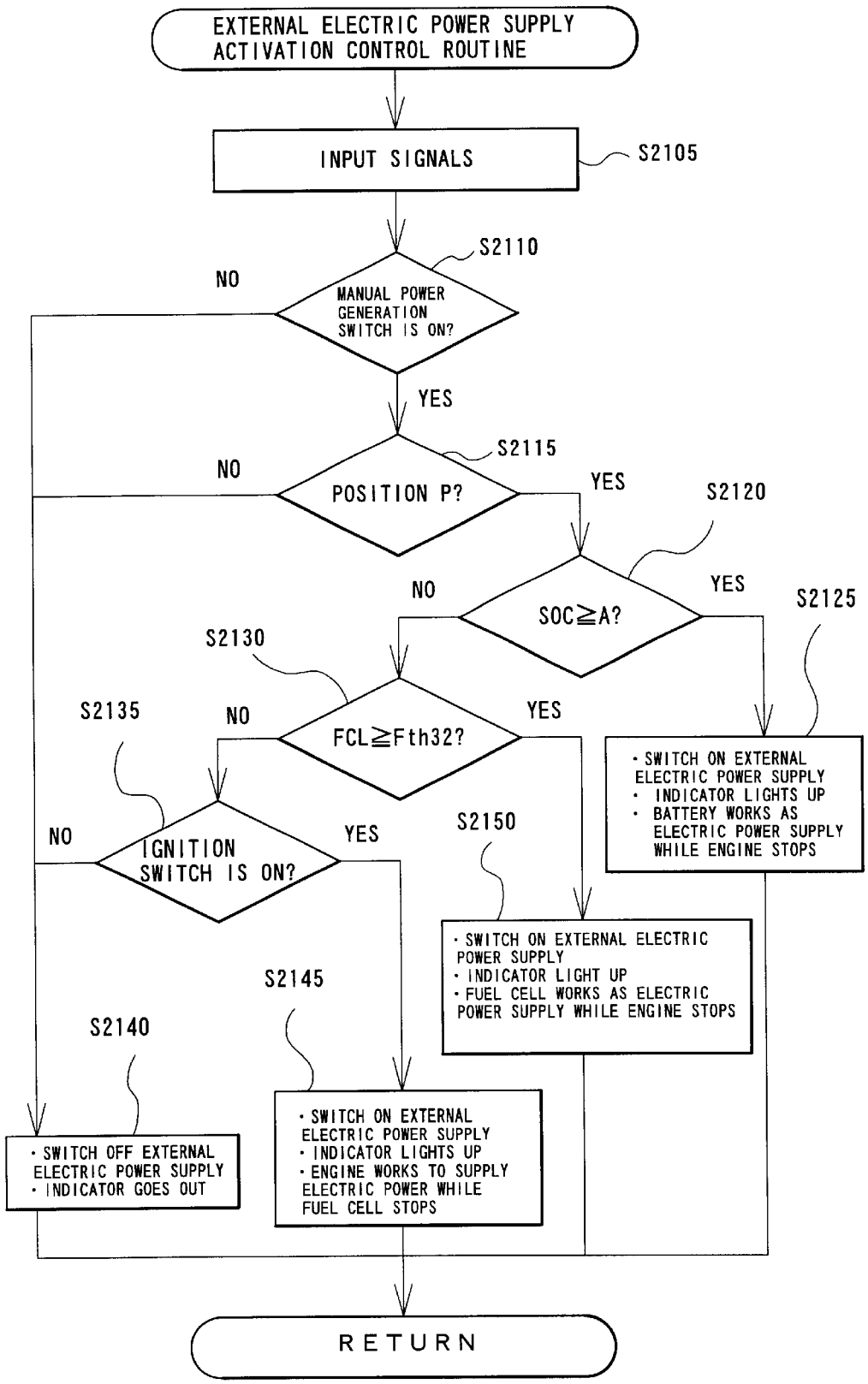
FIG. 70 is a flowchart showing an external electric power supply activation control routine executed in the eighth embodiment.

FIG. 70 is a flowchart showing an external electric power supply activation control routine executed in the eighth embodiment. The external electric power supply activation control process controls the supply of electric power to the outlet 91.

When the program enters the external electric power supply activation control routine of FIG. 70, the CPU first receives the input signals from the various sensors and switches at step S2105. Among the diversity of inputs, the pieces of information on the on-off state of the manual power generation switch 165, the gearshift position, the remaining charge SOC of the battery 50, the remaining quantity FCL of the FC fuel for the fuel cell 60, and the on-off state of the ignition switch are especially involved in the subsequent processing.

The CPU then determines whether or not the manual power generation switch 165 is in ON position at step S2110. When the manual power generation switch 165 is in OFF position, the use of the outlet 91 is not allowed. The CPU accordingly carries out the processing to switch off the external electric power supply, that is, to forbid a supply of electric power to the outlet 91 and causes the external electric power supply indicator 224 to go out at step S2140. The external electric power supply is switched off by setting the changeover switch 90 in neutral position.

When the manual power generation switch 165 is in ON position at step S2110, on the other hand, the CPU subsequently determines whether or not the gearshift position is the position P at step S2115. The decision of step S2115 is not essential, but the technique of this embodiment carries out the decision for the purpose of the confirmation since the outlet 91 is generally used while the vehicle is at a stop. When the gearshift position is not the position P at step S2115, the use of the outlet 91 is not allowed. The CPU accordingly carries out the processing to switch off the external electric power supply and causes the external electric power supply indicator 224 to go out at step S2140. If there is a fair possibility that the outlet 91 is used during a drive, the decision of step S2115 may be omitted.

When it is determined at step S2115 that the gearshift position is the position P, the CPU carries out the processing to cause electric power to be output from the outlet 91. The hybrid vehicle of the eighth embodiment has the battery 50 and the fuel cell 60 as the electric power supplies. The auxiliary machinery driving motor 80 driven as a generator with the power of the engine 10 is also usable as the electric power supply. The hybrid vehicle of this embodiment preferentially uses the battery 50, the fuel cell 60, and the combination of the engine 10 and the auxiliary machinery driving motor 80 for the working electric power supply in this sequence.

For the purpose of the appropriate selection of the working electric power supply, the CPU first compares the remaining charge SOC of the battery 50 with a predetermined reference value A % at step S2120. In the case where the remaining charge SOC is not less than the predetermined reference value A %, it is determined that the battery 50 has some margin. The CPU accordingly carries out the processing to switch on the external electric power supply and causes the external electric power supply indicator 224 to light up at step S2125. Here the battery 50 works as the electric power supply to supply electric power to the outlet 91, while both the fuel cell 60 and the engine 10 are at a stop.

The predetermined reference value A % is used as the criterion of the determination of whether or not the battery 50 is available for the working electric power supply, and may be set arbitrarily. As described previously, the battery 50 is used to compensate for the response delay of the fuel cell 60. It is accordingly desirable that the battery 50 should keep a sufficient level of electric power that enables such compensation. From this point of view, the technique of this embodiment sets the charge level SOC3 with a little margin, which is discussed in the first embodiment with FIG. 16, to the predetermined reference value A %. Any other value may, however, be set to the predetermined reference value A %.

In the case where the remaining charge SOC of the battery 50 is less than the predetermined reference value A % at step S2120, on the other hand, the CPU subsequently compares the remaining quantity FCL of the FC fuel for the fuel cell 60 with a predetermined level Fth32 at step S2130. In the case where the remaining quantity FCL of the FC fuel is not less than the predetermined level Fth32, it is determined that the power generation ability of the fuel cell 60 has some margin. The CPU accordingly carries out the processing to switch on the external electric power supply and causes the external electric power supply indicator 224 to light up at step S2150. Here the fuel cell 60 works as the electric power supply to supply electric power to the outlet 91, while the engine 10 is at a stop.

The predetermined level Fth32 is used as the criterion of the determination of whether or not the fuel cell 60 is available for the working electric power supply, and may be set arbitrarily. The outlet 91 is a device that improves the facility of the hybrid vehicle, and is not essential for the basic functions of the vehicle. From this point of view, the technique of this embodiment restricts the use of the external electric power supply to the case where the power generation ability of the fuel cell 60 has a sufficient margin. A positive value is accordingly set to the predetermined level Fth32. The technique of this embodiment sets a greater value to the predetermined level Fth32 used in the external electric power supply activation control process than the predetermined level Fth31 used in the EV drive control process of FIG. 69 by considering the requirement in the EV drive control process. Any other value may, however, be set to the predetermined level Fth32.

In the case where the remaining quantity FCL of the FC fuel is less than the predetermined level Fth32 at step S2130, on the other hand, the use of the external electric power supply is forbidden in principle. In other words, supply of electric power to the outlet 91 using the engine 10 as the power source is implemented only in response to a specific instruction from the driver. For the purpose of such decision, the CPU determines whether or not the ignition switch is in ON position at step S2135. When the ignition switch is in OFF position, the use of the external electric power supply is forbidden. The CPU accordingly carries out the processing to switch off the external electric power supply and causes the external electric power supply indicator 224 to go out at step S2140. When the ignition switch is in ON position, on the contrary, it is determined that the driver requires a supply of electric power using the engine 10 as the power source. The CPU accordingly carries out the processing to switch on the external electric power supply and causes the external electric power supply indicator 224 to light up at step S2145. Here the auxiliary machinery driving motor 80 is driven as a generator with the power of the engine 10 to supply electric power to the outlet 91, while the fuel cell 60 is at a stop.

The external electric power supply activation control process discussed above enables electric power to be taken out of the outlet 91 and thereby improves the facility of the hybrid vehicle. The preferential use of the reversible electric power supply, that is, the battery 50, ensures the output of electric power without affecting the basic functions of the vehicle. The arrangement of using the battery 50 or the fuel cell 60 for the external electric power supply and forbidding in principle the supply of electric power using the engine 10 as the power source enables the electric power to be taken out of the outlet 91 for the required use without damaging the fuel consumption and the environmental properties of the hybrid vehicle. The prohibition of the drive of the engine 10 also ensures the stillness in the use of the outlet 91.

In the external electric power supply activation control process of this embodiment, supply of electric power using the engine 10 as the power source is allowed in response to the ON operation of the ignition switch. When the output of electric power through the outlet 91 is highly demanded, this arrangement ensures the supply of electric power according to the intention of the driver, thereby improving the facility of the hybrid vehicle.

The hybrid vehicle of the eighth embodiment discussed above preferentially uses the fuel cell 60 over the engine 10, thus improving the driving efficiency and the environmental properties during a drive of the vehicle. The structure of the eighth embodiment allows the driver to manually set the desired drive mode and specify the on-off state of the outlet 91. This actualizes the working state of the hybrid vehicle according to the intention of the driver and improves the facility of the hybrid vehicle. In the drive mode where the use of the engine 10 is not suitable, the drive of the engine 10 is forbidden in principle. This arrangement favorably prevents the fuel consumption and the environmental properties of the hybrid vehicle from being worsened by the drive of the engine 10. Even under such conditions, the drive of the engine 10 is allowed in response to the ON operation of the ignition switch. This also actualizes the working state of the hybrid vehicle according to the intention of the driver and improves the facility of the hybrid vehicle.

L4. First Modification

Figure 71:
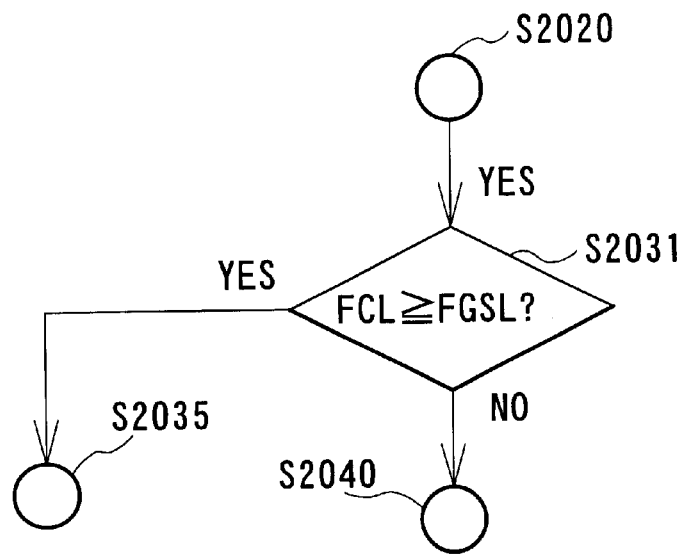
FIG. 71 is a flowchart showing part of an EV drive control routine executed in a first modification of the eighth embodiment.

There are a diversity of possible modifications with regard to the control processes executed in the hybrid vehicle of the eighth embodiment discussed above. One modified example of the EV drive control routine is discussed below as a first modification of the eighth embodiment. FIG. 71 is a flowchart showing part of an EV drive control routine executed in the first modification of the eighth embodiment. The flowchart of FIG. 71 shows only the part different from the EV drive control routine of the eighth embodiment shown in the flowchart of FIG. 69. The technique of the eighth embodiment determines whether or not the fuel cell 60 is available for the working electric power supply, based on the comparison between the remaining quantity FCL of the FC fuel and the predetermined level Fth31 at step S2030 in the flowchart of FIG. 69. The predetermined level Fth31 is a fixed value. The technique of the first modification, on the other hand, determines whether or not the fuel cell 60 is available for the working electric power supply, based on the comparison between the remaining quantity FCL of the FC fuel and a specific value FGSL at step S2031 in the flowchart of FIG. 71. The specific value FGSL is varied with a variation in remaining quantity GSL of gasoline.

Figure 72:
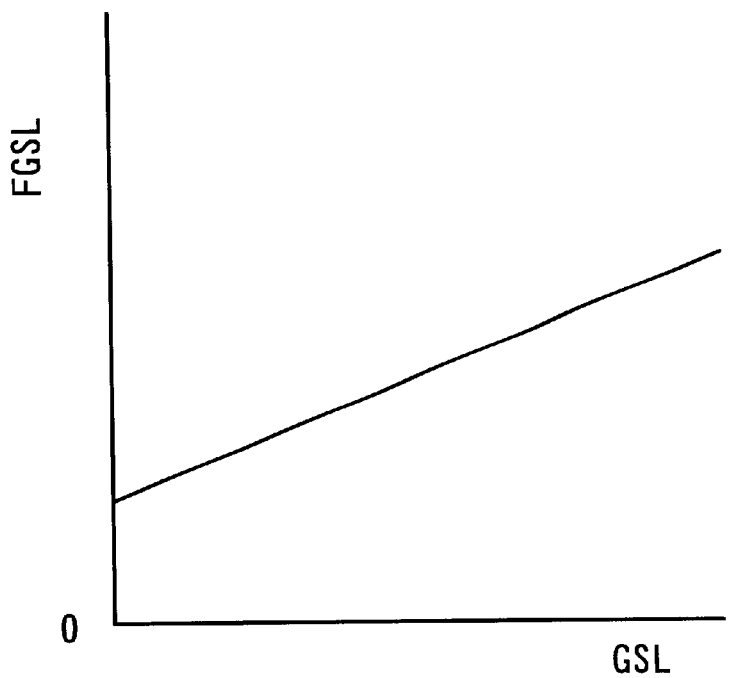
FIG. 72 is a graph showing a variation in specific value FGSL plotted against the remaining quantity GSL of gasoline.

FIG. 72 is a graph showing a variation in specific value FGSL plotted against the remaining quantity GSL of gasoline. The specific value FGSL increases with an increase in remaining quantity GSL of gasoline. This means that the greater remaining quantity GSL of gasoline causes the use of the fuel cell 60 to be restricted at the earlier timing. In the case of a large remaining quantity GSL of gasoline, there is a fair possibility that the hybrid vehicle is further driven for a long time. There is accordingly a high possibility that the fuel cell 60 is used in a number of opportunities. In the setting of FIG. 72, the consumption of the FC fuel is restricted at the earlier timing against the greater remaining quantity GSL of gasoline. This causes the power generation ability of the fuel cell 60 to be kept over a long time period and thereby enables the fuel cell 60 to be used in occasions of high effectiveness. In the example of FIG. 72, the specific value FGSL varies linearly with a variation in remaining quantity GSL of gasoline. The specific value FGSL may, however, be varied non-linearly or in a stepwise manner.

L5. Second Modification

The techniques of the eighth embodiment and its first modification evaluate the power generation ability of the fuel cell 60 and control the use of the fuel cell 60, based on the remaining quantity FCL of the FC fuel. The power generation ability of the fuel cell 60 may, however, be evaluated with other parameters. The control process of evaluating the power generation ability of the fuel cell 60 based on the observed temperature of the fuel cell 60 is discussed below as a second modification of the eighth embodiment.

Figure 73:
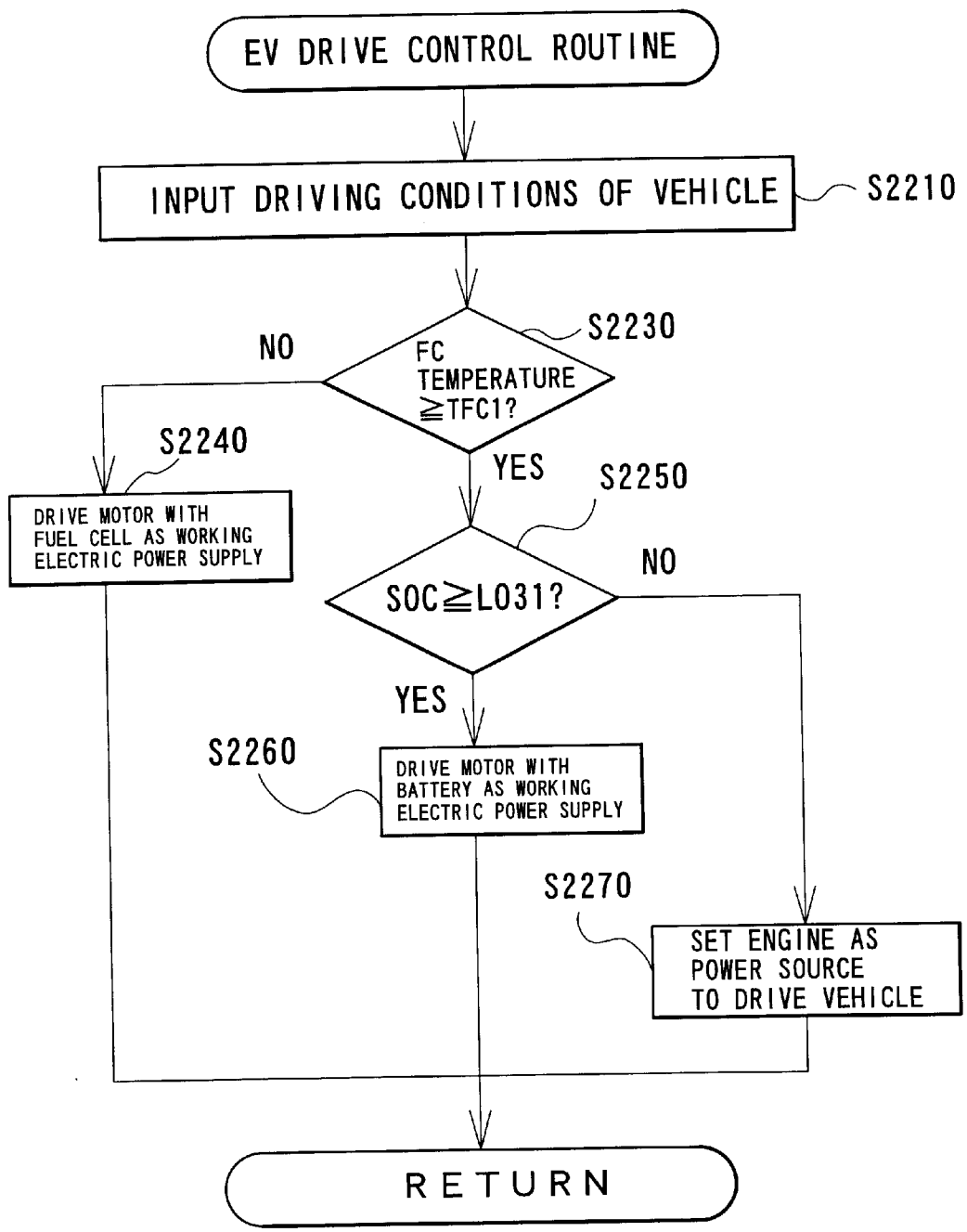
FIG. 73 is a flowchart showing an EV drive control routine executed in a second modification of the eighth embodiment.

FIG. 73 is a flowchart showing an EV drive control routine executed in the second modification of the eighth embodiment. Like the EV drive control routine of the eighth embodiment shown in FIG. 69, when the program enters the EV drive control routine of FIG. 73, the CPU first receives the inputs regarding the driving conditions of the vehicle at step S2210. Among the diversity of inputs, the pieces of information on the temperature of the fuel cell 60, the gearshift position, the vehicle speed, the accelerator travel, and the remaining charge SOC of the battery 50 are especially involved in the subsequent processing.

The CPU then compares the observed temperature of the fuel cell 60 with a preset temperature TFC1 at step S2230. Under the condition of the extremely high temperature of the fuel cell 60, the continuous power generation may cause the fuel cell 60 to be overheated and thereby significantly shorten the life of the fuel cell 60. The preset temperature TFC1 is used as the parameter of determining whether or not there is a fair possibility that the fuel cell 60 is overheated. An appropriate value is set to the preset temperature TFC1 with regard to each type of the fuel cell.

In the case where the observed temperature of the fuel cell 60 is lower than the preset temperature TFC1 at step S2230, it is determined that the continuous use of the fuel cell 60 is allowed. The CPU accordingly carries out the processing to drive the motor 20 with the fuel cell 60 as the working electric power supply at step S2240. In the case where the observed temperature of the fuel cell 60 is not lower than the preset temperature TFC1 at step S2230, on the other hand, it is determined that the use of the fuel cell 60 is to be forbidden. The CPU accordingly carries out the processing to use another electric power supply or another power source to drive the hybrid vehicle. In the EV drive control processes of the eighth embodiment and its first modification, the battery 50 is not used during the EV drive. The EV drive control process of the second modification, on the other hand, uses the battery 50 even during the EV drive.

In order to determine whether or not the battery 50 is available for the working electric power supply, the CPU compares the remaining charge SOC of the battery 50 with a predetermined reference value LO31 at step S2250. A positive value is set to the predetermined reference value LO31 in this embodiment, although the reference value LO31 may be set arbitrarily. The control process of the second modification evaluates the power generation ability of the fuel cell 60 based on the temperature of the fuel cell 60. The prohibition of the use of the fuel cell 60 for some time may lower the temperature and enable the fuel cell 60 to be used again for the electric power supply. In such cases, the response delay of the fuel cell 60 should be compensated with the electric power of the battery 50. The predetermined reference value LO31 is accordingly set in a certain range that ensures the electric power for this purpose.

In the case where the remaining charge SOC of the battery 50 is not less than the predetermined reference value LO31 at step S2250, it is determined that the battery 50 has some margin. The CPU accordingly drives the motor 20 with the battery 50 as the working electric power supply at step S2260. In the case where the remaining charge SOC of the battery 50 is less than the predetermined reference value LO31 at step S2250, on the contrary, it is determined that the use of the battery 50 is not allowed. The CPU accordingly sets the engine 10 as the power source to drive the hybrid vehicle at step S2270.

Figure 74:
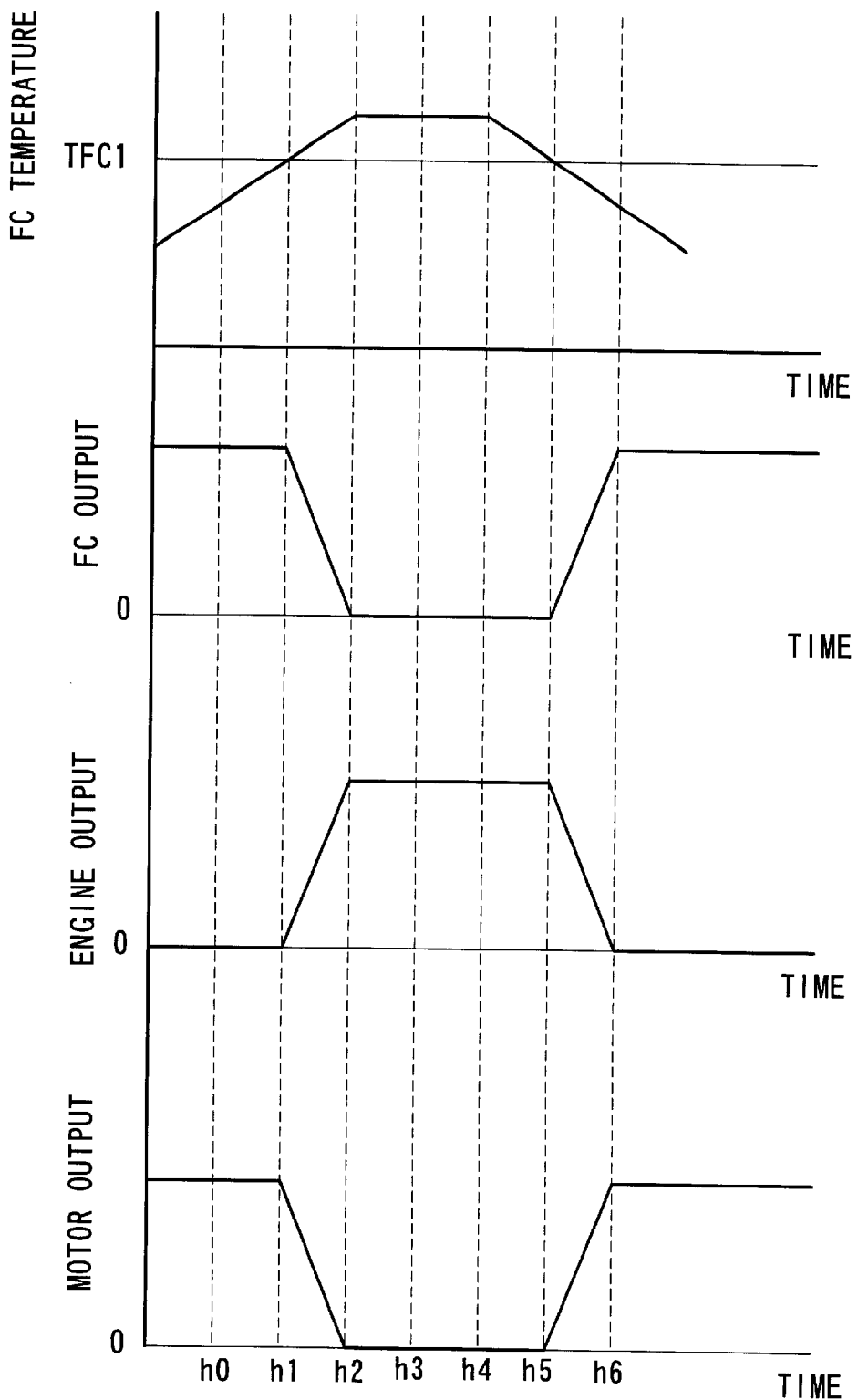
FIG. 74 shows variations in temperature and output of the fuel cell 60, output of the engine 10, and output of the motor 20 in the control process of the second modification.

FIG. 74 shows variations in temperature of the fuel cell 60 (FC temperature), output of the fuel cell 60 (FC output), output of the engine 10, and output of the motor 20 with the elapse of time when the EV drive control process shown in the flowchart of FIG. 73 is carried out. At the initial stage, the hybrid vehicle runs by the EV drive with the fuel cell 60 as the working electric power supply. In this case, both the FC output and the output of the motor 20 have predetermined positive values, whereas the output of the engine 10 is kept zero. The FC temperature rises with the elapse of time.

At a time point h1, the observed FC temperature reaches or exceeds the preset temperature TFC1. The control process of FIG. 73 discussed above decreases the output of the fuel cell 60 to zero at a time point h2. Here it is assumed that the battery 50 has only an insufficient level of remaining charge SOC. Under such conditions, with the decrease in output of the fuel cell 60, the engine 10 is used as the working power source to drive the hybrid vehicle. As shown by the graph of FIG. 74, the output of the motor 20 accordingly decreases while the output of the engine 10 increases in the period between the time points h1 and h2. The drive of the hybrid vehicle using the engine 10 as the power source continues until the temperature of the fuel cell 60 becomes lower than the preset temperature TFC1.

As a result of the forbidden use of the fuel cell 60, at a time point h5, the temperature of the fuel cell 60 becomes lower than the preset temperature TFC1. The operation of the fuel cell 60 accordingly resumes and the output of the fuel cell 60 increases in the period between the time points h5 and h6. With an increase in output of the fuel cell 60, the output of the engine 10 decreases while the output of the motor 20 increases. The control process thus enables the fuel cell 60 to be driven in a specific temperature range that does not significantly deviate from the preset temperature TFC1. It is preferable that an appropriate hysteresis is set at the decision of step S2230 in the EV drive control process of the second modification, in order to prevent the driving state of the fuel cell 60 from being frequently changed over between the allowance and the prohibition in the case where the temperature of the fuel cell 60 is close to the preset temperature TFC1.

The EV drive control process of the second modification evaluates the power generation ability of the fuel cell 60 based on the observed temperature of the fuel cell 60, and enables the fuel cell 60 to be used in an adequate temperature range. This technique effectively prevents the life of the fuel cell 60 from being shortened due to the overheating environment. The use of the fuel cell 60 is forbidden when the temperature of the fuel cell 60 reaches or exceeds the preset temperature TFC1. The cooling system of the fuel cell 60 is accordingly required to have the ability of cooling down the fuel cell 60 in the temperature range of lower than the preset temperature TFC1. The technique of the second modification does not require the fuel cell 60 to have the cooling means applicable for the whole working range of the fuel cell 60, thereby desirably reduces the size of the cooling system.

The technique of the second modification allows the use of the battery 50 during the EV drive. The battery 50 is, however, used temporarily until the temperature of the fuel cell 60 drops below the preset temperature TFC1. Even the battery 50 of the supplementary purpose is thus usable in this application. The use of the battery 50 preferably restricts the drive of the engine 10 and prevents the driving efficiency and the environmental properties of the hybrid vehicle from being worsened. The control process of the second modification is only one possible example, and the processing may be carried out without using the battery 50. Such processing corresponds to the flow when the condition of step S2250 is always unsatisfied in the routine of FIG. 73.

In the case where the observed temperature of the fuel cell 60 reaches or exceeds the preset temperature TFC1, the control process of the second modification completely stops the use of the fuel cell 60 and changes over the working electric power supply from the fuel cell 60 to the battery 50. Another possible procedure reduces the output of the fuel cell 60 to some extent that prevents a further increase in temperature, and causes the battery 50 to compensate for the reduced electric power.

When the engine 10 is used as the working power source to drive the hybrid vehicle in the control processes of the eighth embodiment and its modifications, the drive of the engine 10 may be controlled by a variety of methods. One applicable method, which is generally adopted in the conventional vehicle with only the engine 10 as the power source, drives the engine 10 at idle while the hybrid vehicle is at a stop. Another applicable method stops the operation of the engine 10 while the hybrid vehicle is at a stop. In the latter case, it is required to drive the auxiliary machines, such as the air-conditioning equipment, the power steering, and the pump 93 for driving the cooling system of the fuel cell 60, even when the vehicle is at a stop. Still another applicable method accordingly stops the operation of the engine 10 but drives the auxiliary machinery driving motor 80 with the battery 50 as the electric power supply while the hybrid vehicle is at a stop. In this control procedure, the battery 50 and the engine 10 may be selectively used to drive the auxiliary machines according to the remaining charge SOC of the battery 50.

L6. Third Modification

Figure 75:
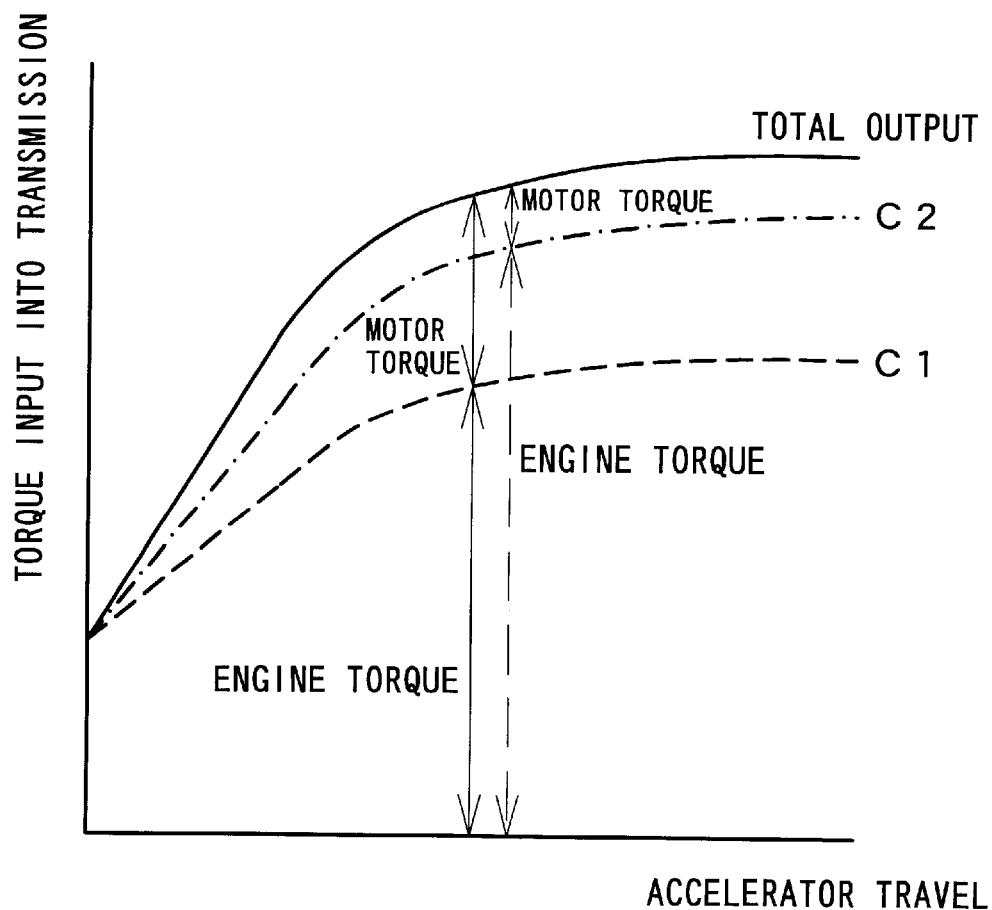
FIG. 75 shows a distribution of output in a third modification of the eighth embodiment.

The control processes of the eighth embodiment and its modifications use the motor 20 only in a specific drive range according to the maps of FIGS. 8 through 11. In a different application, both the engine 10 and the motor 20 are used in the whole drive range. The control process under such conditions is described below as a third modification of the eighth embodiment. FIG. 75 shows a distribution of output in the third modification. The torque output to the drive shaft 15 varies with a variation in speed set in the transmission 100. The graph of FIG. 75 accordingly shows a variation in torque applied to the input shaft 14 of the transmission 100 plotted against the accelerator travel. The technique of the third modification uses both the motor 20 and the engine 10 as the power sources in the whole range of the accelerator travel. Namely the total torque corresponding to the accelerator travel is distributed between the outputs of the engine 10 and the motor 20.

In the technique of the third modification, the distribution of the output between the motor 20 and the engine 10 is varied according to the power generation ability of the fuel cell 60. A distribution curve C1 of the broken line shown in FIG. 75 is adopted in normal conditions. The area below the distribution curve C1 corresponds to the output torque of the engine 10, and the area between a curve of total output (shown by the solid line) and the distribution curve C1 corresponds to the output torque of the motor 20. In the case of the lowered power generation ability of the fuel cell 60, the output torque of the motor 20 is lowered. Namely the distribution of the output is shifted to a distribution curve C2 of the one-dot chain line. The distribution curve C2 has a smaller portion of the output of the motor 20 and enhances the portion of the output of the engine 10 to compensate for the lowered output of the motor 20. The details of the processing to attain such control are described below.

Figure 76:
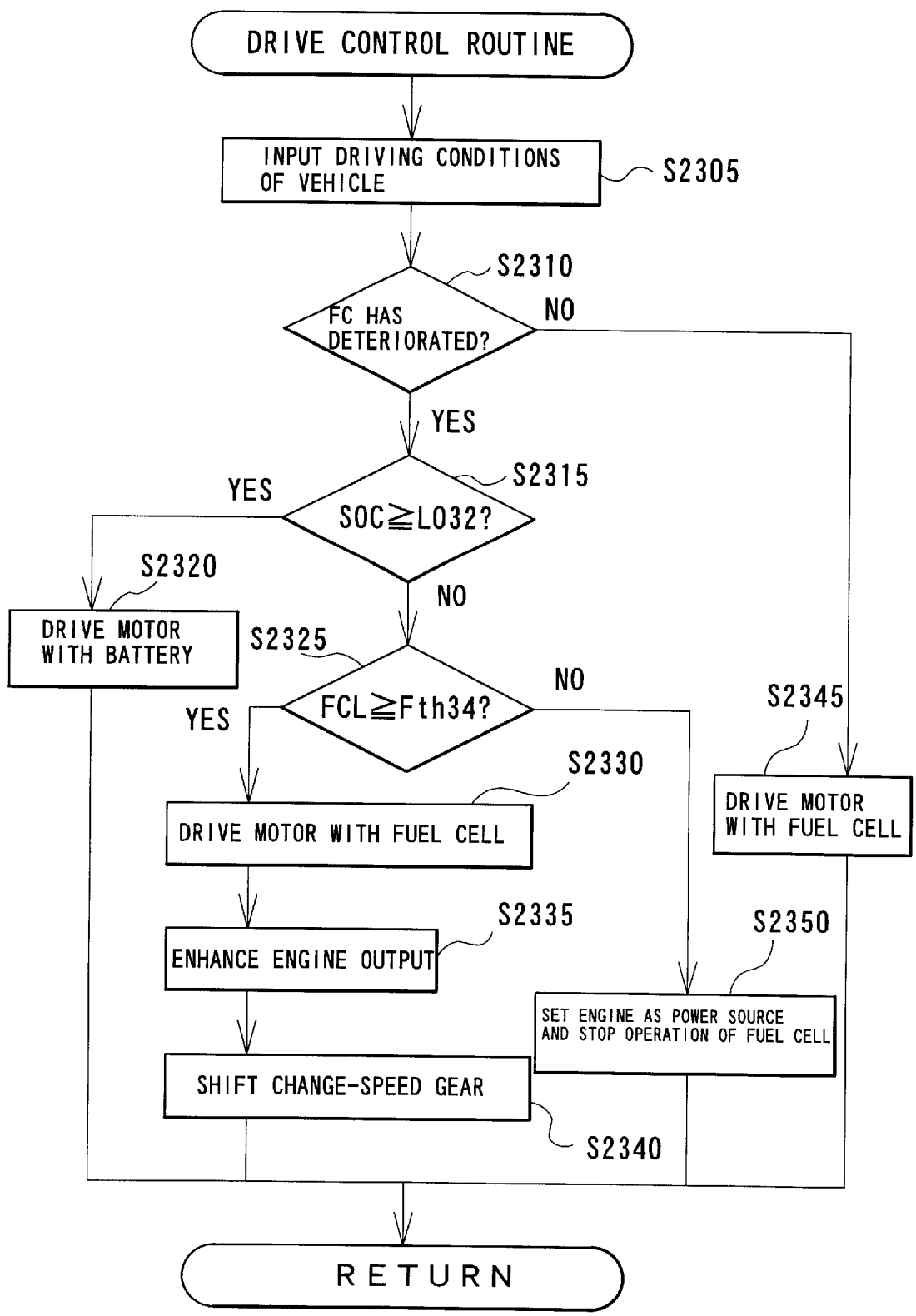
FIG. 76 is a flowchart showing a drive control routine executed in the third modification.

FIG. 76 is a flowchart showing a drive control routine executed in the third modification of the eighth embodiment. When the program enters the drive control routine of FIG. 76, the CPU first receives the inputs regarding the driving conditions of the vehicle at step S2305. Among the diversity of inputs, the pieces of information on the vehicle speed, the accelerator travel, the gearshift position, the remaining quantity FCL of the FC fuel, the remaining charge SOC of the battery 50, and the electric power output from the fuel cell 60 are especially involved in the subsequent processing.

The CPU subsequently determines whether or not the fuel cell 60 has deteriorated at step S2310. The decision of step S2310 is based on the difference between the required electric power to be output from the fuel cell 60 and the electric power actually output from the fuel cell 60. When the electric power actually output from the fuel cell 60 is less than the required electric power by a predetermined or greater difference, it is determined that the fuel cell 60 has deteriorated. As described previously, the fuel cell 60 has a response delay. In order to avoid misjudgment, the decision is made after the temperature of the fuel cell 60 rises sufficiently.

When it is determined at step S2310 that the fuel cell 60 has not yet deteriorated, the motor 20 is driven with the electric power of the fuel cell 60 to output the torque corresponding to the accelerator travel at step S2345. This corresponds to the driving state following the distribution curve C1 shown in FIG. 75. The processing of step S2345 drives both the fuel cell 60 and the engine 10 to respectively output the preset torques on the distribution curve C1 of FIG. 75.

When it is determined at step S2310 that the fuel cell 60 has deteriorated, on the other hand, the CPU carries out the processing to compensate for the lowered output of the fuel cell 60 due to the deterioration. For this purpose, the CPU compares the remaining charge SOC of the battery 50 with a predetermined reference value LO32 at step S2315. In the case where the remaining charge SOC of the battery 50 is not less than the predetermined reference value LO32, it is determined that the battery 50 has some margin. The motor 20 is accordingly driven with the electric power of the battery 50 at step S2320. In this case, the motor 20 is driven to follow the distribution curve C1 shown in FIG. 75. The reference value LO32 may be set in a specific range that ensures a sufficient level of remaining charge SOC in the battery 50 to enable the motor 20 to output the required torque.

In the case where the remaining charge SOC of the battery 50 is less than the predetermined reference value LO32 at step S2315, on the other hand, the CPU subsequently compares the remaining quantity FCL of the FC fuel for the fuel cell 60 with a predetermined level Fth34 at step S2325. The result of the comparison determines whether or not further operation of the deteriorating fuel cell 60 is still allowable. The predetermined level Fth34 is used as the criterion of such decision and may be set arbitrarily by taking into account the requirements in the other drive modes as described previously.

In the case where the remaining quantity FCL of the FC fuel is less than the predetermined level Fth34 at step S2325, further operation of the fuel cell 60 is not allowed. The CPU accordingly changes over the working power source to the engine 10 and stops the operation of the fuel cell 60 at step S2350. Under such conditions, only the engine 10 outputs the torque according to the accelerator travel. It is, however, impossible for the engine 10 to output the sufficient torque corresponding to the required total output shown in FIG. 75. The engine 10 accordingly outputs the maximum possible torque in the allowable range.

In the case where the remaining quantity FCL of the FC fuel is not less than the predetermined level Fth34 at step S1325, on the other hand, the CPU continues the operations of both the fuel cell 60 and the engine 10 while varying the distribution of the output between the fuel cell 60 and the engine 10. According to a concrete procedure, the CPU continues driving the motor 20 with the fuel cell 60 as the working electric power supply at step S2330. In this case, the output of the motor 20 is restricted to the range specified by the distribution curve C2 shown in FIG. 75. The output of the engine 10 is simultaneously enhanced to compensate for the reduced output of the motor 20 at step S2335. Namely the engine 10 outputs the torque following the distribution curve C2 shown in FIG. 75. The position of the change-speed gear in the transmission 100 is simultaneously shifted to a greater gear ratio at step S2340. For convenience of explanation, in the example of FIG. 75, the required total output is attained by varying the distribution of the output between the motor 20 and the engine 10 to the distribution curve C2. In the actual state, however, the required total output may not be attained by varying the distribution of the output in the case of the deteriorating fuel cell 60, since the total output in the normal conditions is set in a specific range that ensures the effective use of the torques output from the motor 20 and the engine 10. Under such conditions, the shift of the change-speed gear to the greater gear ratio enables the equivalent level of torque to that in the normal conditions to be output to the drive shaft 15. This is the purpose of the processing at step S2340.

The drive control process of the third modification discussed above ensures the total output equivalent to that in the normal conditions by varying the distribution of the output between the engine 10 and the motor 20 even when the fuel cell 60 has the lowered power generation ability. Regulation of the change-speed gear in the transmission 100 enables the torque equivalent to that in the normal conditions to be output to drive shaft 15. The technique of the third modification accordingly attains a drive that keeps the driver free of significant uneasiness even in the case of the deterioration of the fuel cell 60.

The control process of the third modification regulates the position of the change-speed gear in the transmission 100, simultaneously with the variation in distribution of the output between the engine 10 and the motor 20. Either one of the regulation and the variation may, however, be omitted. In the control process of the third modification, the motor 20 and the engine 10 are used in combination in the whole drive range. This technique may, however, be applied to the structure that allows the combined use of the motor 20 and the engine 10 only in a specific drive range where the accelerator travel is not less than a preset value.

M. Ninth Embodiment

Figure 77:
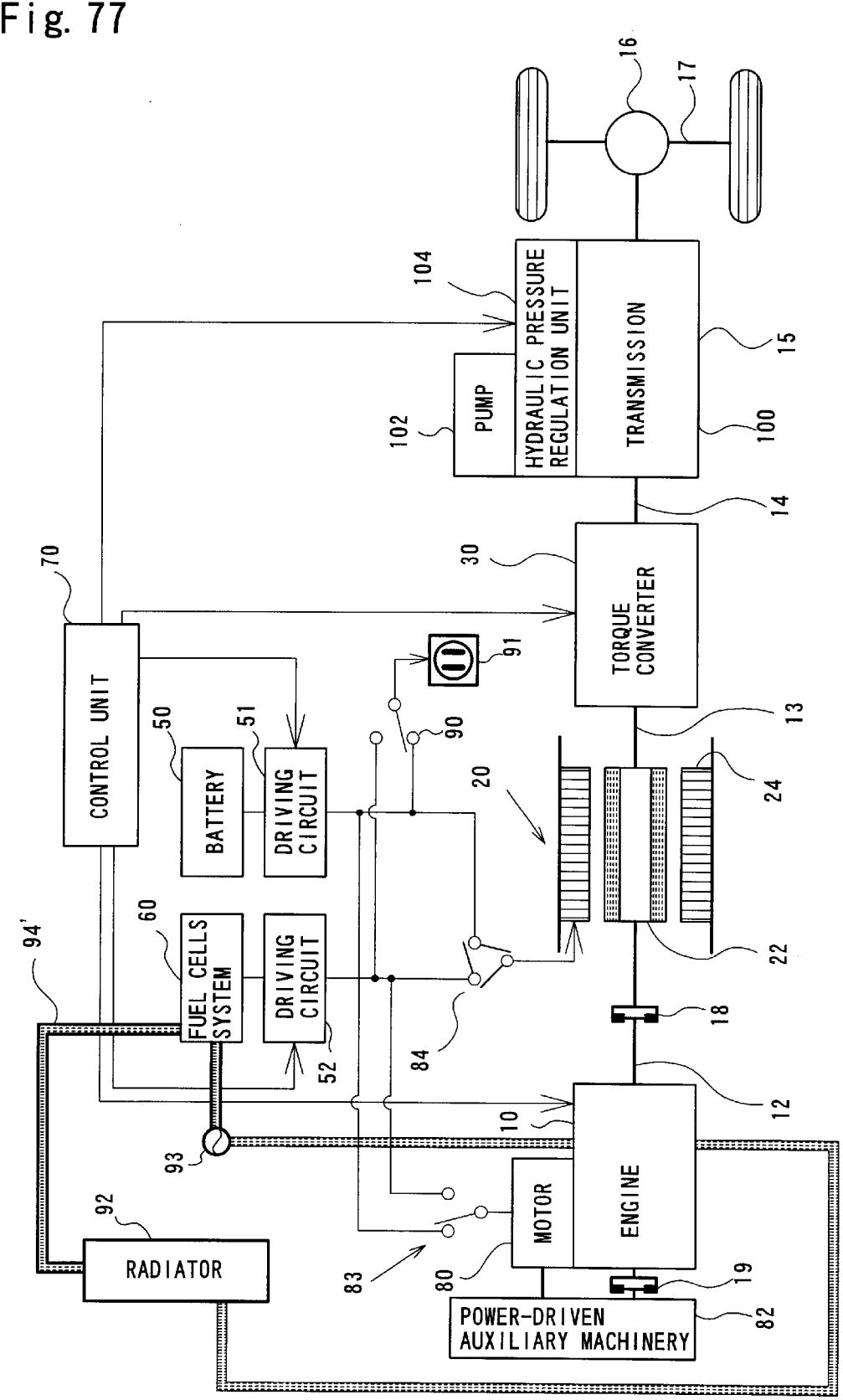
FIG. 77 schematically illustrates the structure of still another hybrid vehicle in a ninth embodiment according to the present invention.

FIG. 77 schematically illustrates the structure of still another hybrid vehicle in a ninth embodiment according to the present invention. The main difference from the eighth embodiment is the structure of the cooling system. The hybrid vehicle of the eighth embodiment has separate cooling systems for the fuel cell 60 and the engine 10, whereas the hybrid vehicle of the ninth embodiment has a common cooling system for the fuel cell 60 and the engine 10. In the structure of the ninth embodiment, a coolant conduit 94', through which cooling water flows, is designed to pass through both the fuel cell 60 and the engine 10. The cooling water is flown through the coolant conduit 94' by means of the pump 93, and the heat radiates from the radiator 92. This arrangement cools down both the fuel cell 60 and the engine 10.

The control processes executed in the hybrid vehicle of the ninth embodiment are identical with those executed in the hybrid vehicle of the eighth embodiment. Because of the difference in structure of the cooling system, the technique of the ninth embodiment carries out the characteristic warm-up control process of the engine 10 as described below.

Figure 78:
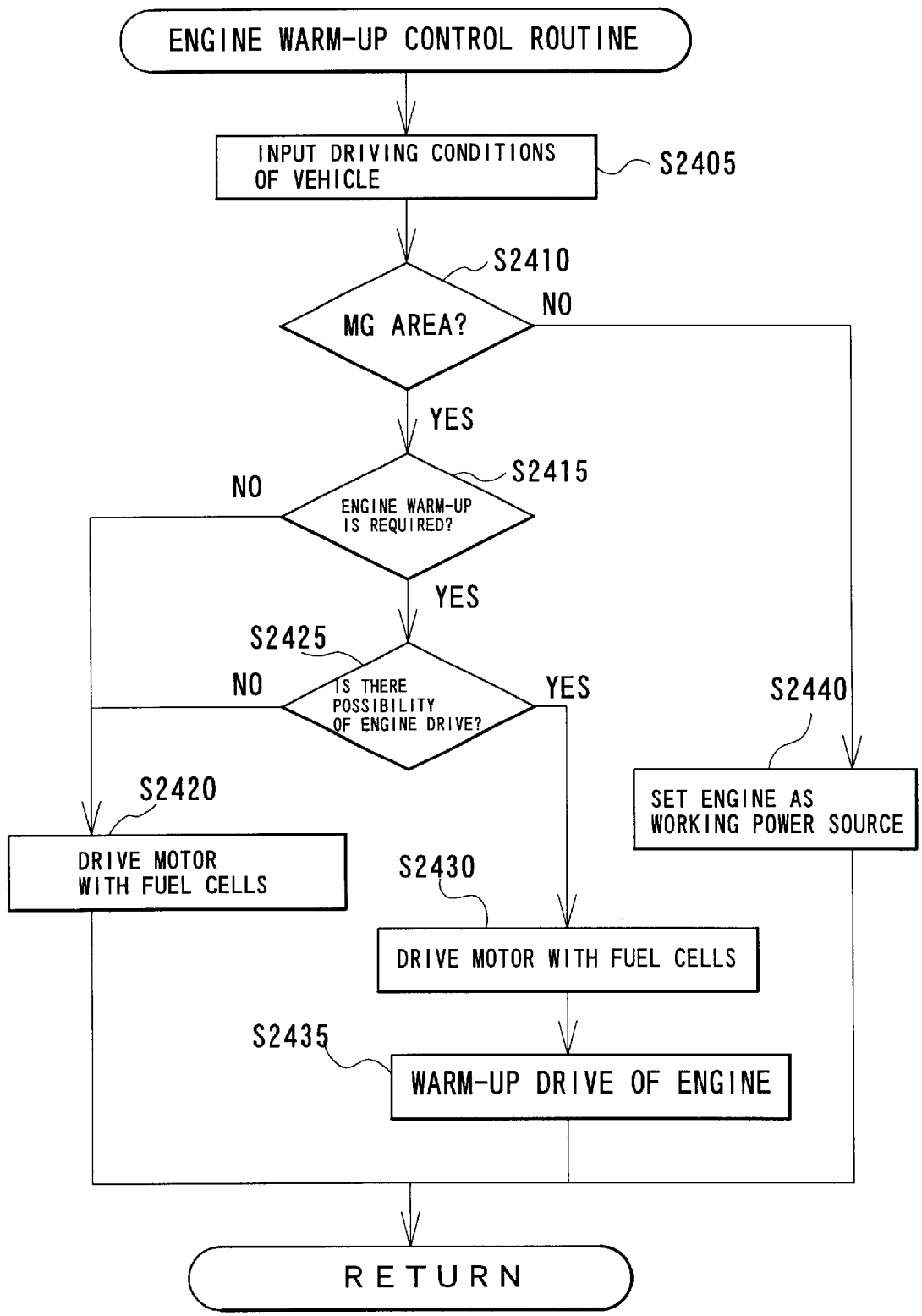
FIG. 78 is a flowchart showing an engine warm-up control routine executed in the ninth embodiment.

FIG. 78 is a flowchart showing an engine warm-up control routine executed in the ninth embodiment. Like the control processes executed in the eighth embodiment, the CPU in the control unit 70 repeatedly executes this engine warm-up control routine at preset time intervals. When the program enters the routine of FIG. 78, the CPU first receives the inputs regarding the driving conditions of the vehicle at step S2405. Among the diversity of inputs, the pieces of information on the vehicle speed, the accelerator travel, the gearshift position, the water temperature in the engine 10, and the remaining quantity FCL of the FC fuel for the fuel cell 60 are especially involved in the subsequent processing.

The CPU subsequently determines whether or not the current driving state of the vehicle corresponds to the MG area, based on the input accelerator travel and vehicle speed at step S2410. When the current driving state of the vehicle does not correspond to the MG area, the engine 10 is used as the working power source to drive the hybrid vehicle, irrespective of the warm-up state of the engine 10 at step S2440.

When it is determined at step S2410 that the current driving state of the vehicle corresponds to the MG area, on the other hand, the CPU subsequently determines whether or not the warm-up of the engine 10 is required at step S2415. The decision of step S2415 is based on the comparison between the observed water temperature in the engine 10 and a predetermined threshold temperature. In the case where the warm-up of the engine 10 is not required, the motor 20 is driven with the fuel cell 60 as the working electric power supply according to the standard driving process in the MG area, so as to drive the hybrid vehicle at step S2420.

In the case where the warm-up of the engine 10 is required at step S2415, on the contrary, the CPU then determines whether or not there is a possibility of the engine drive at step S2425. A diversity of methods may be applied for the decision of step S2425 as discussed later. When it is determined at step S2425 that there is no possibility of the engine drive, the warm-up of the engine 10 is practically needless. The motor 20 is thus driven with the fuel cell 60 as the working electric power supply according to the standard driving process in the MG area, so as to drive the hybrid vehicle at step S2420.

When it is determined at step S2425 that there is a possibility of the engine drive, on the other hand, the CPU drives the motor 20 with the fuel cell 60 as the working electric power supply according to the standard driving process in the MG area at step S2430 and simultaneously starts warming up the engine 10 at step S2435. The warm-up of the engine 10 means that the engine 10 is driven at idle. In the structure of the ninth embodiment, the input clutch 18 arranged between the engine 10 and the motor 20 is released during the warm-up drive of the engine 10. This effectively prevents the power of the engine 10 from affecting the output of the drive shaft 15. During the warm-up process, the engine 10 has extremely low driving efficiency and high emission. The warm-up drive of the engine 10 in the coupled state of the input clutch 18 may cause the speed of the engine 10 to be higher than the idling speed under some driving conditions of the vehicle. An increase in speed of the engine 10 during the warm-up drive undesirably lowers the working efficiency of the hybrid vehicle. The release of the input clutch 18 during the warm-up drive desirably prevents such potential troubles.

The possibility of the engine drive is determined according to a variety of methods. One applicable method determines whether or not the hybrid vehicle may be driven in the engine drive area, based on a variation in vehicle speed in the MG area. The decition may alternativly be based on the remaining quantity of the FC fuel for the fuel cell 60. In the hybrid vehicle of the ninth embodiment, the fuel cell 60 and the engine 10 have a common cooling system. Heat produced in the fuel cell 60 is accordingly transmitted to the engine 10 via cooling water flowing through the common cooling system. Namely the warm-up of the engine 10 can be implemented with the heat produced in the course of the operation of the fuel cell 60.

Figure 79:
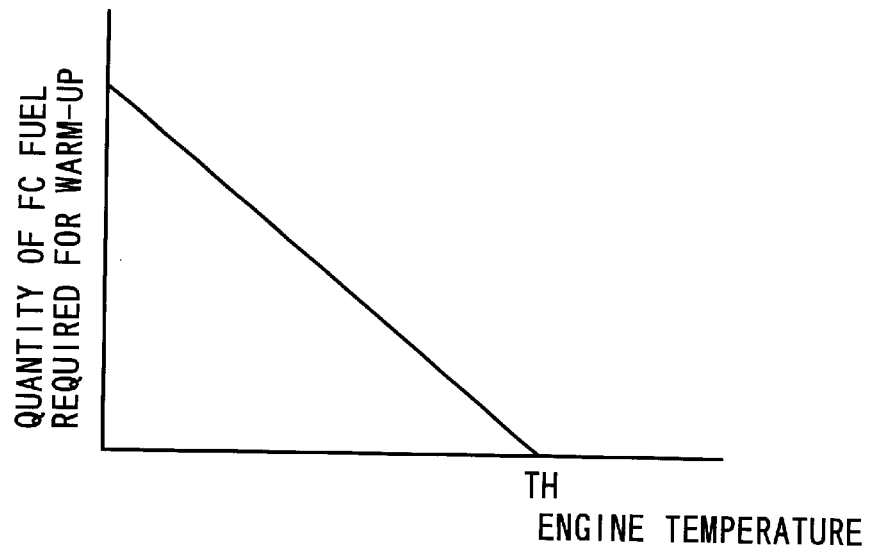
FIG. 79 is a graph showing a variation in quantity of the FC fuel required for the warm-up plotted against the water temperature in the engine.

FIG. 79 is a graph showing a variation in quantity of the FC fuel required for the warm-up plotted against th water temperature in the engine 10 (hereinafter referred to as the engine temperature). A preset temperature TH shown in FIG. 79 represents the temperature at which the warm-up of the engine 10 is completed. The lower engine temperature requires the longer time to reach the preset temperature TH. The consumption of the FC fuel increases in the course of the warm-up of the engine 10 with the heat of the fuel cell 60. Namely the lower engine temperature causes the greater quantity of the FC fuel to be required for the warm-up of the engine 10. The relationship between the engine temperature and the required quantity of the FC fuel may be varied in a diversity of patterns according to the structure of the cooling system and the heat capacity of the engine 10, although they have a linear relationship in the graph of FIG. 79.

When the remaining quantity of the FC fuel is greater than a predetermined value read from the map of FIG. 79, the operation of the fuel cell 60 is continued to complete the warm-up of the engine 10. When the remaining quantity of the FC fuel is less than the predetermined value, however, it is impossible to complete the warm-up of the engine 10 only by means of the fuel cell 60. In the EV drive control process executed in the eighth embodiment, when the remaining quantity of the FC fuel decreases below the predetermined level before the completion of the warm-up of the engine 10, the working power source is changed over from the motor 20 to the engine 10. In the case where the remaining quantity of the FC fuel is less than the predetermined level, it is thus determined that there is a possibility of the engine drive even in the course of the continuous drive of the vehicle in the MG area.

Another applicable method determines the possibility of the engine drive at step S2425, based on a known drive route. One of the recent developments is a navigation system, on which a preset drive routine of the vehicle is displayed. In the hybrid vehicle with the navigation system mounted thereon, the control unit 70 receives information regarding a planned drive route and determines whether or not there is any division of the route where the hybrid vehicle certainly runs in the engine drive area, for example, a highway. A variety of other methods and combinations of the above and other methods may also be applied for the decision about the possibility of the engine drive.

In the hybrid vehicle of the ninth embodiment discussed above, the engine 10 is warmed up independently of the power output from the drive shaft 15. The warm-up of the engine 10 is thus performed without significantly lowering the driving efficiency and the environmental properties of the hybrid vehicle. The warm-up of the engine 10 is carried out only when there is a possibility of driving the engine 10. This desirably avoids the needless warm-up and thereby prevents the driving efficiency of the hybrid vehicle from being lowered. In the arrangement of the ninth embodiment, the engine 10 is warmed up with the heat produced in the fuel cell 60. This ensures the enhanced energy efficiency. In the structure of the ninth embodiment, the fuel cell 60 and the engine 10 have a common cooling system. The technique of the ninth embodiment may, however, be applied to the structure of the eighth embodiment having separate cooling systems in the case where the heat of the fuel cell 60 is not utilized for the warm-up.

M1. Modification of Ninth Embodiment

Figure 80:
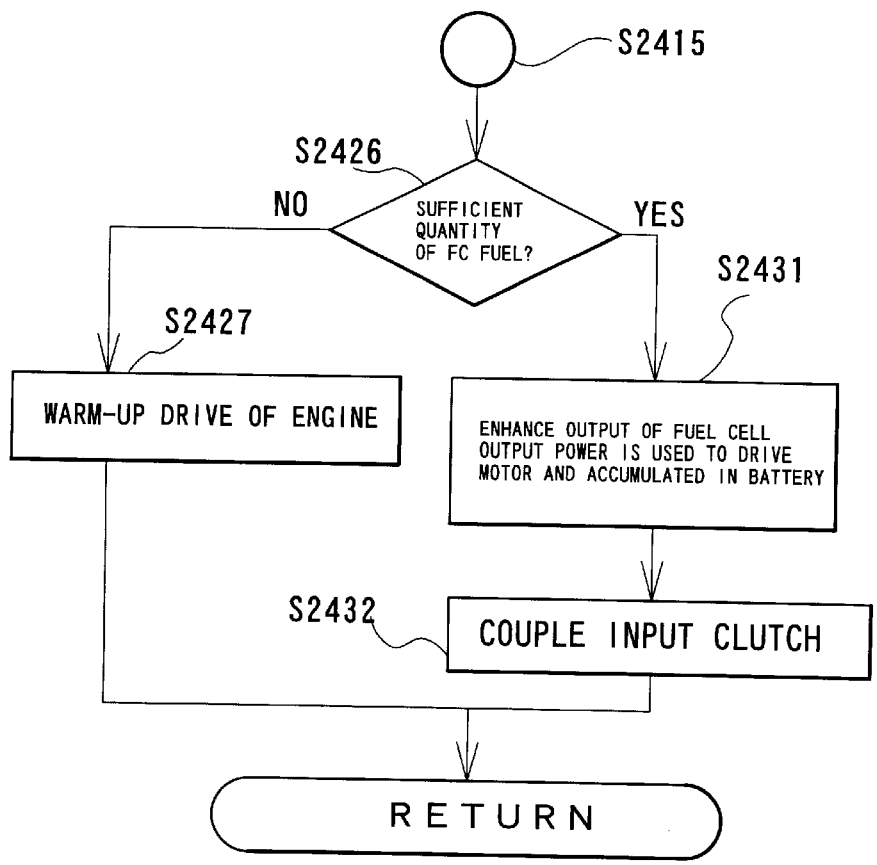
FIG. 80 is a flowchart showing an engine warm-up control routine as one modification of the ninth embodiment.

FIG. 80 is a flowchart showing an engine warm-up control routine as one modification of the ninth embodiment. The flowchart of FIG. 80 shows only a different part from the processing of FIG. 78 executed in the ninth embodiment.

In the engine warm-up control routine of the ninth embodiment, the warm-up of the engine 10 is performed when it is determined that there is a possibility of driving the engine 10 (step S2425 in the flowchart of FIG. 78). In the modified procedure, the possibility of driving the engine 10 is determined, based on the remaining quantity of the FC fuel shown in the map of FIG. 79. In the modified control routine of FIG. 80, instead of the decision at step S2425, the CPU determines whether or not the remaining quantity of the FC fuel is equal to or greater than the required quantity for the warm-up of the engine 10 at step S2426. When there is only an insufficient quantity of the FC fuel, the warm-up of the engine 10 can not be completed only by means of the operation of the fuel cell 60. The warm-up drive of the engine 10 is accordingly performed at step S2427.

When it is determined at step S2426 that there is a sufficient quantity of the FC fuel, on the other hand, the engine 10 is warmed up by means of the operation of the fuel cell 60. In this case, the CPU enhances the output of the fuel cell 60 at step S2431, in order to ensure the quick completion of the warm-up of the engine 10. The output of the fuel cell 60 is basically used to drive the motor 20. The excess electric power output from the fuel cell 60 is accumulated in the battery 50. Simultaneously with the processing of step S2431, the input clutch 18 disposed between the engine 10 and the motor 20 is coupled at step S2432. Coupling the input clutch 18 enables the engine 10 to be motored with the power of the motor 20. This generates the frictional heat between the piston and the cylinder in the engine 10, as well as the heat due to the compression of the air in the cylinder. Such heat contributes to the quick completion of the warm-up of the engine 10.

The modified engine warm-up control process discussed above enhances the output of the fuel cell 60 when there is a sufficient quantity of the FC fuel. This ensures the quick completion of the warm-up of the engine 10. This arrangement prevents gasoline from being consumed for the warm-up drive of the engine 10 and thereby improves the driving efficiency and the environmental properties of the hybrid vehicle. The electric power excessively output from the fuel cell 60 is accumulated in the battery 50 and used according to the requirements. This arrangement desirably prevents a significant decrease in working efficiency. In the modified control process of FIG. 80, the remaining quantity of the FC fuel is compared with the required quantity for the warm-up of the engine 10 at step S2426. The comparison of step S2426 may, however, be omitted, and the processing of steps S2431 and 2432 may be carried out unconditionally. In this case, the engine 10 is warmed up by means of the operation of the fuel cell 60 as far as the FC fuel remains. The process of coupling the input clutch 18 at step S2432 may also be omitted.

N. Tenth Embodiment

A hybrid vehicle of a tenth embodiment fundamentally has a similar hardware structure to that of the hybrid vehicle of the eighth embodiment shown in FIG. 66. The difference from the eighth embodiment is a variety of optional drive modes. In the hybrid vehicle of the eighth embodiment, the drive mode is selectable among the three options, that is, the engine (EG) mode, the FC mode, and the auto mode, by means of the operation of the power source changeover switch 164. In the hybrid vehicle of the tenth embodiment, on the other hand, the drive mode is selectable among another set of three options, that is, an exclusive engine mode, an exclusive FC mode, and a combination mode.

In the exclusive engine mode, the hybrid vehicle is driven only with the engine 10 as the working power source. In the exclusive FC mode, the hybrid vehicle runs using the motor 20, which is driven with the fuel cell 60. In the combination mode, the engine 10 and the motor 20 are selectively used as the working power source according to the driving conditions of the vehicle.

In the hybrid vehicle of the eighth embodiment, the engine mode or the FC mode is selectively set to specify the working power source while the hybrid vehicle runs in the MG area. In the hybrid vehicle of the tenth embodiment, on the other hand, the exclusive engine mode or the exclusive FC mode is selectively set in the whole drive area of the hybrid vehicle. In the case of the selection of the exclusive engine mode, the motor 20 is not used to drive the vehicle even in the MG area. In the case of the selection of the exclusive FC mode, the working power source is not changed over to the engine 10 even out of the MG area. The output torque during a high-speed run in the exclusive FC mode is accordingly lower than that in the combination mode. The technique of the tenth embodiment allows a variation in drive feeling according to the drive mode. The driver intentionally selects a desired drive mode while understanding the possible variation in drive feeling according to the drive mode. Such variation accordingly does not make the driver feel significantly uneasy during a drive of the hybrid vehicle. From this point of view, the displacement of the engine is set by giving a preference to the driving state of the hybrid vehicle at a high speed. The output torque in a low-speed area in the exclusive engine mode is accordingly set smaller than that in the exclusive FC mode. This arrangement does not require the engine 10 to have an unnecessarily high output torque and desirably reduces the size of the engine 10.

The arrangement of the tenth embodiment is characterized by the control process that gives a preference to the fuel consumption and the environmental properties of the hybrid vehicle by selectively using the three drive modes. In the case of the selection of the exclusive FC mode, there is an extremely little possibility of using the engine 10. The warm-up of the engine 10 is thus forbidden as far as the fuel cell 60 is in the available state. This arrangement restricts the waste of gasoline used to warm up the engine 10 and thereby improves the fuel consumption and the environmental properties of the hybrid vehicle. The details of this control process are described below.

Figure 81:
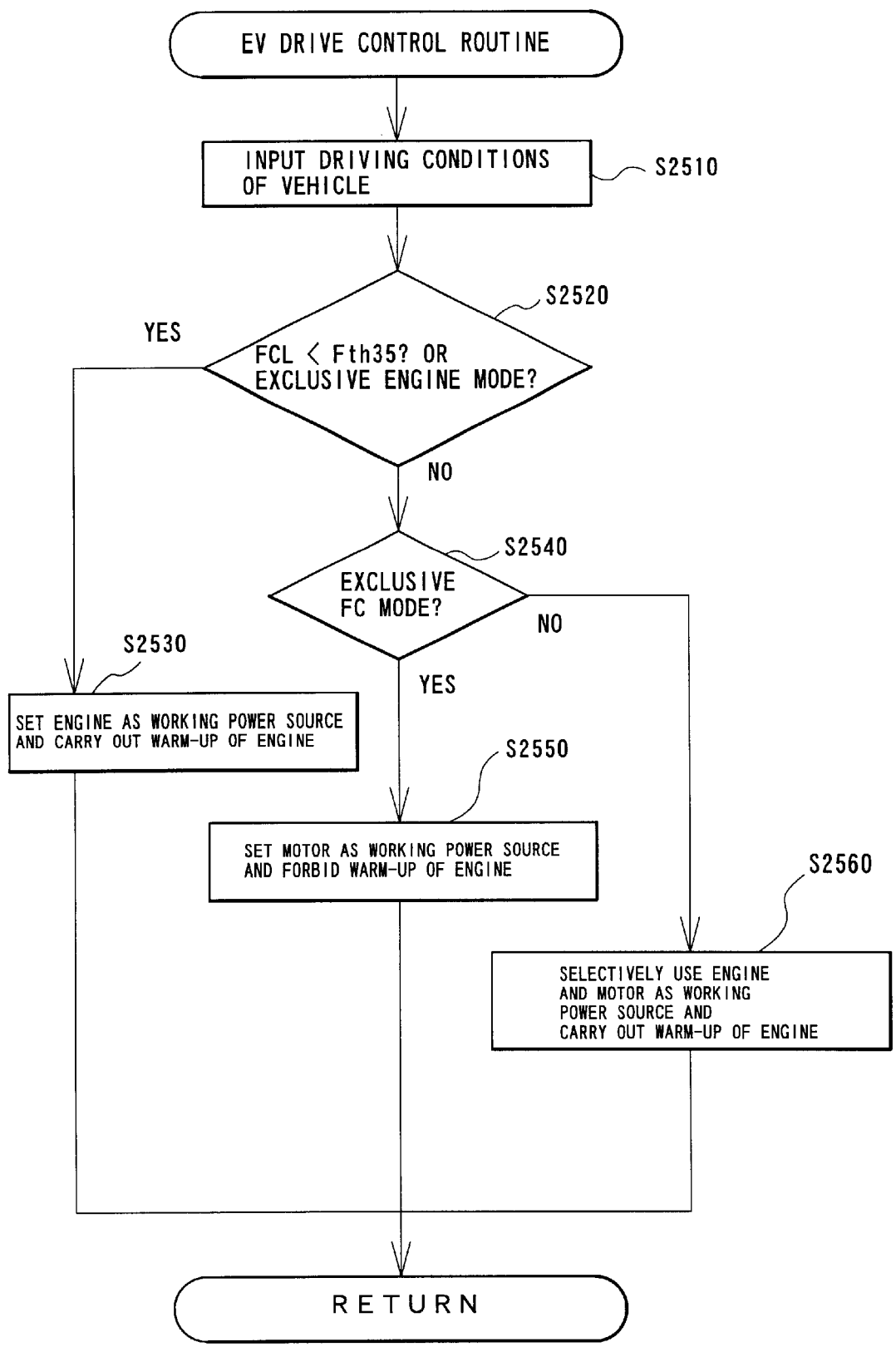
FIG. 81 is a flowchart showing an EV drive control routine executed in a tenth embodiment according to the present invention.

FIG. 81 is a flowchart showing an EV drive control routine executed in the tenth embodiment. When the program enters the routine of FIG. 81, the CPU first receives the inputs regarding the driving conditions of the vehicle at step S2510. Among the diversity of inputs, the pieces of information on the vehicle speed, the accelerator travel, the gearshift position, the remaining quantity GSL of gasoline, the remaining charge SOC of the battery 50, the remaining quantity FCL of the FC fuel for the fuel cell 60, the on-off state of the ignition switch, and the position of the power source changeover switch 164 are especially involved in the subsequent processing.

The CPU then determines whether or not at least one of specific conditions to set only the engine 10 as the working power source is fulfilled at step S2520. The specific conditions are that the use of the fuel cell 60 is forbidden and that the exclusive engine mode is selected. The use of the fuel cell 60 is forbidden when the remaining quantity FCL of the FC fuel is less than a predetermined level Fth35. When at least one of the specific conditions is satisfied at step S2520, the CPU selects the engine 10 as the working power source and warms up the engine 10 according to the requirements at step S2530. The predetermined level Fth35 is fixed to an arbitrary positive value in the same manner as the predetermined level Fth31 used in the EV drive control routine of the eighth embodiment shown in the flowchart of FIG. 69.

A diversity of techniques may be applied for the processing at step S2530. For example, the hybrid vehicle may be driven only by the engine 10, whether the warm-up of the engine 10 has already been completed or not. In this case, the separate warm-up process of the engine 10 is not required. Another technique uses the engine 10 as the working power source after the completion of the warm-up of the engine 10. In this arrangement, the hybrid vehicle is driven by temporarily using the motor 20 with the fuel cell 60, while the engine 10 is driven at idle for the warm-up. Still another technique adopts the former procedure in the exclusive engine mode and the latter procedure in any other drive mode. Any one of these and other possible procedures is selectively set for the processing at step S2530.

When none of the specific conditions is fulfilled at step S2520, it is determined that the fuel cell 60 is to be used for the drive of the hybrid vehicle. The CPU subsequently determines whether or not the drive mode currently selected is the exclusive FC mode at step S2540, and selects the working power source based on the decision of step S2540. In the case of the selection of the exclusive FC mode, the motor 20 is driven with the fuel cell 60 as the electric power supply to drive the hybrid vehicle at step S2550. In the exclusive FC mode, the engine 10 is not used as the working power source as long as the fuel cell 60 is in the available state. The CPU accordingly forbids not only the drive but the warm-up of the engine 10 at step S2550. A concrete procedure of step S2550 turns off a flag, which represents allowance or prohibition of the operation of the engine 10. In response to the flag, a separate engine operation control routine actually stops the drive and the warm-up of the engine 10.

One modified arrangement sets another decision point between steps S2540 and S2550 to determine whether or not the fuel cell 60 malfunctions or is anyway in the unavailable state. The processing of step S2550 is carried out only when the fuel cell 60 is in the available state. Otherwise the warm-up of the engine 10 is allowed. When the fuel cell 60 is in the unavailable state, the processing of step S2530 may be carried out to drive the vehicle with the engine 10 as the working power source.

When the combination mode is the currently selected drive mode at step S2540, on the other hand, the engine 10 and the motor 20 are selectively used as the working power source according to the driving conditions of the vehicle at step S2560. In the combination mode, it is required to swiftly change over the working power source from the motor 20 to the engine 10 according to the driving conditions of the vehicle. The engine 10 is accordingly warmed up even in the MG area at step S2560, although the engine 10 is not used for the drive of the hybrid vehicle in the MG area.

The hybrid vehicle of the tenth embodiment has the exclusive FC mode, in which the engine 10 is not used in principle. Prohibition of not only the drive but the warm-up of the engine 10 significantly improves the fuel consumption and the environmental properties of the hybrid vehicle. When the fuel cell 60 falls into the unavailable state, for example, due to the exhaustion of the FC fuel in the exclusive FC mode or when the driver changes the drive mode from the exclusive FC mode, this arrangement requires the warm-up of the engine 10 and has the poor response to set the engine 10 as the working power source. The driver, however, intentionally selects the drive mode while understanding such disadvantages. These disadvantages thus do not make the driver feel significantly uneasy during a drive of the hybrid vehicle. In the hybrid vehicle of the tenth embodiment, the proper power source is selectively used in the whole drive range of the vehicle through the operation of the power source changeover switch 164. The principle of the tenth embodiment that forbids the warm-up of the engine 10 according to the driving conditions of the vehicle may, however, be also applicable to the arrangement of selectively using the proper power source in the MG area as discussed in the eighth embodiment. This also improves the fuel consumption and the environmental properties of the hybrid vehicle.

O. Eleventh Embodiment

A technique of controlling a variation in torque output from the engine 10 is described as an eleventh embodiment of the present invention. The hybrid vehicle of the eleventh embodiment has the structure identical with that of the hybrid vehicle of the first embodiment shown in FIG. 1. The following describes first the principle of the control to reduce a variation in torque output from the engine 10 and then the details of the control.

Figure 82:
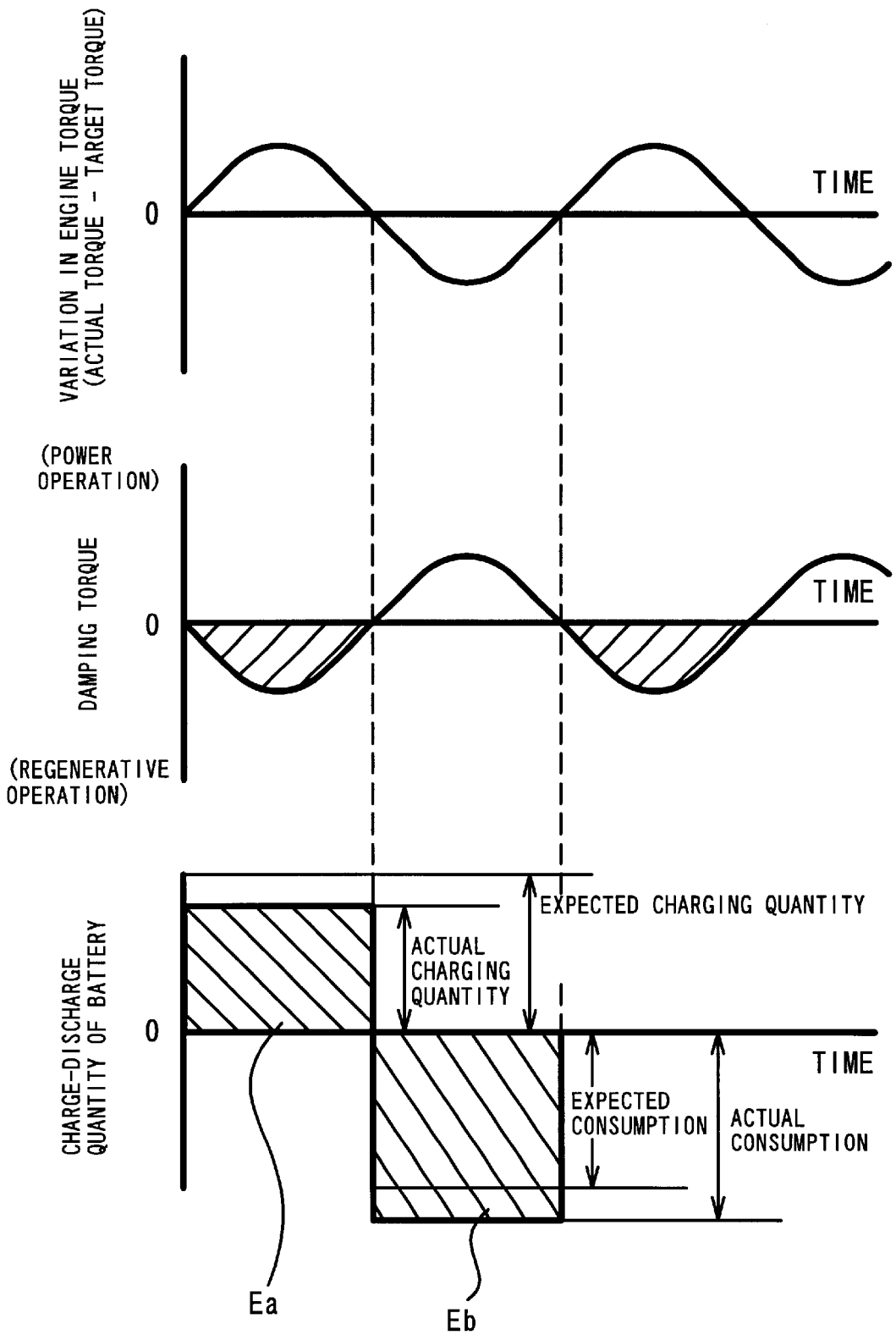
FIG. 82 shows the principle of control to reduce a torque variation in an eleventh embodiment according to the present invention.

FIG. 82 shows the principle of the control to reduce a torque variation. In the example of FIG. 82, the variation in torque output from the engine 10 is compensated with the torque output from the motor 20 linked with the crankshaft 12. The torque output from the engine 10 often pulsates in the vicinity of a target torque. Here the variation in torque represents a difference between the target torque to be output from the engine 10 and the torque actually output from the engine 10. The torque actually output from the engine 10 varies to be greater than the target torque in a certain period and to be smaller than the target torque in another period. Although the torque varies in a periodic manner in the example of FIG. 82, the torque variation may follow an irregular pattern.

The motor 20 outputs a torque to compensate for the variation in torque output from the engine 10. This torque is hereinafter referred to as the damping torque. The damping torque compensates for the actual torque output from the engine 10, so as to enable output of the target torque. The damping torque has a reversed phase to that of the torque variation and corresponds to a difference by subtracting the actual torque from the target torque of the engine 10. In the structure where the motor 20 is directly linked with the engine 10, the damping torque is equal to the required torque of the motor 20. In the structure where the motor 20 is connected with the engine 10 via a transmission mechanism, a value determined by making the gear ratio of the transmission mechanism reflected on the damping torque is the required torque of the motor 20.

In the period when the actual torque of the engine 10 is greater than the target torque, the damping torque has a negative value, and the motor 20 carries out the regenerative operation as shown by the hatched areas in FIG. 82. In the period when the actual torque of the engine 10 is less than the target torque, on the other hand, the damping torque has a positive value, and the motor 20 carries out the power operation.

The bottom drawing of FIG. 82 schematically illustrates a variation in charge-discharge quantity of the battery 50 on the assumption that the electric power is transmitted between the motor 20 and the battery 50 in the torque-damping process. In the period of the negative damping torque, the motor 20 carries out the regenerative operation to charge the battery 50. It is impossible to regenerate the excess power output from the engine 10 in the form of electric power at an efficiency of 100%. The actual charging quantity is accordingly lower than the expected charging quantity and corresponds to a hatched area Ea. In the period of the positive damping torque, on the other hand, the motor 20 carries out the power operation to consume the electric power accumulated in the battery 50. It is also impossible to convert the electric power of the battery 50 into the torque at an efficiency of 100%. The actual consumption of electric power is accordingly greater than the expected consumption of electric power and corresponds to a hatched area Eb. Since the charge-discharge efficiency of the battery 50 is less than 100%, the charging quantity of the battery 50 gradually decreases in the course of the damping control. The electric power consumed during the power operation of the motor 20 has the losses due to both the lowered charge efficiency and the lowered discharge efficiency of the battery 50. This is accordingly not efficient.

The damping control of the eleventh embodiment changes the working electric power supply in the period of the regenerative operation of the motor 20 and in the period of the power operation of the motor 20, in order to prevent such a decrease in charging quantity of the battery 50 and improve the efficiency in the damping control process. During the regenerative operation, the motor 20 is connected with the battery 50 to charge the battery 50. During the power operation, on the other hand, the motor 20 is connected with the fuel cell 60 to use the electric power output from the fuel cell 60. The working electric power supply is changed by regulating the changeover switch 84. The selective use of the electric power supply causes the battery 50 to be only charged in the damping control process. Execution of the damping control over a long time period may thus cause the battery 50 to be excessively charged. In order to avoid the excessive charging, the technique of the embodiment changes over the working electric power supply in the damping control process according to the charging state of the battery 50. Such control follows a damping control process discussed below.

O1. Damping Control Process

Figure 83:
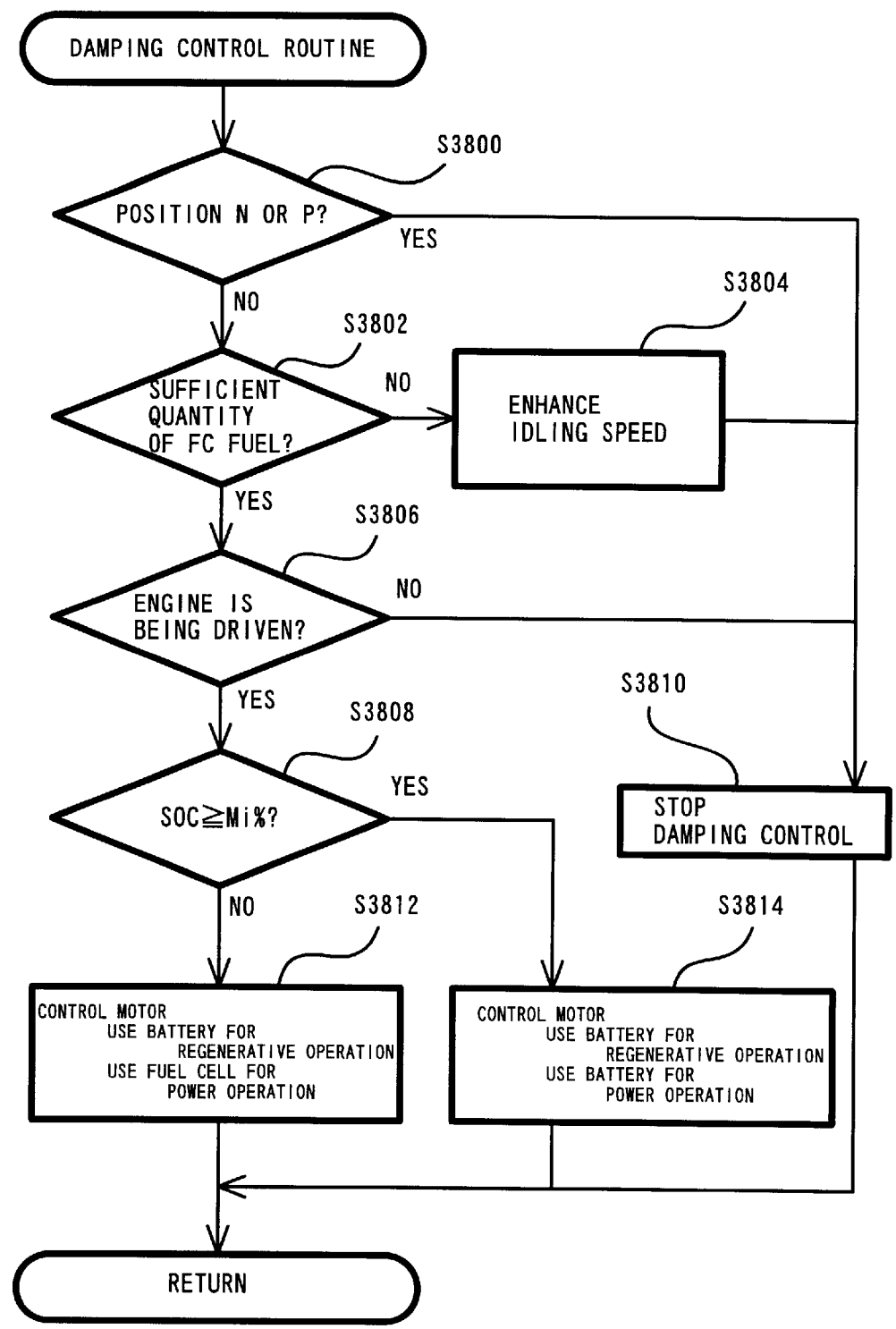
FIG. 83 is a flowchart showing a damping control routine executed in the eleventh embodiment.

FIG. 83 is a flowchart showing a damping control routine executed in the eleventh embodiment. Like the other control routines, the CPU in the control unit 70 repeatedly executes the damping control routine. When the program enters the routine of FIG. 83, the CPU first detects the current gearshift position and determines whether or not the current gearshift position is either the neutral position (N) or the parking position (P) at step S3800. When the current gearshift position is either the position N or the position P, the CPU stops the damping control at step S3810. The parking position is set while the hybrid vehicle is at a stop. In the parking position, the variation in torque output from the engine 10 accordingly does not affect the ride of the vehicle. The neutral position is also set in principle while the hybrid vehicle is at a stop. The variation in torque output from the engine 10 is not transmitted to the axle 17 in the neutral position. The torque variation accordingly does not affect the ride of the vehicle.

When the current gearshift position is other than the position N or the position P at step S3800, it is determined that the vehicle is being driven or temporarily stopped, for example, in response to a 'STOP' signal. In this case, the damping control to reduce the variation in torque output from the engine 10 is carried out only when both the condition that the remaining quantity of the FC fuel is not less than a predetermined level (step S3802) and the condition that the engine 10 is being driven (step S3804) are fulfilled.

When the observed remaining quantity of the FC fuel is not less than the predetermined level (step S3802), the fuel cell 60 can be used as the working electric power supply to enable the motor 20 to carry out the power operation in course of the damping control. When the observed remaining quantity of the FC fuel is less than the predetermined level, that is, when there is only an insufficient quantity of the FC fuel, on the other hand, the CPU enhances the idling speed of the engine 10 at step S3804 and stops the damping control at step S3810. The enhanced idling speed of the engine 10 effectively prevents the vehicle from being resonated due to a torque variation while the engine 10 is driven at idle. For this purpose, the processing of step S3804 enhances the target idling speed of the engine 10 to be out of a resonant zone of the vehicle.

The damping control is not required while the engine 10 is at a stop. The determination of whether or not the engine 10 is being driven (step S3806) is accordingly set as the condition for the damping control. When the engine 10 is not being driven, the CPU stops the damping control at step S3810. The decisions of steps S3800, S3802, and S3806 as the conditions for the damping control may be carried out in a different order from that of FIG. 83 or in parallel.

When the results of these decisions determine that the damping control is to be carried out, the CPU selects the proper electric power supply in the damping control process according to the charging state of the battery 50. The CPU accordingly compares the observed remaining charge SOC of the battery 50 with a preset reference value Mi % at step S3808. The reference value Mi % is arbitrarily set to avoid the excess charging of the battery 50.

In the case where the remaining charge SOC of the battery 50 is less than the preset reference value Mi % at step S3808, the CPU controls the drive of the motor 20 at step S3812 in such a manner that the battery 50 is charged with electric power during the regenerative operation of the motor 20 and that the fuel cell 60 is used as the working electric power supply during the power operation of the motor 20. In the case where the remaining charge SOC of the battery 50 is not less than the preset reference value Mi % at step S3808, on the other hand, the CPU controls the drive of the motor 20 at step S3814 in such a manner that the battery 50 is charged with the electric power during the regenerative operation of the motor 20 and that the battery 50 is used as the working electric power supply during the power operation of the motor 20. This arrangement prevents the battery 50 from being excessively charged. It is desirable to set an appropriate hysteresis at the decision of step S3808, in order to prevent the working electric power supply from being frequently changed over between the battery 50 and the fuel cell 60.

The drive of the motor 20 is controlled in the following manner.

Figure 84:
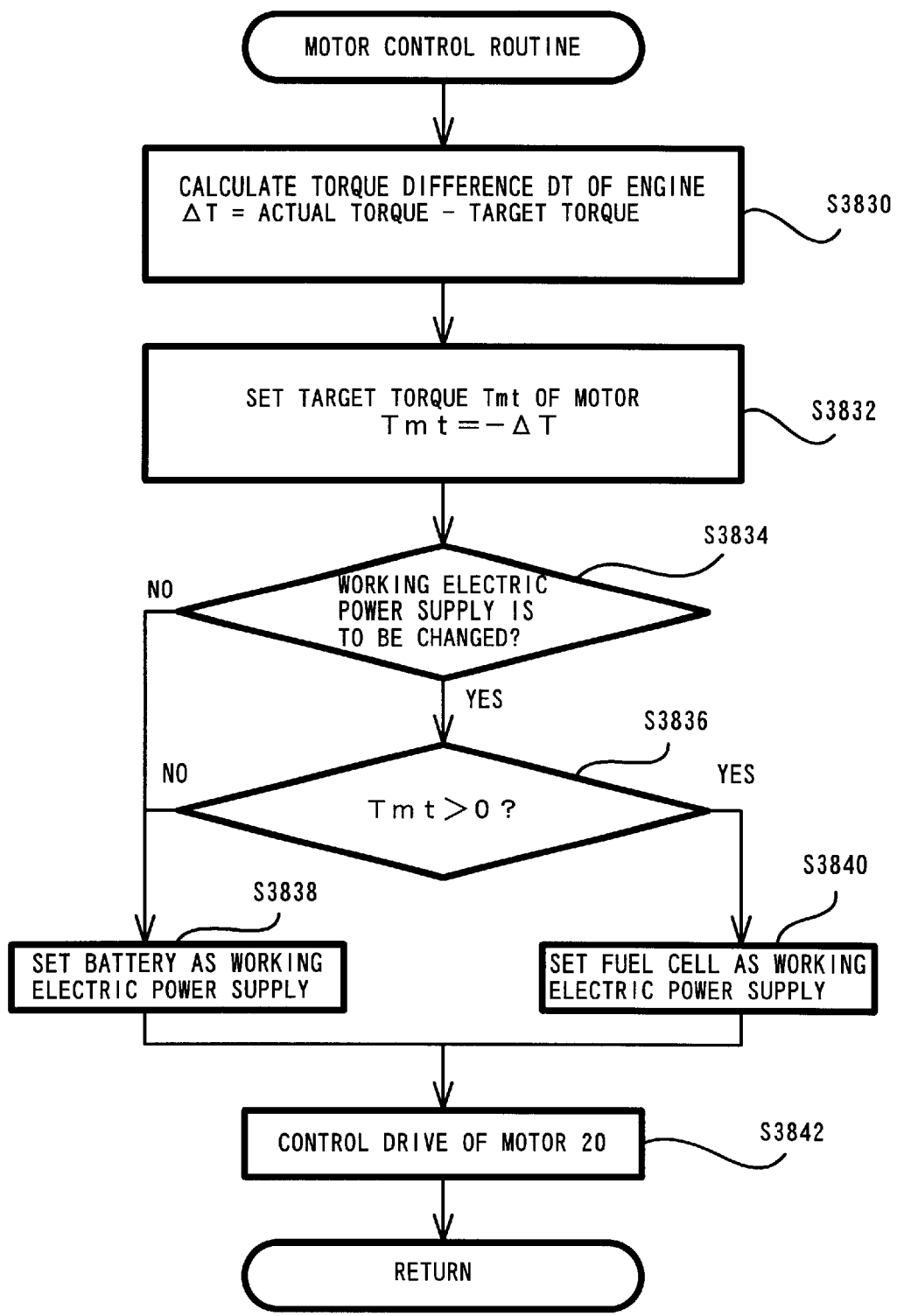
FIG. 84 is a flowchart showing a motor control routine executed in the damping control process.

FIG. 84 is a flowchart showing a motor control routine executed in the damping control process. The CPU first subtracts the target torque of the engine 10 from the true torque actually output from the engine 10 to calculate a torque difference ΔT at step S3830. The CPU subsequently sets a target torque Tmt of the motor 20, so as to compensate for the calculated torque difference ΔT at step S3832. In the hybrid vehicle of the eleventh embodiment, the motor 20 is linked directly with the crankshaft 12. The target torque Tmt is thus set equal to −ΔT. In the structure where the motor 20 is connected with the crankshaft 12 via a transmission, a value determined by making the gear ratio of the transmission reflected on −ΔT is set to the target torque Tmt.

When the battery 50 is set as the electric power supply during both the regenerative operation and the power operation of the motor 20 at step S3814 in the damping control routine of FIG. 83, it is determined at step S3834 that there is no need to change over the working electric power supply. The changeover switch 84 is accordingly controlled to set the battery 50 as the working electric power supply at step S3838. When the different electric power supplies are set during the regenerative operation of the motor 20 and during the power operation of the motor 20 at step S3812 in the damping control routine of FIG. 83, on the contrary, the working electric power supply is selected according to the sign of the target torque Tmt of the motor 20 at step S3836.

In the case where the target torque Tmt is greater than zero, the changeover switch 84 is controlled to set the fuel cell 60 as the working electric power supply at step S3840. In the case where the target torque Tmt is not greater than zero, on the other hand, the changeover switch 84 is controlled to set the battery 50 as the working electric power supply at step S3838.

After setting the working electric power supply, the CPU drives the motor 20 to output the target torque Tmt at step S3842. The motor drive control process discussed previously with the flowchart of FIG. 13 is applied for the processing of step S3842. When the fuel cell 60 is used as the working electric power supply, the CPU also controls the working state of the fuel cell 60. The control procedure of this embodiment regulates a supply of gaseous fuel to enable the fuel cell 60 to generate a maximum possible electric power, irrespective of the actual requirement of electric power. The delayed supply of gaseous fuel to the fuel cell 60 does not allow the electric power to be output quickly in response to the requirement. The torque variation of the engine 10 occurs at a relatively high frequency. In order to attain the effective damping control, the fuel cell 60 is required to output electric power with a good response sufficiently corresponding to the torque variation. The control procedure of the embodiment supplies a sufficient quantity of gaseous fuel to the fuel cell 60 irrespective of the required electric power, and controls the switching in the driving circuit 52 to enable the power generation corresponding to the required electric power. This arrangement attains the power generation with a favorable response. In the case of the low requirement of electric power output from the fuel cell 60, the excess of the supplied gaseous fuel containing hydrogen is discharged from the fuel cell 60. It is desirable to provide a piping system that recovers and circulates the discharged gaseous fuel in the fuel cell 60, in order to avoid the waste of the gaseous fuel.

The hybrid vehicle of the eleventh embodiment discussed above controls the torque variation of the engine 10 and thereby improves the ride of the vehicle. The working electric power supply is appropriately selected during the regenerative operation and the power operation of the motor 20. This arrangement desirably enhances the efficiency in the damping control process. As shown by the bottom drawing in FIG. 82, in the structure where the electric power of the battery 50 is used for the power operation of the motor 20, the motor 20 should carry out the power operation at a low energy efficiency. The technique of the eleventh embodiment, however, enables the fuel cell 60 to be used as the working electric power supply for the power operation of the motor 20. This improves the driving efficiency of the motor 20 during the power operation and thereby enhances the total energy efficiency in the damping control process.

The technique of the eleventh embodiment changes over the working electric power supply during the power operation of the motor 20 according to the remaining charge SOC of the battery 50. This arrangement enables the damping control with a high efficiency, while preventing the battery 50 from being excessively charged.

O2. Modification

The technique of the eleventh embodiment carries out the damping control only with the torque of the motor 20. The hybrid vehicle of the embodiment, however, has two motors that enable output of torque, that is, the motor 20 and the auxiliary machinery driving motor 80. One possible modification of the damping control selectively uses these two motors in the course of the regenerative operation and the power operation. This is described below as a modification of the eleventh embodiment.

Figure 85:
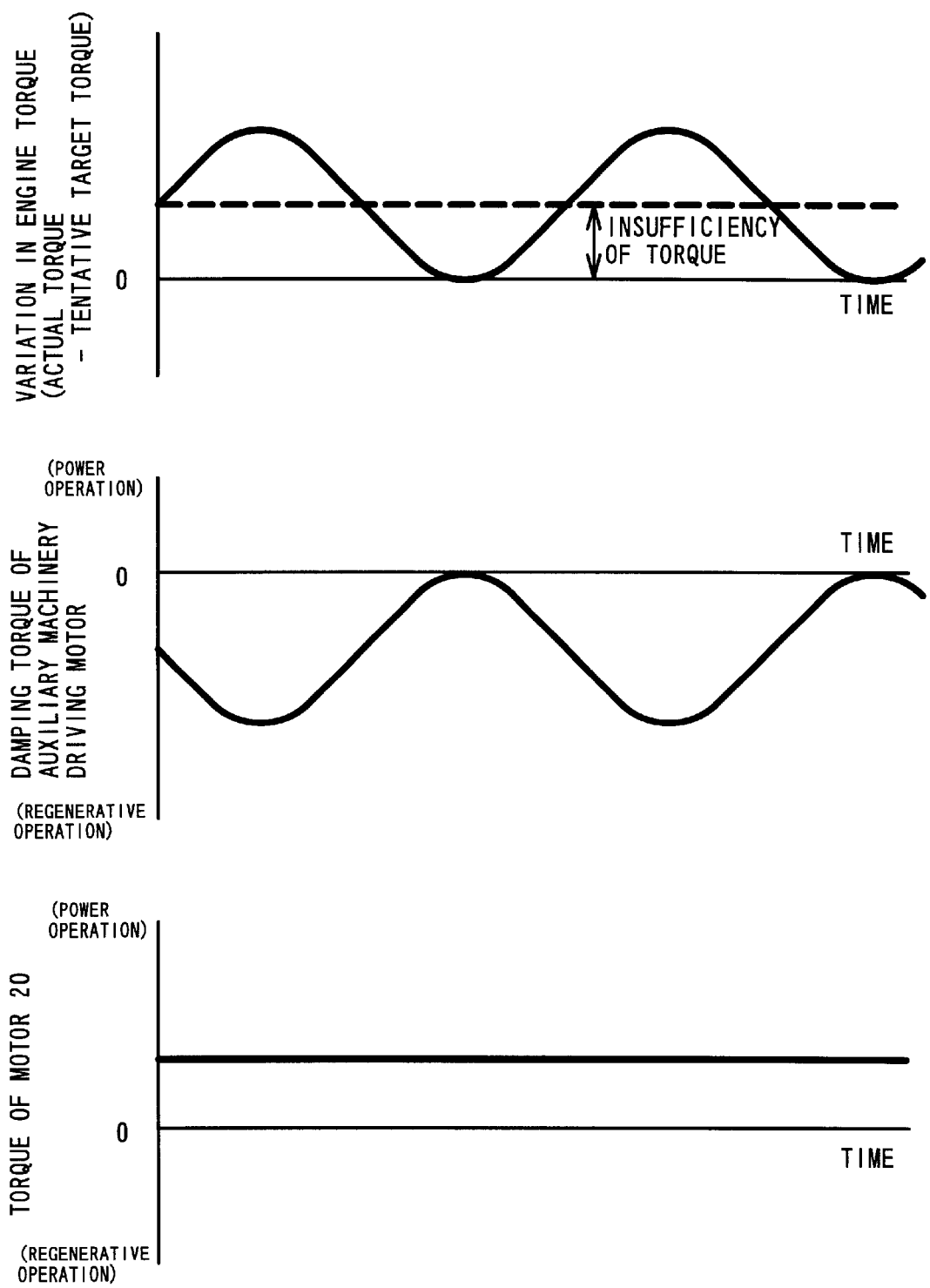
FIG. 85 shows the principle of damping control in a modification of the eleventh embodiment.

FIG. 85 shows the principle of damping control in the modification of the eleventh embodiment. As shown by the upper drawing, there is a variation in torque output from the engine 10. The real target torque of the engine 10 is a value shown by the broken line. The technique of the modification sets a minimum torque output from the engine 10 to a tentative target torque. This causes a positive torque variation of the engine 10 above the tentative target torque.

The technique of the modification compensates this torque variation with the torque output from the auxiliary machinery driving motor 80. The damping torque of the auxiliary machinery driving motor 80 is always negative as shown by the middle drawing of FIG. 85. Application of the damping torque in this manner causes the output torque of the crankshaft 12 to correspond only to the tentative target torque and not to reach the real target torque. The arrangement of the modification causes the motor 20 to carry out the power operation, so as to output an additional torque corresponding to the insufficiency. The torque of the motor 20 is accordingly set to a fixed positive value as shown by the bottom drawing of FIG. 85.

Figure 86:
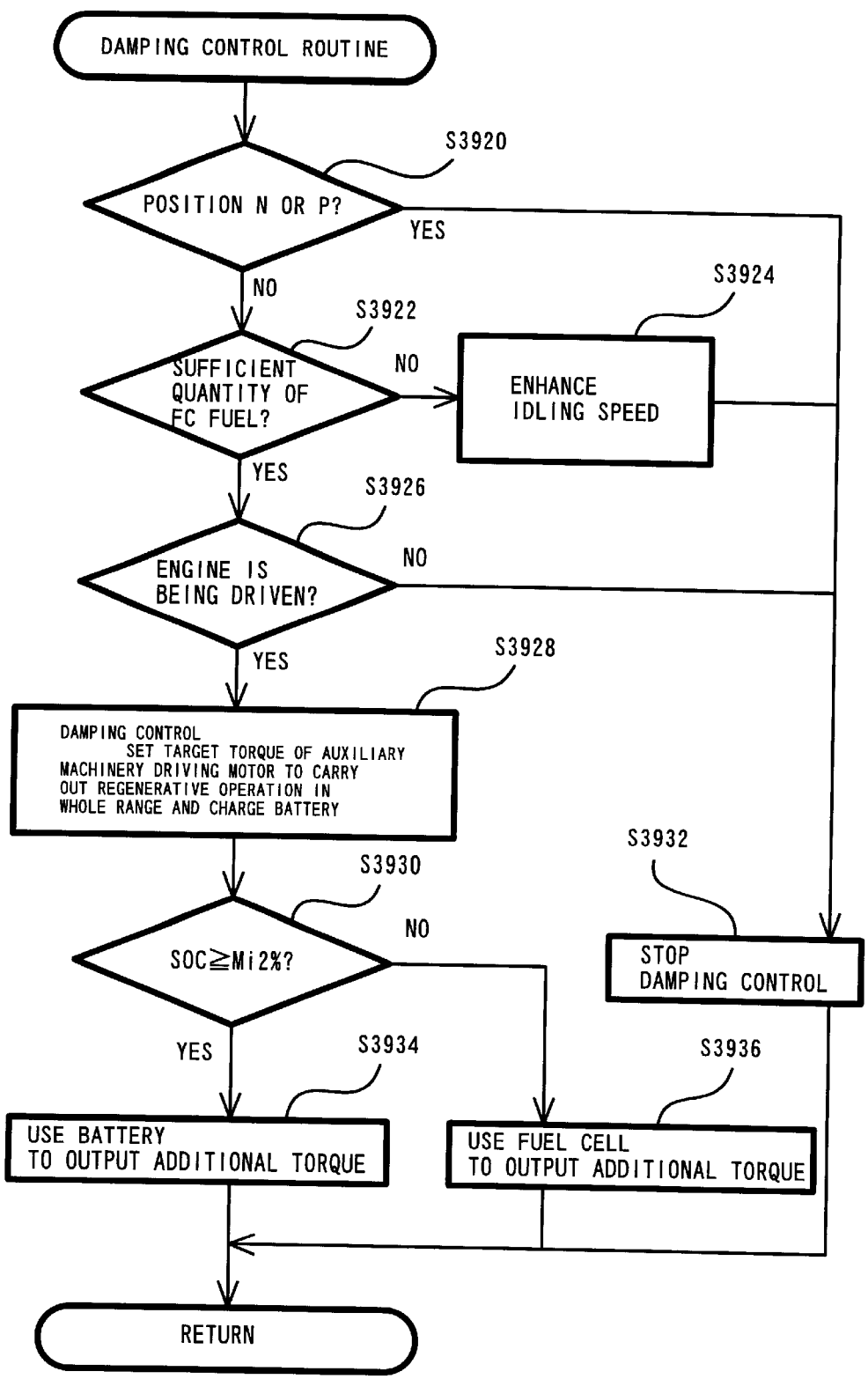
FIG. 86 is a flowchart showing a damping control routine executed in the modification of the eleventh embodiment.

The damping control based on the above principle is carried out in the following manner. FIG. 86 is a flowchart showing a damping control routine executed in the modification of the eleventh embodiment. In the same manner as the eleventh embodiment, the CPU in the control unit 70 repeatedly executes this damping control routine. When the program enters the routine of FIG. 86, the CPU first determines whether or not the damping control is to be carried out, based on the gearshift position, the remaining quantity of the FC fuel, and the driving state of the engine 10 at steps S3920, S3922, and S3926. The details of such decisions and the processing of steps S3924 and S3932 executed in the case of the non-execution of damping control are identical with those discussed in the eleventh embodiment with the flowchart of FIG. 83.

The difference from the eleventh embodiment is the details of the processing executed in the case of the execution of damping control. The CPU sets a target torque of the auxiliary machinery driving motor 80 to allow the regenerative operation of the auxiliary machinery driving motor 80 in the whole range and compensate for the torque variation at step S3928. The concrete procedure of step S3928 sets the tentative target torque equal to the minimum torque output from the engine 10 as discussed previously with FIG. 85, regards the difference between the actual torque output from the engine 10 and the tentative target torque as the torque difference $\Delta T$, and sets the real target torque of the auxiliary machinery driving motor 80 in the same manner as the processing of steps S3830 and S3832 in the flowchart of FIG. 84. The target torque set in this manner is always negative. The regulation of the auxiliary machinery driving motor 80 accordingly causes the regenerative operation in the whole range.

As discussed previously with FIG. 85, the continuous regenerative operation of the auxiliary machinery driving motor 80 causes the torque output to the crankshaft 12 to be less than the real target torque. The CPU then carries out the control to cause the motor 20 to compensate for the insufficiency of the output torque. The technique of the modification selects the working electric power supply for the power operation of the motor 20, based on the remaining charge SOC of the battery 50. The CPU compares the observed remaining charge SOC of the battery 50 with a preset reference value Mi2% at step S3930. The reference value Mi2% is set arbitrarily to avoid the excessive charging of the battery 50. When the remaining charge SOC of the battery 50 is less than the preset reference value Mi2%, that is, when there is no fear of excessively charging the battery 50, the motor 20 is driven with the fuel cell 60 as the working electric power supply at step S3936. When the remaining charge SOC is not less than the preset reference value Mi2%, on the other hand, the motor 20 is driven with the battery 50 as the working electric power supply at step S3934, in order to prevent the battery 50 from being excessively charged. The motor 20 is controlled by setting the difference between the tentative target torque specified at step S3928 and the real target torque to be output from the engine 10 to the required torque of the motor 20.

Like the technique of the eleventh embodiment, the technique of the modification selects the working electric power supply according to the sign of the damping torque. This also attains the efficient damping control. More specifically, the damping control of the modification selectively uses the combination of the electric power supply and the motor. The combination of the auxiliary machinery driving motor 80 with the battery 50 is used to output the negative damping torque. The combination of the motor 20 with the fuel cell 60 is used, on the other hand, to output the positive additional torque. Like the eleventh embodiment, this technique properly selects the accumulator in which the excess power is stored in the form of electric power when the power actually output from the engine 10 is greater than the real target torque, and the supplier of electric power to compensate for the insufficiency when the power actually output from the engine 10 is less than the real target torque. Such selective use improves the driving efficiency in the process of applying the positive additional torque and thereby enhances the total working efficiency in the damping control process.

The damping control process of the modification causes the auxiliary machinery driving motor 80 to compensate for the torque variation, while causing the motor 20 to supplement the insufficiency of the output torque. The total target torque of the auxiliary machinery driving motor 80 and the motor 20 is set arbitrarily to enable compensation for the torque variation of the engine 10, provided that the motor 80 outputs a negative torque and the motor 20 outputs a positive torque. In one example, the maximum torque output from the engine 10 may be set to the tentative target torque in the map of FIG. 85. In this case, the torque variation of the engine 10 is always below the tentative target torque, and the motor 20 is used for the compensation. This causes a torque greater than the real target torque to be output from the crankshaft 12. The auxiliary machinery driving motor 80 is then used to apply a loading torque and thereby cancel the excess torque. Here the auxiliary machinery driving motor 80 outputs a substantially fixed loading torque. The damping control of the engine 10 may also be implemented in this manner.

Like the damping control process of the eleventh embodiment, the difference between the actual torque and the real target torque may be set to the torque variation ΔT of the engine 10. In this case, the motor 20 is used for the compensation in the period of the negative torque variation ΔT, whereas the auxiliary machinery driving motor 80 is used for the compensation in the period of the positive torque variation ΔT.

The techniques of the eleventh embodiment and its modification carry out the damping control by selectively using the battery 50 and the fuel cell 60 for the working electric power supply. The battery 50 may be replaced by any one of various accumulator means that are charged with electric power. For example, a capacitor may be used instead of the battery 50. The fuel cell 60 may be replaced by any one of various power generation means. For example, a generator may be used instead of the fuel cell 60. In the case where the auxiliary machinery driving motor 80 is not applied for the damping control like the eleventh embodiment, the auxiliary machinery driving motor 80 may be used as the power generation means. In this case, it is desirable to regulate the amount of power generation, in order to prevent the power generation of the auxiliary machinery driving motor 80 from causing the torque variation of the engine 10. One exemplified process regulates the amount of power generation of the auxiliary machinery driving motor 80 to a substantially fixed value, regardless of the electric power required for the damping control. The electric power that is not used for the damping control may be accumulated in the battery 50 or consumed by a variety of power-driven equipment.

The description of the eleventh embodiment and its modification are based on the hybrid vehicle having the hardware structure shown in FIG. 1. The technique of the damping control is, however, not restricted to this hardware structure but may be applicable to a diversity of vehicles having different hardware structures. For example, the technique may be applied to the vehicle having the structure of FIG. 1 except the motor 20. In this case, the auxiliary machinery driving motor 80, in place of the motor 20, is used to attain the damping control discussed in the eleventh embodiment. The motor used for the damping control may not be the power source of the vehicle. The damping control technique of the present invention is applicable to any vehicle having the structure that enables addition of a torque to compensate for the torque variation in the power transmission pathway from the engine 10.

P. Twelfth Embodiment

P1. Structure of System

Figure 87:
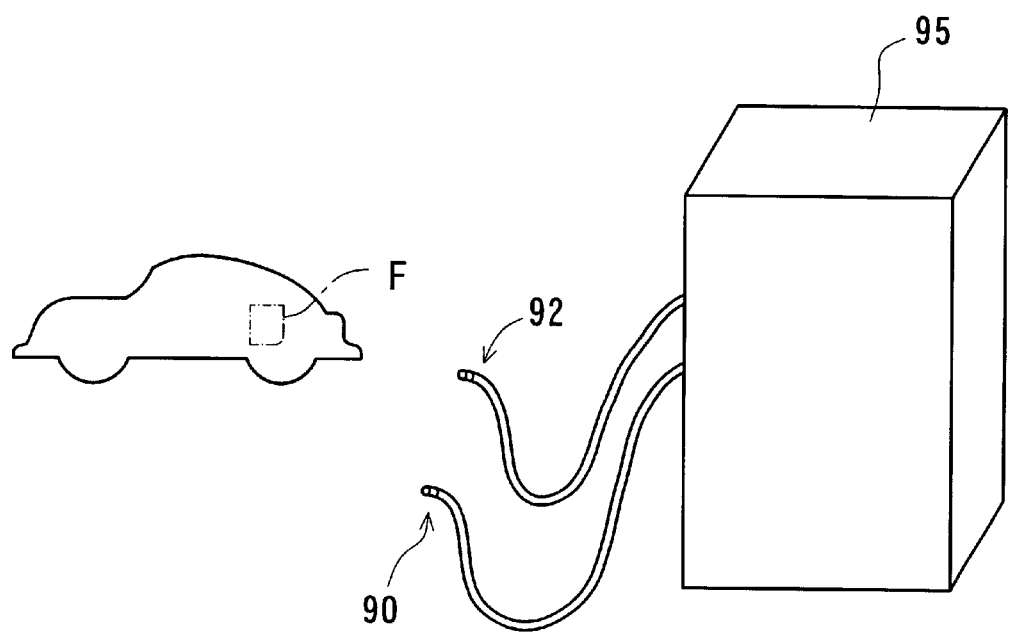
FIG. 87 shows a hybrid vehicle and a fuel supply unit in a twelfth embodiment according to the present invention.
Figure 88:
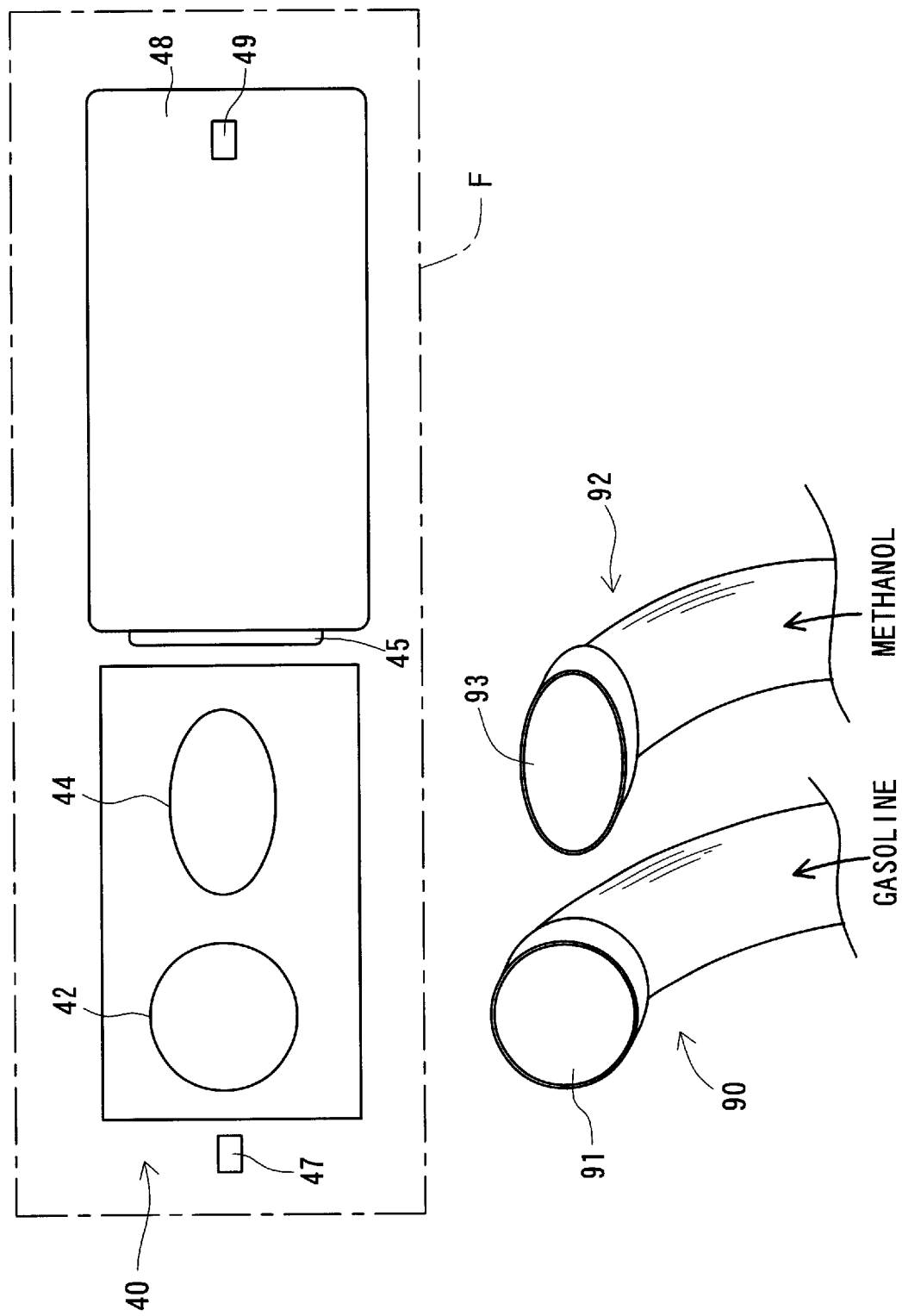
FIG. 88 shows the connecting structure of a fuel inlet unit and fuel spouts in the hybrid vehicle of the twelfth embodiment.

The following describes the structure of a hybrid vehicle in a twelfth embodiment according to the present invention. The hybrid vehicle of the twelfth embodiment has the identical structure with that of the hybrid vehicle of the first embodiment shown in FIG. 1, although the structure of a fuel supply mechanism is basically omitted from FIG. 1. The hybrid vehicle of the twelfth embodiment is characterized by the structure of a fuel inlet unit, through which supplies of gasoline and methanol used as the fuels are fed. FIG. 87 shows the hybrid vehicle and a fuel supply unit 95 for feeding supplies of gasoline and methanol to the vehicle in the twelfth embodiment. FIG. 88 shows the connecting structure of a fuel inlet unit 40 and fuel spouts. The fuel inlet unit 40 is provided at a predetermined position on the outer body surface of the hybrid vehicle as defined by an area F in FIGS. 87 and 88. The fuel supply unit 95 for feeding supplies of gasoline and methanol to the vehicle has two hoses for gasoline and methanol. The respective ends of the hoses form a gasoline spout 90 and a methanol spout 92.

Referring to FIG. 88, the fuel inlet unit 40 has a gasoline feed opening 42 and a methanol feed opening 44. The gasoline feed opening 42 is connected with a gasoline tank 35 (see FIG. 90) via a gasoline flow path arranged inside the vehicle. The methanol feed opening 44 is connected with the methanol reservoir 61 (see FIGS. 2 and 90) via a methanol flow path arranged inside the vehicle.

A gasoline spout opening 91 of the gasoline spout 90 and the gasoline feed opening 42 are formed to have specific shapes that are connectable with each other. Both the gasoline spout opening 91 and the gasoline feed opening 42 have circular cross sections to perfectly mate with each other. In a similar manner, a methanol spout opening 93 of the methanol spout 92 and the methanol feed opening 44 are formed to have specific shapes that perfectly mate with each other. The methanol spout opening 93 and the methanol feed opening 44 have ellipsoidal cross sections, different from the circular cross sections of the gasoline spout opening 91 and the gasoline feed opening 42. The difference in cross section effectively prevents the gasoline spout opening 91 from being mistakenly attached to the methanol feed opening 44 and the methanol spout opening 93 from being mistakenly attached to the gasoline feed opening 42.

The fuel inlet unit 40 has a fuel lid 48 as a single cover member that covers over both the gasoline feed opening 42 and the methanol feed opening 44. The fuel lid 48 is attached to the outer body surface via a hinge 45 to be freely opened and closed. The fuel lid 48 is in the open position in the illustration of FIG. 88. The vehicle body has a mating element 47 at a specific position that faces a click 49 formed on the fuel lid 48. Engagement of the click 49 with the mating element 47 prevents the fuel lid 48 from being accidentally opened.

An opener lever connected with the mating element 47 via a cable is provided in the vicinity of the driver's seat in the vehicle. When the driver operates the opener lever, the engagement of the click 49 with the mating element 47 is released to open the fuel lid 48. This mechanism is well known in the conventional vehicles. Another applicable mechanism does not use the cable but electrically opens the fuel lid 48. After the fuel lid 48 is opened, caps attached to the gasoline feed opening 42 and the methanol feed opening 44 are removed for the fuel supply.

In the hybrid vehicle of the twelfth embodiment, the gasoline feed opening 42 and the methanol feed opening 44 included in the fuel inlet unit 40 have different shapes. This arrangement enables the user to readily identify the right feed opening, in which a desired fuel is to be fed, and effectively prevents the user from mistakenly feeding gasoline or methanol to the wrong feed opening at the time of fuel supply.

The gasoline feed opening 42 and the methanol feed opening 44 are not restricted to the above shapes but may have any other shapes as far as they are explicitly different from each other. Especially preferable is that each feed opening and the corresponding spout opening have specific shapes that allow only one-to-one connection. Namely each feed opening has a specific shape that can receive only the mating spout opening, through which the right fuel is fed. In some combinations of shapes, the spout opening may be inserted into the wrong feed opening that has a different shape from that of the spout opening. It is accordingly desirable that such combinations of shapes are not applied for each set of the feed opening and the spout opening.

In the hybrid vehicle of the twelfth embodiment, the gasoline feed opening 42 connecting with the gasoline tank 35 and the methanol feed opening 44 connecting with the methanol reservoir 61 are formed in the fuel inlet unit 40, which is covered by the single fuel lid 48. This arrangement favorably saves the labor in the process of feeding supplies of gasoline and methanol. The single fuel lid 48 requires only one opener lever, so that this arrangement also simplifies the structure of the fuel supply mechanism.

In the example of FIG. 87, the fuel inlet unit 40 is disposed in the area F, which is located in a rear side portion of the vehicle. The fuel inlet unit 40 may, however, be disposed at a different position. The position of the fuel inlet unit 40 is determined appropriately by taking into account the positions of the gasoline tank 35 and the methanol reservoir 61 and the convenience of fuel supply. The fuel supply unit 95 shown in FIG. 87 supplies both gasoline and methanol. Separate gasoline supply unit and methanol supply unit may, however, be used in place of the fuel supply unit 95, provided that the gasoline spout opening 91 and the methanol spout opening 93 have explicitly different shapes that are respectively one-to-one connectable with the corresponding feed openings formed in the vehicle.

In the hybrid vehicle of the twelfth embodiment, the shape of the joint between the feed opening and the spout opening for gasoline is different from the shape of the joint between the feed opening and the spout opening for methanol. The cap attached to the gasoline feed opening 42 has a circular shape, whereas the cap attached to the methanol feed opening 44 has an ellipsoidal shape. In another example, a common shape may be applied for both the joint between the feed opening and the spout opening for gasoline and the joint between the feed opening and the spout opening for methanol. Such structure is shown in FIG. 89 and described below as a modified example of the twelfth embodiment.

Figure 89:
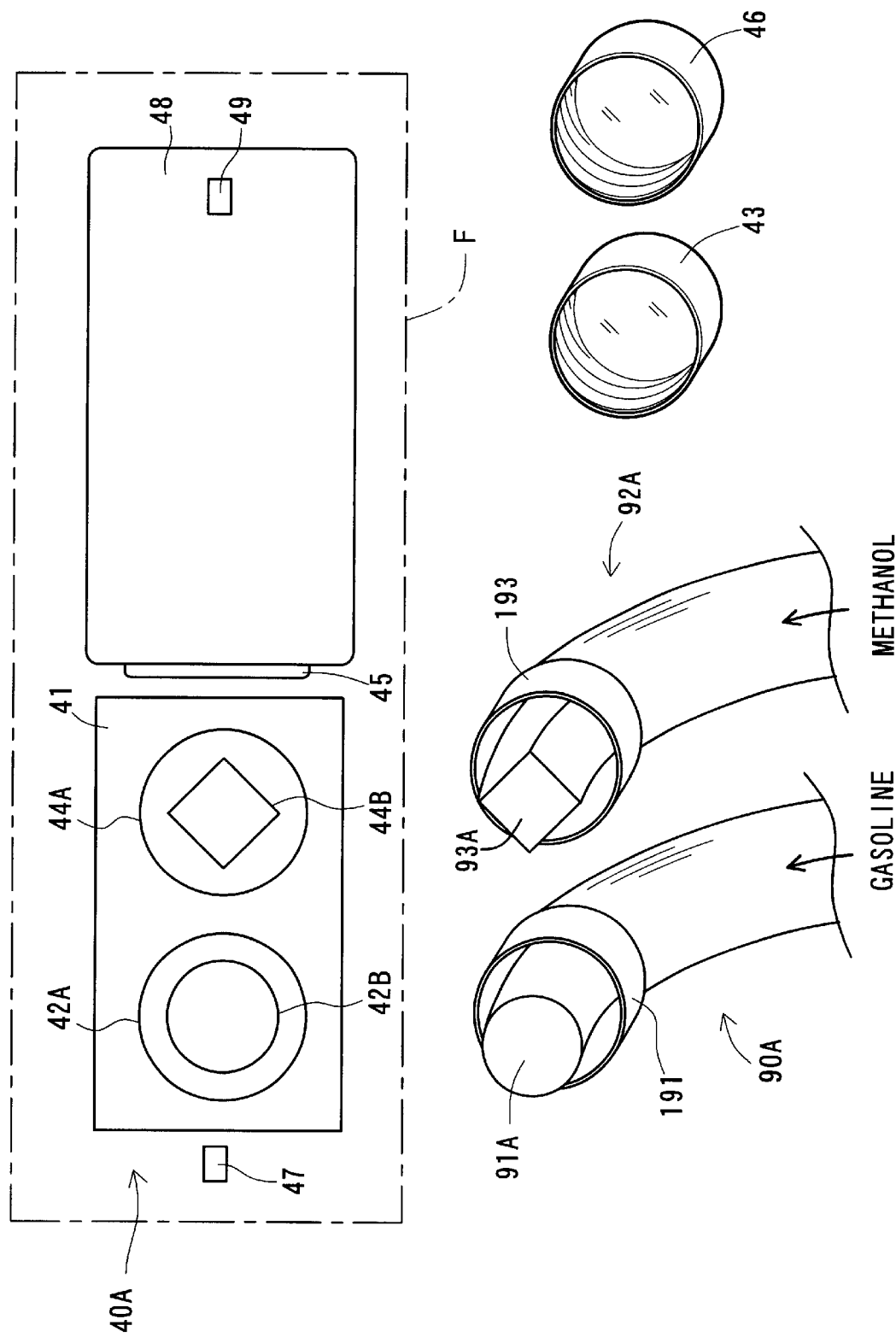
FIG. 89 shows the connecting structure of another fuel inlet unit and fuel spouts.

A fuel inlet unit 40A shown in FIG. 89 has a gasoline feed opening 42A and a methanol feed opening 44A. In this modified example, the gasoline feed opening 42A and the methanol feed opening 44A have both circular joints but include inner apertures of different shapes. The gasoline feed opening 42A has a circular aperture 42B, whereas the methanol feed opening 44A has a rectangular aperture 44B. The circular joints of the gasoline feed opening 42A and the methanol feed opening 44A have identical spiral grooves.

A fuel supply unit (not shown) has a gasoline spout 90A and a methanol spout 92A. One end of the gasoline spout 90A forms a gasoline spout opening 91A, which has a circular cross section to mate with the circular aperture 42B of the gasoline feed opening 42A. One end of the methanol spout 92A forms a methanol spout opening 93A, which has a rectangular cross section to mate with the rectangular aperture 44B of the methanol feed opening 44A.

The gasoline spout 90A and the methanol spout 92A respectively have cylindrical fitting elements 191 and 193. The cylindrical fitting elements 191 and 193 have circular cross sections and mate with the spiral grooves formed on the gasoline feed opening 42A and the methanol feed opening 44A. For the supply of gasoline, the gasoline spout opening 91A is inserted into the aperture 42B of the gasoline feed opening 42A, while the circular fitting element 191 is set on the circular gasoline feed opening 42A. For the supply of methanol, the methanol spout opening 93A is inserted into the aperture 44B of the methanol feed opening 44A, while the circular fitting element 193 is set on the circular methanol feed opening 44A.

The fuel inlet unit 40A has caps 43 and 46 for the gasoline feed opening 42A and the methanol feed opening 44A. The caps 43 and 46 have identical threads that are screwed to the identical spiral grooves formed on the gasoline feed opening 42A and the methanol feed opening 44A. Namely the caps 43 and 46 are identical in shape.

Like the fuel inlet unit 40 of the twelfth embodiment, the arrangement of the fuel inlet unit 40A effectively prevents the spout opening from being mistakenly inserted into the wrong feed opening. In the arrangement of this modified example, the caps 43 and 46 for the gasoline feed opening 42A and the methanol feed opening 44A have an identical shape.

In the fuel inlet unit 40A, the circular aperture 42B of the gasoline feed opening 42A and the rectangular aperture 44B of the methanol feed opening 44A should be formed to allow insertion of only the mating spout openings and forbid insertion of the wrong spout openings. For example, the diameter of the circular cross section of the gasoline spout opening 91A is made smaller than the circumcircle of the rectangular aperture 44B and greater than the inscribed circle thereof.

The twelfth embodiment regards the structure of the fuel inlet unit having the gasoline feed opening and the methanol feed opening. The fuel inlet unit may further include a water feed opening that connects with the water reservoir 62 to feed a supply of water used in the fuel cells stack 60A (see FIG. 2). In this case, it is desirable that the water feed opening is formed to have a specific shape that is connectable only with a water spout opening and unconnectable with the non-mating spout openings, that is, the gasoline spout opening and the methanol spout opening.

P2. Modification

In one modified structure of the twelfth embodiment, the hybrid vehicle has fuel type sensors that are disposed in respective fuel flow paths to identify the type of fuel currently flowing therethrough, and controls the operations of the engine 10 and the other constituents based on the results of the identification.

Figure 90:
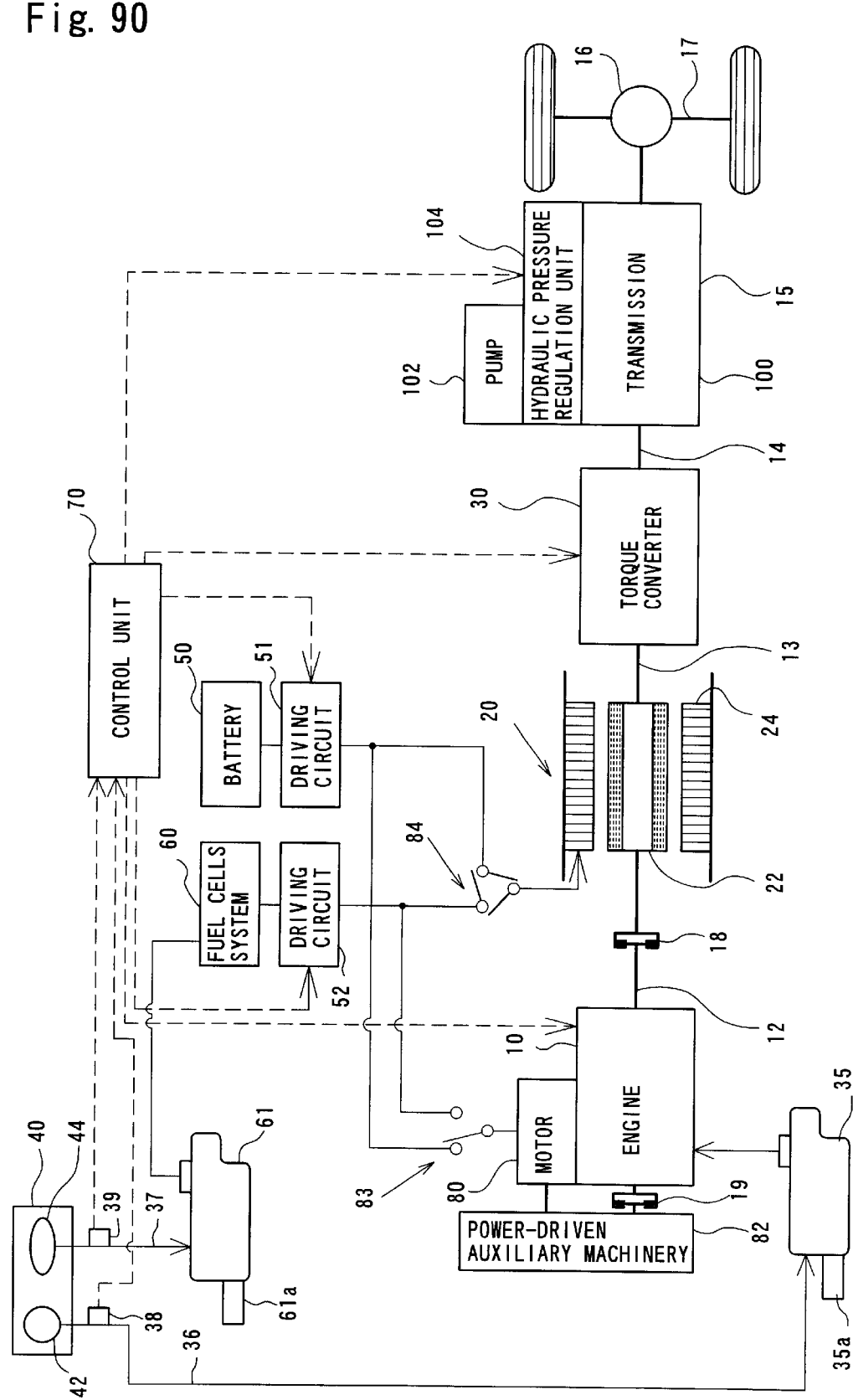
FIG. 90 shows the structure of another hybrid vehicle in one modification of the twelfth embodiment.

FIG. 90 illustrates the structure of the hybrid vehicle in the modification of the twelfth embodiment. The hybrid vehicle of the modification has a similar structure to that of the hybrid vehicle of the first embodiment shown in FIG. 1. The hybrid vehicle of the modification has fuel types sensors 38 and 39 that are respectively disposed in a gasoline flow path 36 and a methanol flow path 37 to identify the type of fuel currently flowing therethrough.

Figure 91:
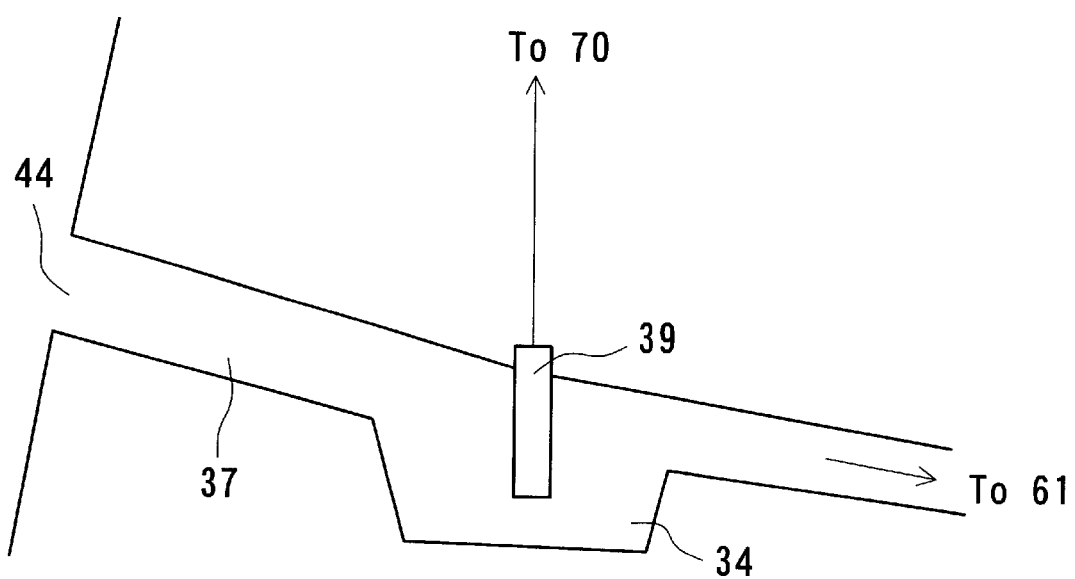
FIG. 91 shows attachment of a fuel type sensor.

FIG. 91 shows the fuel type sensor 39 set in the methanol flow path 37. The methanol flow path 37 has a sub-pool 34, in which the supply of fuel stays, in the vicinity of the methanol feed opening 44. The fuel type sensor 39 is located in the area of the sub-pool 34.

The fuel type sensor 39 is a known gas sensor for inflammable gas, and includes, for example, an n-type oxide semiconductor, such as tin oxide, with a catalyst like palladium (Pr) or platinum (Pt) carried thereon. The gas sensor utilizes the characteristic of the oxide semiconductor that the electrical resistance thereof varies with a variation in concentration of the inflammable gas, and outputs a signal corresponding to the electrical resistance of the oxide semiconductor.

When a new supply of fuel is fed through the methanol feed opening 44, part of the new supply of fuel stays in the sub-pool 34. When a predetermined quantity of fuel stays in the sub-pool 34, the fuel vaporized into the air around the sub-pool 34 has a certain range of concentration according to the environmental temperature. The concentration of the vaporized gasoline is naturally different from the concentration of the vaporized methanol. The difference in concentration is measured as the electrical resistance. This arrangement enables the user to identify the type of the supply of fuel and determine whether the right fuel, methanol in this case, is supplied. By appropriately selecting the composition of the oxide semiconductor and the catalyst carried thereon, the fuel type sensor 39 may have an enhanced selectivity to the target gas of interest and the improved accuracy of the identification. The fuel type sensor 38 disposed in the gasoline flow path 36 is constructed in a similar manner.

The hybrid vehicle may have an alarm mechanism, which gives an alarm display or an alarm sound to inform the user of the supply of wrong fuel, based on the detection results of these fuel type sensors 38 and 39. A display unit for the alarm display may be located in the vicinity of the fuel inlet unit 40 or the driver's seat.

One preferred structure forbids the drive of the engine 10 or the fuel cell 60 in response to the detection of the supply of wrong fuel. This arrangement desirably prevents the potential troubles due to the drive of the engine 10 or the fuel cell 60 with the wrong fuel.

Figure 92:
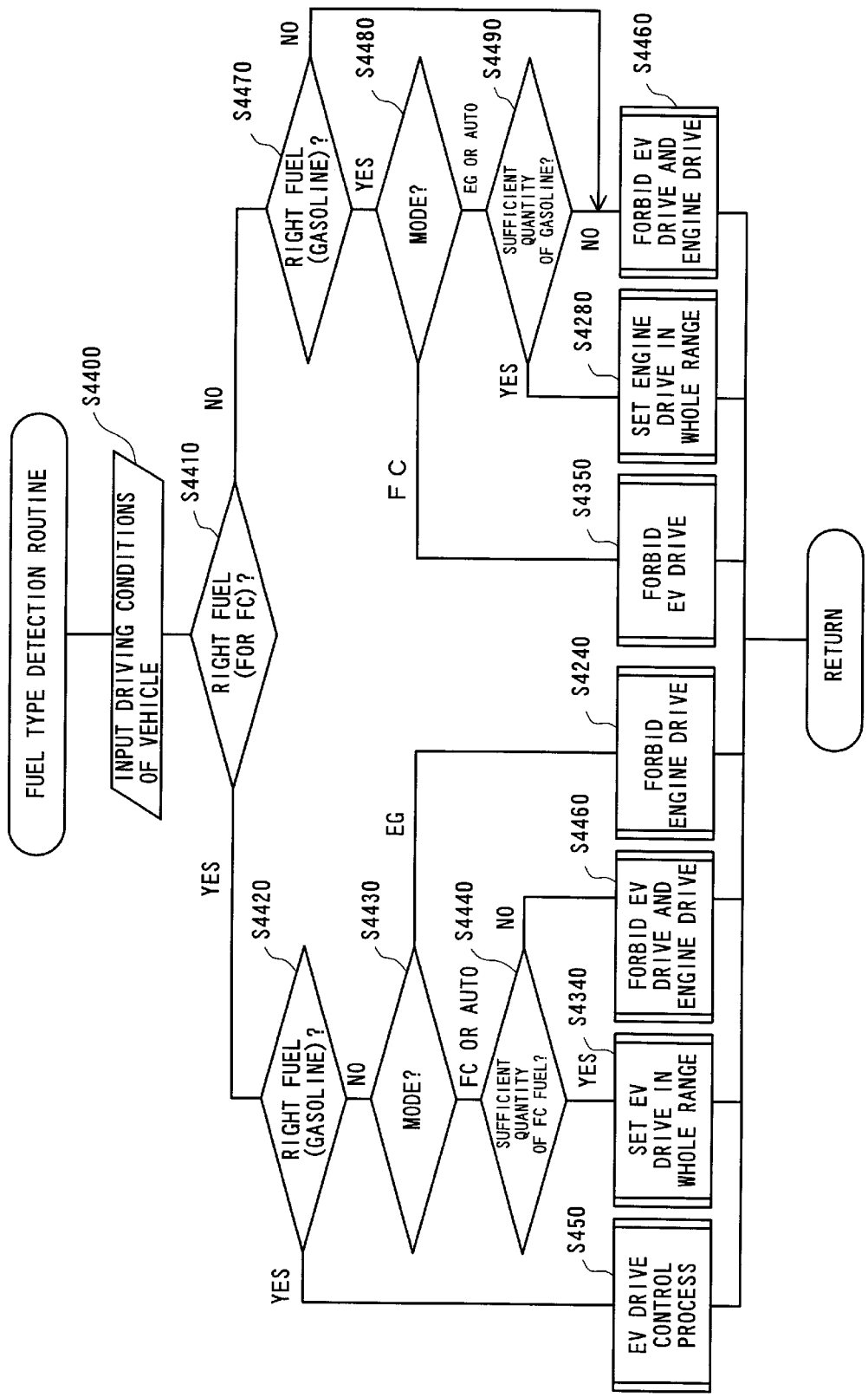
FIG. 92 is a flowchart showing a fuel type detection routine executed in the hybrid vehicle of the modification.

FIG. 92 is a flowchart showing a fuel type detection routine executed in the hybrid vehicle of the modification. The CPU in the control unit 70 periodically executes the fuel type detection routine at preset time intervals during a drive of the vehicle. When the program enters the routine of FIG. 92, the CPU first receives the inputs regarding the driving conditions of the vehicle at step S4400. In addition to the inputs from the various sensors and switches shown in FIG. 7, signals from the fuel type sensors 38 and 39 are input here. The signals from the fuel type sensors 38 and 39 are based on the pieces of information stored in the control unit 70 as the results of the detection at the time of latest fuel supply. These pieces of information stored in the control unit 70 are updated at every time of fuel supply.

At subsequent step S4410, the CPU determines whether or not the supply of fuel fed to the methanol reservoir 61 is the right fuel, that is, methanol, based on the information input at step S4400. When it is determined at step S4410 that the supply of fuel fed to the methanol reservoir 61 is the right fuel, the CPU subsequently determines at step S4420 whether or not the supply of fuel fed to the gasoline tank 35 is the right fuel, that is, gasoline, based on the information input at step S4400. When it is determined at step S4420 that the supply of fuel fed to the gasoline tank 35 is the right fuel, the CPU carries out the EV drive control process at step S4450 and exits from this routine. The EV drive control process carried out at step S4450 follows the flowchart of FIG. 69 discussed above as the eighth embodiment. The EV drive control process changes over the working power source between the engine 10 and the motor 20 according to the drive mode specified by the power source changeover switch 164.

When it is determined at step S4420 that the supply of fuel fed to the gasoline tank 35 is the wrong fuel, on the other hand, the CPU identifies the drive mode of the vehicle specified by the power source changeover switch 164 at step S4430. In the case of the selection of either the FC mode or the AUTO mode at step S4430, the CPU determines whether or not there is a sufficient quantity of the FC fuel at step S4440. When it is determined at step S4440 that there is a sufficient quantity of the FC fuel, the CPU sets the EV drive in the whole range at step S4340 and exits from this routine. The processing of step S4340 causes the hybrid vehicle to always run by the EV drive, irrespective of the driving conditions of the vehicle.

In the flow of FIG. 92, when the AUTO mode is selected through the operation of the power source changeover switch 164 at step S4430, the hybrid vehicle runs by the EV drive in the whole range upon the condition that there is a sufficient quantity of the FC fuel. In this case, it is desirable to give a display that informs the driver of prohibition of the automatic changeover of the working power source, because of the supply of wrong fuel. Another applicable procedure does not allow the hybrid vehicle to immediately start running by the EV drive in the case of the selection of the AUTO mode, but simply gives an alarm display that informs the driver of the supply of wrong fuel to the gasoline tank 35. When the driver selects the FC mode through another operation of the power source changeover switch 164, the hybrid vehicle starts running by the EV drive.

When it is determined at step S4440 that there is only an insufficient quantity of the FC fuel, the CPU forbids both the EV drive and the engine drive at step S4460 and exits from this routine. The processing of step S4460 forbids the drive of the engine 10 and the drive of the fuel cell 60, based on the supply of wrong fuel to the gasoline tank 35 and the insufficient quantity of the FC fuel. In a preferable arrangement, simultaneously with the prohibition of the drive of both the engine 10 and the fuel cell 60, an alarm display is given to inform the driver of the supply of wrong fuel to the gasoline tank 35 and the insufficient quantity of the FC fuel. In this case, if the battery 50 has a sufficient remaining charge, the hybrid vehicle may run by the EV drive with the electric power output from the battery 50.

When the engine (EG) mode is selected through the operation of the power source changeover switch 164 at step S4430, the CPU forbids the engine drive at step S4240 and exits from this routine. The processing of step S4240 forbids the drive of the engine 10. In a preferable arrangement, simultaneously with the prohibition of the drive of the engine 10, an alarm display is given to inform the driver of the supply of wrong fuel to the gasoline tank 35. The driver then understands the reason of the unsuccessful engine drive irrespective of the selection of the engine mode. In this case, if there is a sufficient quantity of the FC fuel, the hybrid vehicle may run by the EV drive in response to the selection of the FC mode through the operation of the power source changeover switch 164.

When it is determined at step S4410 that the supply of fuel fed to the methanol reservoir 61 is the wrong fuel, the CPU subsequently determines at step S4470 whether or not the supply of fuel fed to the gasoline tank 35 is the right fuel, that is, gasoline, based on the information input at step S4400. When it is determined at step S4470 that the supply of fuel fed to the gasoline tank 35 is the right fuel, the CPU identifies the drive mode of the vehicle specified by the power source changeover switch 164 at step S4480.

In the case of the selection of the FC mode at step S4480, the CPU forbids the EV drive at step S4350 and exits from this routine. The processing of step S4350 forbids the drive of the fuel cell 60. In a preferable arrangement, simultaneously with the prohibition of the drive of the fuel cell 60, an alarm display is given to inform the driver of the supply of wrong fuel to the methanol reservoir 61. The driver then understands the reason of the unsuccessful EG drive irrespective of the selection of the FC mode. In this case, if there is a sufficient quantity of gasoline, the hybrid vehicle may run by the engine drive in response to the selection of the EG mode through the operation of the power source changeover switch 164.

In the case of the selection of either the engine (EG) mode or the AUTO mode at step S4480, the CPU determines whether or not there is a sufficient quantity of gasoline at step S4490. When it is determined at step S4490 that there is a sufficient quantity of gasoline, the CPU sets the engine drive in the whole range at step S4280 and exits from this routine. The processing of step S4280 causes the hybrid vehicle to always run by the engine drive, irrespective of the driving conditions of the vehicle.

In the flow of FIG. 92, when the AUTO mode is selected through the operation of the power source changeover switch 164 at step S4480, the hybrid vehicle runs by the engine drive in the whole range upon the condition that there is a sufficient quantity of gasoline. In this case, it is desirable to give a display that informs the driver of prohibition of the automatic changeover of the working power source, because of the supply of wrong fuel. Another applicable procedure does not allow the hybrid vehicle to immediately start running by the engine drive in the case of the selection of the AUTO mode, but simply gives an alarm display that informs the driver of the supply of wrong fuel to the methanol reservoir 61. When the driver selects the EG mode through another operation of the power source changeover switch 164, the hybrid vehicle starts running by the engine drive.

When it is determined at step S4490 that there is only an insufficient quantity of gasoline, the CPU forbids both the EV drive and the engine drive at step S4460 and exits from this routine. In this case, the processing of step S4460 forbids the drive of the engine 10 and the drive of the fuel cell 60, based on the supply of wrong fuel to the methanol reservoir 61 and the insufficient quantity of gasoline. In a preferable arrangement, simultaneously with the prohibition of the drive of both the engine 10 and the fuel cell 60, an alarm display is given to inform the driver of the supply of wrong fuel to the methanol reservoir 61 and the insufficient quantity of gasoline. In this case, if the battery 50 has a sufficient remaining charge, the hybrid vehicle may run by the EV drive with the electric power output from the battery 50.

When it is determined at step S4470 that the supply of fuel fed to the gasoline tank 35 is also the wrong fuel, the CPU forbids both the EV drive and the engine drive at step S4460 and exits from this routine. In this case, the processing of step S4460 forbids the drive of the engine 10 and the drive of the fuel cell 60, based on the supply of wrong fuel to the methanol reservoir 61 and the supply of wrong fuel to the gasoline tank 35. In a preferable arrangement, simultaneously with the prohibition of the drive of both the engine 10 and the fuel cell 60, an alarm display is given to inform the driver of the supply of wrong fuel to the methanol reservoir 61 and the supply of wrong fuel to the gasoline tank 35. In this case, if the battery 50 has a sufficient remaining charge, the hybrid vehicle may run by the EV drive with the electric power output from the battery 50.

In the hybrid vehicle of this arrangement, in the case of the supply of wrong fuel, the use of the corresponding energy output source, that is, the fuel cell 60 or the engine 10, is prohibited. This desirably prevents the potential troubles, due to the drive of the energy output source with the wrong fuel. As described in the twelfth embodiment, it is desirable that each feed opening of the hybrid vehicle is one-to-one connectable with the mating spout opening of the fuel supply unit 95 and unconnectable with the wrong spout openings. The hybrid vehicle of this modified arrangement effectively prevents or reduces the potential troubles, due to the drive of the energy output source with the wrong fuel, even in the case of the supply of wrong fuel.

When the supply of wrong fuel is fed to one fuel tank but another fuel tank keeps the right fuel, the energy output source receiving the supply of fuel from another fuel tank is used to drive the hybrid vehicle. The drive mode using the supply of right fuel to output the driving energy is automatically selected or manually specified by the driver, based on the alarm display that informs the driver of the supply of wrong fuel. The changeover of the working energy output source enables the hybrid vehicle to continue driving.

In the hybrid vehicle of the modified arrangement, the fuel type sensors are disposed in both the gasoline flow path 36 and the methanol flow path 37. The fuel type sensor may, however, be disposed only one of these flow paths 36 and 37. This simplified arrangement identifies the type of fuel passing through the flow path with the fuel type sensor and determines whether or not the right fuel is supplied to the fuel tank connecting with the flow path. This exerts the limited but similar effects.

The hybrid vehicle of the twelfth embodiment or its modification uses gasoline and methanol as the fuels for driving the vehicle and has the engine 10 and the fuel cell 60 as the energy output sources driven with these fuels. The technique of the twelfth embodiment or its modification may, however, be applicable to another combination of fuels or another combination of energy output sources. For example, another hydrocarbon or hydrocarbon compound, such as ethanol, gas oil, or ethane, may be used in place of methanol and reformed to generate a hydrogen-rich gas as the fuel of the fuel cell 60.

The twelfth embodiment regards the application of the structure of the fuel inlet unit having the plurality of feed openings, which have different shapes and are one-to-one connectable with the mating spout openings of the fuel supply unit, to the hybrid vehicle with the engine 10 and the fuel cell 60. The plurality of fuels are supplied to the separate fuel tanks through the connection of the feed openings of the fuel inlet unit with the mating spout openings of the fuel supply unit. The modification of the twelfth embodiment regards the application of the structure with the fuel type sensors that identify the type of the fuel fed to the respective fuel tanks to the hybrid vehicle with the engine 10 and the fuel cell 60. These techniques may, however, be applicable to any other moving object using a plurality of different fuels and having a plurality of different energy output sources.

Q. Other Modifications

The above embodiments regard the hybrid vehicle with both the fuel cell 60 and the battery 50 as the available electric power supplies. The techniques of the present invention are also applicable to the hybrid vehicle with only the fuel cell 60 as the electric power supply. In the hybrid vehicle of this structure, the respective parameters used for the various control processes discussed above should be set by taking into account the response delay of the fuel cell 60.

The hybrid vehicle may further include an additional element to compensate for the response delay of the fuel cell. For example, a capacitor may be used in place of the battery 50. The capacitor is used to transiently compensate for the poor response of the fuel cell. A certain quantity of electric power output from the fuel cell or obtained by the regenerative operation of the motor is accumulated in advance into the capacitor. The capacitor outputs the electric power accumulated therein to compensate for the insufficiency of electric power. This structure effectively reduces an extreme variation in electric power even without the battery 50.

The above embodiments regard the hybrid vehicle with both the motor and the engine. The techniques of the present invention may, however, be applicable to other vehicles, for example, the electric vehicles with only the motor as the available power source, and a variety of other moving objects having a plurality of power sources or a plurality of electric power supplies.

The hybrid vehicle may have a diesel engine or another power source, in place of the gasoline engine 10. An induction motor, another a.c. motor, or a d.c. motor, in place of the three-phase synchronous motor, may be used for the motor 20 and the auxiliary machinery driving motor 80.

The present invention is not restricted to the above embodiments or their modifications, but there may be many other modifications, changes, and alterations without departing from the scope or spirit of the main characteristics of the present invention. For example, in the above embodiments and their modifications, the CPU executes the various control processes according to the software programs. The similar controls may, however, be implemented by the hardware structure.

The scope and spirit of the present invention are limited only by the terms of the appended claims.

What is claimed is:

1. A vehicle having at least two energy output sources including a fuel cell, said vehicle comprising:
   a drive shaft that outputs mechanical power to move said vehicle;
   a mechanical energy output mechanism that converts energy output from each of said at least two energy output sources into mechanical energy and outputs the converted mechanical energy to said drive shaft,
   a detection unit that measures at least either one of an output sustaining ability and a variation thereof with regard to said fuel cell;
   an output controller that controls an output energy from said fuel cell based on a result of the measurement by said detection unit and controls an output from the remaining energy output sources based on the output from said fuel cell so as to ensure output of a required total energy;
   wherein the required total energy is expressed as a quantity of mechanical energy output from said drive shaft per unit time,
   wherein said vehicle has a specific driving range where said fuel cell is selected to be mainly used to output the required total energy, and
   wherein said output controller narrows the specific driving range according to at least one of the output sustaining ability and a variation thereof.

2. A vehicle in accordance with claim 1, wherein said detector measures at least either one of the output sustaining ability of said fuel cell and the variation thereof, based on a remaining quantity of a fuel for said fuel cell.

3. A vehicle in accordance with claim 1, wherein said detector measures at least either one of the output sustaining ability of said fuel cell and the variation thereof, based on a loading state of said fuel cell.

4. A vehicle in accordance with claim 1, wherein said at least two energy output sources include said fuel cell and a heat engine.

5. A vehicle in accordance with claim 4, wherein said detector measures at least either one of the output sustaining ability of said heat engine and the variation thereof,
   an overall driving range of the vehicle includes a first driving range where the heat engine is used as a working energy output source and a second driving range where the heat engine is not used as the working energy output source, and
   said output controller selects said fuel cell to be used in place of said heat engine as the working energy output source even in the first driving range when the observed output sustaining ability of said heat engine is lower than a predetermined level.

6. A vehicle in accordance with claim 1, wherein said output controller reduces a torque, which is to be output by utilizing said fuel cell, according to at least one of the output sustaining ability and a variation thereof.

7. A vehicle in accordance with claim 1, wherein said at least two energy output sources include a heat engine, said fuel cell, and a secondary battery,
   said mechanical energy output mechanism includes at least a motor that is rotatable with electric power output from said fuel cell and said secondary battery,
   a driving range of said vehicle includes a specific driving range only in which said motor is to operate.

8. A vehicle in accordance with claim 1, said vehicle further comprising:
    an accumulator that is charged with electric power and is discharged to release electric power; and
    an electrical energy output mechanism that converts energy output from each of said at least two energy output sources into electrical energy, which is supplied to charge said accumulator,
    wherein the required total energy is expressed as a quantity of electrical energy required to increase a charge level of said accumulator to a predetermined degree.

9. A vehicle in accordance with claim 8, wherein said output controller lowers the predetermined degree, which is set as a target charge level of said accumulator, with a decrease in output sustaining ability of a specific energy output source that mainly outputs electric power to charge said accumulator.

10. A vehicle in accordance with claim 8, wherein said output controller reduces a ratio of an output of a specific energy output source, which mainly outputs electric power to charge said accumulator, to the total energy with a decrease in output sustaining ability of said specific energy output source.

11. A vehicle in accordance with claim 10, wherein said output controller heightens the predetermined degree, which is set as a target charge level of said accumulator, with a decrease in output sustaining ability of a specific energy output source that mainly outputs electric power to charge said accumulator.

12. A vehicle in accordance with claim 1, wherein said detector measures the variation in the output sustaining ability with regard to at least one of said at least two energy output sources, and
    said output controller varies an output of said at least one energy output source, which is observed by the detector to measure the variation in the output sustaining ability, at a rate corresponding to the observed variation.

13. A vehicle in accordance with claim 1, wherein said output controller changes a working energy output source according to a driving state of said vehicle, so as to output the total energy,
    said output controller forbidding a change of the working energy output source to a specific energy output source that is determined to have an output sustaining ability of not greater than a preset level.

14. A vehicle in accordance with claim 1, wherein said output controller changes a working energy output source according to a driving state of said vehicle, so as to output the total energy,
    said output controller performing a change of the working energy output source from a specific energy output source, which is determined to have an output sustaining ability of not greater than a preset level, to another energy output source even if the driving state of said vehicle recommends a selection of said specific energy output source as the working energy output source.

15. A vehicle in accordance with claim 14, wherein each of said at least two energy output sources has a mechanism that outputs rotational power to a drive shaft of said vehicle, and
    said output controller performs the change of the working energy output source from said specific energy output source to said another energy output source in a specific driving state of said vehicle, where a difference between torques said specific energy output sources can output is within a preset range.

16. A vehicle in accordance with claim 1, said vehicle further comprising:
    a driving state input unit that inputs a predetermined parameter representing a driving state of said vehicle,
    wherein said output controller varies a reference value, which is used to control the output state of energy from each of said at least two energy output sources based on the result of the measurement, with a variation of the predetermined parameter.

* * * * *